FIG. 1

BINARY CODE PATTERN A

| COUNTER VALUE | 1 | 2 | 4 | 8 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |

FIG. 2

BINARY CODE PATTERN A'

| COUNTER VALUE | 1 | 2 | 4 | 8 |
|---|---|---|---|---|
| 0 | 1 | 1 | 1 | 1 |
| 1 | 0 | 1 | 1 | 1 |
| 2 | 1 | 0 | 1 | 1 |
| 3 | 0 | 0 | 1 | 1 |
| 4 | 1 | 1 | 0 | 1 |
| 5 | 0 | 1 | 0 | 1 |
| 6 | 1 | 0 | 0 | 1 |
| 7 | 0 | 0 | 0 | 1 |
| 8 | 1 | 1 | 1 | 0 |
| 9 | 0 | 1 | 1 | 0 |
| 10 | 1 | 0 | 1 | 0 |
| 11 | 0 | 0 | 1 | 0 |
| 12 | 1 | 1 | 0 | 0 |
| 13 | 0 | 1 | 0 | 0 |
| 14 | 1 | 0 | 0 | 0 |
| 15 | 0 | 0 | 0 | 0 |

NOTE — IN BOTH PATTERNS "1" INDICATES COUNTER ON
"0" INDICATES COUNTER OFF

*INVENTOR.*
ARTHUR H. DICKINSON

*BY* Joseph C. Sweet, Jr.

ATTORNEY

INVENTOR
ARTHUR H. DICKINSON
BY
Joseph C. Sweet, Jr.
ATTORNEY

INVENTOR
ARTHUR H. DICKINSON
BY
Joseph C. Sweet, Jr.
ATTORNEY

INVENTOR
ARTHUR H. DICKINSON
BY
Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 5

INVENTOR.
ARTHUR H. DICKINSON

BY Joseph C. Sweet, Jr.
ATTORNEY

MULTIPLIER-DIVIDER EMPLOYING TRANSISTORS

INVENTOR
ARTHUR H. DICKINSON
BY Joseph C. Sweet Jr.
ATTORNEY

PR-DD ACCUMULATOR

ENTRY OF PARTIAL DIFFERENTIAL VALUES

| DIGIT TO BE ENTERED | PARTIAL DIFF. VALUE ENTRY | RESULT | 1<br>S1 | 2<br>S2 | 4<br>S3 | 8<br>S4 | C<br>CY | BINARY NUMBER<br>TRIGGER STAGE |
|---|---|---|---|---|---|---|---|---|
| | | 0 | 1 | 1 | 1 | 1 | 0 | |
| 9 | 8 | | 1 | 1 | 1 | 0 | 0 | |
| | | | 1 | 0 | 1 | 0 | 0 | |
| | | | 1 | 0 | 0 | 0 | 0 | |
| | 1 | 9 | 0 | 0 | 0 | 0 | 0 | |
| 8 | 8 | 7 | 0 | 0 | 0 | 1 | ① | CARRY OUT |
| 7 | 4 | | 0 | 0 | 1 | 0 | 0 | |
| | | | 0 | 1 | 0 | 0 | 0 | |
| | | | 0 | 1 | 1 | 1 | 1 | |
| | 2 | | 0 | 0 | 1 | 1 | 1 | |
| | 1 | 4 | 1 | 1 | 0 | 1 | ① | CARRY OUT |
| 6 | 4 | | 1 | 1 | 1 | 0 | 0 | |
| | | | 1 | 0 | 1 | 0 | 0 | |
| | | | 1 | 0 | 0 | 0 | 0 | |
| | 2 | 0 | 1 | 1 | 1 | 1 | ① | CARRY OUT |
| 5 | 4 | | 1 | 1 | 0 | 1 | 0 | |
| | 1 | 5 | 0 | 1 | 0 | 1 | 0 | |
| 4 | 4 | | 0 | 1 | 1 | 0 | 0 | |
| | | | 0 | 0 | 1 | 0 | 0 | |
| | | 9 | 0 | 0 | 0 | 0 | 0 | |
| 3 | 2 | | 0 | 1 | 1 | 1 | 1 | |
| | 1 | 2 | 1 | 0 | 1 | 1 | ① | CARRY OUT |
| 2 | 2 | 4 | 1 | 1 | 0 | 1 | 0 | |
| 1 | 1 | 5 | 0 | 1 | 0 | 1 | 0 | |

FIG. 8

NOTE -
"1" INDICATES COUNTER ON
"0" INDICATES COUNTER OFF

*INVENTOR.*
ARTHUR H. DICKINSON

*BY* Joseph C. Sweet, Jr.
*ATTORNEY*

DIVISION BY ALTERNATE SUBTRACTION (IN TENS COMPLEMENT FORM) AND ADDITION OF THE DIVISOR

EXAMPLE: 2072 ÷ 037 = 56

INVENTOR.
ARTHUR H. DICKINSON
BY Joseph C. Sweet, Jr.
ATTORNEY

INVENTOR.
ARTHUR H. DICKINSON
BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 10

INVENTOR.
ARTHUR H. DICKINSON
BY
Joseph C. Sweet, Jr
ATTORNEY

June 28, 1960 A. H. DICKINSON 2,942,780

MULTIPLIER-DIVIDER EMPLOYING TRANSISTORS

Filed July 1, 1954 74 Sheets-Sheet 11

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 12

INVENTOR.
ARTHUR H. DICKINSON

BY Joseph C. Sweet, Jr.

ATTORNEY

June 28, 1960 A. H. DICKINSON 2,942,780

MULTIPLIER-DIVIDER EMPLOYING TRANSISTORS

Filed July 1, 1954 74 Sheets-Sheet 13

*INVENTOR.*
ARTHUR H. DICKINSON

*BY*

Joseph C. Sweet, Jr.
ATTORNEY

MC-DRA REGISTER

| ENTRY PULSE NUMBER ↓ | 1 | 2 | 4 | 8 | BINARY NUMBER |
|---|---|---|---|---|---|
| | S1 | S2 | S3 | S4 | TRIGGER STAGE |
| 0 (RESET STATUS) | 0 | 0 | 0 | 0 | |
| 1 | 1 | 0 | 0 | 0 | |
| 2 | 0 | 1 | 0 | 0 | |
| 3 | 1 | 1 | 0 | 0 | |
| 4 | 0 | 0 | 1 | 0 | |
| 5 | 1 | 0 | 1 | 0 | |
| 6 | 0 | 1 | 1 | 0 | |
| 7 | 1 | 1 | 1 | 0 | |
| 8 | 0 | 0 | 0 | 1 | |
| 9 | 1 | 0 | 0 | 1 | |

FIG. 12

DRS REGISTER

| ENTRY PULSE NUMBER ↓ | 1 | 2 | 4 | 8 | BINARY NUMBER |
|---|---|---|---|---|---|
| | S1 | S2 | S3 | S4 | TRIGGER STAGE |
| 0 (RESET STATUS) | 1 | 0 | 0 | 1 | |
| 1 | 0 | 0 | 0 | 1 | |
| 2 | 1 | 1 | 1 | 0 | |
| 3 | 0 | 1 | 1 | 0 | |
| 4 | 1 | 0 | 1 | 0 | |
| 5 | 0 | 0 | 1 | 0 | |
| 6 | 1 | 1 | 0 | 0 | |
| 7 | 0 | 1 | 0 | 0 | |
| 8 | 1 | 0 | 0 | 0 | |
| 9 | 0 | 0 | 0 | 0 | |

FIG. 13

NOTE -
IN BOTH PATTERNS "1" INDICATES COUNTER ON
"0" INDICATES COUNTER OFF

INVENTOR.
ARTHUR H. DICKINSON
BY Joseph C. Sweet, Jr.
ATTORNEY

INVENTOR.
ARTHUR H. DICKINSON
BY
Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 16

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 17

INVENTOR.
ARTHUR H. DICKINSON

BY Joseph C. Sweet, Jr.
ATTORNEY

INVENTOR.
ARTHUR H. DICKINSON

Joseph C. Sweet, Jr.
ATTORNEY

INVENTOR.
ARTHUR H. DICKINSON

BY Joseph C. Sweet, Jr.
ATTORNEY

MULTIPLIER-DIVIDER EMPLOYING TRANSISTORS

Filed July 1, 1954 74 Sheets-Sheet 20

COLUMN SHIFT GATE CIRCUITS

INVENTOR.
ARTHUR H. DICKINSON
BY Joseph C. Sweet, Jr
ATTORNEY

INVENTOR.
ARTHUR H. DICKINSON
BY Joseph C. Sweet, Jr.
ATTORNEY

MULTIPLIER-DIVIDER EMPLOYING TRANSISTORS

Filed July 1, 1954 74 Sheets-Sheet 22

DISTRIBUTOR

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 23

DISTRIBUTOR

INVENTOR.
ARTHUR H. DICKINSON

BY Joseph C. Sweet, Jr.
ATTORNEY

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 25

INVENTOR.
ARTHUR H. DICKINSON

BY Joseph C. Sweet, Jr.
ATTORNEY

MULTIPLIER-DIVIDER EMPLOYING TRANSISTORS

INVENTOR.
ARTHUR H. DICKINSON

BY Joseph C. Sweet, Jr.
ATTORNEY

INVENTOR.
ARTHUR H. DICKINSON

BY Joseph C. Sweet, Jr.
ATTORNEY

INVENTOR.
ARTHUR H. DICKINSON
Joseph C. Sweet, Jr.
ATTORNEY

MULTIPLIER-DIVIDER EMPLOYING TRANSISTORS

Filed July 1, 1954 74 Sheets-Sheet 29

INVENTOR.
ARTHUR H. DICKINSON

BY Joseph C. Sweet Jr.
ATTORNEY

INVENTOR.
ARTHUR H. DICKINSON

Joseph C. Sweet, Jr.
ATTORNEY

MULTIPLIER-DIVIDER EMPLOYING TRANSISTORS

Filed July 1, 1954 74 Sheets-Sheet 31

INVENTOR.
ARTHUR H. DICKINSON

BY Joseph C. Sweet, Jr.
ATTORNEY

INVENTOR.
ARTHUR H. DICKINSON
Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 33

INVENTOR.
ARTHUR H. DICKINSON

BY Joseph C. Sweet, Jr.
ATTORNEY

MULTIPLIER-DIVIDER EMPLOYING TRANSISTORS

Filed July 1, 1954

INVENTOR.
ARTHUR H. DICKINSON

BY Joseph C. Sweet, Jr.
ATTORNEY

INVENTOR.
ARTHUR H. DICKINSON
BY Joseph C. Sweet, Jr.
ATTORNEY

MULTIPLIER-DIVIDER EMPLOYING TRANSISTORS

Filed July 1, 1954 74 Sheets-Sheet 36

INVENTOR.
ARTHUR H. DICKINSON

BY Joseph C. Sweet, Jr.
ATTORNEY

INVENTOR.
ARTHUR H. DICKINSON
BY Joseph C. Sweet, Jr.
ATTORNEY

MULTIPLIER-DIVIDER EMPLOYING TRANSISTORS

INVENTOR.
ARTHUR H. DICKINSON

BY Joseph C. Sweet, Jr.
ATTORNEY

INVENTOR.
ARTHUR H. DICKINSON

BY Joseph C. Sweet, Jr.
ATTORNEY

MP-Q REGISTER

INVENTOR.
ARTHUR H. DICKINSON
Joseph C. Sweet, Jr.
ATTORNEY

MULTIPLIER-DIVIDER EMPLOYING TRANSISTORS

Filed July 1, 1954 74 Sheets-Sheet 41

INVENTOR.
ARTHUR H. DICKINSON

BY Joseph C. Sweet, Jr.
ATTORNEY

INVENTOR.
ARTHUR H. DICKINSON
Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 43

INVENTOR.
ARTHUR H. DICKINSON

BY Joseph C. Sweet, Jr.
ATTORNEY

MULTIPLIER-DIVIDER EMPLOYING TRANSISTORS

MP-Q REGISTER

INVENTOR.
ARTHUR H. DICKINSON

Joseph C. Sweet, Jr.
ATTORNEY

INVENTOR.
ARTHUR H. DICKINSON

BY Joseph C. Sweet, Jr.
ATTORNEY

MULTIPLIER-DIVIDER EMPLOYING TRANSISTORS

Filed July 1, 1954 74 Sheets-Sheet 46

MULTIPLIER-DIVIDER EMPLOYING TRANSISTORS

INVENTOR.
ARTHUR H. DICKINSON
BY Joseph C. Sweet, Jr.
ATTORNEY

MULTIPLIER-DIVIDER EMPLOYING TRANSISTORS

INVENTOR.
ARTHUR H. DICKINSON

Joseph C. Sweet, Jr
ATTORNEY

MP-Q REGISTER
FORWARD OPERATION

| ENTRY PULSE NUMBER ↓ | 1 | 2 | 4 | 8 | BINARY NUMBER |
|---|---|---|---|---|---|
| | S1 | S2 | S3 | S4 | TRIGGER STAGE |
| 0 (RESET STATUS) | 0 | 0 | 0 | 0 | |
| 1 | 1 | 0 | 0 | 0 | |
| 2 | 0 | 1 | 0 | 0 | |
| 3 | 1 | 1 | 0 | 0 | |
| 4 | 0 | 0 | 1 | 0 | |
| 5 | 1 | 0 | 1 | 0 | |
| 6 | 0 | 1 | 1 | 0 | |
| 7 | 1 | 1 | 1 | 0 | |
| 8 | 0 | ⦶ | ⦶ | 1 | |
| 9 | 1 | 1 | 1 | 1 | |

FIG. 27

MP-Q REGISTER
REVERSE OPERATION
MULTIPLYING

| IMPUT PULSE NO. ON M'PLYING | ENTRY FROM CARD | 1 | 2 | 4 | 8 | BINARY NUMBER |
|---|---|---|---|---|---|---|
| | | S1 | S2 | S3 | S4 | TRIGGER STAGE |
| | 9 | 1 | 1 | 1 | 1 | |
| 1 | | 0 | 1 | 1 | 1 | |
| 2 | | 1 | 0 | 1 | 1 | |
| 3 | | 0 | 0 | 1 | 1 | |
| 4 | | 1 | 1 | 0 | 1 | |
| 5 | | 0 | 1 | 0 | 1 | |
| 6 | | 1 | 0 | 0 | 1 | |
| 7 | | 0 | 0 | 0 | 1 | |
| 8 | | 1 | ⦶ | ⦶ | 0 | |
| 9 | | 0 | 0 | 0 | 0 | |

FIG. 28

NOTE-
IN BOTH PATTERNS "1" INDICATES COUNTER ON
"0" INDICATES COUNTER OFF

INVENTOR.
ARTHUR H. DICKINSON
Joseph C. Sweet, Jr.
ATTORNEY

MP-Q REGISTER
REVERSE OPERATION
DIVIDING

| ENTRY PULSE NUMBER ↓ | QUOTIENT RESULT DIGIT ↓ | 1 S1 | 2 S2 | 4 S3 | 8 S4 | BINARY NUMBER TRIGGER STAGE |
|---|---|---|---|---|---|---|
| 0 | | 0 | 0 | 0 | 0 | |
| 1 | 9 | 1 | 1 | 1 | 1 | |
| 2 | 8 | 0 | 1 | 1 | 1 | |
| 3 | 7 | 1 | 0 | 1 | 1 | |
| 4 | 6 | 0 | 0 | 1 | 1 | |
| 5 | 5 | 1 | 1 | 0 | 1 | |
| 6 | 4 | 0 | 1 | 0 | 1 | |
| 7 | 3 | 1 | 0 | 0 | 1 | |
| 8 | 2 | 0 | 0 | 0 | 1 | |
| 9 | 1 | 1 | 0 | 0 | 0 | |

FIG. 29

MP-Q REGISTER
READ-OUT OPERATION
REGISTER PREVIOUSLY OPERATED IN FORWARD DIRECTION

| DIF'R'NT'L TIME OF READ-OUT ↓ | READ-OUT PULSE NUMBER ↓ | RESULT DIGIT ↓ | 1 S1 | 2 S2 | 4 S3 | 8 S4 | BINARY NUMBER TRIGGER STAGE |
|---|---|---|---|---|---|---|---|
| | | 7 | 1 | 1 | 1 | 0 | |
| 9 | 1 | | 0 | 0 | 0 | 1 | |
| 8 | 2 | | 1 | 1 | 1 | 1 | |
| 7 | 3 | | 0 | 0 | 0 | 0 | PULSE OUT → |
| 6 | 4 | | 1 | 0 | 0 | 0 | |
| 5 | 5 | | 0 | 1 | 0 | 0 | |
| 4 | 6 | | 1 | 1 | 0 | 0 | |
| 3 | 7 | | 0 | 0 | 1 | 0 | |
| 2 | 8 | | 1 | 0 | 1 | 0 | |
| 1 | 9 | | 0 | 1 | 1 | 0 | |
| 0 | 10 | 7 | 1 | 1 | 1 | 0 | |

FIG. 30

NOTE-
IN BOTH PATTERNS "1" INDICATES COUNTER ON
"0" INDICATES COUNTER OFF

INVENTOR.
ARTHUR H. DICKINSON
Joseph C. Sweet, Jr.
ATTORNEY

MP-Q REGISTER
READ-OUT OPERATION

REGISTER PREVIOUSLY OPERATED IN REVERSE DIRECTION

| DIF'R'NT'L TIME OF READ-OUT ↓ | READ-OUT PULSE NUMBER ↓ | Q RESULT DIGIT | 1 | 2 | 4 | 8 | BINARY NUMBER |
|---|---|---|---|---|---|---|---|
| | | | S1 | S2 | S3 | S4 | TRIGGER STAGE |
| | | 4 | 0 | 1 | 0 | 1 | |
| 9 | 1 | | 1 | 1 | 0 | 1 | |
| 8 | 2 | | 0 | 0 | 1 | 1 | |
| 7 | 3 | | 1 | 0 | 1 | 1 | |
| 6 | 4 | | 0 | 1 | 1 | 1 | |
| 5 | 5 | | 1 | 1 | 1 | 1 | |
| 4 | 6 | | 0 | 0 | 0 | 0 | PULSE OUT → |
| 3 | 7 | | 1 | 0 | 0 | 0 | |
| 2 | 8 | | 0 | 1 | 0 | 0 | |
| 1 | 9 | | 1 | 1 | 0 | 0 | |
| 0 | 10 | | 0 | | 1 | 0 | |

NOTE -

"1" INDICATES COUNTER ON
"0" INDICATES COUNTER OFF

FIG. 31

INVENTOR.
ARTHUR H. DICKINSON

BY Joseph C. Sweet, Jr.
ATTORNEY

PR-DD ACCUMULATOR
IMPULSES APPLIED TO INPUT 54

| ENTRY PULSE NUMBER ↓ | 1 | 2 | 4 | 8 | BINARY NUMBER |
|---|---|---|---|---|---|
| | S1 | S2 | S3 | S4 | TRIGGER STAGE |
| (RESET STATUS) | 1 | 1 | 1 | 1 | |
| 1 | 0 | 1 | 1 | 1 | |
| 2 | 1 | 0 | 1 | 1 | |
| 3 | 0 | 0 | 1 | 1 | |
| 4 | 1 | 1 | 0 | 1 | |
| 5 | 0 | 1 | 0 | 1 | |
| 6 | 1 | 0 | 0 | 1 | |
| 7 | 0 | 0 | 0 | 1 | |
| 8 | 1 | 0 | 0 | 0 | |
| 9 | 0 | 0 | 0 | 0 | |

FIG. 32

PR-DD ACCUMULATOR
APPLICATION OF READ-OUT PULSES

| DIF'R'NT'L TIME OF READOUT ↓ | READ-OUT PULSE NUMBER ↓ | RESULT DIGIT | 1 | 2 | 4 | 8 | BINARY NUMBER |
|---|---|---|---|---|---|---|---|
| | | | S1 | S2 | S3 | S4 | TRIGGER STAGE |
| | | 8 (BINARY 14) | 1 | 0 | 0 | 0 | |
| 9 | 1 | | 0 | 0 | 0 | 0 | PULSE OUT → |
| 8 | 2 | | 1 | 1 | 1 | 1 | |
| 7 | 3 | | 0 | 1 | 1 | 1 | |
| 6 | 4 | | 1 | 0 | 1 | 1 | |
| 5 | 5 | | 0 | 0 | 1 | 1 | |
| 4 | 6 | | 1 | 1 | 0 | 1 | |
| 3 | 7 | | 0 | 1 | 0 | 1 | |
| 2 | 8 | | 1 | 0 | 0 | 1 | |
| 1 | 9 | | 0 | 0 | 0 | 1 | |
| 0 | 10 | | 1 | 1 | 1 | 0 | |
| | | | 1 | 0 | 1 | 0 | |
| | | 8 (BINARY 14) | 1 | 0 | 0 | 0 | |

FIG. 33

NOTE-
IN BOTH PATTERNS "1" INDICATES COUNTER ON
"0" INDICATES COUNTER OFF

INVENTOR.
ARTHUR H. DICKINSON

Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 53

INVENTOR.
ARTHUR H. DICKINSON

Joseph C. Sweet, Jr.
ATTORNEY

TYPICAL PULSES APPLIED TO CS (COLUMN SHIFT)-ADDING MC OR DR

INVENTOR.
ARTHUR H. DICKINSON

BY Joseph C. Sweet, Jr.
ATTORNEY

TYPICAL PULSES APPLIED TO CS (COLUMN SHIFT)-SUBTRACTING DR

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 56

*INVENTOR.*
ARTHUR H. DICKINSON

*BY* Joseph C. Sweet, Jr.
*ATTORNEY*

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 58

INVENTOR.
ARTHUR H. DICKINSON

Joseph C. Sweet, Jr.
ATTORNEY

INVENTOR.
ARTHUR H. DICKINSON

Joseph C. Sweet Jr.
ATTORNEY

MULTIPLIER-DIVIDER EMPLOYING TRANSISTORS

Filed July 1, 1954 74 Sheets-Sheet 60

INVENTOR.
ARTHUR H. DICKINSON

Joseph C. Sweet, Jr.
ATTORNEY

MULTIPLIER-DIVIDER EMPLOYING TRANSISTORS

Filed July 1, 1954 74 Sheets-Sheet 61

INVENTOR.
ARTHUR H. DICKINSON
BY
Joseph C. Sweet Jr.
ATTORNEY

MULTIPLIER-DIVIDER EMPLOYING TRANSISTORS

Filed July 1, 1954 74 Sheets-Sheet 62

INVENTOR.
ARTHUR H. DICKINSON

BY Joseph C. Sweet, Jr.
ATTORNEY

INVENTOR.
ARTHUR H. DICKINSON
BY
Joseph C. Sweet, Jr.
ATTORNEY

INVENTOR.
ARTHUR H. DICKINSON
BY
Joseph C. Sweet Jr.
ATTORNEY

INVENTOR.
ARTHUR H. DICKINSON
BY
Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 66

INVENTOR.
ARTHUR H. DICKINSON
BY
Joseph C. Sweet Jr.
ATTORNEY

MULTIPLICATION EXAMPLE

MC x MP = PR 37 x 56 = 2072

NOTE: = STAGE ON
= STAGE OFF
= CARRY OUT
= CARRY IN

INVENTOR.
ARTHUR H. DICKINSON
BY Joseph C. Sweet, Jr.
ATTORNEY

INVENTOR.
ARTHUR H. DICKINSON
BY
Joseph C. Sweet, Jr.
ATTORNEY

INVENTOR.
ARTHUR H. DICKINSON
BY
Joseph C. Sweet, Jr.
ATTORNEY

INVENTOR.
ARTHUR H. DICKINSON
BY
Joseph C. Sweet Jr.
ATTORNEY

INVENTOR.
ARTHUR H. DICKINSON
BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 72

INVENTOR.
ARTHUR H. DICKINSON

BY Joseph C. Sweet, Jr.
ATTORNEY

June 28, 1960 A. H. DICKINSON 2,942,780

MULTIPLIER-DIVIDER EMPLOYING TRANSISTORS

Filed July 1, 1954 74 Sheets-Sheet 73

INVENTOR.
ARTHUR H. DICKINSON

BY Joseph C. Sweet, Jr.

ATTORNEY

June 28, 1960 A. H. DICKINSON 2,942,780

MULTIPLIER-DIVIDER EMPLOYING TRANSISTORS

Filed July 1, 1954 74 Sheets-Sheet 74

INVENTOR.
ARTHUR H. DICKINSON

BY Joseph C. Sweet, Jr.

ATTORNEY

United States Patent Office 2,942,780 Patented June 28, 1960

2,942,780

MULTIPLIER-DIVIDER EMPLOYING TRANSISTORS

Arthur H. Dickinson, Greenwich, Conn., assignor to International Business Machines Corporation, New York, N.Y., a corporation of New York Filed July 1, 1954, Ser. No. 440,621

39 Claims. (Cl. 235—159)

This invention relates to a multiplying-dividing machine, and more particularly, to a record-controlled electronic multiplying-dividing machine employing transistors, crystal diodes and vacuum tubes. The computed results are recorded on the record cards from which the factors forming such results are derived. The transistors and crystal diodes are variously employed as elements in accumulators, registers, commutators, gate circuits, switches, phase inverting and non-phase inverting amplifiers, control circuits, column shift circuits, etc.

A primary object of this invention is the provision of a multiplier-divider employing semiconductor diodes and triodes (transistors) to reduce the number of vacuum tubes required to produce multiplying and dividing operations in a similar manner and thereby reduce the power consumption of and heat generated by the machine.

Another is the provision of such a machine wherein the registers, accumulators, column shift circuits, and other control circuits utilize serially connected tubes and transistors in their trigger circuits.

Another is the provision of such a machine wherein one or more additional transistors are serially connected with selected ones of the foregoing trigger circuits to provide load circuits isolated from the balance-maintaining portion of the associated trigger circuit.

Another is the provision of such a machine wherein the serially connected tube-transistor trigger circuits are of both the bistable and monostable types and wherein serially connected tubes and transistors are also utilized as non-phase inverting amplifiers.

Another is the provision of such a machine wherein the inputs, supplied in decimal notation, are converted into partial differential values to simply the circuitry.

Another is the provision of such a machine wherein read-out of like partial differential values from a plurality of orders of the MC Register is produced concurrently, with different partial differential values of each order being read out sequentially.

Another is the provision of such a machine wherein multiplication is accomplished by repeated addition of the amount stored in the MC Register into the PR Accumulator under control of the value stored in the MP Register.

Another is the provision of such a machine which operates serially under control of a commutator.

Another is the provision of such a machine in which the length of the commutator cycle is variable and under control of the value(s) of the multiplicand and divisor digit(s) during multiplication and division, respectively, to reduce the computation time when possible.

Another is the provision of such a machine including detection circuits for determining the presence or absence of respective partial differential values in the various orders of the MC (and DR) Register to control the length of the commutator cycle in accordance therewith.

Another is the provision of such a machine including zero detection circuits to detect the presence of a significant digit in each order of the MP Register.

Another is the provision of such a machine wherein such zero detection circuits not only control the column shift circuits through successive steps but also skip column shift steps when the respective multiplier value is zero to further reduce the computation time.

Another is the provision of such a machine wherein the MP Register is capable of operating both forwardly and reversely and at the same time provides a binary-to-decade adjustment for either type of operation.

Another is the provision of such a machine wherein the MP Register achieves its selective forward and reverse operation by means of intermediate circuits between adjacent stages of each order and wherein these intermediate stages include switching circuits which may comprise cascaded transistor amplifiers and gated vacuum tube amplifiers.

Another is the provision of such a machine wherein the partial differential values are entered into the PR Accumulator on a differentially timed or cyclical binary-coded basis.

Another is the provision of such a machine wherein the PR–DD Accumulator permits side entry as well as end entry and in addition provides a direct binary-to-decimal conversion and a carry to the next higher order, as required.

Another is the provision of such a machine wherein the binary-to-decimal conversion within the PR–DD Accumulator is achieved by means of feedback pulses from one stage to a plurality of the preceding stages through respective delay circuits providing respectively different time delays.

Another is the provision of such a machine wherein an order of the PR–DD Accumulator can effect a carry into a higher order when it stands at the highest value digit and receives a carry from its next lower order.

Another is the provision of such a machine wherein the DR Register comprises DRS and DRA portions and the divisor amount is simultaneously entered into both portions, with the 9's complement being directly formed in the DRS Register portion while the true value is formed in the DRA Register portion, both being in partial differential form, to simplify and speed division.

Another is the provision of such a machine wherein division is accomplished by alternate subtraction (by addition of the complement) and addition (of the true value) of partial differential values, the alternate subtraction and addition operations being under the control of no-carry and carry detection circuits, respectively, connected to respective orders of the DD Accumulator, other control circuits including column shift circuits being provided to produce the necessary column shift between the alternate subtraction and addition steps.

Another is the provision of such a machine wherein, during dividing, a representation of the digit "1" is normally entered into the Q Register once during each addition or subtraction cycle, but such entry is suppressed during the first cycle of any subtraction operation, each subtraction operation then proceeding until a no-carry condition is detected in the order next higher than that in which the highest order of the divisor is being entered (in complement form), whereupon a column shift is performed and the true value of the divisor then added successively until a carry condition is detected in the order next higher than that in which the highest order of the divisor is then being entered in true form, whereupon another column shift is performed and the value of the divisor again subtracted until a no-carry condition is again detected, etc.

Other objects of this invention will be pointed out in the following description and claims and illustrated in the accompanying drawings, which disclose, by way of example, the principle of the invention and the best mode which has been contemplated of applying that principle.

In the drawings:

Figs. 1 and 2 illustrative the basic binary code patterns utilized, at least in part, in the register and accumulator orders of the machine of the present invention;

Figs. 3*a* and 3*b* comprise a block diagram of the multiplication circuits of the machine of the present invention;

Figs. 4, 5, and 6 show waveforms useful in the explanation of the operation of the A Commutator shown in Fig. 3*b*;

Fig. 7*a* shows waveforms useful in the explanation of the column shift operation of the circuits of Figs. 3*a* and 3*b*, and Fig. 7*b* shows similar waveforms illustrating the column shift operation during division;

Fig. 8 illustrates the pattern of operation of the different stages of one order of the PR Accumulator of Figs. 3*a* and 3*b* for successively entered partial differential values;

Figure 9:
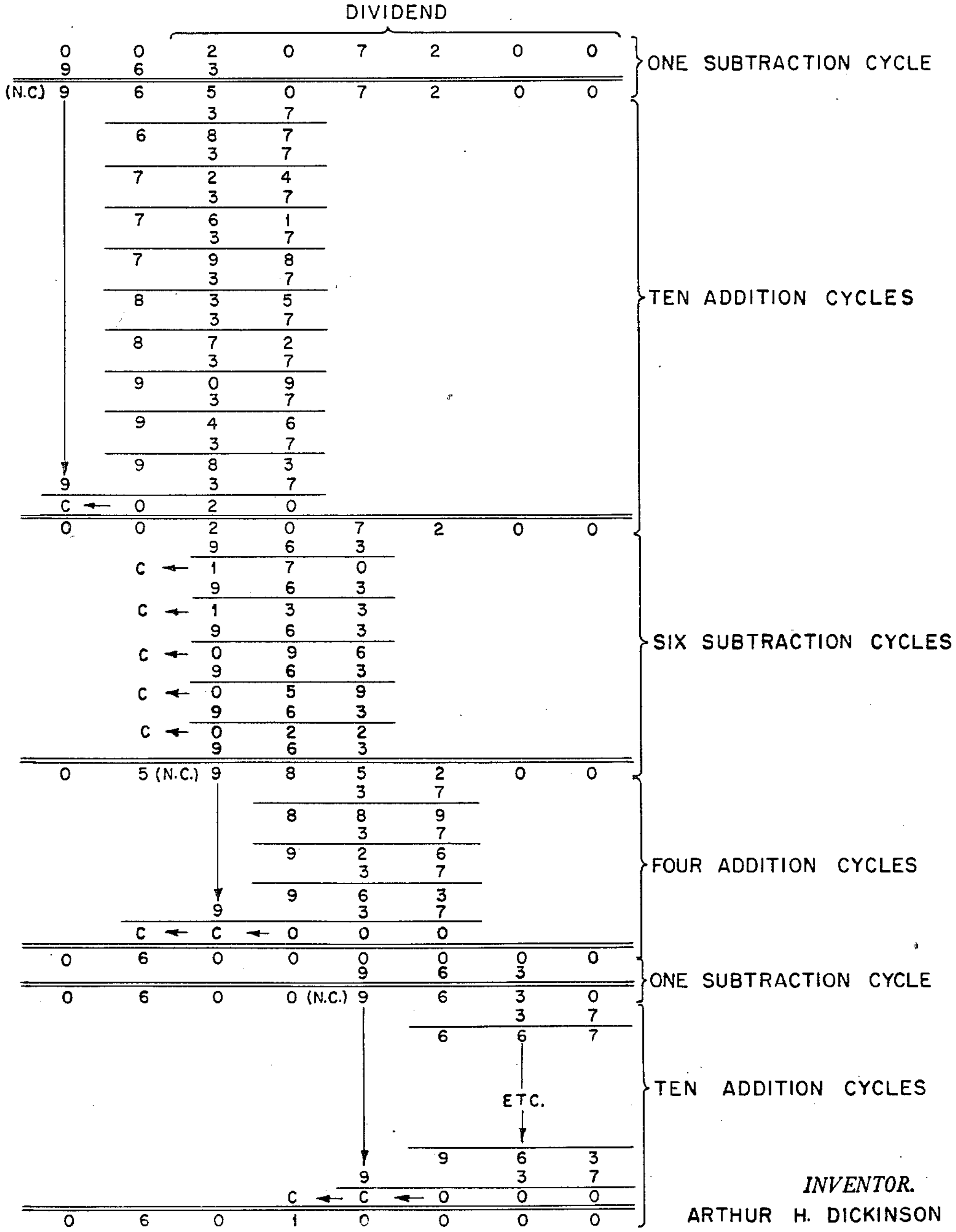
Fig. 9 illustrates the arithmetic processes utilized in the machine of the present invention during a sample division example.
Figure 10A:
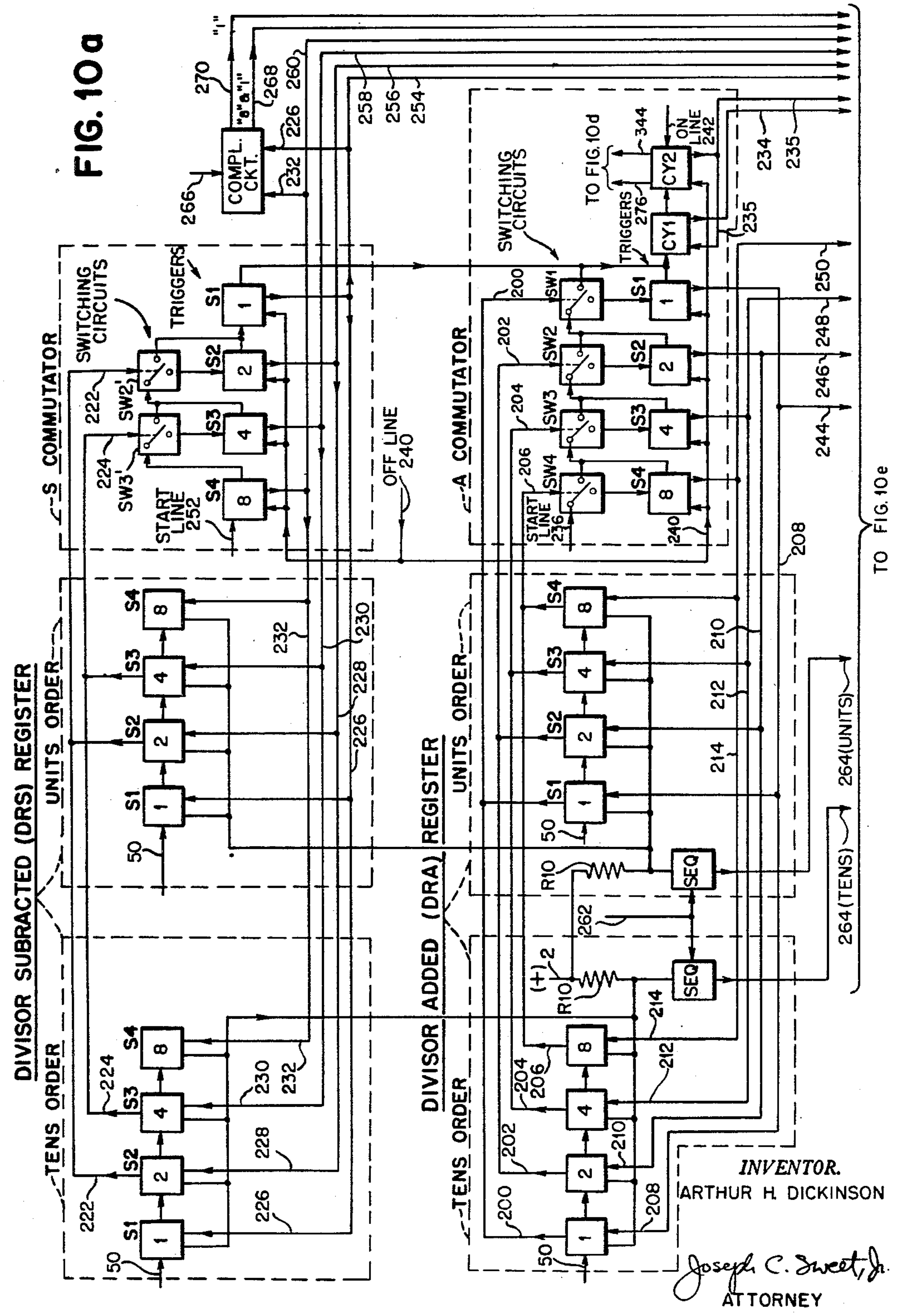
Figure 10B:
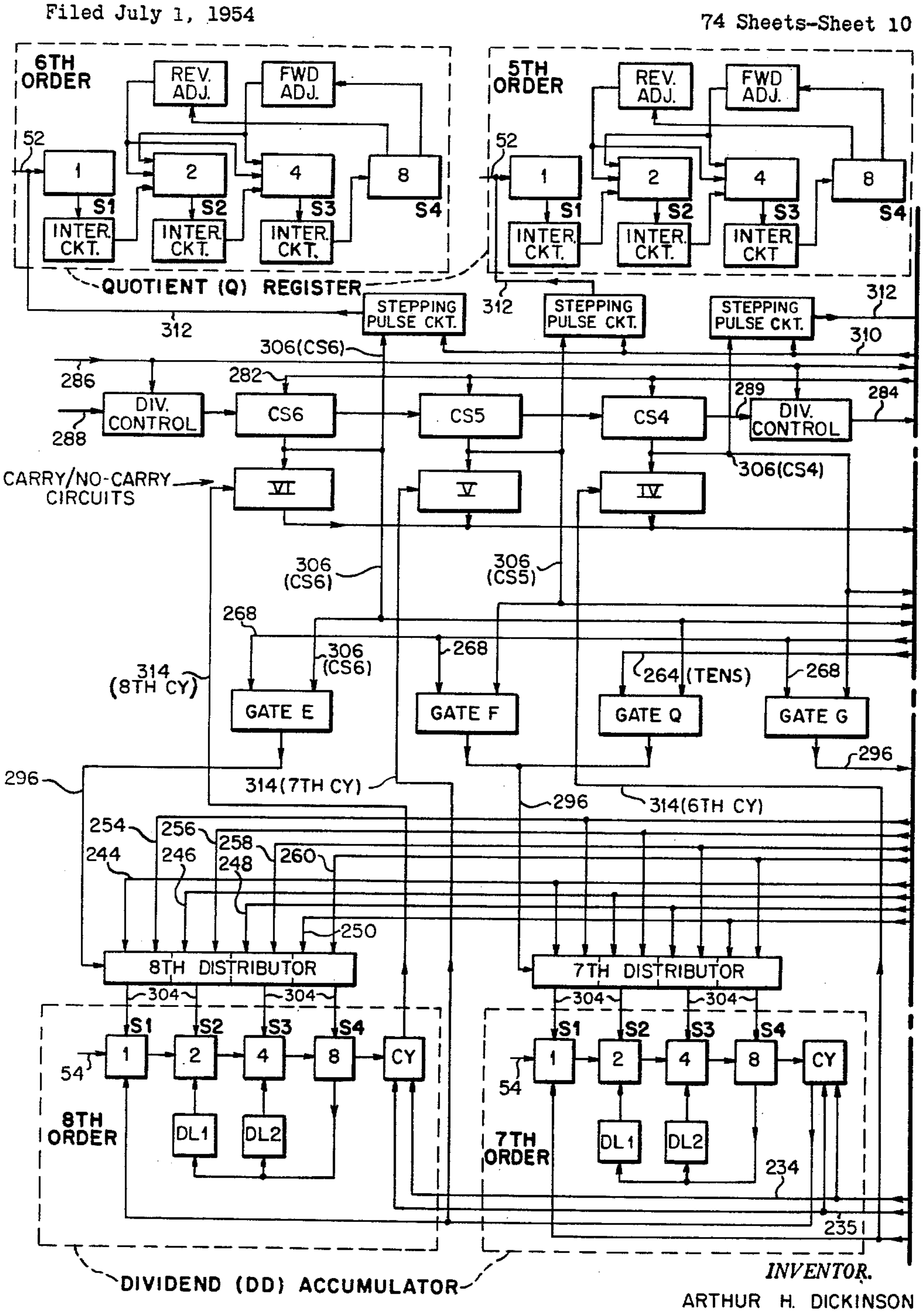
Figure 10C:
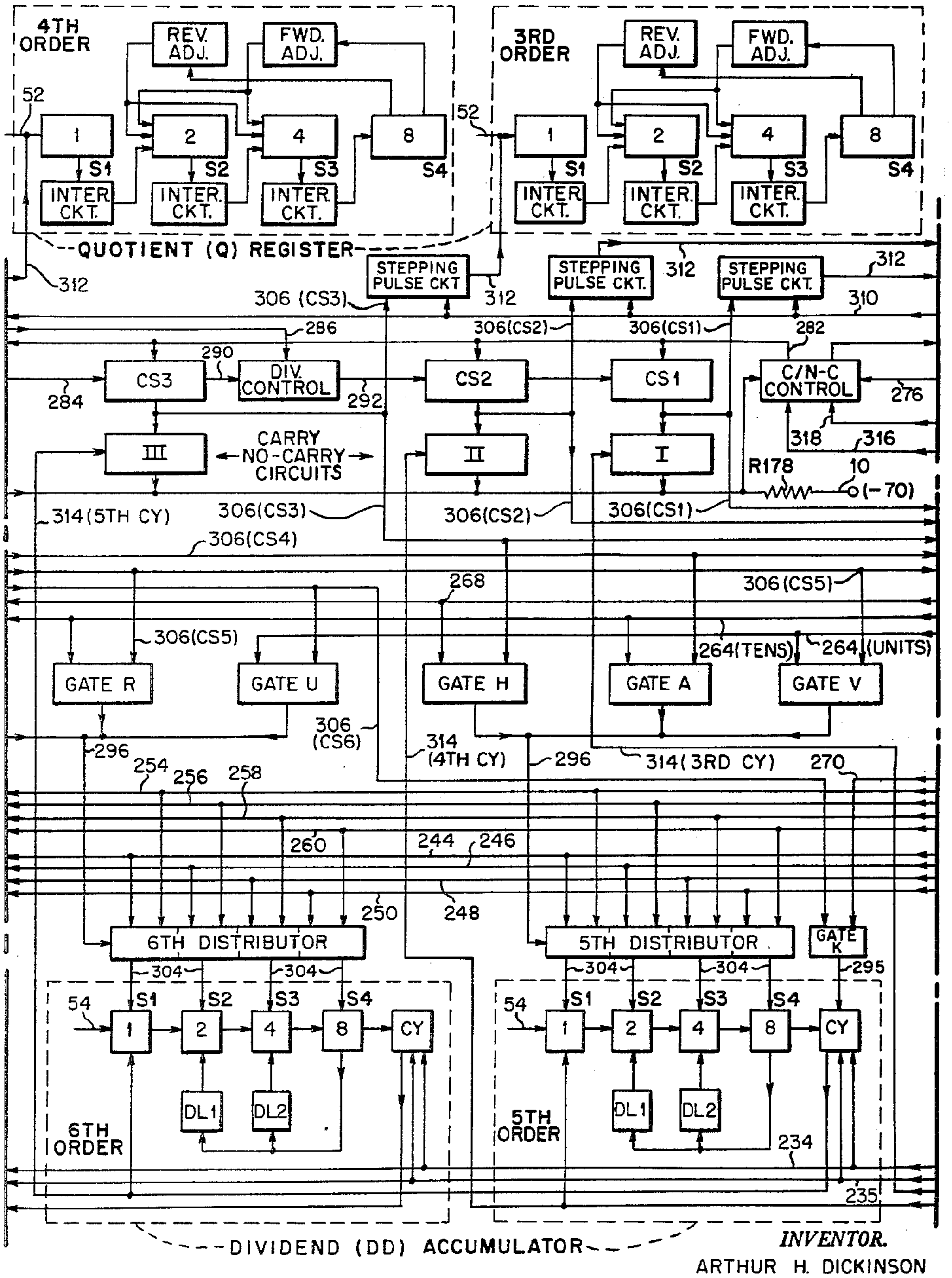
Figure 10D:
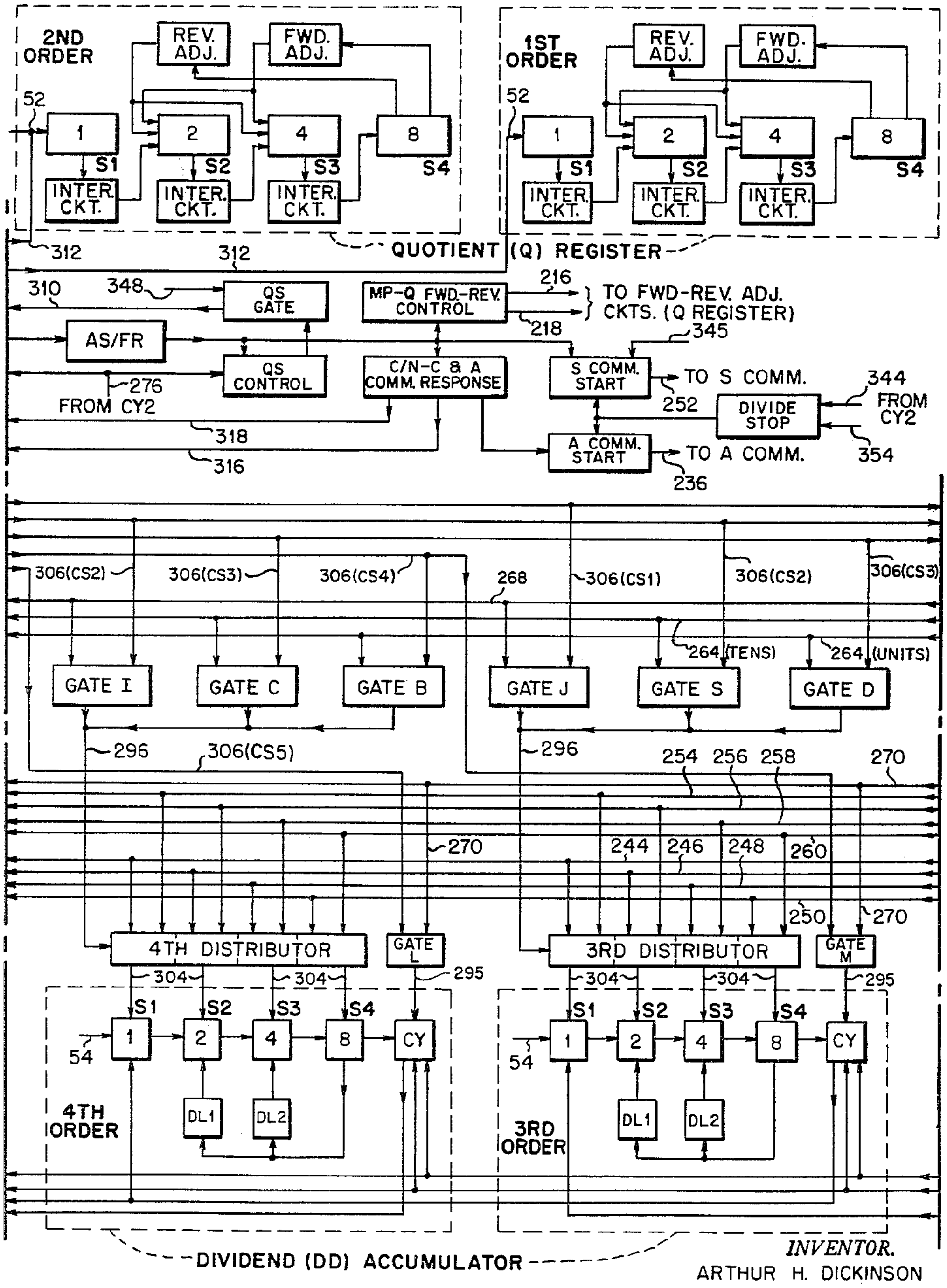
Figure 11:
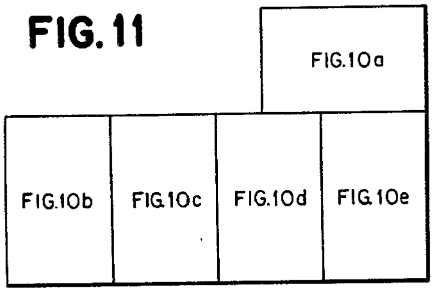
Figure 10E:
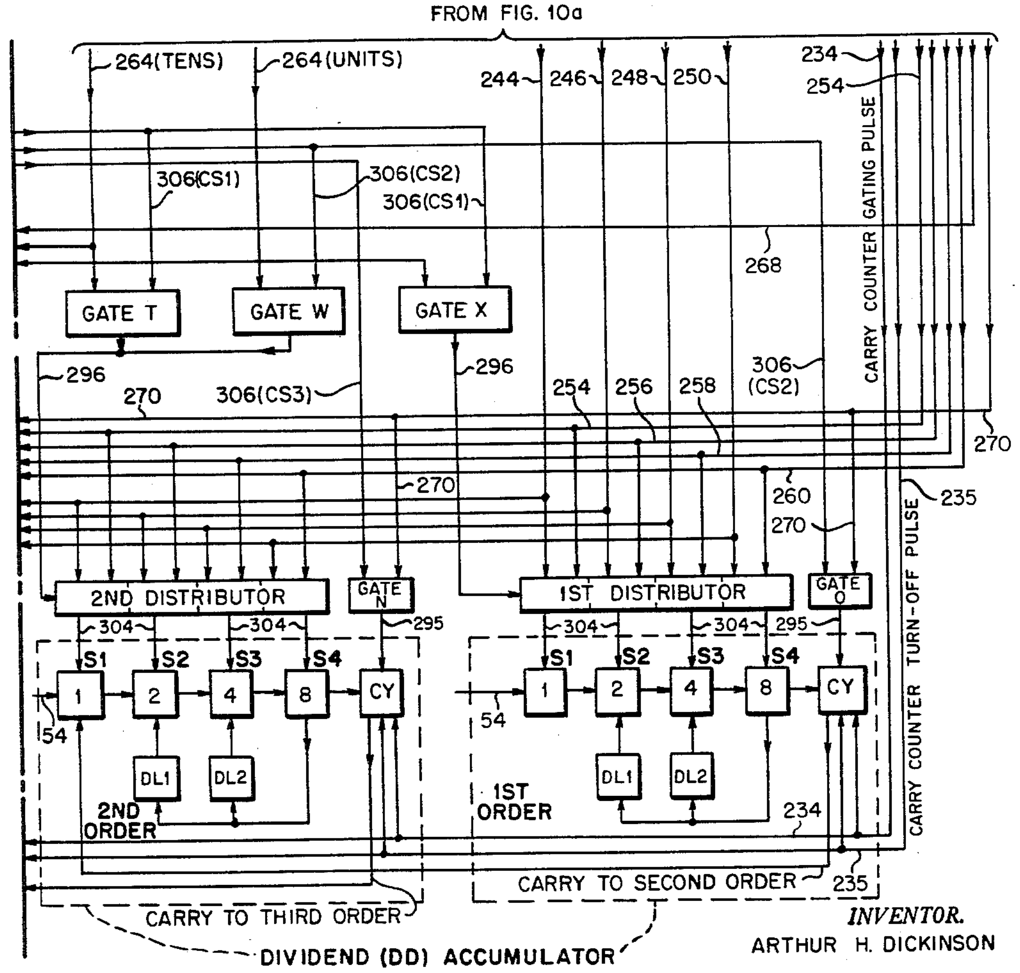
Figure 14:
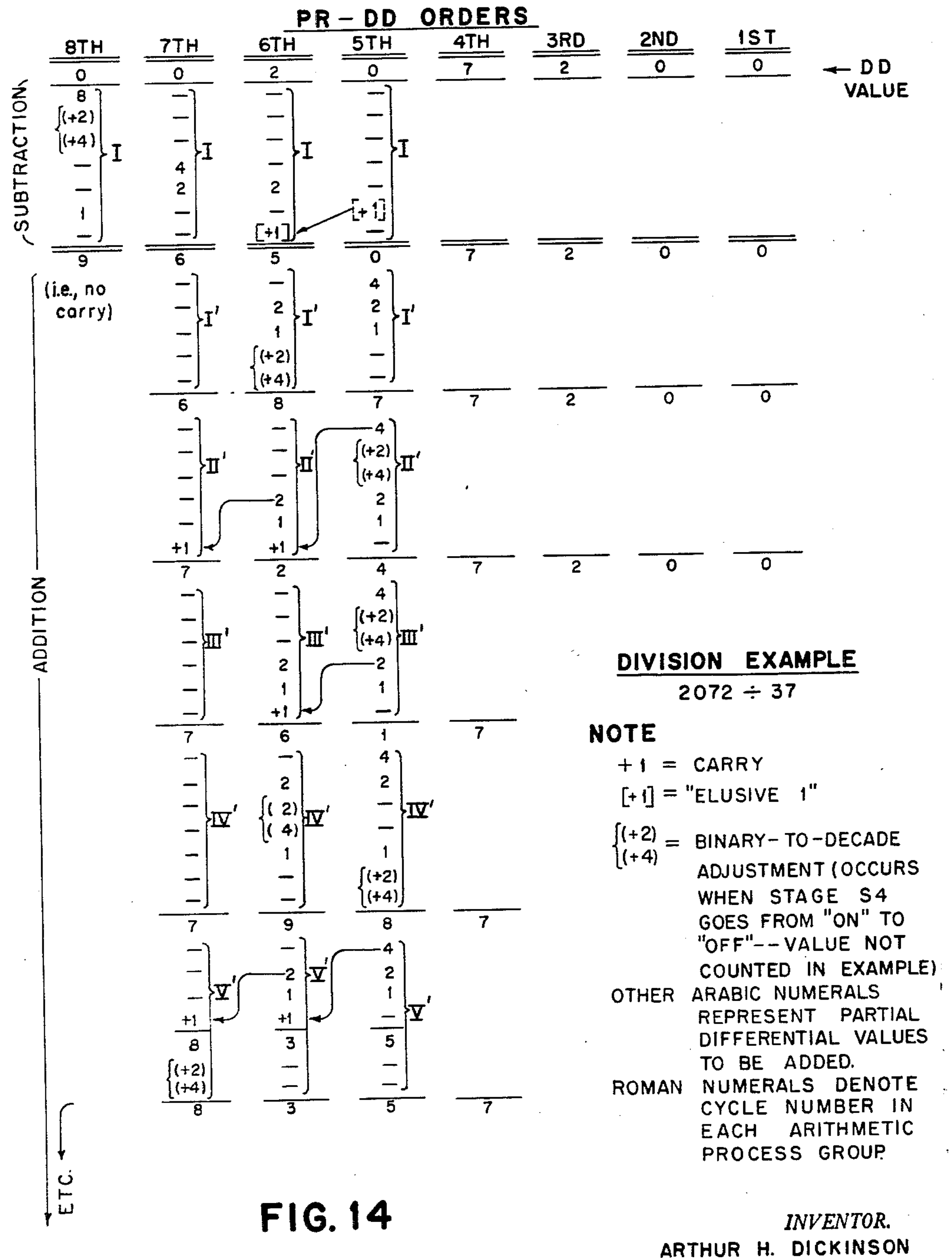
Figure 25A:
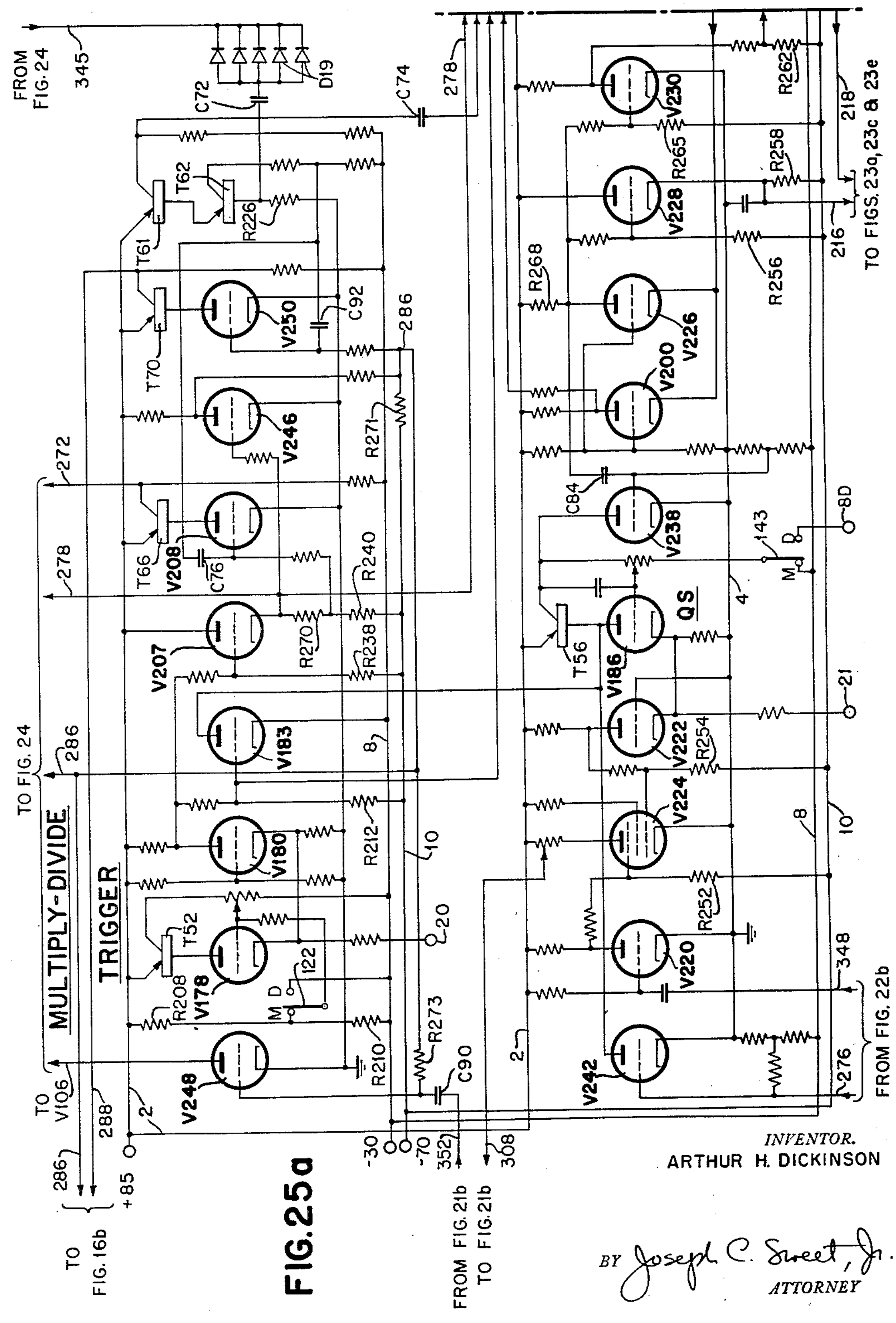
Figure 25B:
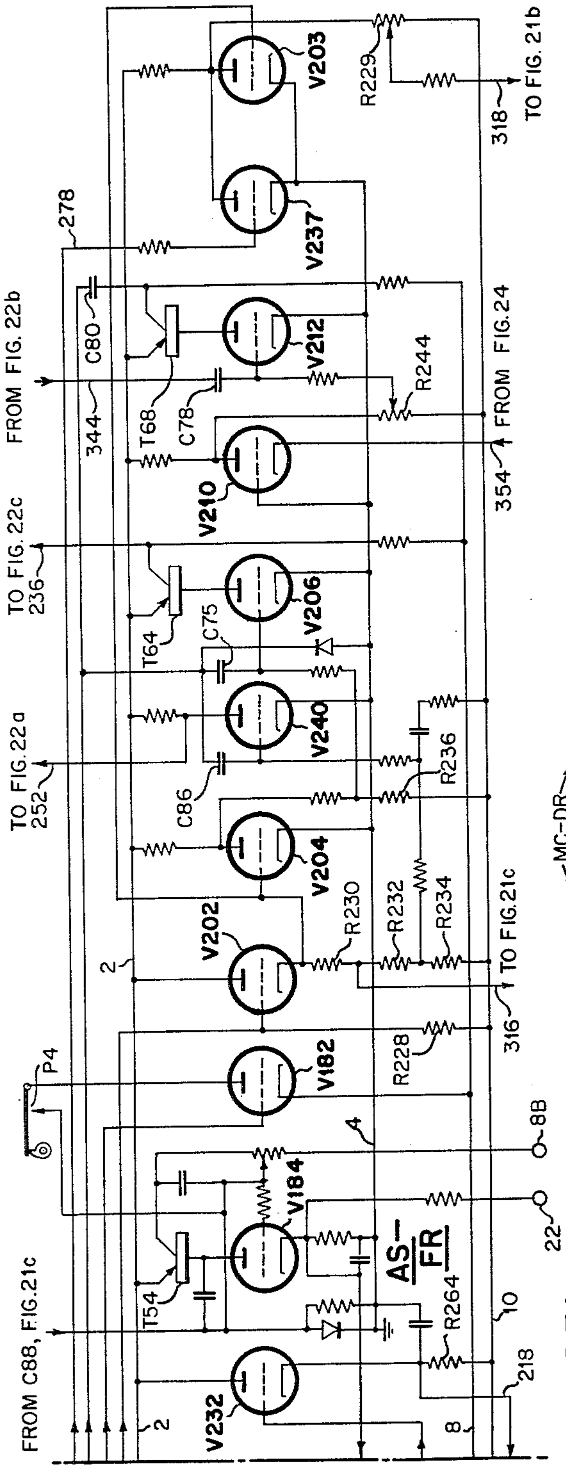
Figure 26:
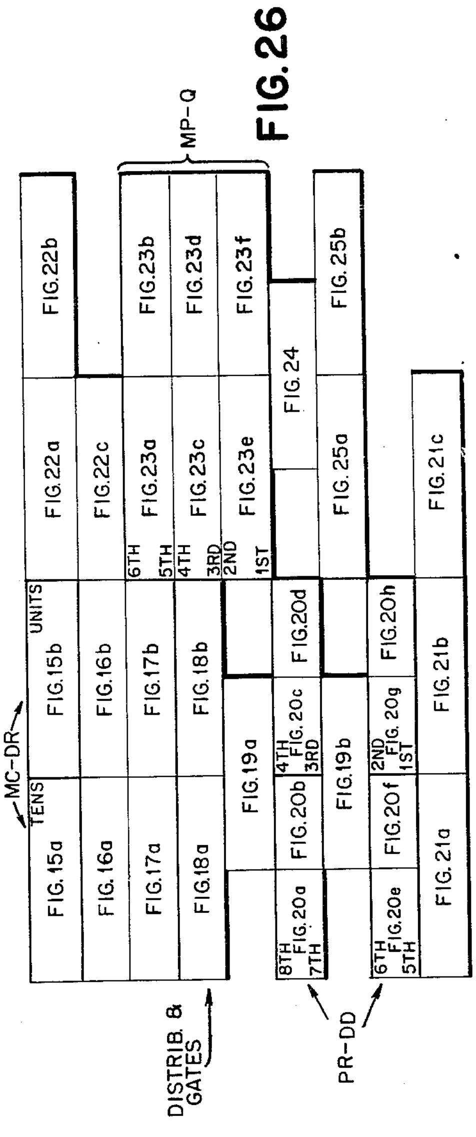
Figure 35:
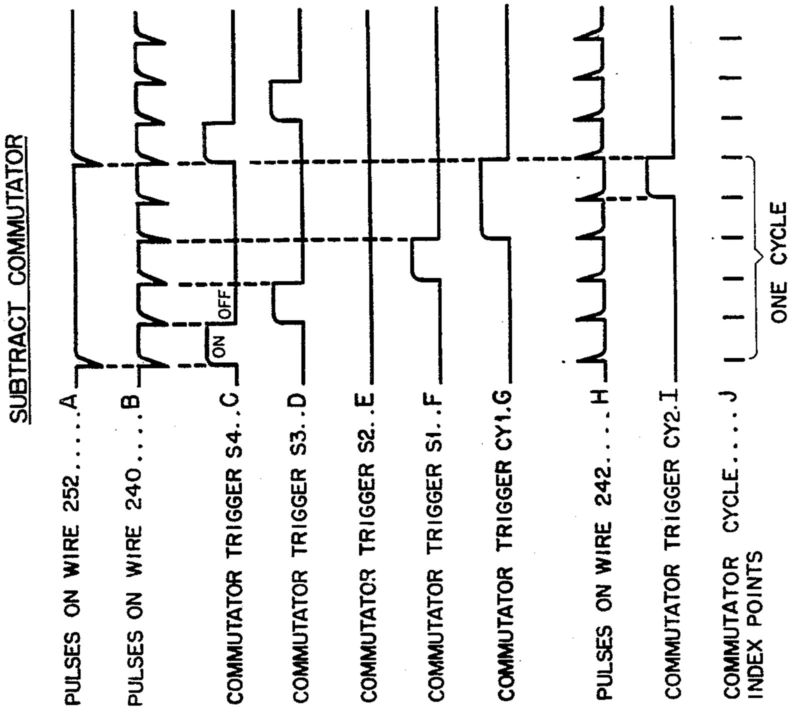
Figure 34:
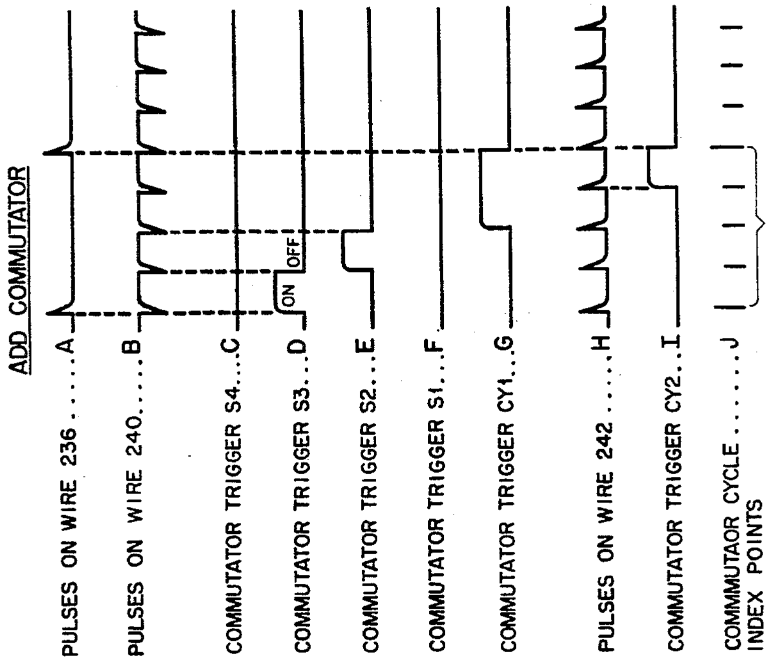
Figure 42:
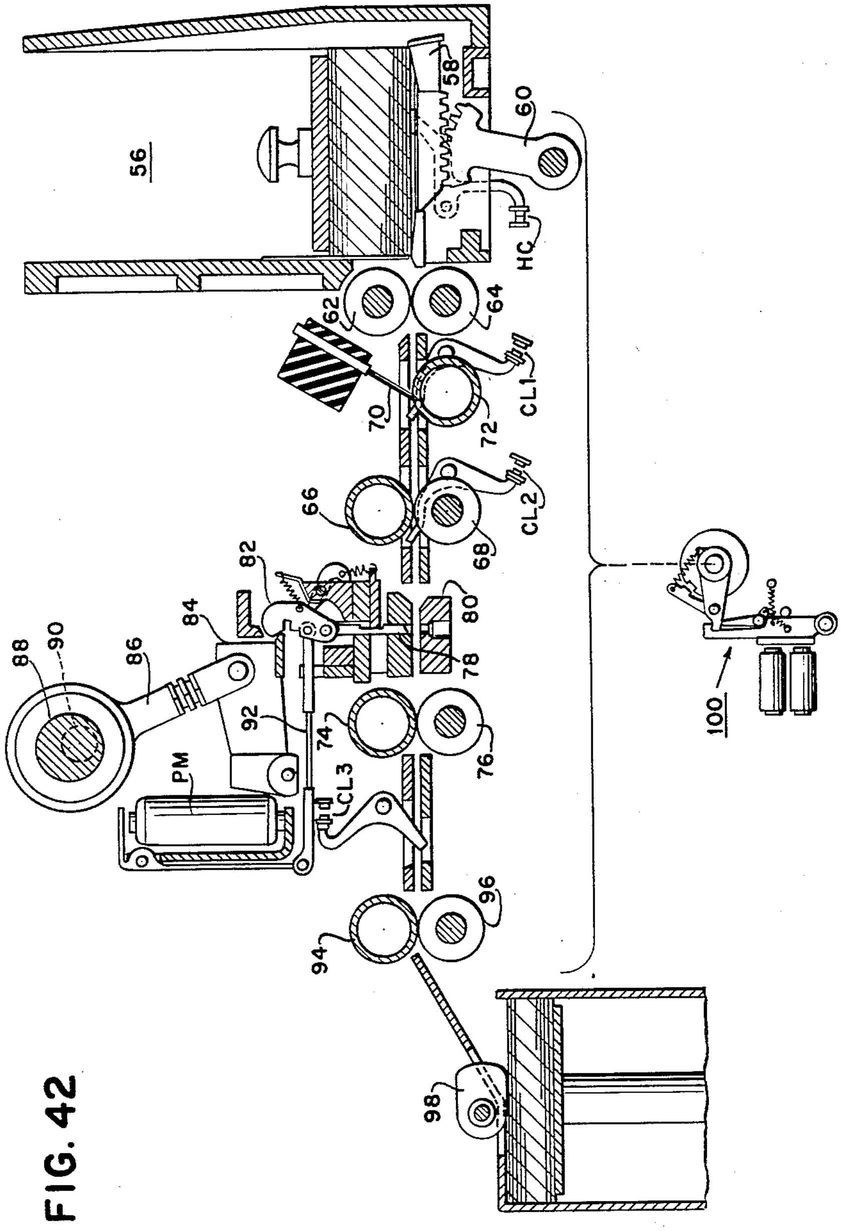
Figure 43A:
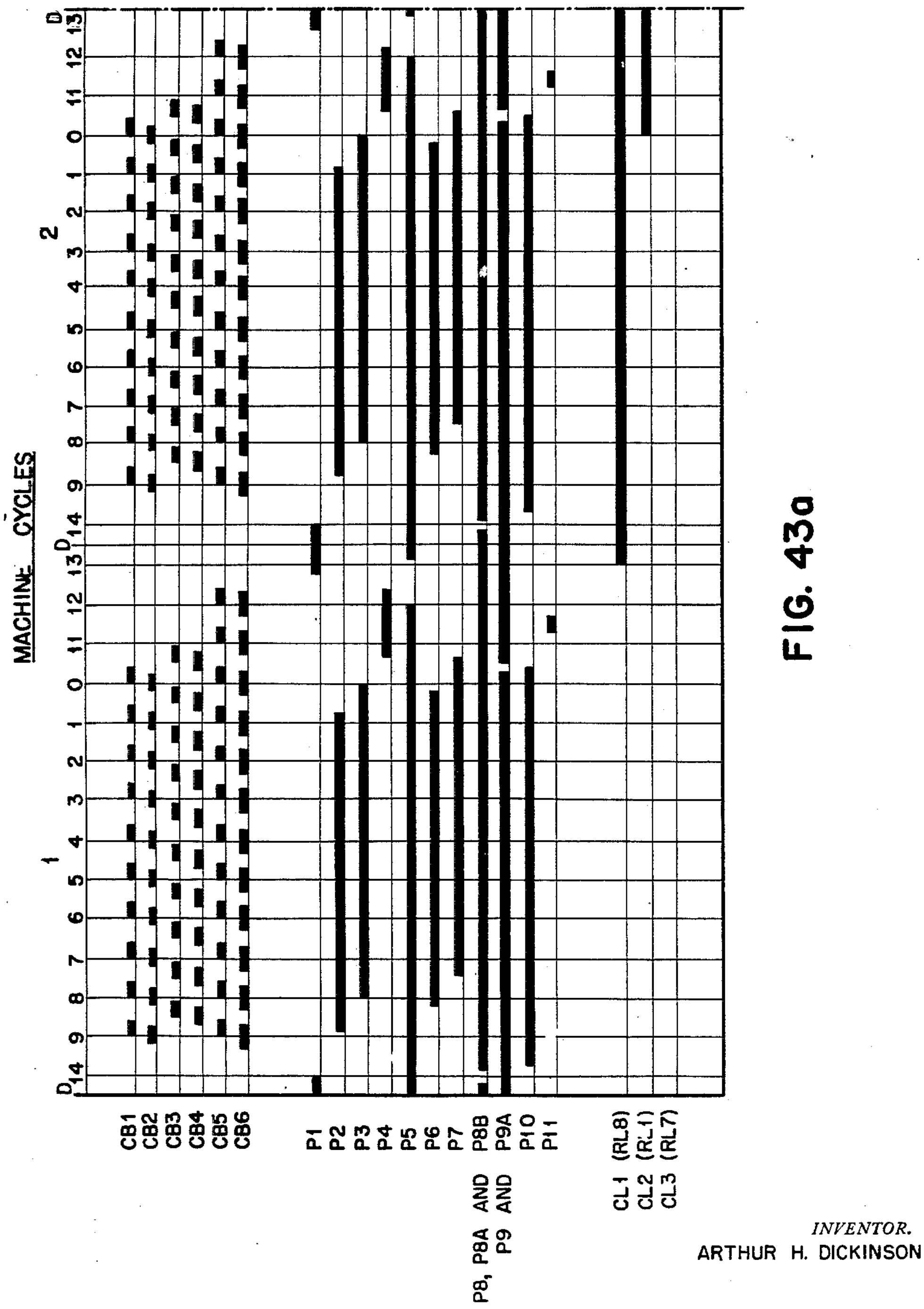
Figure 43B:
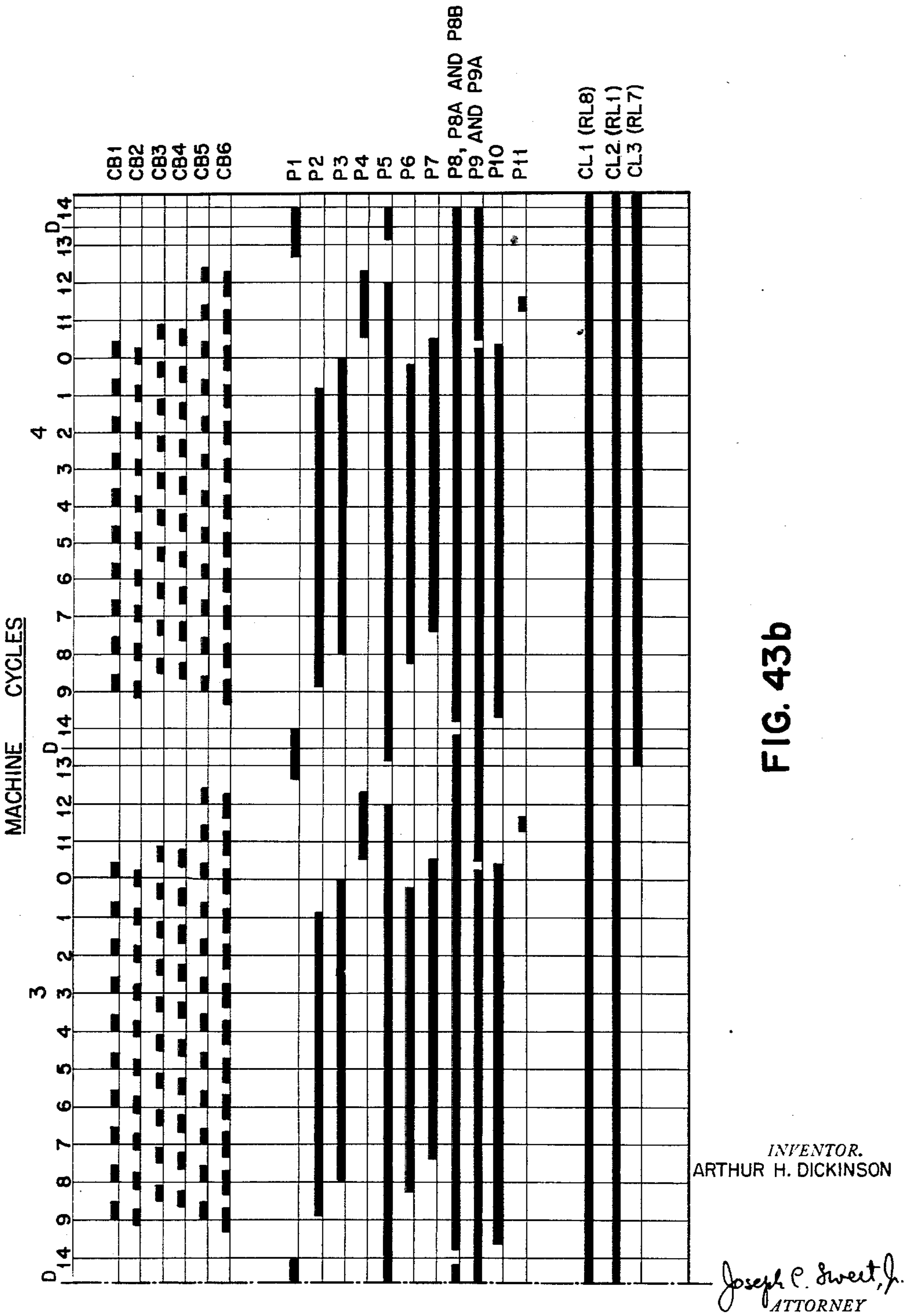
Figure 44A:
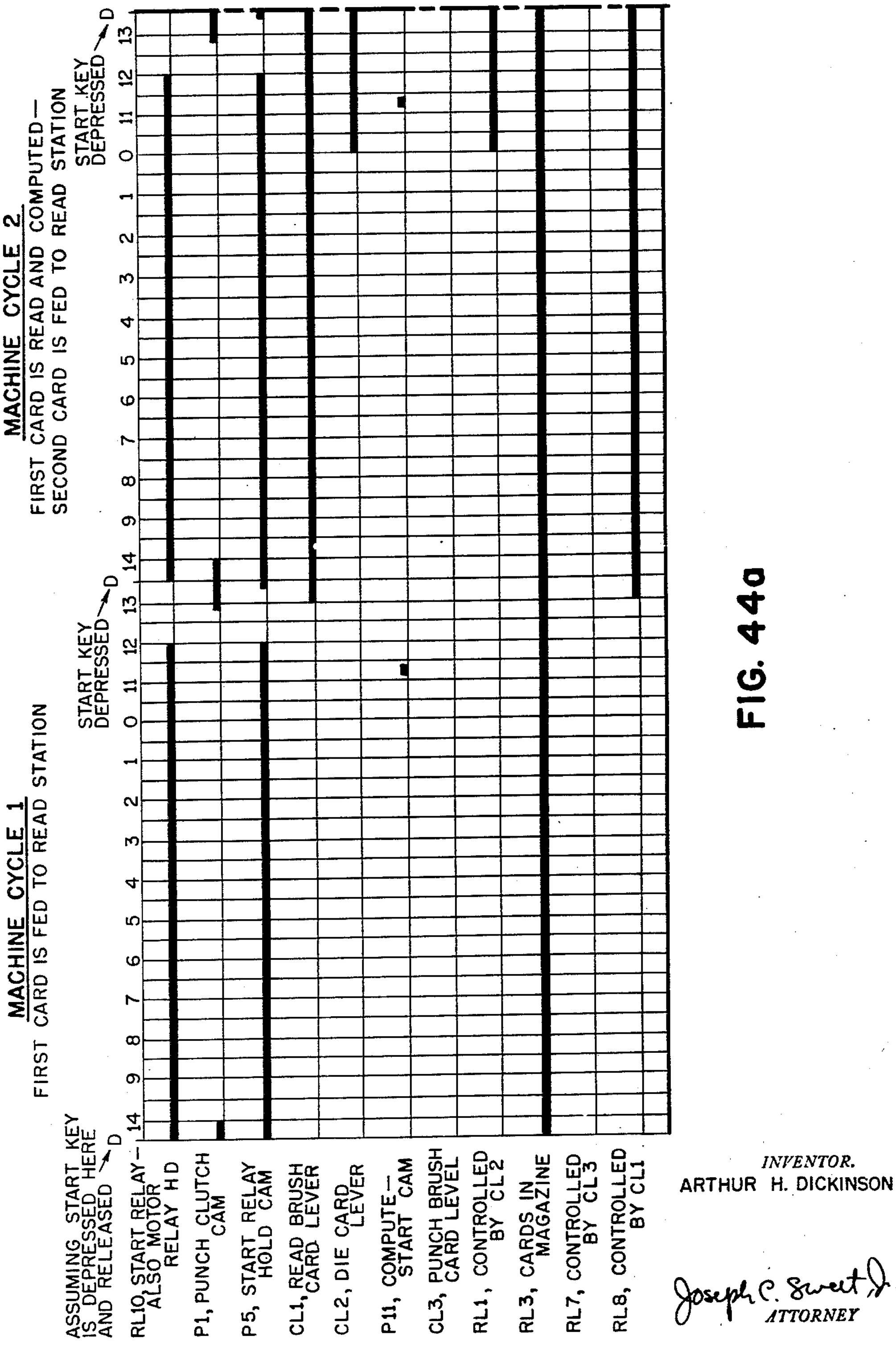
Figure 44B:
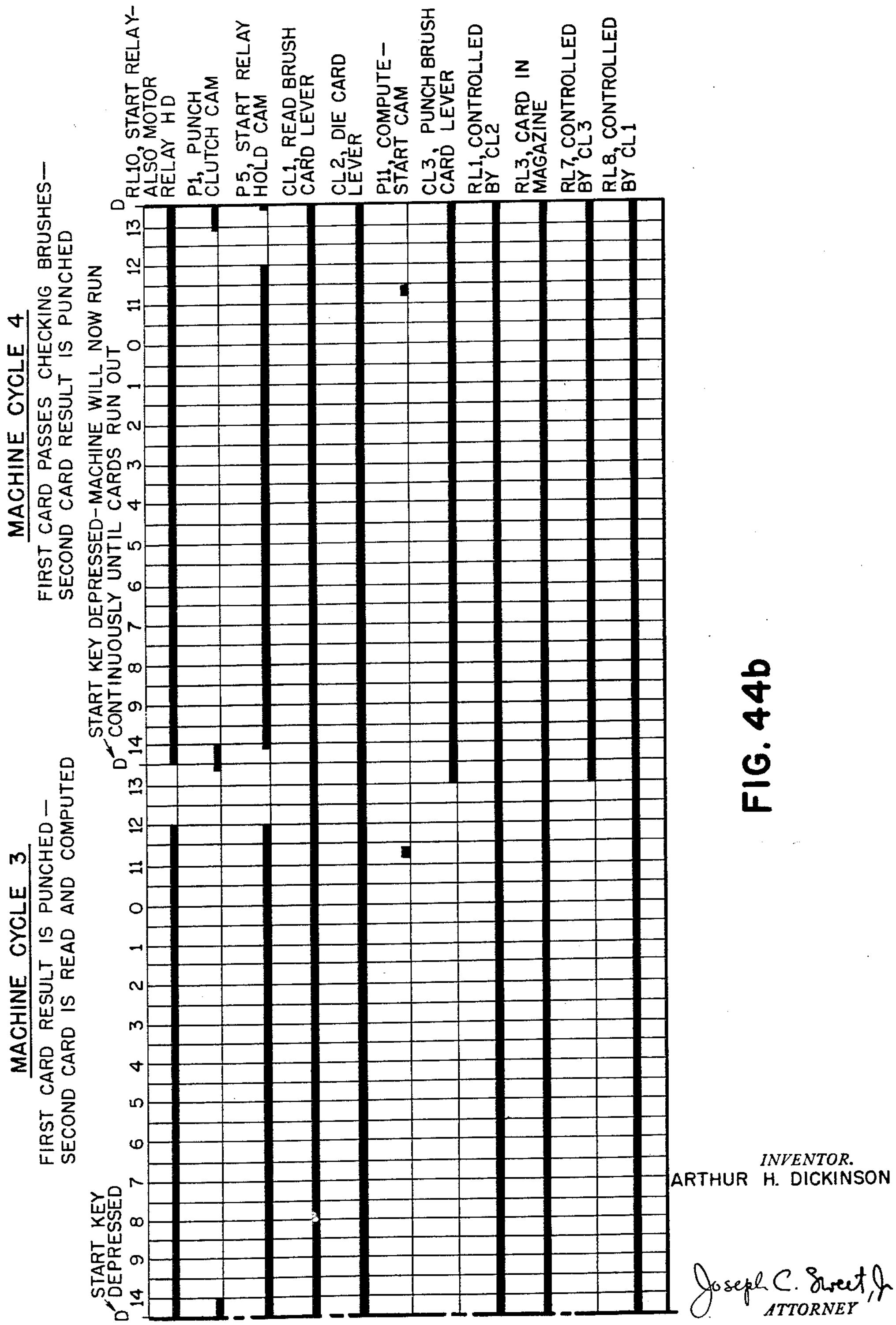
Figure 45A:
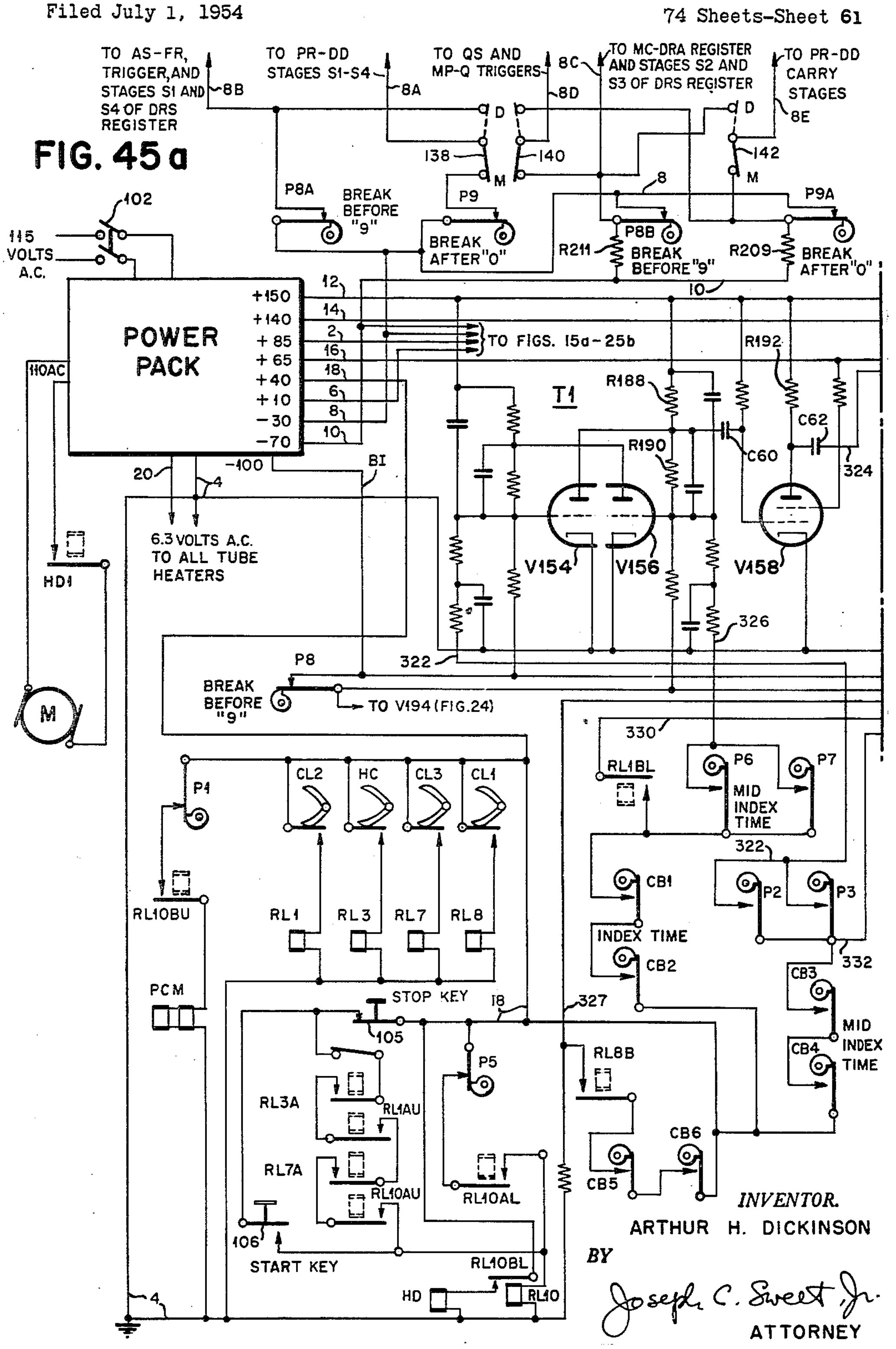
Figure 45B:
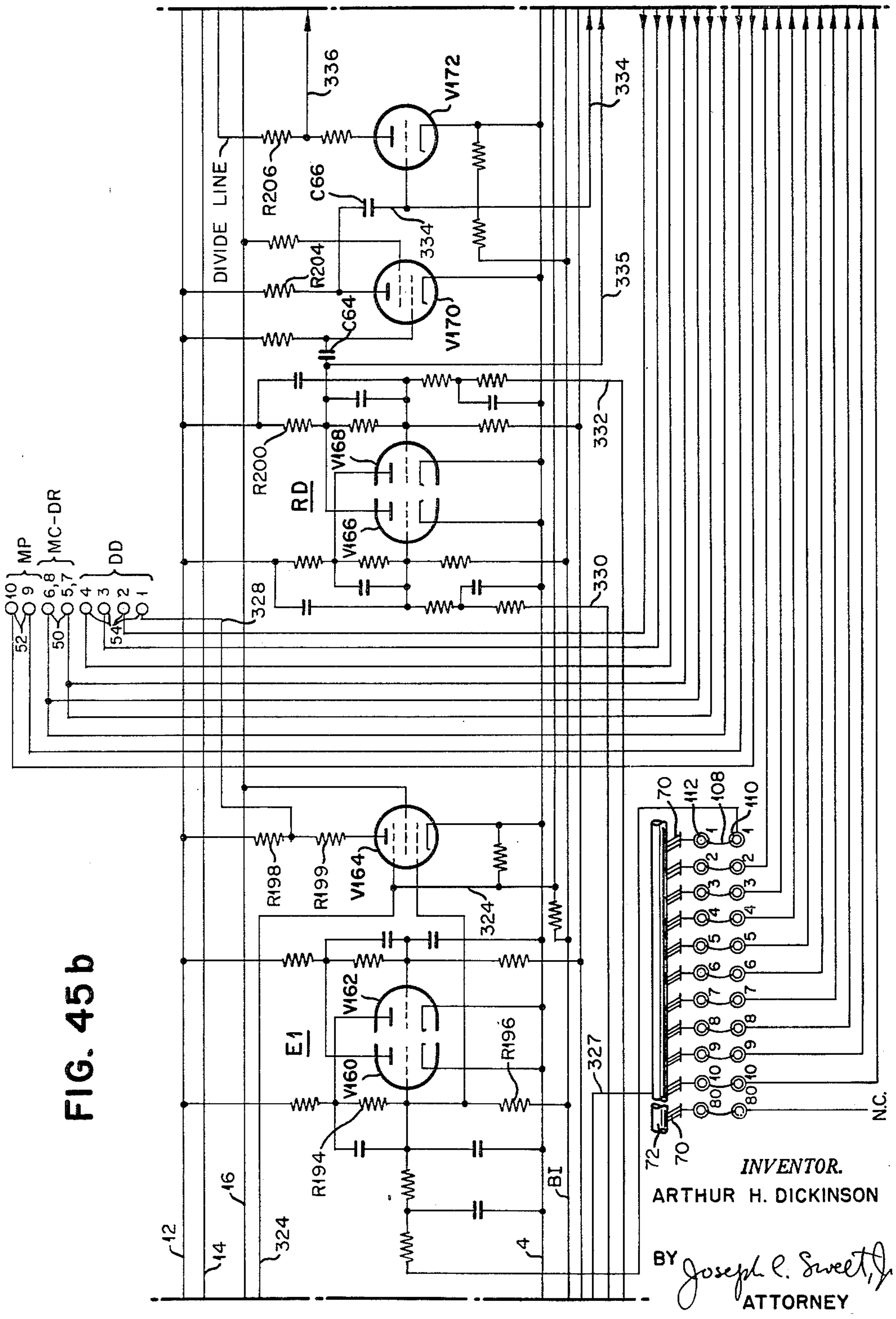
Figure 45C:
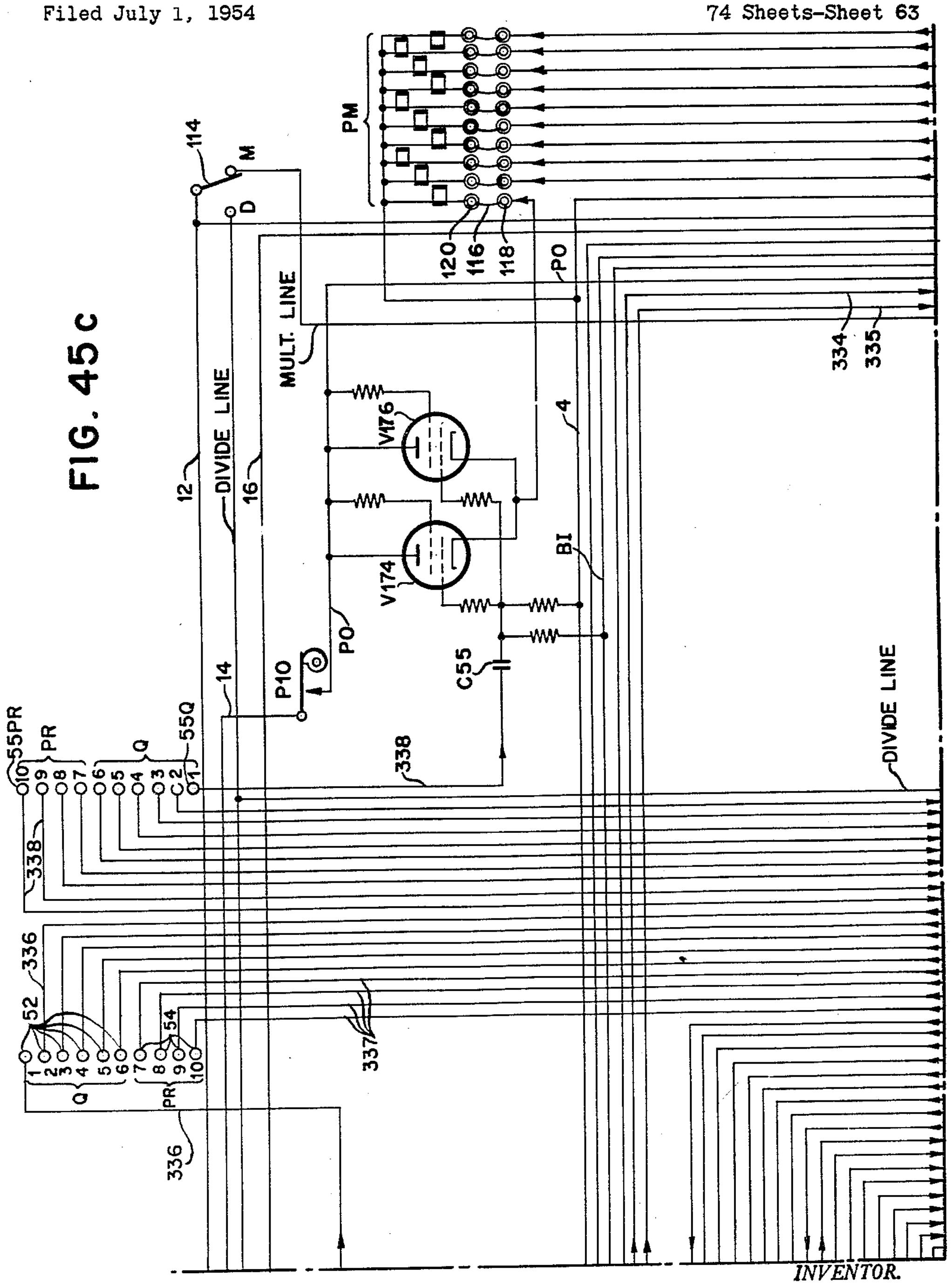
Figure 45D:
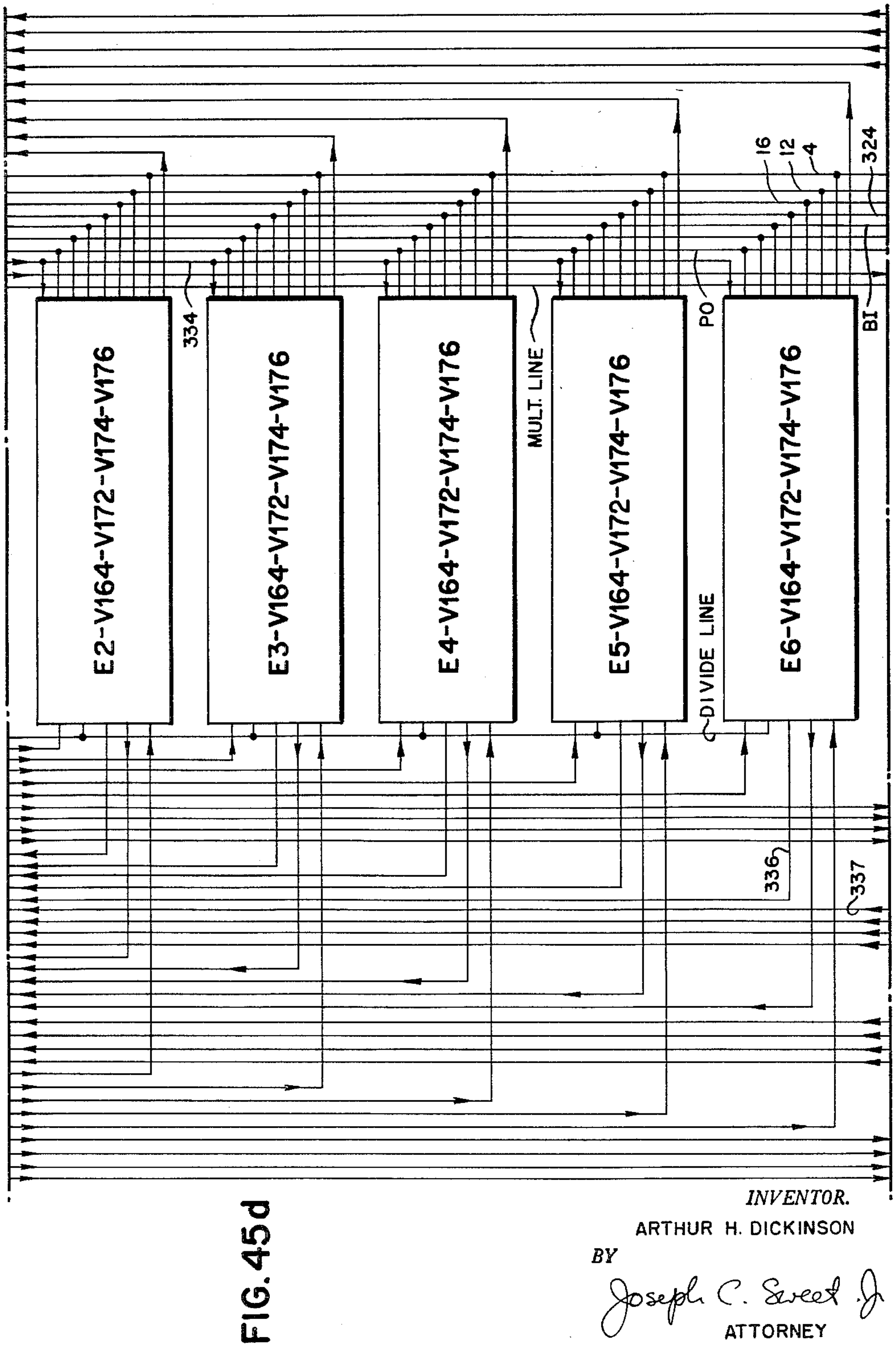
Figure 45E:
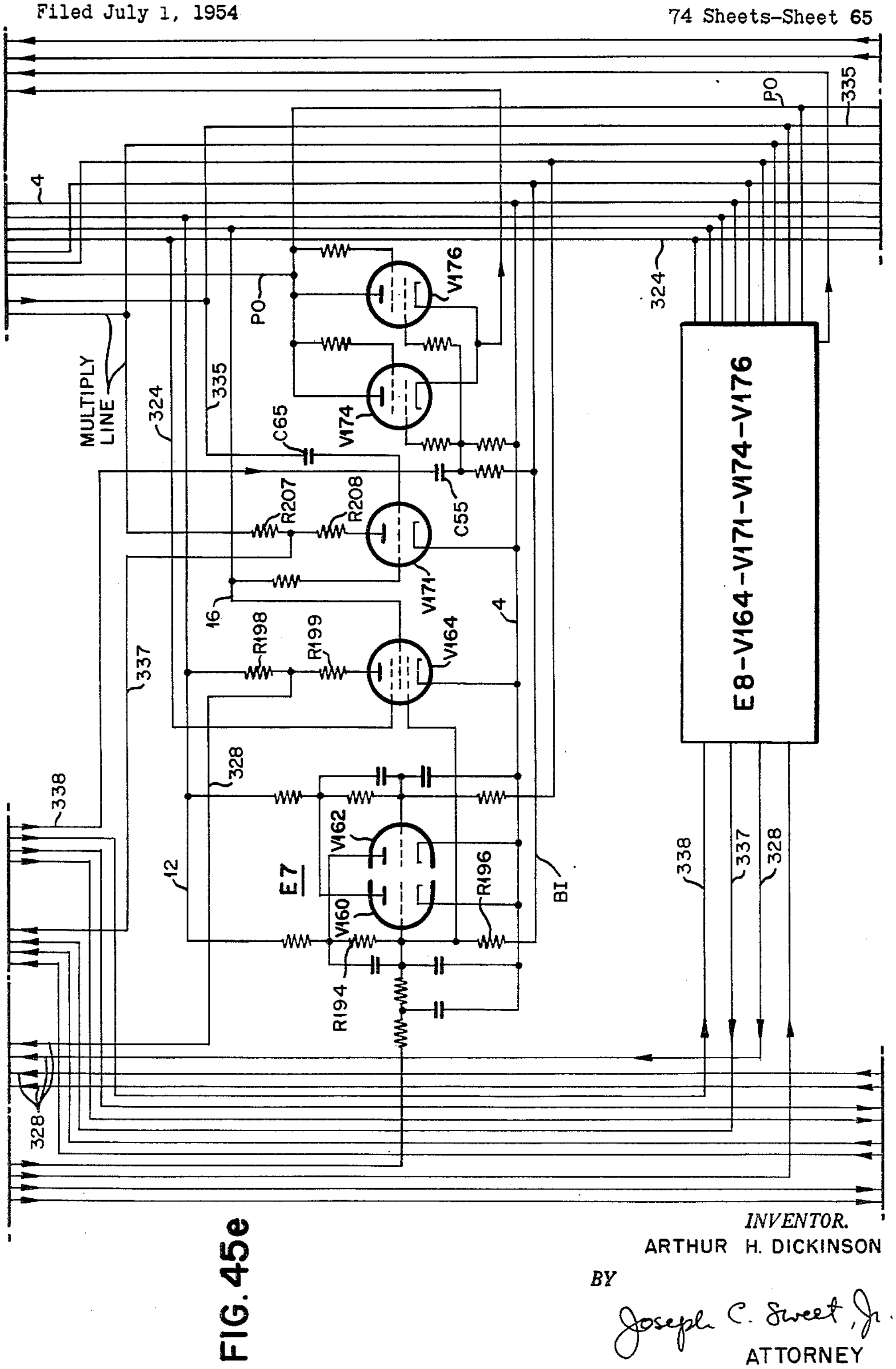
Figure 45F:
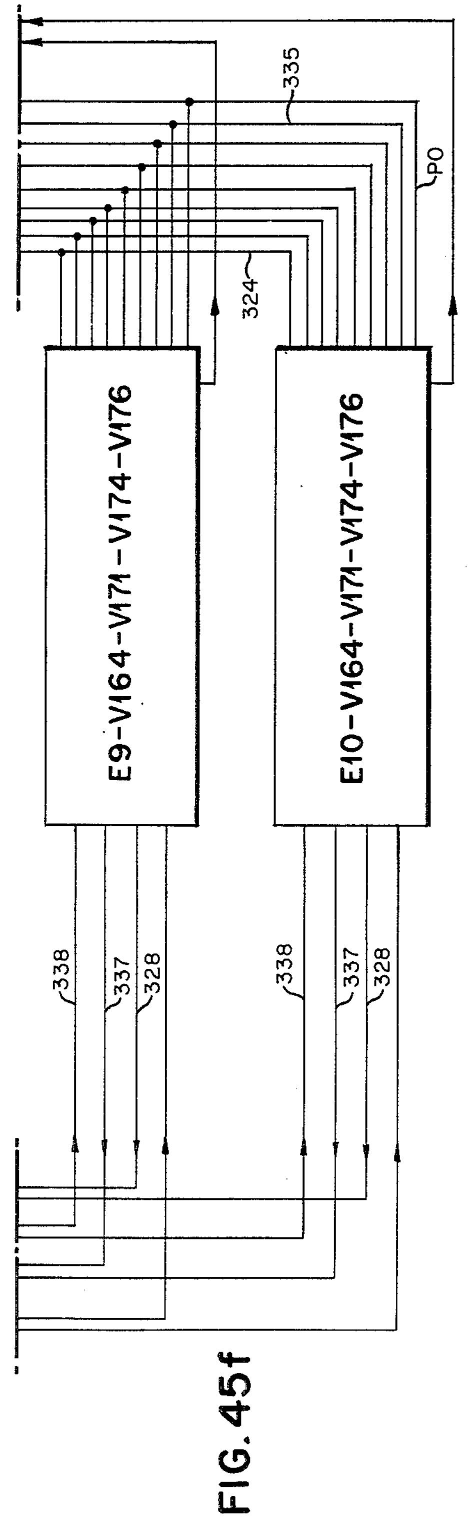
Figure 49:
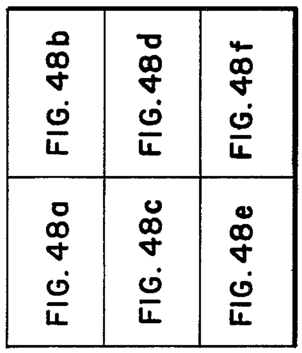
Figure 46:
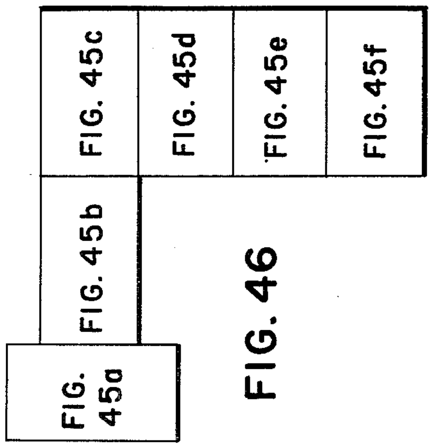
Figure 47A:
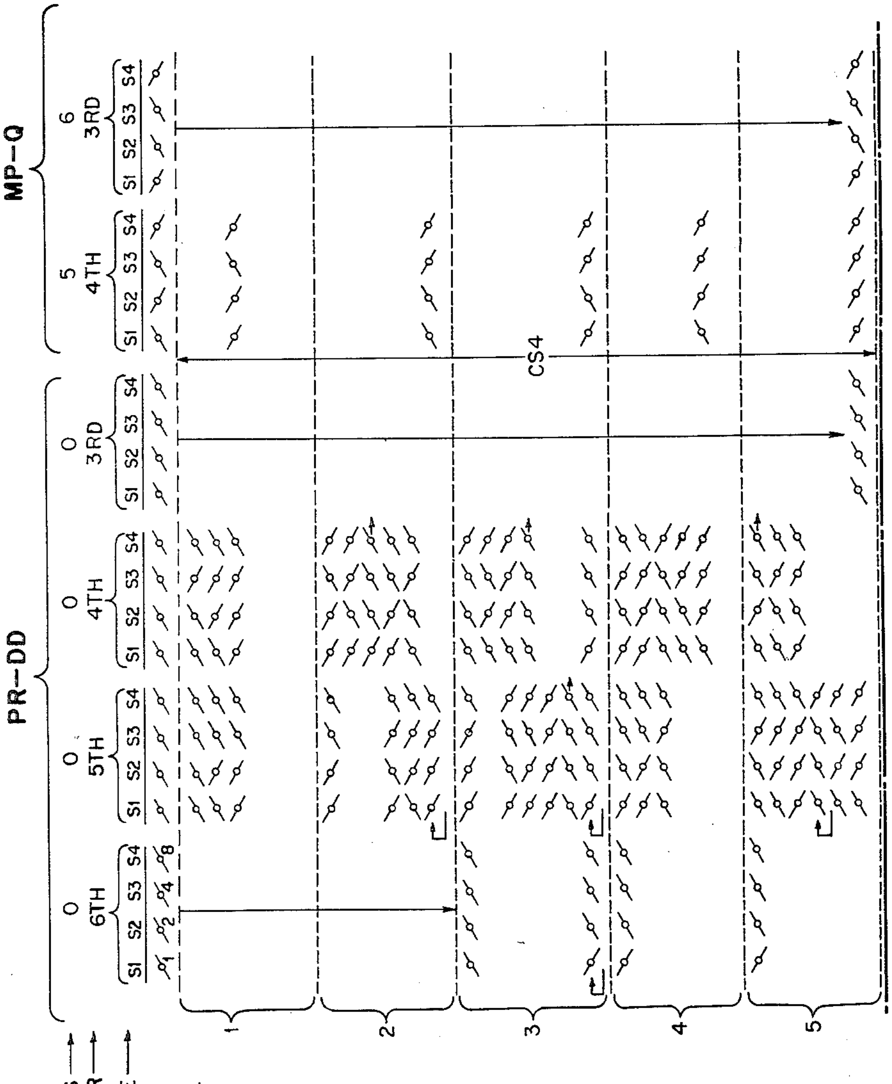
Figure 47B:
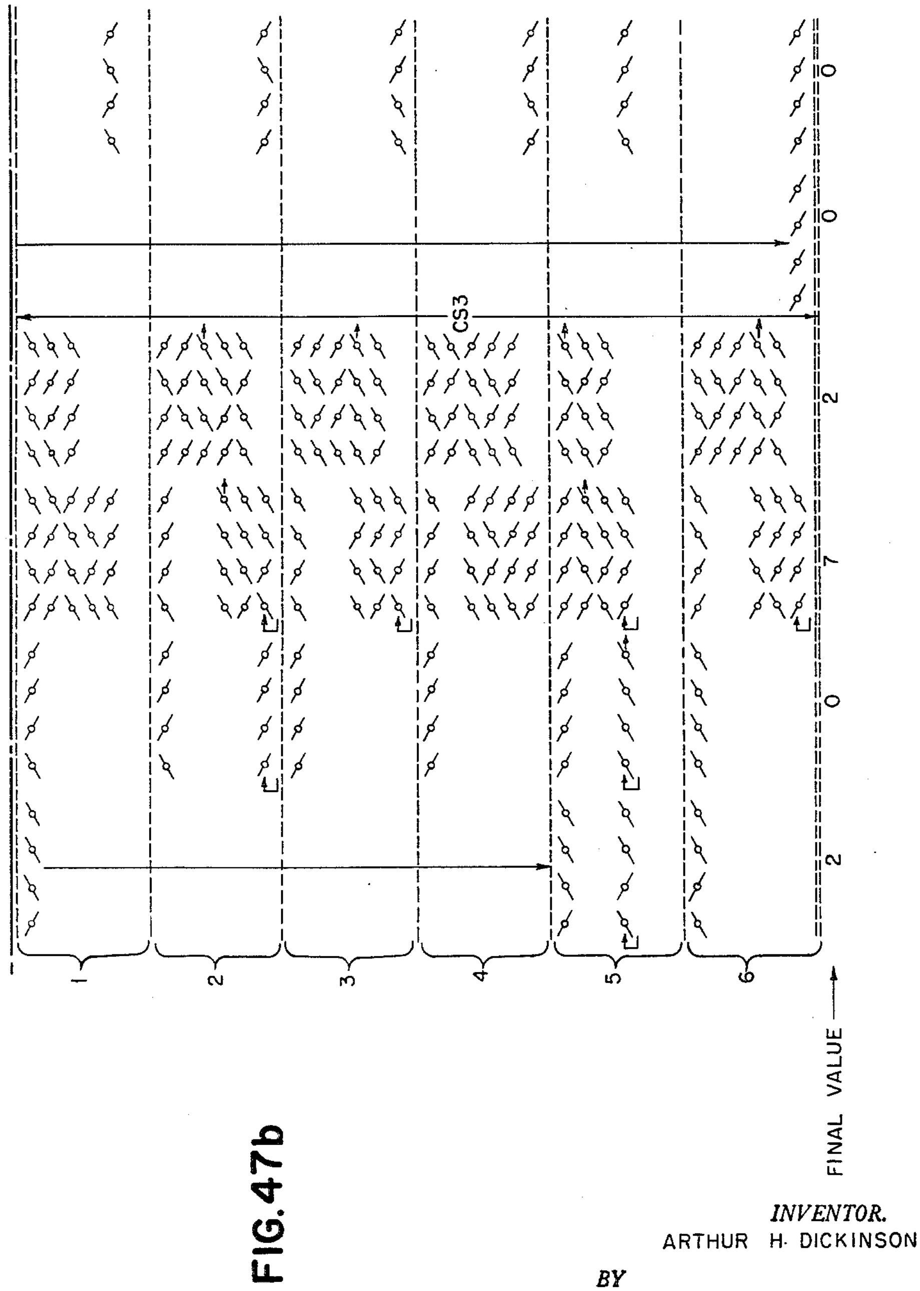

Figs. 10*a*–10*e* comprise a block diagram of the division circuits of the machine of the present invention;

Fig. 11 is a key diagram showing the manner in which the drawings of Figs. 10*a*–10*e* interfit;

Figs. 12 and 13 illustrate the patterns assumed by the various stages of an order of the MC–DRA Register and the DRS Register, respectively, of Fig. 10*a* during the entry of successive input pulses;

Fig. 14 illustrates the manner in which partial differential values are entered into the various orders of the PR–DD Accumulator of Figs. 10*b*–10*e* for the same sample division problem set forth in Fig. 9;

Figs. 15*a*, 15*b*, 16*a*, 16*b*, 17*a*, 17*b*, 18*a*, 18*b*, 19*a*, 19*b*, 20*a*–20*h*, 21*a*–21*c*, 22*a*–22*c*, 23*a*–23*f*, 24, 25*a* and 25*b* show the detailed circuitry of the computing portions of the machine of the present invention;

Fig. 26 is a key diagram showing the manner in which the drawings of Figs. 15*a*–25*b* interfit;

Figs. 27–31 illustrate the patterns assumed by the different stages of one order of the MP–Q Register for various conditions of operation of this register;

Figs. 32 and 33 illustrate the patterns assumed by the different stages of one order of the PR–DD Accumulator upon the applications of input pulses and read-out pulses, respectively;

Figs. 34 and 35 show waveforms useful in the explanation of the operations of the A and S Commutators, respectively;

Figs. 36–41 show waveforms useful in the explanation of the operation of the CS Commutator;

Fig. 42 shows a diagrammatic view of the record handling machine utilized in the machine of the present invention;

Figs. 43*a* and 43*b* show the timing of various contacts during successive cycles of operation of the machine of Fig. 42;

Figs. 44*a* and 44*b* similarly show the operation of the principal relays, cam contacts, and card lever contacts during successive cycles of operation of the machine of Fig. 42;

Figs. 45*a*–45*f* show the power pack, diagrammatically, and the entry, read-in and read-out circuits of the present machine in circuit detail;

Fig. 46 is a key diagram showing the manner in which the drawings of Figs. 45*a*–45*f* interfit;

Figs. 47*a* and 47*b* when placed one above the other illustrate the patterns assumed by the different stages of the pertinent PR–DD Accumulator and MP–Q Register orders for a sample multiplication example;

Figs. 48*a*–48*f* similarly illustrate the patterns assumed by the different stages of the pertinent PR–DD Accumulator and MP–Q Register orders for the same sample division example treated previously in connection with the block diagrams of Figs. 10*a*–10*e*, and also shown in Fig. 9; and, Fig. 49 is a key diagram showing the manner in which the drawings of Figs. 48*a*–48*f* interfit.

Before proceeding to the detailed description, a brief description of the machine and its method of operation may be helpful.

The machine effects multiplication by the repeated addition of partial differential values. Division is effected by the alternate subtraction and addition of partial differential values. When multiplying, the time required to effect a computation is determined by the magnitude of both the MC (multiplicand) and MP (multiplier) amounts. Similarly, when dividing, the time requirement is determined by the magnitude of both the DR (divisor) and DD (dividend) amounts.

A differential value may be defined as a multi-denominational amount in which each of the orders or positions may contain any of the digits of a notation. When the decimal notation is used, as in this case, each order or position may thus comprise any of the digits 0 through 9. The following is illustrative of a decimal differential value:

1 9 4 6 3 7 0 5 2 8

A partial differential value may be defined as a multi-denominational amount in which any of the orders or positions contain only a zero or a single digit of lesser value than the largest digit of the notation. For example, the binary coded partial differential values comprising the aforementioned differential value are:

```
                    0800000008
                    0044040400
                    0002220020
                    1100110100
                    ----------
which add up to:    1946370528
```

Note that the first line contains only "8's" or "0's," the second only "4's" or "0's," etc.

Partial differential values when added form differential values and the use of the former in accounting machines provides useful results, notably that of reducing the time required for performing computing operations. While the illustration just given employs only binary coded digits, i.e., 0, 1, 2, 4 and 8, to form partial differential values, it will be realized that other combinations, such as 0, 1, 2, 4 and 5, are also applicable in forming partial differential values for the decimal notation. The use of the binary radix, however, is preferred since it allows circuits to operate at higher impulsing rates.

The circuits for multiplying and dividing are incorporated in a record controlled machine having a record handling and punching mechanism similar to that shown and described in U.S. Patent No. 2,624,508, granted January 6, 1953, to A. H. Dickinson, B. E. Phelps, and C. A. Bergfors. Referring first to multiplication, in a machine of this type the MP and MC values are derived from the card as it traverses a set of sensing brushes. Simultaneously, the previously computed result is being punched on the record card just ahead of the one being read. The differential timed impulse representative of an MC or MP digit is converted into a number of impulses equal in number to the value of the digit by circuits to be considered subsequently.

The multiplicand amount is entered into an MC Register and simultaneously the multiplier amount is entered into the MP Register. Following completion of read-in and also a reset of the Product (PR) Accumulator, initiation of a multiplying computation is effected. It is sufficient here to state that multiplication is carried out by repeated additive transfers of the MC amount from the MC Register into the PR Accumulator. These repeated operations are under control of the MP amount.

It is to be noted that partial differential values are entered into the PR Accumulator on a differentially timed or cyclical binary-coded basis. It is to be further noted that the PR Accumulator is automatically self-adjusting so that the product is accumulated according to the ten's notation. Accordingly, multiplication is carried out binarywise without the necessity of translating devices for converting from the tens into the binary notation prior to computing and from the binary back to the tens notation for recording purposes.

Having completed a multiplying computation, the MC and MP Registers are reset. The machine is now ready to receive the factors of a new computation from the next successive card and to record in the card at the punch station the product result standing in the PR Accumulator. Accordingly, ten impulses are applied to each of the products-containing PR Accumulator orders as the card traverses the punching station. Thus, each order progresses through ten steps and produces a differential timed impulse at the proper time in the controlling cycle which is representative of the digit standing in that order for controlling a related punch magnet.

When shifting from multiplying to dividing, certain control circuits are adjusted prior to placing the machine into operation upon a group of cards. Each card contains the dividend (DD) and divisor (DR) amounts, which are entered into the PR–DD Accumulator and the MC–DR Register, respectively. The first quotient (Q) digit formed in the MP–Q Register is determined by subtracting partial differential values of DR from DD. The next Q digit is formed in the MP–Q Register by adding partial differential values of DR in the PR–DD Accumulator. Subsequent Q digits are formed by alternate subtraction and addition operations.

Upon completion of dividing operations, the MC–DR Register and PR–DD Accumulator are reset and read-out pulses are applied to the MP–Q Register. Upon operation of the latter register, differentially timed or cyclical impulses are provided for controlling the punch magnets.

Figure 20A:
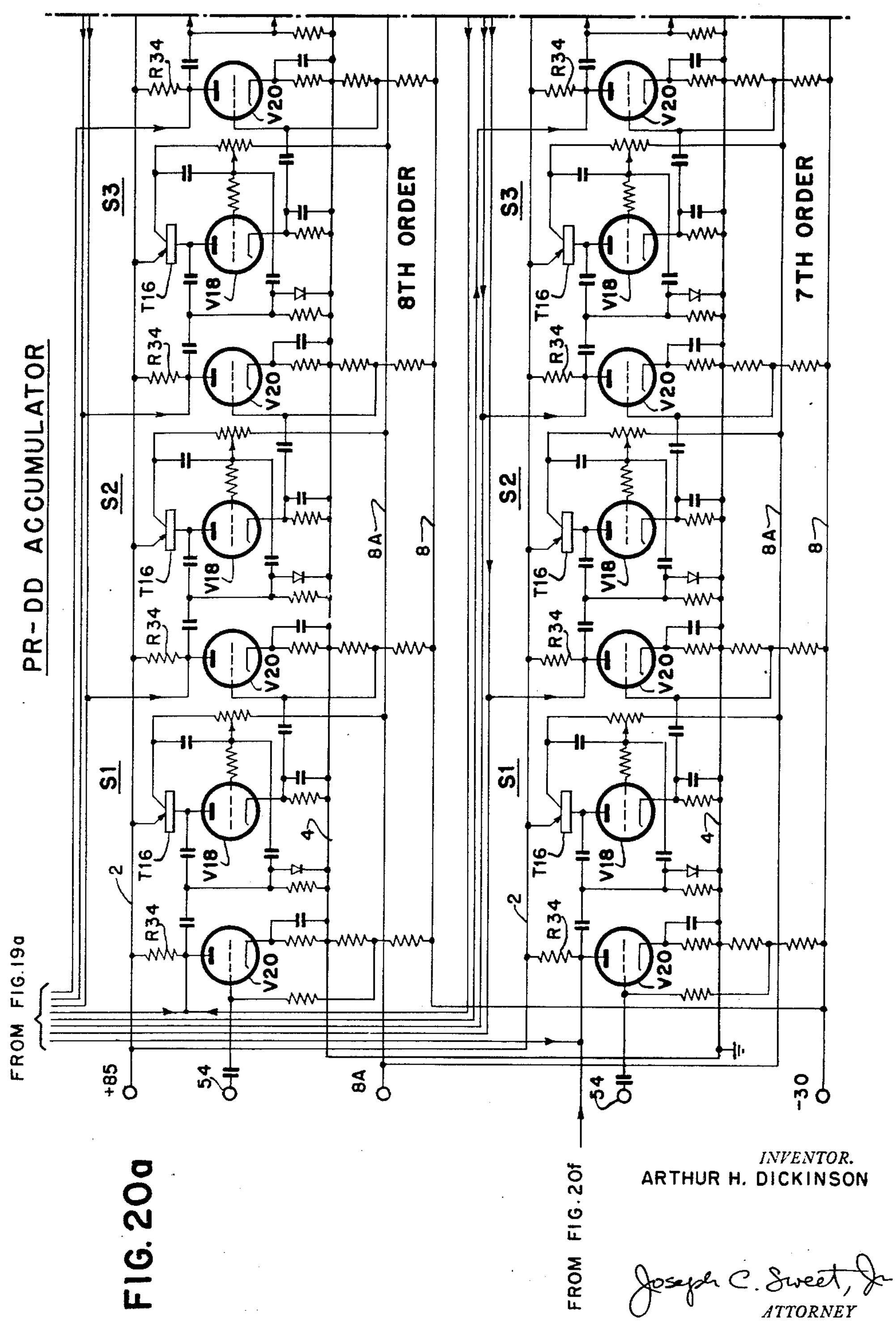
Figure 20B:
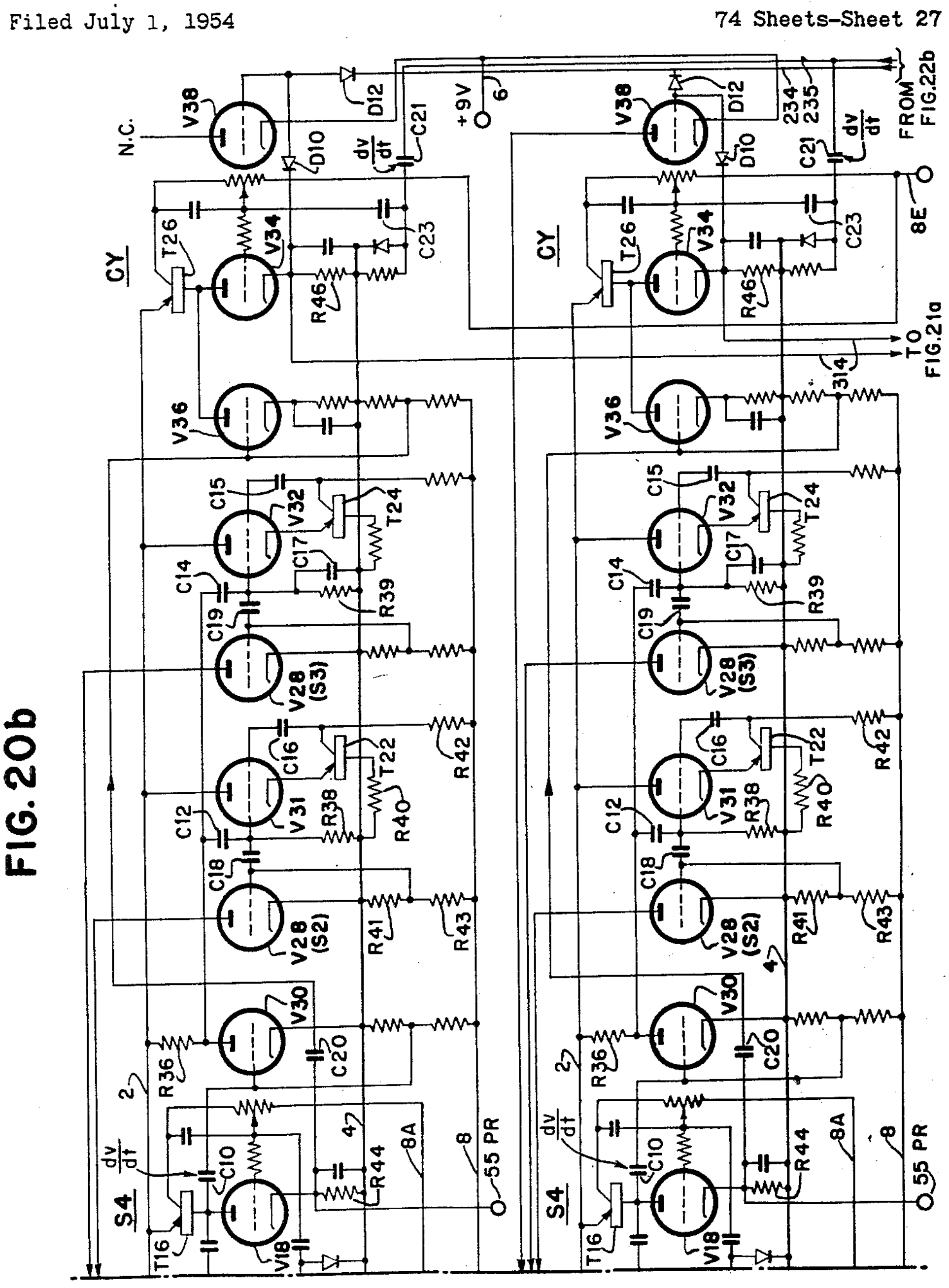
Figure 24:
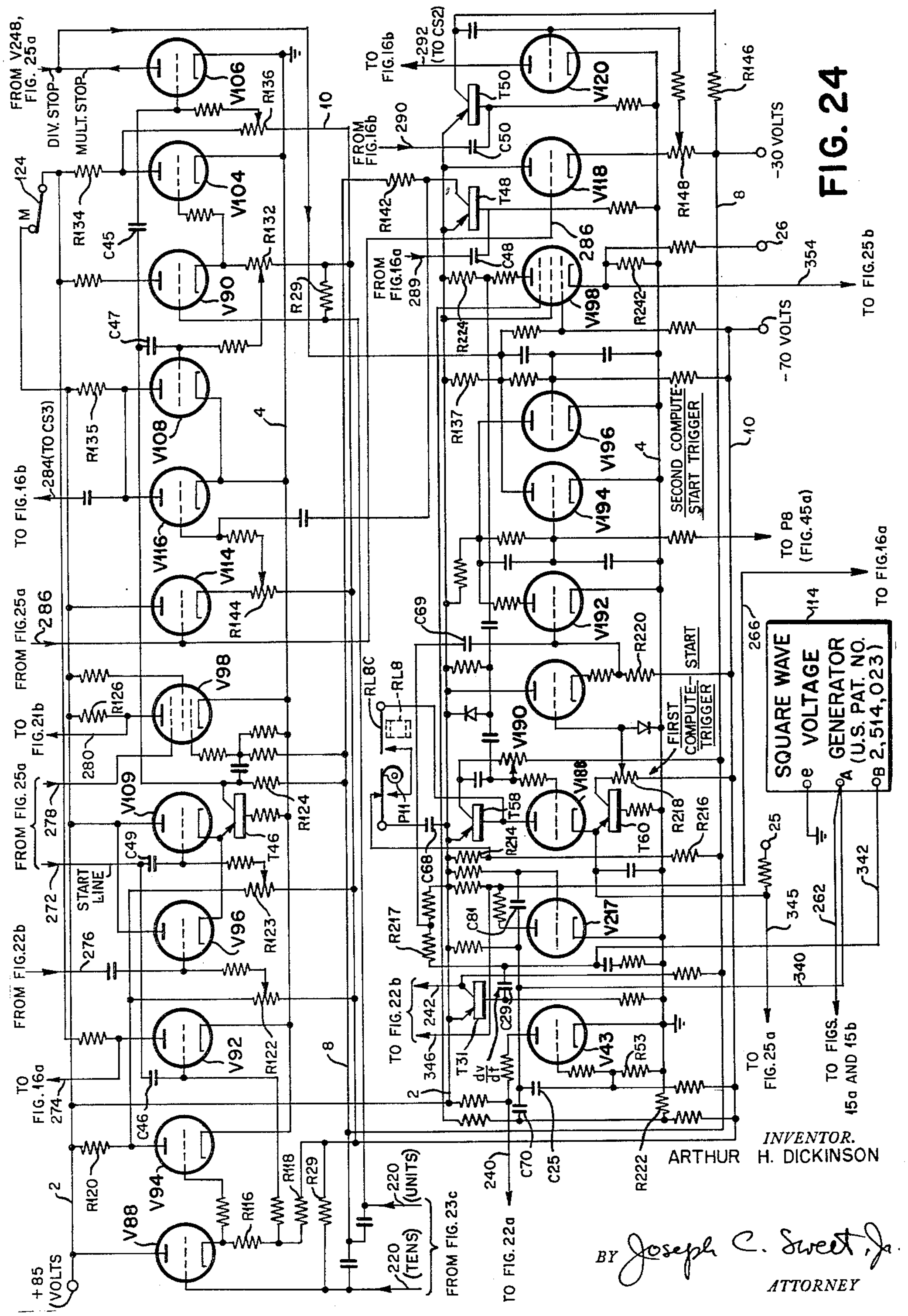

Two fundamental electronic trigger circuits are utilized in the present invention. One of these utilizes thermionic vacuum tubes and is of the form shown in Fig. 8*a* of U.S. Patent No. 2,514,035, granted July 4, 1950, to A. H. Dickinson. The second and most generally utilized trigger circuit is of the type shown basically in application Serial No. 177,446, filed August 3, 1950, now Patent No. 2,872,592, in the name of A. H. Dickinson and entitled Electronic Amplifier. As explained in detail in that application, this trigger circuit comprises basically a transistor and a vacuum tube connected serially therewith. The vacuum tube may be either a pentode or a triode. Several variations of this fundamental transistor-tube trigger circuit are incorporated in the machine of this invention. In one such circuit a plurality of transistors is employed, as shown in another copending application, Serial No. 312,318, filed September 30, 1952, now Patent No. 2,761,965, in the name of A. H. Dickinson. Another such circuit, shown for example in Fig. 20*b*, is monostable. In addition, the non-phase inverting amplifier shown in the above application Serial No. 177,446, now Patent No. 2,872,592, is also utilized. Further, the transistor is used alone in this machine as a phase inverting amplifier, e.g., as shown in Fig. 24.

A plurality of the trigger circuits just referred to are utilized as counters in the individual orders of the registers and the accumulator of the machine of the present invention. In general each order comprises four counters or stages S1–S4, each stage or trigger circuit being employed for the storage of one selected binary digit or partial differential value. For example, stage S1 is utilized to store the value "1," stage S2 the value "2," stage S3 the value "4," and stage S4 the value "8." The storage or absence of a particular digit is denoted by the conduction status of the respective stage. In certain cases in the present machine the stages are reset in Off conduction status, as shown in the first line of Fig. 1, whereas in other cases the stages are all reset in On status, as shown in the first line of Fig. 2. These figures illustrate the two possible conduction states of the respective stages for stored values "0" through "15" in the basic binary code. However, only the values "0" through "9" are manifested in the orders of the present machine and, as will be pointed out more fully below, in certain of the counters a binary-to-decade adjustment is effected as an order passes from "7" to "8," thereby modifying the above patterns for the values "8" and "9."

BLOCK DIAGRAM—MULTIPLICATION CIRCUITS

Multiplication is accomplished by a process of successive additions of the multiplicand value, the number of such additions being determined by the multiplier value. As pointed out previously, each order of a multiplicand value derived from a punched card is converted into one or more binary-coded partial differential values or digits which are then stored in the Multiplicand (MC) Register. By way of example, two orders of the MC Register are shown (the tens order and the units order) in block diagram form in Figs. 3*a* and 3*b*.

Each addition of the value stored in each order of the MC Register is carried out in a serial cyclical fashion, one partial differential value after another in sequence, under control of the Add or "A" Commutator. Further, like partial differential values stored in the different orders of the MC Register are added simultaneously (to the respective order of the Product (PR) Accumulator, of course) in each addition cycle. Thus, all 8's are added first, then all 4's, then all 2's and, lastly, all 1's. Each commutator cycle also includes a final interval of time reserved for a carry from one order to another in case this is required.

Figure 3A:
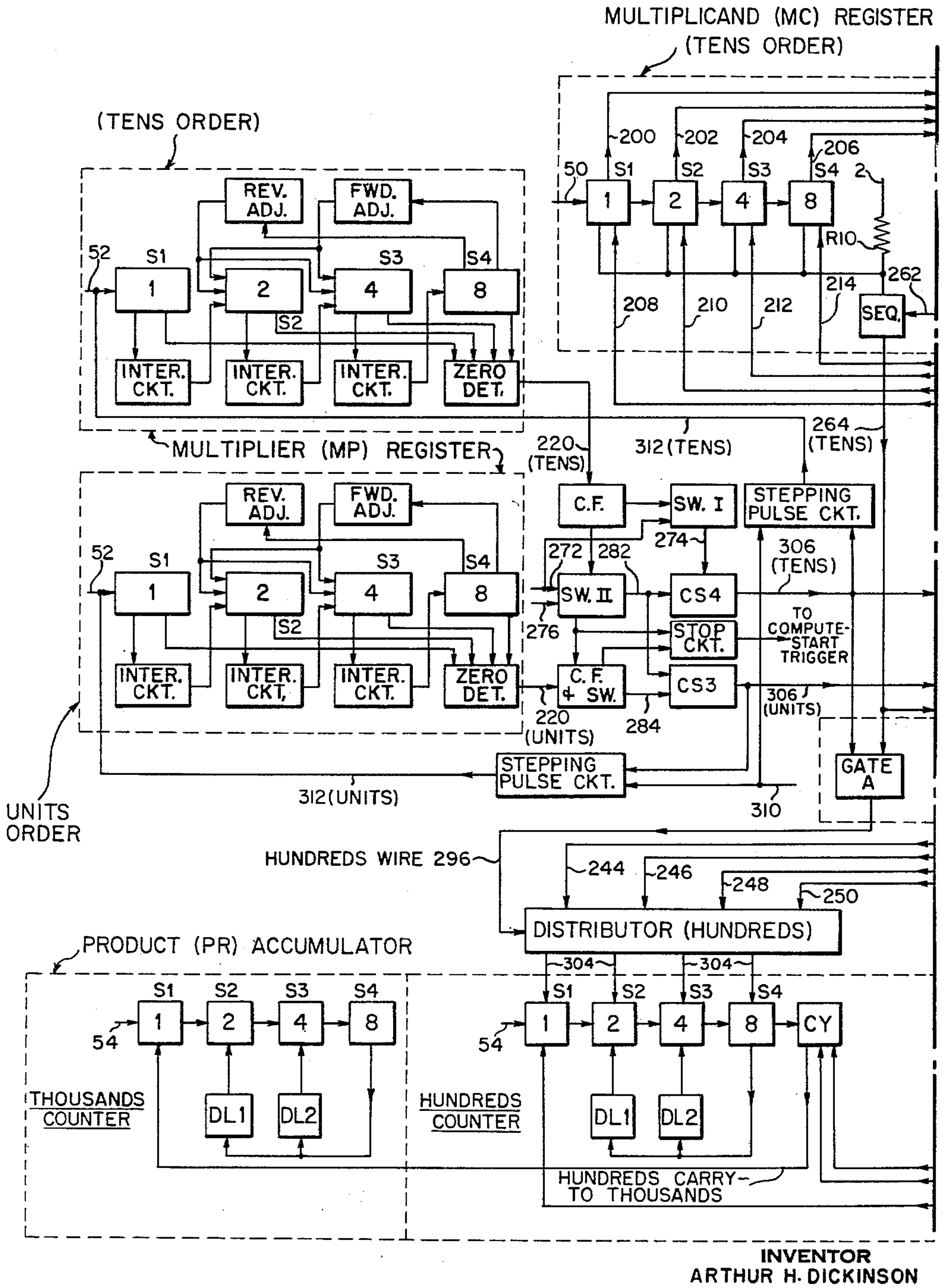
Figure 3B:
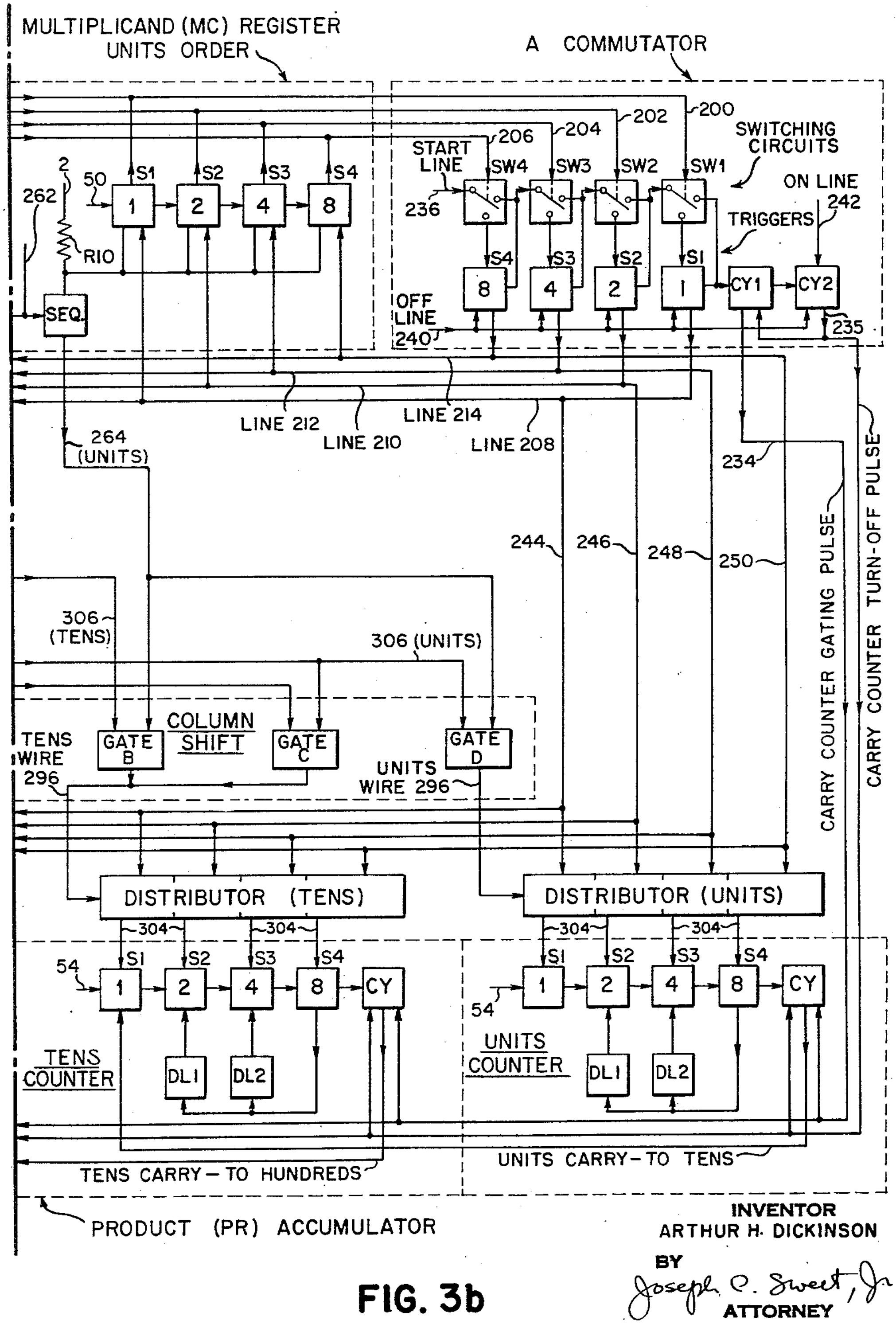

The A Commutator is shown in block diagram form in the upper right-hand corner of Fig. 3*b*. As pointed out previously, the cycle produced thereby has a variable period, i.e., is of variable length, dependent upon the presence or absence of each of the different significant binary-coded digits in the MC Register. For convenience the commutator cycle will be shown and referred to as being made up of equal length intervals separated by equally spaced index points, although the intervals may be of unequal length if desired. In the particular example given the maximum cycle is six index points long and the minimum three, assuming at least one significant digit stored in the MC Register. The reason that the minimum length commutator cycle is three index points long, rather than two, is that the carry interval has been made two index points long to demonstrate how this may be done if necessary to accommodate a many-order value being operated upon, as pointed out more fully hereinafter in connection with description of the carry interval defining circuits in the A Commutator.

Basically, the A Commutator contains four bit trigger circuits labeled S4, S3, S2 and S1, respectively, two carry trigger circuits labeled CY1 and CY2, respectively, and four switching circuits labeled SW4, SW3, SW2 and SW1, respectively. The switching circuits are provided so that, in the event one or more partial differential values or digits are not stored in any of the MC Register orders, corresponding ones of the bit trigger circuits S4–S1 may be by-passed. Normally, the A Commutator operates as a closed ring, although, as pointed out hereinafter, under certain conditions it may function as a start-stop device.

Switching stage SW4 is controlled by and commonly connected to stage S4 of each of the orders of the MC Register via line or wire 206 and is actuated so as to transmit input pulses from start line or wire 236 directly to the input of switch circuit SW3 (thus by-passing stage S4 of the A Commutator) in the event that an "8" is not stored in either stage S4 of the MC Register. Switching circuits SW3, SW2 and SW1 function similarly in conjunction with trigger circuits S3, S2 and S1, respectively, of the A Commutator and are coupled via lines or wires 204, 202 and 200, respectively, to their respective controlling stages S3, S2 and S1 of the MC Register.

Thus if an "8" is stored in at least one stage S4 of the MC Register, regardless of in which order the digit is contained, an input pulse from start wire 236 will be routed by switching circuit SW4 to the input of trigger S4 of the A Communtator, thus switching that stage On until it is shut Off by the next of the regularly repeated pulses applied via line or wire 240 to all of the trigger circuits of the A Commutator except carry stage CY1. The resultant operational wave-forms are shown in lines A–C of Fig. 4. Note that the first pulse on wire 240 shown in line B of Fig. 4 occurs simultaneously with the start pulse on wire 236 (line A of Fig. 4), and that each pulse on wires 236 and 240 defines or occurs simultaneously with an index point of of the commutator cycle (line J of Fig. 4).

Figure 4:
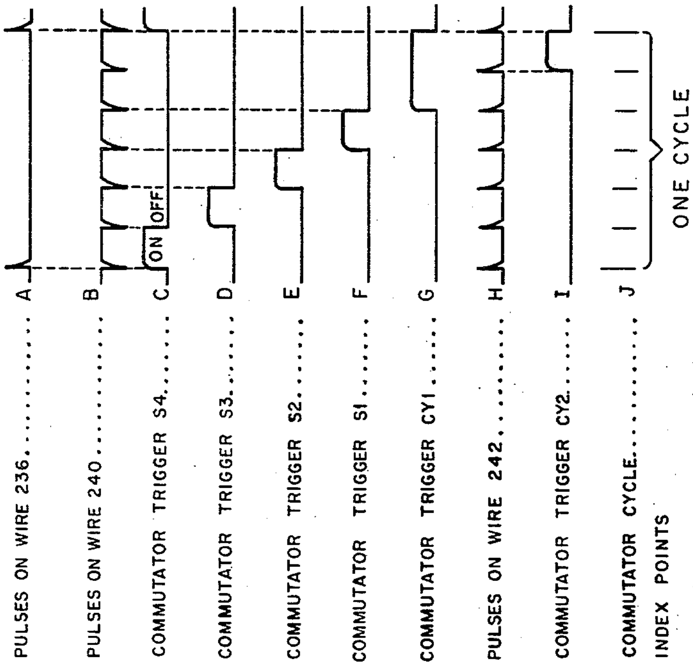

In this connection note that since, as shown in lines A and B of Fig. 4, the first pulse on each of wires 236 and 240 occurs simultaneously with one another, the pulse on wire 240 tends to turn stage S4 Off at the same time that the pulse on wire 236 tends to turn that stage On. However, trigger stage S4 (whose circuit is shown in detail in Fig. 22*a*) is basically of the type disclosed in my copending application, Serial No. 177,446, and in its present modified form in my application, Serial No. 312,318, both referred to previously. In such a trigger circuit an On pulse takes precedence, so that even if an Off pulse is applied simultaneously therewith as in this case, the trigger circuit is nevertheless turned On.

If a "4" is stored in either or both stages S3 of the MC Register, when trigger S4 of the A Commutator is turned Off by the second pulse from wire 240 shown in line B of Fig. 4, the resultant drop in voltage is transmitted through switching circuit SW3 to the input of trigger S3 of the A Commutator. This trigger S3 then remains ON until the next successive pulse from wire 240 shuts it Off as shown in line D of Fig. 4. Further, if a "2" is stored in either or both stages S2 of the MC Register and a "1" is stored in either or both stages S1 thereof, triggers S2 and S1 of the A Commutator are then turned On and Off successively, their wave-forms for this operation being shown in lines E and F of Fig. 4.

The outputs of switching circuit SW1 and trigger S1 of the A Commutator are connected together and to the input of the first carry trigger stage CY1. The second carry trigger stage CY2 has two inputs, one the output from first carry stage CY1 and the other line or wire 242, from which is received an On pulse timed simultaneously with each index point as shown in line H of Fig. 4. Carry stage CY2 switches On only in response to a simultaneous input voltage from both its inputs and is thereafter turned Off by the next of the regularly repeated pulses on wire 240. Carry stage CY1 is turned Off at the same time via a feedback connection from output line or wire 235 of carry stage CY2.

As shown in lines G and I of Fig. 4, first carry stage CY1 thus remains On for the last two intervals of the A Commutator cycle defined by the index points whereas carry stage CY2 remains On only for the last interval of the cycle, which interval overlaps the On period of carry stage CY1.

The general function of both carry stages CY1 and CY2 is to effect carry operations. In the exemplified embodiment of this invention only eight orders will be shown in the Dividend (DD) Accumulator, and one interval of the A Commutator cycle as defined by the index points is sufficient to effect carries therein of the lowest order through all orders to the highest. However, if additional orders were to be added to the DD Accumulator, one interval as defined by the index points might prove to be insufficient and two or more such intervals would be required. Accordingly, the manner in which carry time may be extended is shown by inclusion of both carry stages CY1 and CY2 in the circuit.

The outputs from triggers S4, S3, S2 and S1 and carry stages CY1 and CY2 are available at lines or wires 214, 212, 210, 208, 234 and 235, respectively, as shown in Fig. 3*b*.

As pointed out above, the A Commutator is normally operated as a ring and hence the output of second carry stage CY2 at wire 235 is connected back to start wire 236 through a compute-start circuit (shown in detail in Fig. 24 and described hereinafter) to produce successive cycles. The initial pulse on start wire 236 for each multiplication operation is derived from wire 340 of master pulse generator 114 (Fig. 24) under control of cam P11 (Fig. 24) of the record handling machine (Fig. 42). The regularly recurring pulses on wires 240 and 242, each defining or occurring simultaneously with a corresponding index point of the commutator cycle, are also derived from this master pulse generator, as described more fully hereinafter. It is sufficient here to point out that the output on wire 340 from this master pulse generator 114 is a square-wave whose positive and negative portions are of equal duration or lengths, although this is not necessary. The period of one cycle of this square-wave output fixes the time interval between each successive pair of index points of the commutator cycle, and each index point and pulse on wires 236, 240 and 242 coincides in time with the leading edge of the positive going portion of the square wave output on line 340.

Figure 5:
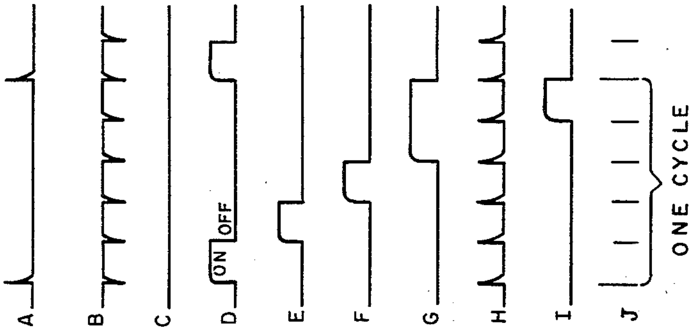

As will now be obvious, if neither the units nor the tens order stage S4 of the MC Register contain an "8," switching circuit SW4 would by-pass trigger stage S4 of the A Commutator so that the initiating pulse of each cycle from start wire 236 would turn trigger circuit S3 On initially, with trigger stage S4 remaining out of the circuit. The wave-forms for a cycle of this operation, assuming that there is, however, a "4," a "2" and a "1" stored in either or both stages S3, S2 and S1, respectively, of the MC Register, are shown in Fig. 5.

Figure 6:
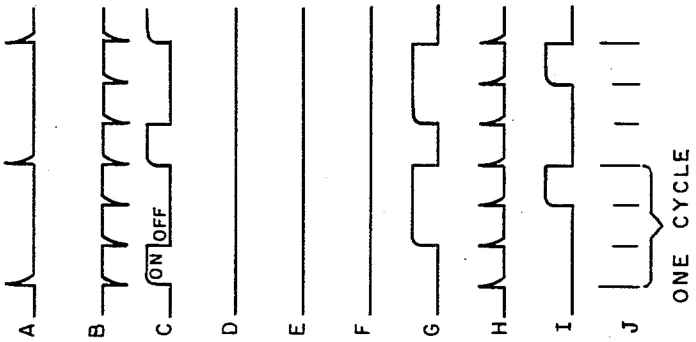

Similarly, the absence of "4's," "2's" and "1's" in the coded multiplicand value standing in the MC Register will cause triggers S3, S2 and S1, respectively, of the A Commutator to be by-passed. The wave-forms of such operation, assuming, however, that there is an "8" stored in either or both stages of the MC Register, are shown in Fig. 6.

It will thus be apparent that the maximum six index point cycle is required for only six multiplicand values out of the total of 99 possible for a two-order multiplicand (i.e., for multiplicand values 69, 78, 79, 87, 96 or 97). In other words, for a two-order multiplicand, 93 of the 99 possible values require less than the cycle period required if an invariable cycle were provided. Further, of these 93 multiplicand values, 12 utilize the minimum (3) index point cycle (i.e., multiplicand values 01, 02, 04, 08, 10, 11, 20, 22, 40, 44, 80 or 88). Of the remaining 81, 40 utilize the next lowest (4) index point cycle (i.e., multiplicand values 03, 05, 06, 09, 12, 13, 14, 15, etc.), and 41 utilize the 5 index point cycle (i.e., multiplicand values 07, 16, 17, 25, 27, 29, 34, etc.).

Referring again to the MC Register, the tens order is shown in Fig. 3*a* and the units order in Fig. 3*b*. Each order comprises four cascaded stages S1–S4 in which are stored binary-coded partial differential values "1," "2," "4" and "8," respectively. The input to stage S1 of each order of the MC Register is derived via a line 50 from a punched card in the exemplified embodiment of this invention. The entry of the desired multiplicand value to be operated upon is, of course, made into the MC Register prior to the multiplication operation to be described.

As pointed out above in connection with the A Commutator, a common connnection from both stages S1 of the MC Register is connected via line 200 to switching circuit SW1 of the A Commutator to control the latter. Similarly, the pairs of stages S2, S3 and S4 are each respectively commonly connected via lines 202, 204 and 206 to switching circuits SW2, SW3 and SW4 of the A Commutator. The output lines 208, 210, 212 and 214 from the A Commutator are each respectively connected from the corresponding stage S1, S2, S3 and S4 thereof to the respective stages S1, S2, S3 and S4 of the MC Register to provide serially-timed gating pulses in order to carry out the computation in the desired serial fashion, as follows.

All stages of the MC Register are of the gated variety, and the gate circuit portions of all four stages S1–S4 of each order of the MC Register share a common load resistor R10 connected to the positive supply line 2 and controlling a sequencer circuit SEQ. If any of the stages S1–S4 has a significant value stored therein, a potential drop will thus be produced across the corresponding resistor R10 at the time a gating pulse is applied to the gate circuit portion of that stage and for the duration thereof. These gating pulses are derived in sequence from the A Commutator for Stages S1–S4 of each order via the above-mentioned lines 208, 210, 212 and 214, respectively.

Line 262 is directly connected to square-wave output line 340 of master pulse generator 114 (Fig. 24) referred to previously, and differentiated mid-index point time pulses are derived therefrom within each sequencer SEQ. to produce an output pulse whenever a potential drop occurs across its resistor R10. The resultant output pulses from each sequencer SEQ. are connected via its respective line 264 to two alternate ones of the gate circuits leading to the distributors as shown in Figs. 3*a* and 3*b*, tens line 264 being connected to Gates A and C, and units line 264 being connected to Gates B and D.

For example, if the multiplicand value "78" were stored in the MC Register, a timed pulse representative of the units value "8" would appear first on units line 264 followed by the appearance on tens line 264 of three sequentially-timed pulses representative of the values "4," "2" and "1," all at mid-index point times. The manner in which these pulses are routed through the four gate circuits A–D and the three distributor circuits shown in Figs. 3*a* and 3*b* under control of the multiplier value in order to produce the desired multiplication operation will be apparent from the ensuing description.

A two order Multiplier (MP) Register is disclosed in the exemplified embodiment and shown in block diagram form in Fig. 3*a*. Each order again comprises four stages S1–S4, inclusive. However, an intermediate circuit Inter. Ckt. is included between each pair of adjacent stages, i.e., between stages S1 and S2, S2 and S3, and S3 and S4. The reason for these intermediate circuits is that each order of the MP Register must operate in two directions: forward or ascending during entry, and reverse or decending during multiplying. This will be discussed more in detail in connection with the circuitry of this register. It is sufficient to state here that initially, during entry, successive pulses applied from a punched card to input line 52 of stage S1 of each order cause the desired multiplier value to be stored as binary coded partial differential values in the respective stages of that order of the MP Register by means of forward operation of its circuits. During the ensuing multiplying operation, successive pulses derived from the multiplying machine and applied to the same line 52 via line 312 cause the value stored in that order to be reduced step-by-step to zero. The number of input pulses thus required to return each order of the MP Register to a stored value "0" is equal to the multiplier value initially stored in that order. Further, when all stages of an order are thus reduced to "0," it is apparent that a column shift is required to continue the multiplying operation unless the order being operated upon is the units one, in which case multiplication should cease. To this end a Zero Detector Zero Det. is provided for each order of the MP Register and controlled by each of its stages S1–S4.

In order to provide a decimal counter, some means must be included to introduce extra or feed-back pulses in each order of the MP Register. This is accomplished in the present embodiment by means of a feed-back pulses derived from stage S4 of each order and applied to stages S2 and S3 thereof through either of two adjustment circuits Fwd. Adj. or Rev. Adj., depending upon whether the register is being operated in a forward or reverse direction, respectively. These circuits and their operation will be described more in detail hereinafter.

It is sufficient to note at this point that an output will be produced on line 220 of zero detector Zero Det. of the tens order of the MP Register as long as any significant partial differential value is stored in that order and, similarly, a control potential or gating pulse output will be produced on line 220 of the zero detector Zero Det. of the units order of the MP Register as long as any significant partial differential value is stored in that order. These control potential outputs on lines 220 of the tens and units orders of the MP Register are used to control the successive addition into the PR Accumulator of the partial differential values from the MC Register through the four gate circuits previously mentioned, as follows.

As is usual in multiplying machines, the control of this operation is carried out from a higher to a lower sense, i.e., the control potential output from line 220 of the ten orders of the MP Register is utilized first. This output line 220 turns the first of two CS Commutator stages, stage CS4, to On status via cathode follower C.F., switch circuit SW. I and line 274 under control of a pulse from multiply-start line 272. Cathode follower C.F. is included merely for impedance matching purposes. Whenever, after entry of the desired multiplicand and multiplier values into the MC register and MP Register, respectively, it is desired to initiate the multiplying operation, a pulse is supplied to multiply-start tline 272. This pulse turns the CS Commutator stage CS4 On, and it will remain in this status until such time as the MP Register tens order no longer has any significant partial differential value stored therein.

The output of this stage CS4 is connected via tens line 306 to two of the gate circuits (A and B) shown in the center of Figs. 3*a* and 3*b* to turn these gates On and thus enable them to pass the time sequenced pulses appearing on tens line 264 and units line 264 from the tens and units orders, respectively, of the MC Register. Output line 306 from CS Commutator Stage CS4 is also connected to gate to On status an additional circuit Stepping Pulse Ckt., included for the purpose of returning the multiplier value stored in the tens order of the MP Register step-by-step to "0." This is accomplished by means of successive input pulses derived from line 310, one occurring midway of the first half of the two index point interval allocated for carry purposes during each commutator cycle. The resultant output pulse from this circuit Stepping Pulse Ckt. is coupled via line 312 back to line 52 of stage S1 of the corresponding (tens) order of the MP Register, which is of course now adjusted for reverse operation since forward operation and entry into this register were completed prior to the initiation of the multiplying operation.

It is thus apparent that so long as an output is produced from tens line 306 of stage CS4, all sequential pulses appearing on tens line 264 during each commutator cycle will be routed through Gate A and hundreds wire 206 to the hundreds distributor input, and, similarly, all sequentialy pulses appearing on units line 264 during each commutator cycle will be routed through Gate B and tens wire 296 to the tens distributor input. Further, as is pointed out above, the value standing in the tens order of the MP Register will be reduced by "1" during each successive cycle of the commutator. The wave-forms of this operation are shown in Fig. 7 for arbitrary values of multiplicand and multiplier equal to 79 and 53, respectively.

CS Commutator stage CS4 is turned Off during the last carry interval of the last commutator cycle in which any significant partial differential value is stored in the tens order of the MP Register, such value always, of course, being "1." This is accomplished by means of another switch circuit SW. II, which is now gated On by the previously mentioned cathode follower circuit C.F., and controlled by regularly recurring input pulses from line 276, one of which occurs during each commutator cycle and, more specifically, midway of the last carry interval thereof. The resultant output is coupled via line 282 to CS Commutator stage CS4 to turn this stage Off.

Another resultant pulse from this switch circuit SW. II is also utilized to turn On the successive CS Commutator stage CS3 via a cathode follower and switch circuit C.F. & SW. and line 284 under control of line 220 of the units order of the MP Register whenever a suitable control potential output appears on the latter, such control output signifying that a significant partial differential value is stored in that order. A control potential output is thereafter produced on units line 306 of CS Commutator stage CS3 as long as any significant partial differential value is stored in the units order of the MP Register. This control potential is connected to Gate circuits C and D to maintain them in On status during this period and is also connected to another circuit Stepping Pulse Ckt., which is also controlled by line 310. The purpose of this latter circuit is to reduce the value standing in the units order of the MP Register sequentially step-by-step to "0," each step again occurring midway of the first half of the two index point interval allocated for carry purposes at the end of each commutator cycle.

During these commutator cycles the sequential pulses on tens line 264 representing the partial differential values stored in the tens order of the MC Register are routed via Gate C to the tens distributor input via tens wire 296. Similarly, the sequential pulses on units wire 264 representing the partial differential values stored in the units order of the MC Register are routed via Gate D and units wire 296 to the units distributor input.

It is to be noted that line 282 is connected to CS commutator stage CS3 as well as stage CS4, and the pulse which, as described above, turns stage CS4 Off, therefore tends to turn CS3 Off at the same time that a pulse is being applied from line 284 to turn this stage On. The trigger circuit utilized in stage CS3 is, however, of the type disclosed in my copending application Serial No. 177,446, referred to previously, and shown in detail in Fig. 16*b*. As noted above in connection with the A Commutator, in such a trigger circuit an On pulse takes precedence, so that even if an Off pulse is applied simultaneously therewith as in this case, the trigger circuit is nevertheless turned On. It is also to be noted that an On pulse from line 284 is applied to CS Commutator stage CS3 thereafter during each commutator cycle simultaneously with the application thereto of an Off pulse from line 282 until the first ensuing cycle when the value stored in the units order of the MP Register has been reduced to "0." At that time the circuit C.F. & SW. prevents the On pulse derived from line 276 via switch circuit SW. II from appearing on line 284. Since at that time only the Off pulse appears on line 282, CS Commutator Stage CS3 is turned Off.

It is further to be noted that an input from line 272 is also provided to switch circuit SW. II. The purpose of this is to switch CS Commutator stage CS3 to On status initially via the cathode follower and switch circuit C.F. & SW. and On line 284 in the event that a significant digit of multiplier value is stored in the units order of the MP Register but not in the tens order thereof.

The output from switch circuit SW. II leading to the cathode follower and switch circuit C.F. & SW. is also connected to a stop circuit Stop Ckt., as is a gate output from the cathode follower and switch circuit C.F. & SW. The latter circuit prevents the pulses on line 276 from actuating this stop circuit as long as the value stored in the units order of the MP Register is other than "0." As soon as the value stored therein is reduced to "0," the next pulse appearing on line 276 and coupled via switch circuit SW. II to this stop circuit produces an output from the latter which is then routed to the previously mentioned compute-start trigger of the multiplying machine (Fig. 24), to end the multiplying operation, as will be described more in detail hereinafter.

Three distributors are provided in the exemplified embodiment: one for units, one for tens and one for hundreds. The hundreds distributor derives its input from Gate A via hundreds wire 296, the units distributor derives its input from Gate D via units wire 296, and the tens distributor derives its input from either Gate B or Gate C, depending upon which is On, via tens wire 296. Note that these Gates A–D thus form the column shift circuit for multiplying. Four outputs are provided for each distributor, each connected via a line 304 to a respective stage of the corresponding order of the PR Accumulator. The operation of each distributor is under the control of the A Commutator, to which it is connected via four lines: 244, 246, 248 and 250.

Referring now for the moment to the PR Accumulator, four orders are shown to take care of a possible four order product resulting from a two order multiplicand and a two order multiplier. Each order of the PR Accumulator includes four cascaded stages S1–S4 for storing partial differential values of "1," "2," "4" and "8," respectively. Each order also includes two delay circuits DL1 and DL2 connected between stage S4 and stages S2 and S3, respectively, to provide feed-back pulses in order to convert the binary-coded inputs into the decimal system. Each order with the exception of the thousands order further includes a carry stage CY. The output of the carry stage CY of the units order counter is connected to one input of stage S1 of the tens order counter, the output of the carry stage CY of the tens order counter is connected to one input of stage S1 of the hundreds order counter, and the output of the carry stage CY of the hundreds order counter is connected to one input of stage S1 of the thousands order counter. Two control inputs are provided for each carry stage CY: a gating pulse input line 234 from the first carry stage CY1 of the A Commutator and a turn-off pulse input line 235 from the second carry stage CY2 of the A Commutator.

An additional input from a respective line 54 is also connected to stage S1 of each counter of the PR Accumulator so that read-out pulses may be applied thereto, when desired, to determine the value standing in the PR Accumulator after the multiplying operation is completed.

Any pulse representative of an "8" appearing on units wire 296 will appear thereon simultaneously with a gating pulse or control potential appearing on line 250 only of the four output lines from the A Commutator leading to the distributor. This pulse is thus routed through the units distributor into stage S4 of the units counter of the PR Accumulator. Similarly, any pulse representative of a "4" appearing on units wire 296 will appear thereon when a gating pulse or control potential appears on line 248 only, and this pulse is thus routed through the units distributor into stage S3 of the units counter.

If these two pulses were applied in succession to the units counter, a carry should of course occur, and an adjustment should also take place to indicate that the units counter then stands at "2" (=12−10). The binary-to-decade adjustment occurs first, during the last half of that interval of the A Commutator cycle when a gating pulse appears on lines 250 and 214 and the "8" pulse is entered into stage S4 of the units counter of the PR Accumulator at mid-index point time. In other words, the binary-to-decade adjustment occurs whenever stage S4 of any counter of the PR Accumulator is in On status and an "8" pulse is entered therein, and further, during that commutator cycle in which the "8" is entered.

Assuming that the units counter stood at "0" prior to any entry of the "8" and "4" pulses (discussed above), i.e., with all four stages S1–S4 in On status and carry stage CY in Off status for reasons which will be pointed out below in connection with the description of the detailed circuitry of the PR Accumulator, the first entry of an "8" pulse into stage S4 of this counter via the respective wire 304 from the units distributor causes this stage to turn Off. When stage S4 switches from On to Off, delay circuits DL1 and DL2 are triggered to switch stages S2 and S3, respectively from On to Off in succession. This action is completed before the next index point position of the commutator cycle during which the "8" pulse was entered.

During normal operation it is, of course, impossible to enter both an "8" and a "4" pulse from an order of the MC Register into an order of the PR Accumulator during a single commutator cycle. Therefore, assume that after the above described entry of "8" and during the next successive commutator cycle, a gating pulse appears on lines 248 and 212 and for the first time a "4" pulse is entered into stage S3 of the units counter of the PR Accumulator at mid-index point time. Since stage S3 is now in Off status (due to the previous binary-to-decade adjusting pulse received via delay circuit DL2), the "4" pulse causes this stage to revert to On status. This action causes the successive stage S4 to switch to On status also, and the latter change in status causes the successive carry stage CY, which is normally Off, to switch to On status. However, carry stage CY is of the gated variety, as described below in detail, and hence will not produce an output carry pulse to the tens counter until a gating pulse is received from the A Commutator via line 234 during the first half of the carry interval of the commutator cycle under discussion. At that time a carry pulse is transmitted to stage S1 of the tens counter of the PR Accumulator, and shortly thereafter, during the latter half of the carry portion of the commutator cycle, an Off pulse is applied from wire 235 to the units order carry stage CY (as well as to the carry stages CY of all other orders of the PR Accumulator) to return it to Off status in anticipation of future possible operation.

The desired result has now been achieved: The units order stands at "2," i.e., with stage S2 in Off status and stages S1, S3, and S4 in On status, and a carry has been effected to the next or tens order.

In a similar manner to that just described, any pulse representative of a "2" appearing on units wire 296 will appear thereon simultaneously with a gating pulse or control potential appearing on line 246 only of the four output lines from the A Commutator leading to the distributor. This pulse is thus routed through the units distributor into stage S2 of the units counter of the PR Accumulator. Also, any pulse representative of a "1" appearing on units wire 296 will appear thereon when a gating pulse or control potential appears on line 244 only, and this pulse is thus routed through the units distributor into stage S1 of the units counter.

The manner in which these pulses cause the respective stages of the units counter to switch in status will be apparent from an examination of Fig. 8, which shows the manner in which an order of the PR Accumulator responds to successive entries therein of partial differential values "9" through "1," commencing with an initial "0" setting. The sum of all the nine values "9" through "1" is 45," and hence the units order should finally stand at "5" and have delivered four carries to the next stage. This may be verified in the figure, since, as shown in the bottom row, stages S1 and S3 end in Off status and stages S2 and S4 in On status, and four carries have been effected.

DIVISION

Division is accomplished in the machine of the present invention by a process of alternate subtraction (by addition of the complement value) of the divisor from the dividend in one column shift position and addition of the divisor to the dividend in the next column shift position. These alternate processes are repeated as necessary to obtain the quotient value. The actual mathematical process will be discussed first, followed by a description of the dividing portions of the machine with reference to a block diagram thereof, and finally the modified arithmetic processes utilized in the machine, as expressed in binary notation.

Assume that it is desired to divide "2072" by "37." The quotient is, of course, "56." The basic mathematical process by which this is accomplished in the machine of the present invention is shown in Fig. 9. In the first line is shown the dividend value, preceded and followed by two zeros. The initial or "preceding" two zeros are always required in this mathematical method, as is, during subtraction, the addition of a "9" in that order of the PR–DD Accumulator next higher than that receiving the highest order divisor complement digit. Since "9" is the complement of "0," for convenience this operation will be included in the following description by referring to the subtraction of the value "037." The two zeros following the dividend value represent the tenth's and hundredth's orders and are included to provide an answer even though the divisor value is not contained in a single place dividend value. The first column is utilized for control purposes only and, upon the occurrence of an overdraft, signals, by the fact of "no-carry," that a column shift should occur and also that a change to the addition process must ensue.

Accordingly, in the first subtraction cycle the divisor "037" is subtracted (by addition of the ten's complement value in the lowest order and the nine's complement value in all others) from the first, second and third column dividend values. As shown in the third line of Fig. 9, the result of this subtraction is the value "965," which does not produce a carry out of the first column. The lack of a carry, i.e., "no-carry," is the signal that no further subtraction should take place, and that, after a step of column shift, the machine should switch to addition. Accordingly, the divisor value "37" is next added, over and over, in the third and fourth columns, until a carry ensues from the second column to the first column. This, as is seen from Fig. 9, occurs after ten addition cycles and is the signal for again switching to the subtraction process subsequent to another step of the column shift. The divisor "037" is then subtracted, repeatedly, from the third, fourth and fifth columns, until a "no-carry" condition once more ensues. This again is a signal for suspension of the subtraction process, a one step column shift, and a switching to the addition process. The divisor "37" is again added, over and over, this time in the fifth and sixth columns, until a carry ensues, from the fourth to the third column. A column shift and one cycle of subtraction only then takes place, since the single subtraction cycle immediately results in a "no-carry" condition in the fifth column. This again is a signal for a further column shift and over and over addition of the divisor "37," until a carry ensues from the sixth to the fifth column.

Fig. 9 shows all the steps required for solution of the sample problem. As is seen by inspection of Fig. 9, this solution required an initial single subtraction cycle followed by ten addition cycles, six subtraction cycles, four addition cycles, one subtraction cycle, and ten addition cycles, in that order.

Since each subtraction cycle must proceed to an overdraft in order to produce a so-called "no-carry" signal, which indicates a requirement to switch to the addition process, the increment of quotient produced during each such first cycle in a subtraction process must be suppressed.

Also, during addition cycles, a number of increments of quotient, equal to the ten's complement of the number of such addition cycles, are directly fed to the quotient register to provide the proper quotient value.

Utilizing these simple rules, it will be seen that the resultant quotient value of the above example is "0056.00," since the quotient increments resulting from single subtraction cycles, occurring, respectively, initially and in the fifth step, are suppressed and the ten's complement of ten addition cycles (occurring in the second and sixth steps) is zero. Also, in accordance with the above rules, the first cycle of the six subtraction cycles comprising the third step is suppressed, leaving the quotient value "5," and, the ten's complement of the four addition cycles occurring as the fourth step is, of course, "6."

It is thus seen that to utilize this mathematical process for division, both addition and subtraction of the divisor must be provided. Register means must be provided to determine the number of steps during each addition and subtraction process and thereby supply the proper number of quotient increments. Means must also be provided for producing a column shift (*a*) during subtraction, when a "no-carry" condition occurs in the next higher order, and (*b*) during addition, when a "carry" condition occurs in the next higher order. As stated above, the quotient increment must be suppressed during the first cycle of each subtraction process, and the quotient increments resulting from the addition process must equal the ten's complement value of the number of addition cycles. Further, two more orders than that actually required for the dividend value must be provided, i.e., for a four-digit dividend, six orders are necessary the highest order digit of the dividend being entered in the third order.

It should be noted in Fig. 9 that, for the particular example, the digits "6" and "1" remain in the second and fourth columns, respectively, when the division process is completed. These digits are of no import, however, and merely result as a by-product of the particular mathematical process utilized. The digits remaining in these column positions will vary with the quotient value and are disregarded in the machine. They are, of course, cleared when the machine is reset after the problem is completed.

BLOCK DIAGRAM—DIVISION CIRCUITS

As pointed out previously, division is accomplished by a process of alternate subtraction (by addition of the complement value) of the divisor from the dividend in one column shift position and addition of the divisor to the dividend in the next column shift position. As has also been pointed out previously, each order of a dividend value derived from a punched card is converted into one or more binary-coded partial differential values or digits which are then stored in the Dividend (DD) Accumulator. By way of example, eight orders of the DD Accumulator are shown in block diagram form in Figs. 10*b*–10*e*. Similarly, each order of the divisor value derived from a punched card is converted into one or more binary-coded partial differential values or digits which are then stored in the Divisor (DR) Register. By way of example, two orders of the DR Register (the tens order and the units order) are shown in block diagram form in Fig. 10*a*. To provide the desired addition and subtraction of the divisor, the DR Register comprises two portions, in one of which (the DRA) the true value is stored and in the other of which (the DRS) the nine's complement value is stored. The manner in which the block diagrams of Figs. 10*a*–10*e* interfit is shown in the key diagram of Fig. 11.

The two orders of the MC Register described above in connection with the block diagram of the mutliplication circuits are utilized as the DRA portion of the DR register. For convenience, this will be referred to hereinafter as the MC–DRA or DRA Register, and the DRS portion will be referred to as the DRS Register. As described previously, each addition of the value stored in each order of this DRA Register is carried out in serial cyclical fashion, one partial differential value after another, in sequence, under control of the A Commutator. As before, like partial differential values stored in the different orders of the DRA Register are added simultaneously (to the respective orders of the Dividend (DD) Accumulator, of course) in each addition cycle. Thus, all "8's" are added first, then all "4's," then all "2's," and lastly, all "1's." As before, each commutator cycle also includes a final interval of time reserved for a carry from one order to another in case this is required.

Since the MC–DRA Register and the A Commutator have been described previously in connection with the block diagram of the multiplication circuits, no further discussion of these is believed necessary. However, it should be recalled that the A Commutator produces a cycle of variable period, i.e., of variable length, depending upon the presence or absence of each of the different significant binary-coded digits in the MC–DRA Register.

Each order of the DRS Register is similar to the corresponding order of the DRA Register with two exceptions. The first is that whereas in the MC–DRA Register each stage is reset in Off condition (indicating a "0"), in the DRS Register stages S1 and S4 are reset in the On condition and stages S2 and S3 in the Off condition, i.e., indicating a stored "9." Also, each successive stage of the DRS Register is switched in status in response to the previous stage being switched On, whereas in the MC–DRA Register each stage is switched in status in response to the previous stage being switched Off. The effect of this is to cause the true divisor value to be stored in the DRA Register and the complement value to be stored in the DRS Register when an equal number of impulses, representative of a divisor digit and derived from a punched card, are applied simultaneously to inputs 50 of an order of the DRA and DRS Registers. This is shown in Figs. 12 and 13.

Further, in the DRS Register only stages S2 and S3 provide control potentials to the associated Subtract or "S" Commutator to control the length of the commutator cycle during the subtraction process. This is because, as pointed out previously in connection with the general description of the division process utilized in this machine, during each subtraction cycle the digit "9" must be entered in the PR–DD Accumulator in one order higher than that receiving the higher order DR partial differential value. Accordingly, since "9" is entered in binary fashion in this machine as an "8" and a "1," no circuits are provided in the DRS Register to determine the presence or absence of "1's" and "8's."

It should also be noted that the S Commutator is similar to the A Commutator except for the absence of switching circuits associated with stages S4 and S1, and that the carry circuits CY1 and CY2 are common to the A and S Commutators. Thus, carry stage CY1 is switched On in response to either an output from stage S1 of the S Commutator, from stage S1 of the A Commutator, or from Switching Circuit SW1 of the A Commutator. Stage S4 of the S Commutator is switched On in response to a starting pulse from start line or wire 252 when subtraction is desired, as described hereinafter in detail in connection with the control circuits, and each of stages S4–S1 of the S Commutator is turned Off by means of negative pulses from Off line 240 common to the S and A Commutators. The output (utilized for gating purposes) from stage S4 of the S Commutator is applied via line 232 to stages S4 of the units and tens order of the DRS Register, and via line 260 to the respective distributors and thence to stages S4 of each of the orders of the DD Accumulator. In a similar fashion gating lines 230 and 258, gating lines 228 and 256, and gating lines 226 and 254 lead from stages S3, S2, and S1 of the S Commutator to the respective stages S3, S2, and S1 of the various orders of the DRS Register and to the distributors to control the respective stages S3, S2, and S1 of the DD Accumulator. As mentioned previously, stage SW3' of the S Commutator is controlled from stages S3 of the units and tens orders of the DRS Register by means of line 224, and switching stage SW2' of the S Commutator is controlled from the stages S2 of the units and tens orders of the DRS Register by means of line 222.

Note that the sequencer circuit SEQ. of each order is common to the DRS and DRA Registers. Thus, if a gated output is produced from stage S1 of the units order of either the DRS or the DRA Registers, it will appear across the respective resistor R10 of the associated sequencer circuit SEQ. As described previously in connection with the block diagram of the multiplication circuits, the resultant output from each sequencer circuit SEQ. is under the control of pulses on line 262 which occur at mid-index point time, this output appearing on the respective line 264 as indicated in Fig. 10*a*.

In addition to the timed pulses representing partial differential value digits appearing on these units and tens lines 264, timed pulses representing the required "elusive 1" appear on line 270 and timed pulses representing the digits "8" and "1," making up the value "9" required during each subtraction cycle, appear on line 268. These are supplied by a complement circuit Compl. Ckt., shown in the upper right-hand corner of Fig. 10*a*, which is controlled by gating lines 226 and 232 leading from the S Commutator and by timed pulses, appearing on line 266, which occur at mid-index point time of each commutator interval.

Referring now to Figs. 10*b*–10*e*, eight orders of the Dividend (DD) Accumulator are shown in the lower portions thereof as mentioned above. The four orders of the PR Accumulator described previously in connection with the block diagram of the multiplication circuits are utilized as the middle four orders of the DD Accumulator, i.e., the sixth, fifth, fourth, and third orders, except that a carry circuit CY is now shown in the sixth order since a carry may be required to the next higher or seventh order. Inasmuch as these four orders have already been described previously and the other four orders are similar, no further discussion of them is believed necessary. However, it should be noted that the carry circuits CY of the first through the fifth orders of the DD Accumulator are each provided with a second input from a respective gate circuit K, L, M, N, or O via a line 295, in order to introduce the required "elusive 1," as will be described more fully hereinafter.

Also, the output of each of the carry circuits CY of the third through seventh orders of the DD Accumulator, in addition to being connected to one input of stage S1 of the next higher order, is also connected to control a respective Carry/No-Carry Circuit I, II, III (Fig. 10*c*), IV or V (Fig. 10*b*). Since the eighth order is the highest one in the machine of the present invention, the output of its carry CY is connected only to its respective Carry/No-Carry Circuit VI, as shown in Fig. 10*b*.

Eight distributors are provided, one for each order of the DD Accumulator. Each is similar to the distributors described above in connection with the block diagram of the multiplication circuits, except that each is now also under control of timed voltage gates applied from the S Commutator via lines 254, 256, 258, and 260. Thus, if a timed pulse appears on an input wire 296 of any distributor coincident with the appearance of a gate on either line 244 (from the A Commutator) or line 254 (from the S Commutator), such pulse will be routed to Stage S1 of the associated order of the DD Accumulator. Similarly, if a pulse appears on input line 296 of any distributor coincident with the appearance of a gate on either line 246 or 256, such pulse will be routed to Stage S2 of the associated order of the DD Accumulator, etc.

The pulses appearing on each line 296 are derived from respective dual-input gate circuits, each under the control of the output from one of the Column Shift Circuits CS1–CS6 and one of input lines 264 (units), 264 (tens), or 268. Line 264 (units) is applied to one input of each of gate circuits U, V, B, D, W, and X. Line 264 (tens) is applied to one input of each of gate circuits Q, R, A, C, S, and T. Line 268 is connected to one input of each of gate circuits E, F, G, H, I, and J. The other input of each of gate circuits E, Q, and U is connected to output line 306 from Column Shift Circuit CS6; the other input of each of gate circuits F, R, and V is connected to output line 306 from Column Shift Circuit CS5; the other input to each of gate circuits G, A, and B is connected to output line 306 from Column Shift Circuit CS4; the other input of each of gate circuits H, C, and D is connected to output line 306 from Column Shift Circuit CS3; the other input of each of gate circuits I, S, and W is connected to output line 306 from Column Shift Circuit CS2; and, the other input of each of gate circuits J, T, and X is connected to output line 306 from Column Shift Circuit CS1.

Output line 296 from gate circuit E is connected to the input of the eighth distributor; the outputs of gate circuits F and Q are connected together and via respective line 296 to the input of the seventh distributor; the outputs of gate circuits G, R, and U are connected together and via respective line 296 to the input of the sixth distributor; the outputs of gate circuits H, A, and V are connected together and via respective line 296 to the input of the fifth distributor; the outputs of gate circuits I, C, and B are connected together and via respective line 296 to the input of the fourth distributor; the outputs of gate circuits J, S, and D are connected together and via respective line 296 to the input of the third distributor; the outputs of gate circuits T and W are connected together and via respective line 296 to the input of the second distributor; and, the output of gate circuit X is connected via its respective line 296 to the input of the first distributor.

Gate circuits A, B, C, and D have been discussed above in connection with the block diagram of the multiplication circuits and the other gate circuits are similar. The operation of these circuits will be discussed hereinafter in connection with a sample division example.

Dual-input gate circuits K, L, M, N, and O (shown adjacent the fifth through the first distributors in Figs. 10*c*, 10*d* and 10*e*) are similar to gate circuits A–D except that one input of each is connected to "elusive 1" line 270 and the respective output line 295 of each is directly connected to one input of the carry circuit CY of the associated order of the DD Accumulator. The other input of each of these gate circuits K, L, M, N, and O is connected to the respective line 306 from Column Shift Circuit CS6, CS5, CS4, CS3, or CS2, respectively, as shown.

Six steps of column shift are required in the machine of the present invention with an eight order DD Accumulator and a two order DR Register. Accordingly, six Column Shift Circuits are provided, stages CS6, CS5, and CS4 being shown in the upper central portion of Fig. 10*b* and Stages CS3, CS2, and CS1 in the upper central portion of Fig. 10*c*. Stages CS4 and CS3 have been discussed above in connection with the block diagram of the multiplication circuits, and the other column shift stages are similar. However, the connection between the circuits is somewhat different during division. While the output of Stage CS6 is directly connected to the input of Stage CS5, the output of Stage CS5 is directly connected to the input of stage CS4, and the output of Stage CS2 is directly connected to the input of Stage CS1, Division Control Circuits Div. Control are provided between Stages CS4 and CS3, between Stages CS3 and CS2, and ahead of Stage CS6. These Division Control Circuits are under control of a potential, applied from wire 286, which is at the higher of its two values during division, and this allows an input pulse applied to any of the respective input lines 288, 289, or 290 to produce an output at the respective output line leading to the successive column shift stage. When division is started, a positive input pulse is applied via line 288 to the initial Division Control Circuit from a circuit described hereinafter in connection with the detailed circuitry. The resultant negative output pulse is applied to the input of Column Shift Circuit CS6 to produce an output gating pulse on its respective output line 306. Stage CS6 remains On and this gating pulse continues until a negative pulse is applied via line 282 to this stage (and to all the other Column Shift Stages simultaneously) to turn it Off. When Column Shift Circuit CS6 turns Off, it applies a negative impulse to Column Shift Circuit CS5, which is then turned On and produces a gating pulse on its respective output line 306. Stage CS5 is turned Off in response to the next negative pulse appearing on line 282 and at the same time Column Shift Circuit CS4 is turned On. This process is repeated to produce successive pulses on the respective output lines 306 from Column Shift Circuits CS3, CS2, and CS1.

The pulses on line 282 producing the column shift steps are derived from a Carry/No-Carry Control Circuit C/N-C Control (Fig. 10*c*). Four inputs are provided to this circuit. One is the potential drop across load resistor R178 common to the six Carry/No-Carry Circuits I–VI. The second is input line 276, on which appears a positive pulse at mid-index point time during the second carry interval of each commutator cycle, whether of the A Commutator or the S Commutator. The two remaining inputs are lines 316 and 318, which are alternately raised and lowered in potential during addition and subtraction, respectively, of the divisor from the dividend. The potential on line 316 is high and the potential on line 318 low during addition, and the reverse potential conditions prevail during subtraction. The relative potential of these lines determines whether a negative pulse is to be produced on line 282 in response to a carry or a "no carry" condition, respectively, in that order of the DD Accumulator whose condition is being sensed during the particular interval between column shifts. During addition a carry condition thus produces a pulse on line 282 and a column shift, and during subtraction a "no-carry" condition produces the same.

A six order Quotient (Q) Register is required in the machine of the present invention with an eight order DD Accumulator and a two order DR Register. These six orders are shown in the upper portions of Figs. 10*b*, 10*c*, and 10*d*. The two orders of the MP Register described above in connection with the block diagram of the multiplication circuits are used as the middle two orders, i.e., the fourth and third orders of the Q Register. However, the Zero Detector Circuits shown in the block diagram of the MP Register (Fig. 3*a*) are not utilized during dividing and hence are not shown in Figs. 10*b*–10*d*. With this exception each of the orders of the Q Register is similar to the orders of the MP Register described above and hence their description will not be repeated here.

One Stepping Pulse Circuit, labelled Stepping Pulse Ckt., is provided for and associated with each order of the Q Register and has its respective output line 312 connected to input 52 of the associated Q Register order. Pulse line 310 is commonly connected to each of these Stepping Pulse Circuits and the output lines 306 from Column Shift Circuits CS6–CS1 are individually connected as the respective second inputs to the Stepping Pulse Circuits associated with the sixth to the first orders, respectively, of the Q Register. Each of these Stepping Pulse Circuits applies pulses to input 52 of the associated order of the Q Register as required to form the quotient value, one pulse being applied during each commutator cycle with the exception of the first commutator cycle during each subtraction operation. The reason for this has been explained above in connection with the explanation of the division process utilized in the machine of the present invention.

In addition to producing negative pulses on line 282 for column shift purposes, the Carry/No-Carry Control Circuit also controls the status of Add-Subtract/Forward-Reverse Trigger Circuit AS/FR. The output of this circuit AS/FR is applied to four successive circuits, labelled respectively: QS Control, C/N-C & A. Comm. Response, S Comm. Start, and MP-Q Fwd.-Rev. Control.

The first of these, QS Control, is also controlled by input line 276, on which appears a positive pulse at mid-index point time during the second carry interval of the first cycle from the S Commutator whenever the latter operates. An inhibiting gate output from this circuit is applied to succeeding circuit QS Gate, which is also under control of line 348. Once each commutator cycle and more specifically, at mid-index point time during the second carry interval thereof, a pulse is applied to line 348 and will produce an output pulse on line 310 leading to the six Stepping Pulse Circuits unless an inhibiting gate is received from QS Control. As pointed out above, this inhibiting gate is produced only when the S Commutator is operated, and then only during the first cycle thereof.

The second circuit controlled by trigger AS/FR is C/N-C & A Comm. Response. Two of its outputs are lines 316 and 318, whose alternately raised and lowered potentials control the response of the Carry/No-Carry Control Circuit to carry or "no-carry" conditions, respectively, as described above. The third output is an enabling gate to the A Commutator Start Circuit, labeled A Comm. Start. This circuit is also under control of line 344, leading from carry stage CY2 common to both the A and S Commutators, via an intermediate gated circuit Divide Stop shown. This gated circuit Divide Stop passes pulses from line 344 whenever an enabling gate is received from line 354, leading from the second Compute-Start Trigger Circuit (Fig. 24), not shown in block diagram form but described hereinafter in connection with the detailed circuitry. This enabling gate on line 354 continues until the dividing operation is to be terminated when Column Shift Stage CS1 turns Off. A pulse appears on line 344 at the end of each commutator cycle and will produce an output pulse on start line 236 leading to the A Commutator providing the end of the division operation has not been reached and providing an enabling gate is received from C/N-C & A Comm. Response Ckt. Such an enabling gate is, of course, provided whenever the circuit AS/FR is conditioned for addition operation.

The third circuit, S Comm. Start, controlled by trigger AS/FR is also under control of line 345, upon which a pulse appears at the beginning of each division operation, and the output of circuit Divide Stop. When trigger AS/FR is initially conditioned for subtraction operation, an output pulse is thereby produced, due to the pulse on line 345, upon start line 252 leading to the S Commutator to initiate operation of the latter. Thereafter at the end of each commutator cycle a pulse appears upon line 344 and is passed through circuit Divide Stop (as long as the division operation continues) to both the S Comm. Start and A Comm. Start circuits. As long as trigger AS/FR is conditioned for subtraction operation, the pulse on line 344 will produce a pulse on line 252 to initiate another commutator cycle from the S Commutator. However, when trigger AS/FR is conditioned for addition operation, each pulse on line 344 will produce a pulse on line 236 leading to the A Commutator to initiate a commutator cycle from the latter. Thus, the initial pulse to begin operation of the machine of the present invention for division is derived from line 345 and produces at least one cycle of operation from the S Commutator, whereas successive commutator cycles of operation (whether from the S Commutator or the A Commutator, under control of the condition of trigger AS/FR) are initiated by the pulses from line 344 produced at the end of each preceding commutator cycle.

When Column Shift Stage CS1 turns Off and division operation is to be terminated, the enabling gate on line 354 leading to circuit Divide Stop ceases prior to the time the last pulse is produced upon line 344. This last pulse therefore cannot pass through circuit Divide Stop and the dividing operation ceases inasmuch as there is no further operation of either the S or A Commutators.

The fourth circuit, MP-Q Fwd.-Rev. Control, controlled by trigger AS/FR has two outputs, lines 216 and 218, which are connected to control the Forward and Reverse Adjusting Circuits, labeled Fwd. Adj. and Rev. Adj., respectively, of each of the Q Register orders. For clarity of the drawings the individual connections are not shown in Figs. 10*b*–10*d*. However, the alternately raised and lowered potentials on these lines 216 and 218 during addition and subtraction, respectively, of the divisor from the dividend cause these Forward and Reverse Adjusting Circuits to operate in the manner described above in connection with the block diagram of the multiplication circuits to form the proper quotient value.

The operation of the block diagram circuits of Figs. 10*a*–10*e* will now be described with reference to the same sample division example described generally above, i.e., 2072÷37. The digits of the dividend value "2072" are entered in the 6th, 5th, 4th, and 3rd orders, respectively, of the DD Accumulator in the form of pulses applied to the respective inputs 54. The exact manner in which these digits are entered is described more fully hereinafter in connection with the detailed read-in circuits. Similarly, the digits of the divisor value "37" are entered in both the DRA and DRS registers in the form of pulses applied to their respective inputs 50. It will be recalled that the true value of the divisor, i.e., "37," is stored in the DRA Register and the nine's complement value, i.e., "62," is stored in the DRS Register. Division operation is now started by the application of positive pulses to Div. Control line 288 (Fig. 10*b*), S Comm. Start line 345 (Fig. 10*d*) and C/N-C Control (Fig. 10*c*) and QS Control (Fig. 10*d*) common input line 276, and the application of enabling gates to Div. Control line 286 (Fig. 10*b*) and Divide Stop line 354 (Fig. 10*d*). As described above, the pulse on line 288 in conjunction with the enabling gate on line 286 turns initial Column Shift Stage CS6 (Fig. 10*b*) to On status. The pulse on line 276 conditions trigger AS/FR in On status for subtraction. It also, in conjunction with the On status of trigger AS/FR, turns circuit QS control to Off status to suppress, through succeeding circuit QS Gate, line 310 and the Stepping Pulse Circuit associated with the 6th order of the Q Register (Fig. 10*b*), the quotient value which would otherwise be formed during the first S Commutator cycle. The positive input pulse on line 345 in conjunction with the On status of trigger AS/FR produces, by means of circuit S Comm. Start (Fig. 10*d*), a pulse on line 252 which is applied to the input of Stage S4 of the S Commutator (Fig. 10*a*) to initiate the first commutator cycle of operation.

Since the value stored in the DRS Register (Fig. 10*a*) is "62" and the digit "6" is stored in the tens order thereof in binary fashion as a "4" and a "2," the resultant S Commutator Cycle will be six intervals long, i.e., one interval each for the transfer of the digits "8," "4," "2," and "1" in succession, and finally two intervals reserved for carry purposes for the reason pointed out hereinbefore in connection with the block diagram of the multiplication circuits. As stages S4, S3, S2, and S1 of the S Commutator are switched On in succession through intermediate switching circuits $SW_3'$ and $SW_2'$, four enabling gates will be produced in succession on lines 232 and 260, 230 and 258, 228 and 256, and 226 and 254, respectively.

Only stages S2 and S3 of the tens order of the DRS Register are in On status and only stage S2 of the units order of the DRS register is in On status. It will be recalled that these stages are of the gated variety and, hence, when an enabling gate is received on line 228, a potential drop will be produced across resistor R10 common to all stages of the tens orders of both the DRS and DRA Registers and across resistor R10 common to all stages of the units orders of both the DRS and DRA Registers. Since no digit "4" is stored in the units order of the DRS Register, when an enabling gate appears on line 230 a potential drop is produced across only register R10 common to all stages of the tens orders of both the DRS and DRA Registers. These raised potentials on the resistors R10 will produce two successive timed pulses representative of the digits "4" and "2" on tens line 264, and a timed pulse on units line 264 representative of the digit "2" simultaneously with the similar pulse representative of the digit "2" on tens line 264. These timed pulses are produced at mid-index point time of the corresponding commutator intervals by means of the Sequencer Circuits Seq. under control of input line 262 in the manner described above in connection with the block diagram of the multiplication circuits.

Pulses at mid-index point times on line 266 are also applied to the Complement Circuit Compl. Ckt. shown in the upper right-hand portion of Fig. 10*a*. These pulses, in conjunction with the enabling gates on lines 232 and 226, produce timed pulses from this circuit representative of the digits "8" and "1" on line 268 during the first and fourth intervals, respectively, of each S Commutator cycle. Also, the pulses on line 266 in conjunction with the enabling gate on line 226 produce from this circuit a timed pulse representative of the "elusive 1" digit on line 270, this timed pulse also occurring during the fourth interval of each S Commutator cycle.

With column Shift Stage CS6 in On status, an enabling gate is applied to each of gates E, Q, U, and K, thereby allowing these gates to pass the pulses appearing on lines 268, 264 (tens), 264 (units) and 270, respectively. Therefore, the "8" and "1" pulses referred to above will be applied to line 296 leading to the input of the 8th Distributor, the "4" and "2" pulses appearing on tens line 264 will be applied to line 296 leading to the input of the 7th Distributor, the second "2" pulse referred to above, appearing on units line 264, will be applied to line 296 leading to the input of the 6th Distributor, and the "elusive 1" pulse appearing on line 270 will be applied to line 295 leading to one input of carry stage CY of the fifth order of the DD Accumulator.

As the S Commutator produces the successive voltage gate outputs referred to above on lines 254, 256, 258 and 260 during the first cycle of operation, these timed pulses representative of the digits "8," "4," "2" and "1" will be passed through the 8th, 7th, and 6th Distributors to the proper stages of the eighth, seventh, and sixth orders of the DD Accumulator. Note that the pulse representative of the "elusive 1" does not pass through the 5th Distributor, but is applied directly through gate circuit K to one input of carry circuit CY of the fifth order of the DD Accumulator. However during the carry interval of this first S Commutator cycle, a resultant pulse output from this carry stage CY will be applied to stage S1 of the next higher or sixth order of the DD Accumulator.

This is illustrated in Fig. 14, which shows the manner in which the pulses representing the partial differential values and the necessary supplemental pulses to make up the true complement values are applied to the respective orders of the DD Accumulator for the sample division example. In the top line is shown the initial status of the various orders of the DD Accumulator after the divided value "2072" has been read into the sixth, fifth, fourth and third orders. It will be recalled that in the present machine the pulse(s) representing the highest partial differential value, i.e., "8" is (are) transferred during the first interval of any commutator cycle, then the next highest, i.e., "4," etc. Accordingly, during the first interval of the first commutator cycle, the pulse representative of the digit "8" on line 268 is entered into the eighth order of the DD Accumulator as shown in the second line of Fig. 14. Since the stages of each order of the DD Accumulator are reset in On status and the binary-to-decade adjustment occurs when any Stage S4 switches from On to Off status, adjustment pulses are next applied to Stages S2 and S3 of the eighth order of the DD Accumulator, as shown in the third and fourth lines of Fig. 14. However, since these are merely adjustment pulses to maintain the Accumulator in the decade notation, their numerical value is not added in the machine.

During the second interval of the first S Commutator cycle, the pulse representing the digit "4" is applied from tens line 264 to the seventh order of the DD Accumulator, as shown in the fifth line of Fig. 14. In the next, or third interval of this first S Commutator cycle, pulses representative of the digit "2" are applied from each of tens and units lines 264 to the seventh and sixth orders, respectively, of the DD Accumulator, as shown in the sixth line of Fig. 14.

During the fourth interval of the first S Commutator cycle, the pulse representative of the digit "1" on line 268 is applied to stage S1 of the eighth order of the DD Accumulator and simultaneously the pulse representing the "elusive 1" on line 270 is applied to carry stage CY of the fifth order of the DD Accumulator. This is shown in the seventh line of Fig. 14, the "elusive 1" value being represented by the dotted-line bracketed "+1" symbol inasmuch as this pulse is transferred to the sixth order of the DD Accumulator during the ensuing carry interval of the first S Commutator cycle, as indicated by the arrow leading to the solid-line bracketed "+1" symbol shown in the eighth line of Fig. 14.

At the end of this first S Commutator cycle the values standing in the eighth, seventh, sixth and fifth orders of the DD Accumulator are "9," "6," "5" and "0," respectively, as shown in the ninth line of Fig. 14. It will be recalled that during subtraction the sensing of a "no-carry" condition in the order next higher than that in which the highest order dividend value is entered is a signal for a one step column shift due to the control potentials applied C/N-C Control (Fig. 10*c*) from lines 316 and 318. This column shift step is produced by means of a negative pulse on output line 282 from this circuit C/N-C Control, which pulse is applied simultaneously to all of the Column Shift Stages. Since only Column Shift Stage CS6 is in On status, this pulse is effective only as to this state, which is thus switched Off and in so doing switches successive Column Shift Stage CS5 to On status. It will also be recalled that this pulse on line 282 was derived from one of the regularly repeated pulses on line 276 when Carry/No-Carry Circuit VI sensed a "no-carry" condition in stage CY of the eighth order of the DD Accumulator via the respective line 314 and conveyed this information to circuit C/N-C Control.

This same pulse on line 276 in conjunction with the output from trigger circuit AS/FR also conditioned circuit QS Control to prevent circuit QS Gate from passing the pulse on input line 348 via line 310, the left-hand Stepping Pulse Ckt. shown in Fig. 10*b*, and the respective line 312 to input 52 of the 6th order of the Q Register. The quotient value which would otherwise be formed is thereby suppressed during this first commutator cycle.

Circuit C/N-C Control (Fig. 10*c*) in addition to producing a negative pulse on line 282 as above described to switch stage CS6 to Off status and stage CS5 to On status, also switched trigger circuit AS/FR to Off status for subsequent addition operation while Column Shift Stage CS5 is On. This status of trigger circuit AS/FR conditions circuit C/N-C & A Comm. Response to apply an enabling gate to circuit A Comm. Start and also to reverse the potential conditions of lines 316 and 318 so that circuit C/N-C Control (Fig. 10*c*) will now be responsive to a carry condition, rather than a "no-carry" condition as during the first commutator cycle.

Since it is not yet time to terminate the dividing operation, circuit Divide Stop is still gated On from line 354 and hence passed the pulse on line 344 occurring at the end of the first S Commutator cycle to circuit A Comm. Start to produce a pulse on line 236 and thereby initiate a cycle of operation from the A Commutator.

The true value of the divisor, i.e., "37," stored in the tens and units orders of the DRA Register is now transferred via tens and units lines 264 under control of the gating pulses on lines 208 and 244, 210 and 246, 212 and 248, and 214 and 250. Since the digit "7" is made up in binary form of the digits "4," "2" and "1" and the digit "3" is similarly made up of the digits "2" and "1," the A Commutator produces a cycle of operation which is only of five intervals duration, one each for the transfer of the digits "4," "2" and "1" in succession and a final two-interval period reserved for carry purposes, as described above.

With Column Shift Stage CS5 in On status, an enabling gate is applied to each of gate circuits F, R, V and L. During the first interval of the first A Commutator cycle, the pulse representative of the digit "4" appears on units line 264 and is applied via gate V to line 296 leading to the 5th Distributor, as shown in the tenth line of Fig. 14.

During the second interval of this first A Commutator cycle, a pulse representative of the digit "2" appears on each of tens and units line 264 and is applied via the respective gate circuits R and V to the respective lines 296 leading to the 6th and 5th Distributors and thence to the sixth and fifth orders, respectively, of the DD Accumulator. This is shown in the 11th line of Fig. 14. In a similar fashion a pulse representative of the digit "1" appears during the third interval of this A Commutator cycle on each of tens and units lines 264 and is applied via the respective lines 296 to the inputs of the 6th and 5th Distributors and thence to the sixth and fifth orders of the DD Accumulator.

As these pulses are applied to the 5th and 6th Distributors, respective enabling gates are, of course, also simultaneously applied thereto in succession from the A Commutator via lines 248, 246 and 244, respectively. These cause the pulses to be applied to the proper stage S1, S2 or S3 of the fifth and sixth orders of the DD Accumulator.

The last pulse referred to representative of the digit "1" and applied to the sixth order of the DD Accumulator causes stage S4 thereof to switch from On to Off status since the resultant digit stored is an "8." In the manner described above, this causes adjustment pulses of values "+2" and "+4" to be applied to stages S2 and S3, respectively, of this order. However, since these are, as described above, merely for the purpose of maintaining the Accumulator in the decade notation, their numerical values again are not added in the machine.

As shown in the fifteenth line of Fig. 14, the value standing in the seventh, sixth and fifth orders of the DD Accumulator is now "687." Note that no carry has been produced out of the seventh order of the DD Accumulator. Therefore, the pulse that occurred upon line 344 at the end of the first A Commutator cycle is again routed through circuit Divide Stop and A Comm. Start (Fig. 10*d*) to line 236 to initiate another cycle of operation of the A Commutator.

During the first interval of this second A Commutator cycle, another pulse representative of the digit "4" appears on units line 264 and is routed through gate V (Fig. 10*c*) via the respective line 296 and the 5th Distributor to stage S3 of the fifth order of the DD Accumulator. This is indicated in the sixteenth line of Fig. 14 and produces not only a binary-to-decade adjustment within this order of the Accumulator (since stage S4 thereof is switched from On to Off status) but also a switching of its Carry Stage CY inasmuch as the addition of the digit "4" to the digit "7" requires a carry to the next stage.

During the second and third intervals of this second A Commutator cycle, pulses representative of the digits "2" and "1" appear on each of tens and units lines 264 and are routed through gate circuits R and V, respectively, respective lines 296, the 6th and 5th Distributors, respectively, and respective lines 304 to respective stages S2 and S3 of the 6th and 5th orders, respectively, of the DD Accumulator. Note that, as shown in the nineteenth and twenty-first lines of Fig. 14, the application of the pulse representative of the digit "2" to stage S2 of the 6th Distributor during this second A Commutator cycle switches Carry Stage CY of this order during the ensuing carry interval of this cycle. Thus, Carry Stage CY of the 6th order of the DD Accumulator applies a pulse to stage S1 of the 7th order thereof concurrently with Carry Stage CY of the 5th order applying a pulse to stage S1 of the 6th order. The application of these carry pulses is under control of Carry Counter Gating Pulse Line 234 and Carry Counter Turn-off Pulse Line 235 leading from circuits CY1 and CY2 (Fig. 10*a*) common to both the S and A Commutators.

As shown in the twenty-second line of Fig. 14, the 7th, 6th and 5th orders of the DD Accumulator now stand at "724" and no carry has yet been produced out of the seventh order. Accordingly, the pulse upon line 344 at the end of this second cycle of operation of the A Commutator produces a third cycle of operation thereof via circuits Divide Stop and A Comm. Start and line 236 (Fig. 10*d*). This and two additional cycles of operation are shown in Fig. 14 but will not be described here in detail. At the end of the fifth cycle of operation of the A Commutator, the seventh, sixth and fifth orders of the DD Accumulator stand at "835." As shown in Fig. 9, five additional cycles of operation of the A Commutator (making a total of ten) are required to produce a carry out of the 7th order of the DD Accumulator, and the values standing in the eighth, seventh, sixth and fifth order thereof will then be "0," "0," "2" and "0," respectively.

It will be recalled that during each cycle of operation of the A Commutator, and more particularly at mid-index point time during the first carry interval thereof, a negative pulse will be produced upon line 348 (Fig. 10*d*) and passed through circuit QS Gate, line 310 and one of the stepping pulse circuits and its output line 312 to a respective order of the Q Register. During the ten cycles of operation of the A Commutator just described, the middle stepping pulse circuit shown in the right-hand portion of Fig. 10*b* (associated with the fifth order of the Q Register) is enabled by means of a voltage gate upon line 306 from Column Shift Stage CS5. Therefore, once during each of these commutator cycles a stepping pulse is applied from its line 312 to input 52 of this fifth order of the Q Register. However, since ten pulses are applied to this order and no carry is provided therefrom, the resultant digit standing therein at the end of the ten addition cycles is "0."

It should also be noted here that the value standing in the sixth order of the Q Register is also "0" since there was only one cycle of operation of the S Commutator and the stepping pulse which would have otherwise been delivered to its input 52 from the left-hand stepping pulse circuit shown in Fig. 10*b* was suppressed by means of circuits QS Control and QS Gate (Fig. 10*d*).

The carry pulse out of the seventh order of the DD Accumulator at the end of the ten addition cycles is coupled via the respective line 314 to Carry/No-Carry Circuit V and produces a potential across common resistor R178 (Fig. 10*c*) to actuate circuit C/N-C Control. The negative pulse thereby produced on line 282 switches Column Shift Stage CS5 to Off status, which in turn switches On Column Shift Stage CS4.

Circuit C/N–C Control also, under the concurrent control of the positive pulse on line 276, again switches trigger circuit AS/FR to On status for subtraction operation. The subsequent operation of the machine of this invention during the ensuing six cycles of operation of the S Commutator, as indicated in Fig. 9, is similar to that described above in connection with the initial subtraction cycle hence will not be described in detail. However, it is to be noted that a carry is produced out of carry stage CY of the 6th order of the DD Accumulator during each of the first five of these subtraction cycles. Each such carry pulse is applied via the respective line 314 to Carry/No-Carry Circuit IV, which controls circuit C/N–C Control so as not to produce a pulse upon line 282 in response to the pulse occurring upon line 276 during each of these five S Commutator cycles. During the sixth S Commutator cycle, however, no carry is produced out of carry stage CY of the 6th order of the DD Accumulator, as indicated in Fig. 9, and a pulse is accordingly then produced on line 282 to switch Column Shift Circuit CS4 to Off status, which switches Column Shift Circuit CS3 to On status.

In the manner described previously, circuits QS Control and QS Gate prevent a pulse from being applied via line 310, the right-hand stepping pulse circuit shown in Fig. 10*b*, and the respective line 312 to input 52 of the 4th order of the Q Register (Fig. 10*c*) during the first of the six S Commutator cycles but allow a pulse to be applied thereto during the next five such cycles.

Also, the pulse appearing upon line 344 at the end of the 10th cycle of the previous A Commutator operation and the pulse appearing thereon at the end of each of the first five cycles of this operation of the S Commutator are routed via circuits Divide Stop and S. Comm. Start (Fig. 10*d*) and line 252 to the input of stage S4 of the S. Commutator (Fig. 10*a*) to produce the required commutator operation.

As further indicated in Fig. 9, these six subtraction cycles are followed in turn by four addition cycles, one subtraction cycle and ten addition cycles, in that order. It is not believed necessary to detail the operation of the machine of the present invention for these, since the manner in which the successive column shift stages operate has been indicated and the manner in which the required quotient values are formed in the respective orders of the Q Register is now believed obvious.

Near the end of the second carry interval of the last addition cycle indicated in Fig. 9, Column Shift Circuit CS1 is turned Off by a negative pulse on line 282 derived from line 276 via circuit C/N–C Control. This terminates the enabling gate on Divide Stop line 354 through circuits described hereinafter in connection with the detailed circuitry of the second Compute-Start-Trigger Circuit (Fig. 24). Thereafter, at the end of this second carry interval of the last commutator cycle from the A Commutator, a pulse is produced upon line 344. However, this pulse cannot pass through circuit Divide Stop and hence no pulse will be produced upon line 236, thereby terminating the division operation. The final values standing in the sixth through the first orders of the Q Register are, of course, "0," "0," "5," "6," "0" and "0."

DETAILED CIRCUITS

*MC–DRA Register*

Figure 15A:
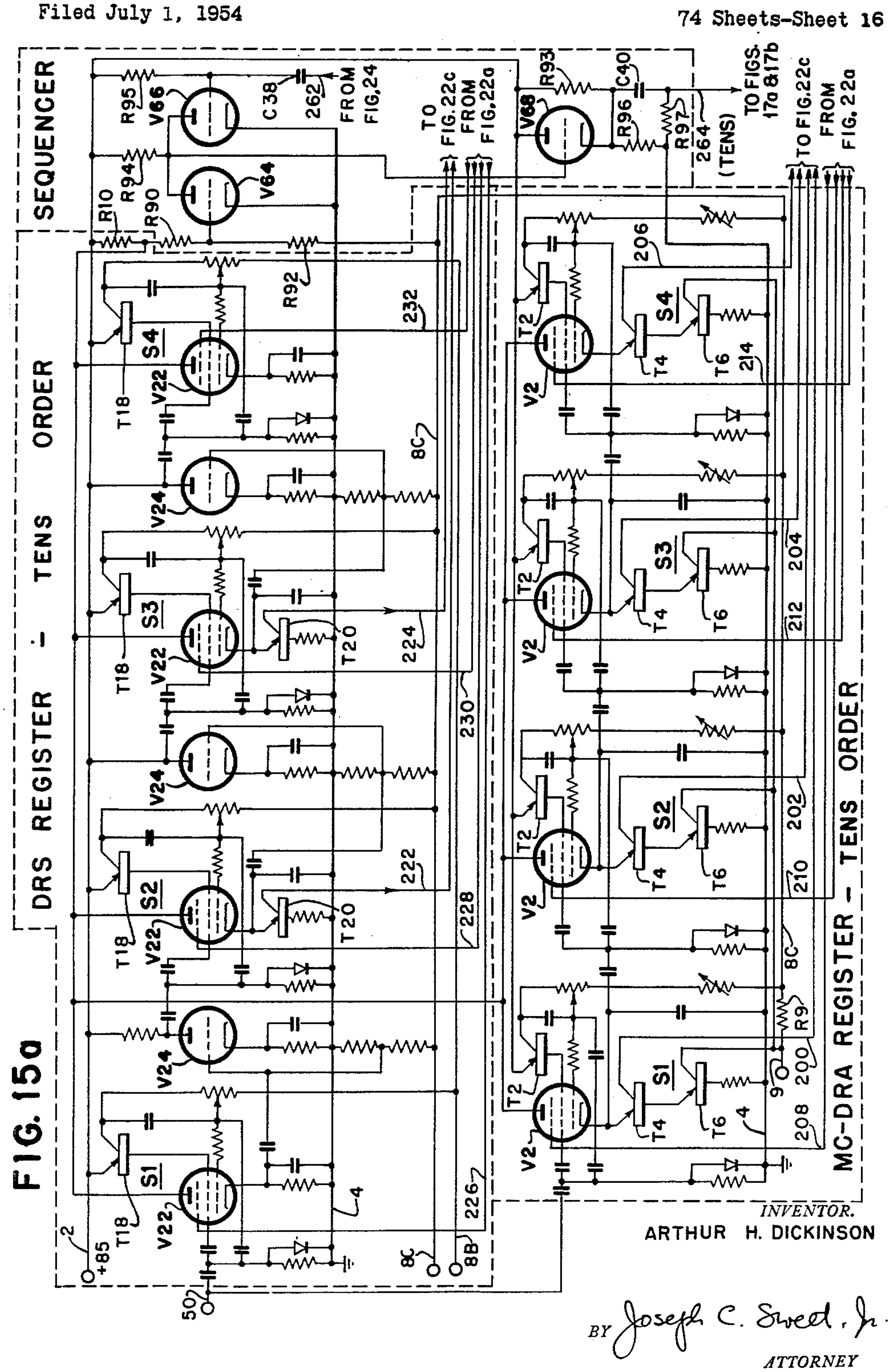
Figure 15B:
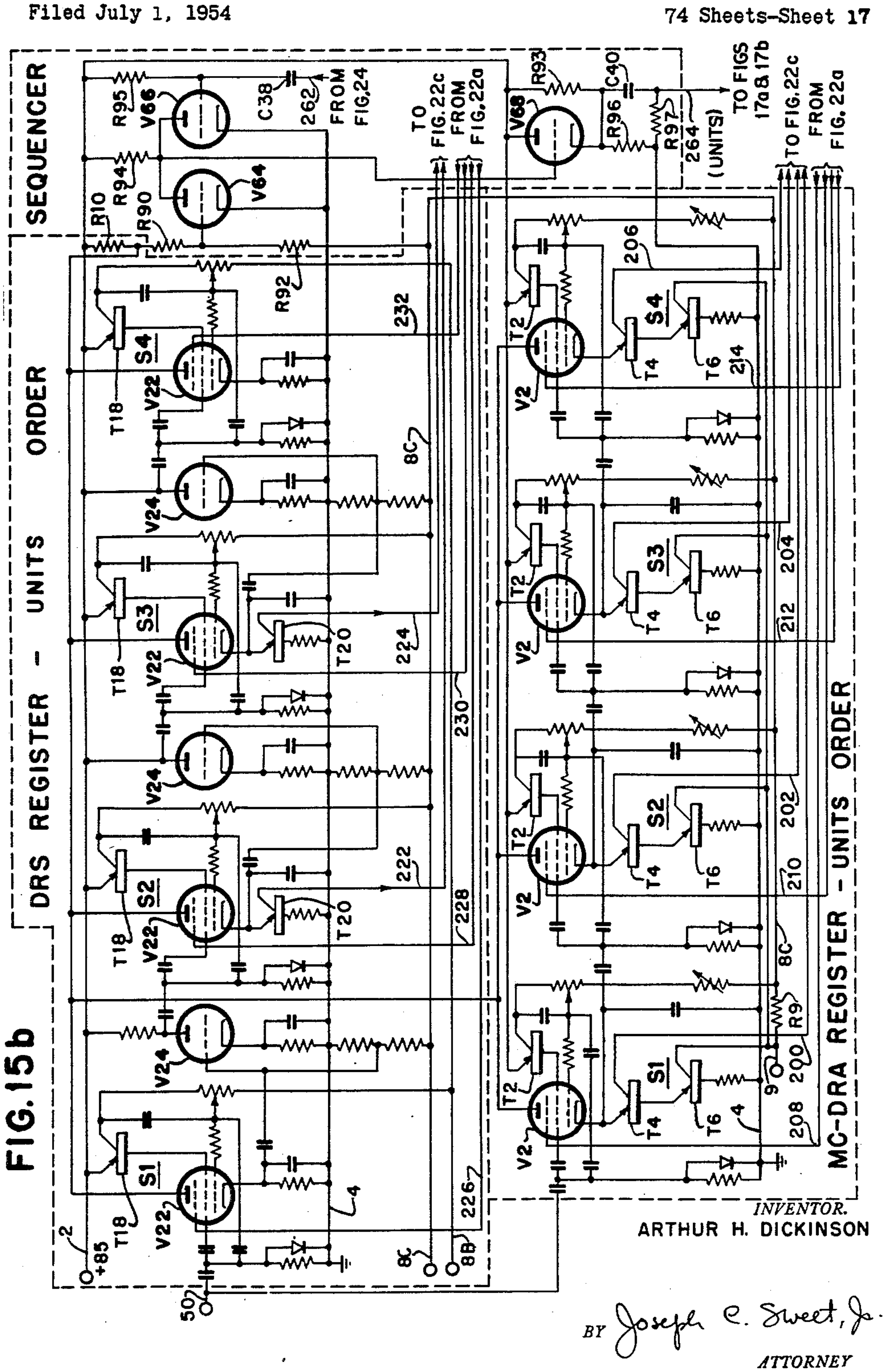

As pointed out previously, two MC–DR Registers or entry receiving devices are employed in this machine. Both registers are called into action for dividing, whereas the one now to be discussed in detail is utilized solely while multiplying. This register, whose circuit diagram is shown mainly in the lower halves of Figs. 15*a* and 15*b*, is labelled "MC–DRA" in view of the fact that the MC amount is additively transferred from the MC–DRA Register into the PR–DD Accumulator.

Each order (only two are shown, units [Fig. 15*b*] and tens [Fig. 15*a*]) comprises four stages designated S1 through S4. Each stage of each order comprises a bistable circuit which includes a transistor T2 and a gated pentode V2 connected and operating as described in detail in my application Serial No. 177,446, now Patent No. 2,872,592, referred to above. Note that a single load resistor R10 (shown in the upper right-hand corner of each figure) is provided for each order and all pentodes V2 in that order are connected to the positive potential line 2 (+85 v.) therethrough. The emitters of transistors T4 and T6 are connected serially in the cathode return circuit for pentode V2 as described in detail in my application Serial No. 312,318, now Patent No. 2,761,965. The trigger circuits comprising stages S1, S2, etc., are connected in cascade fashion to form a register order responsive to impulses applied at input 50. The On and Off patterns estabilshed by the triggers S1, S2, etc., in response to input pulses applied to trigger S1 are shown in Fig. 12. Note that partial differential values are formed directly upon entry.

During a multiplying operation the function of each order of the MC–DRA Register is three-fold. The first is to receive (via input 50) and manifest a multiplicand (MC) digit derived from a record card and to form directly partial differential values. The second is to operate conjointly with each other MC–DRA column to determine the number of index points required by the commutator which effects transfer of MC additively into the PR–DD Accumulator. The third is to respond only to cyclical or differentially timed impulses, provided by this commutator, thereby forming timed value impulses corresponding to the differential value standing in the order.

With regard to the S1 stages in all orders of the MC–DRA Register, the collector electrodes of transistors T4 are commonly connected to wire 200. The collector electrodes of transistors T4 associated with all S2 stages are commonly connected to wire 202. Wire 204 similarly connects all transistor T4 collector electrodes of the S3 stages. Further, wire 206 commonly connects all transistor T4 collectors of the S4 stages. Wires 200, 202, 204 and 206 connect to resistors R2, R4, R6 and R8, respectively (Fig. 22*c*), the other end of each of these resistors being returned via line 10 to a suitable source of negative potential, for example, −70 v.

Considering now only the transistors T4 associated with stage S1 in the units and tens orders of the MC–DRA Register, if neither trigger is On, no potential is applied to either transistor T4 emitter and current flow through resistor R2 is low. If either trigger S1 is On, or if both are On, there is higher current flow in one or both transistor T4 collector circuits, thus producing an increased voltage drop across resistor R2. Thus, the presence of an odd digit in either or both orders of the MC–DRA Register is manifested by an increased voltage drop across resistor R2. If there is no odd digit in the MC–DRA Register, then the potential drop across resistor R2 is low. The raised or lowered potential across resistor R2 is employed to control the associated commutator in a manner to be described subsequently.

If one or more orders of the MC–DRA Register contain a "2," a "3," a "6" or a "7," at least one stage S2 trigger is On, thus causing an increased potential to appear across resistor R4. If none of the aforementioned digits are present in the MC–DRA Register, then the potential drop across resistor R4 is low. If one or more orders of the MC–DRA Register contain a "4," "5," a "6" or a "7," at least one S3 stage is On and there is an increased voltage drop across resistor R6. If such digits are absent from the MC–DRA Register, then the potential drop across resistor R6 is low. If any order of the MC–DRA Register contains an "8" or a "9," at least one stage S4 trigger is On and there is an increased voltage drop across resistor R8. On the other hand, when the latter digits are absent, the voltage drop across resistor R8 is low. The raised and lowered potentials produced across resistors R4, R6 and R8 are also utilized to control the cyclical operation of the aforementioned commutator.

The operation of the Add or "A" Commutator associated with the MC–DRA Register is discussed hereinafter. It is sufficient to state here that this commutator provides cyclical control potentials which appear on wires 208, 210, 212 and 214. Wire 208 is commonly connected to the suppressor grids of gated pentodes V2 in the S1 stages. Wires 210, 212 and 214 are commonly connected to the suppressor grids of all gated pentodes V2 related to stages S2, S3 and S4, respectively. The normal potential applied by the commutator to wires 208, 210, 212 and 214 is such as to bias the anode-cathode circuit of each pentode tube V2 at or beyond cut-off. The commutator in its operation, however, may apply a control potential to one or more of the wires 208, 210, 212 and 214 sufficient to reduce the suppressor grid bias of the respective pentode(s) V2 to substantially zero. However, such action may or may not result in the flow of anode current through the tube(s) V2 receiving such a control potential, depending upon the status of the respective trigger in which the gated pentode V2 is situated. If the trigger is On, current is already flowing in the screen-cathode path of its pentode V2, and reducing the suppressor grid bias then allows current to flow in the anode-cathode path also.

Assume now that the MC amount is "01." Accordingly, only stage S1 in the units order of the MC–DRA Register is On. In such status an increased potential is produced on resistor R2. This causes the commutator to operate in a manner such that a control potential appears only on wire 208. Accordingly, the suppressor grid bias of gated pentode V2 in both the units and tens order stages S1 is reduced. Since only the units order stage S1 is On, however, anode current flows only through the resistor R10 common to the units order stages and the aforementioned units stage S1 pentode V2 for the duration of the control potential on wire 208 (i.e., during one commutator interval defined by the index points).

Assume now that the MC amount is "09." Then both stages S1 and S4 in the units order of the MC–DRA Register are On. In such status, both resistors R2 and R8 have increased voltage drops. These act upon the commutator in a manner such that cyclical control potentials are applied to wires 214 and 208. The operation of the commutator is such that these potentials appear sequentially on wires 214 and 208. Since only stages S1 and S4 in the units order are On, anode current flows first through gated pentode V2 associated with stage S4 and then through gated pentode V2 associated with stage S1. Such action results in current flow through resistor R10 for two commutator intervals defined by the index points.

Now assume that the multiplicand amount is "16." Accordingly, stage S1 in the tens order is On, while only stages S2 and S3 in the units order are On. This results in increased voltage drops across resistors R2, R4 and R6. These raised potentials now control the commutator such that it produces and applies control potentials to wires 212, 210 and 208 sequentially. The control potential on wire 212 is effective only to cause anode current flow through tube V2 of stage S3 in the units order, since it is the sole S3 stage trigger in On status. The control potential on wire 210 is effective to cause anode current flow only through tube V2 of stage S2 in the units order since it is the sole S2 stage trigger On. The potential on wire 208 causes anode current flow through tube V2 of stage S1 in the tens order only, since it is the sole S1 stage trigger On. Accordingly, at the time the control potentials appear on wires 212 and 210, there is current flow through resistor R10 in the units order, and when there is a control potential on wire 208 there is current flow through resistor R10 in the tens order. The commutator operates for five commutator intervals defined by the index points, two of these being alotted for carry purposes as explained previously.

From the foregoing it will be readily understood that were the MC amount "17," the potential on wire 208 would cause anode current to flow through tube V2 of stage S1 and resistor R10 in the units order concurrently with anode current flow through tube V2 of stage S2 and resistor R10 in the tens order.

The foregoing describes the manner in which an MC amount is entered into the MC–DRA Register. The manner in which this register directly forms and manifests such digits as partial differental values has also been described. Further, it is seen how the presence or absence of partial differential values in an order is determined. The manner in which circuits, common to all orders, are utilized to determine those differential values which are present in a plurality of register orders is now apparent, as is the manner in which the aforementioned circuits produce control potentials determining the operation of a commutator associated with the MC–DRA Register. It has also been pointed out that the operation of this commutator produces cyclical or timed control potentials having a significance based on the partial differential values standing in the MC–DRA Register. Lastly, the manner in which such control potentials are effective to produce potential changes in one read-out circuit per order, which read-out circuit is common to all four stages comprising the order, has been covered.

The manner of effecting reset of the MC–DRA Register is as follows, the result of this operation being to return all triggers to Off status. The transistor T2 collector resistors in the triggers of stages S1, S2, etc., return to line 8C, which in turn returns to line 8 through cam contacts P8B, as shown in Fig. 45*a*. Early in a card feed cycle, just prior to an entry into the MC–DRA Register, cam contacts P8B open and the potential of line 8C falls toward that of line 10 so as to drive the grids of tubes V2 sufficiently negative to switch any trigger which is On to its Off status. Resetting of the MC–DRA Register occurs at the specified time for both multiplying and dividing operations.

The transistor T6 collectors of stages S1, S2, etc. of each order of the MC–DRA Register also return to line 8C through a common load resistor R9, and are also connected to a respective line 9. While not specifically utilized in the present machine, the potential at each line 9 is an indication of the storage or absence of any significant binary digits in the respective order of the MC–DRA Register. Thus, these commoned collector circuits of transistors T6 of each order of the MC–DRA Register form a Zero Detector for that order, which may be utilized to prevent the machine from operating through a multiplying cycle in the event that the multiplicand received from the punched cards is "0" during a particular problem. This Zero Detector may also be utilized to prevent the machine from operating through a dividing cycle in the event that the divisor received from the punched cards is "0" during a particular problem, which would, of course, otherwise produce an infinite answer.

*DRS Register*

The second divisor Register will now be described with reference to Figs. 15*a* and 15*b*. As previously mentioned, both the MC–DRA Register and this register are called into action during a dividing operation. This second register is labelled "DRS" in view of the fact that the divisor amount is transferred from the DRS Register into the PR–DD Accumulator in nine's complemental form, thereby effecting a subtraction of the divisor (DR).

Each order (again only two are shown, units [Fig. 15*b*] and tens [Fig. 15*b*]) comprises four stages, again labelled S1 through S4, inclusive. Each stage is essentially a trigger circuit comprising a transistor T18 and a pentode V22 connected and operating as described in my application Serial No. 177,446. In stage S2, and similarly in stage S3, the emitter of another transistor T20 is serially connected to the cathode of its tube V22. The operation of these latter two stages is thus as described in my application Serial No. 312,318.

The trigger circuits comprising stages $S_1$, $S_2$, etc., are connected in cascade fashion to form a register responsive to impulses applied to input line 50. Tubes V24 are located intermediate stages S1 and S2, S2 and S3, and S3 and S4. Tubes V24 are normally biased at or beyond cut-off from line 8C and provide keying pulses when a controlling trigger switches On. Note that this is opposite to the operation of the triggers in the MC–DRA Register just described, wherein each trigger was switched in status in response to the previous trigger being switched Off. The DRS Register is thus said to operate reversely, and the MC–DRA Register forwardly, since by ascending or forward operation is meant that the switching Off of a trigger causes the following trigger to switch, i.e., to reverse its status from Off to On, or vice versa, depending on its initial status. Conversely, by descending or reverse operation is meant that the switching On of a trigger causes the following trigger to switch or reverse its status. That this "forward" and "reverse" terminology is apt will be apparent from the description hereinafter in connection with the MP–Q Register, wherein it is shown that successive input pulses applied to the MP–Q Register during forward operation cause it to increase its stored count step-by-step, whereas successive input pulses applied thereafter and after a change to reverse operation cause the MP–Q Register to decrease its stored count step-by-step.

The On and Off pattern established by the S1, S2, etc., stage triggers of the DRS Register in response to input pulses applied to stage S1 is shown in Fig. 12.

During a dividing operation the function of each order of the DRS Register is three-fold. The first is to receive (via input line 50) and manifest a divisor digit derived from a record card and to form directly nine's complemental partial differential values. The second is to operate conjointly with each other DRS Register order to determine the number of index points required by a commutator which effects transfer of DR into the PR–DD Accumulator in nine's complemental fashion. The third is to respond only to differentially timed impulses, provided by this commutator, thereby forming timed value impulses corresponding to the differential value standing in the order.

It will be recalled that in the MC–DRA Register, each of stages S1–S4 provided control potentials for the associated commutator. However, in the DRS Register only two stages, S2 and S3, provide such control potentials. The reason for this is that in this machine, whenever during a dividing operation DR is subtracted from DD in the course of each cycle, it is required that such entry be accompanied by the introduction by a "9" in the PR–DD Accumulator in one order higher than that receiving the higher order DR partial differential value. Accordingly, since "9" is entered in binary fashion in this machine as an "8" and a "1," no circuits are provided in the DRS Register to determine the presence or absence of "1's" and "8's." However, it is to be noted that even were the "9" not binary coded, at least no "1" determining circuit could be provided in the DRS Register inasmuch as subtraction by the nine's complemental method requires introduction of the "elusive 1" in that order of the PR–DD Accumulator receiving the lowest order digit from the DRS Register.

With regard to stages S2 in all orders of the DRS Register, the collector electrodes of transistors T20 are commonly connected to wire 222. Similarly, the collector electrodes of transistors T20 associated with stages S3 in all orders are commonly connected to wire 224. Wires 222 and 224 terminate at resistors R30 and R32, respectively (Fig. 22*c*).

Considering now only the transistors T20 associated with stages S2 in the units and tens orders of the DRS Register, if neither trigger is On, no potential is applied to either transistor T20 emitter, and current flow through resistor R30 is low. If either trigger of stages S2 is On, or if both are On, there is higher current flow in one or both transistor T20 collector circuits, thus producing an increased voltage drop across resistor R30. Thus, the presence of a "2," "3," "6," or "7" digit in either order of the DRS Register is manifested by an increased voltage drop across resistor R30. If such digits are absent from the DRS Register, then the potential drop across resistor R30 is low.

Similarly, if one or more orders of the DRS Register contain a "4," "5," "6" or "7," at least one S3 stage is is On and the action of its transistor T20 causes an increased voltage drop across resistor R32. If such digits are absent from the DRS Register, then the potential drop across resistor R32 is low. The raised and lowered potentials formed on resistors R30 and R32 are utilized to control the cyclical operation of the associated S Commutator, as described in connection with that circuit hereinafter.

The operation of the Subtract or "S" Commutator associated with the DRS Register is discussed subsequently. It is sufficient to state here that this commutator provides control potentials which appear on wires 226, 228, 230 and 232. Wire 226 is commonly connected to the suppressor grids of tubes V22 associated with all S1 stages of the DRS Register. Wires 228, 230 and 232 are commonly connected to the suppressor grids of all tubes V22 related to stages S2, S3 and S4, respectively. The normal potential applied by the S Commutator to any of the wires 226, 228, 230 and 232 is such as to bias the associated tubes V22 at or beyond cut-off.

The S Commutator in its operation applies a potential to wires 226 and 232 and may apply a potential to one or both wires 228 and 230. This reduces the suppressor grid bias of the related tubes V22 to substantially zero. Such action may or may not result in the flow of anode-cathode current in all tubes V22 receiving such a control potential, depending upon the status of the trigger in which the tube V22 is situated.

Assume first that the nine's complemental DR amount is "02." Accordingly, only stage S2 in the units DRS order is On, and in such status an increased potential is produced on resistor R30. This causes the commutator to operate in a manner such that control potentials appear only on wires 226, 228 and 232. It will be recalled that the absence of "8's" and "1's" is not determined by the DRS Register inasmuch as such partial differential values are required for reasons previously stated. Accordingly, the suppressor grid bias of all tubes V22 of stages S4, S2 and S1 of all orders is reduced in turn, in that sequence, by the S Commutator. However, since only units stage S2 is On, there is anode current produced through common resistor R10 and the units order stage S2 tube V22 only for the duration of the control potential on wire 228 (i.e., during one commutator interval defined by the index points). Note that the anode output of the tubes V22 of each order is in parallel with the previously described tubes V2 output of that order due to their common resistor R10.

Assume next that the nine's complemental DR amount is "06." Accordingly, both stages S2 and S3 in the units order of the DRS Register are On and in such status both resistors R30 and R32 have increased voltage drops. These act upon the commutator in a manner such that control potentials are applied to wires 228 and 230 as well as wires 226 and 232. The operation of the commutator is such that these potentials appear sequentially upon wires 232, 230, 228 and 226. Since stages S2 and S3 in the units order are now On, anode current flows first through tube V22 associated with stage S3 and then through tube V22 associated with stage S2. Such action results in current flow through resistor R10 for the duration of two commutator intervals defined by the index points.

From the foregoing it will be readily understood that were the nine's complemental DR amount "26," the potential on wire 228 would also cause anode current to flow through tube V22 of stage S2 and resistor R10 in the units order concurrently with anode current flow through tube V22 of stage S2 and resistor R10 in the tens order.

The foregoing describes the manner in which a DR amount is entered into the DRS Register. The manner in which this register directly forms and manifests such digits as nine's complemental partial differential values has also been described. Further, it is seen how the presence or absence of partial differential values in an order is determined. The manner in which circuits common to all orders are utilized to determine certain differential values which are present in a plurality of register orders is now apparent, as is the manner in which the aforementioned circuits produce control potentials determining the operation of a commutator associated with the DRS Register. It has also been pointed out that the operation of this commutator produces timed control potentials having a significance based on certain partial differential values standing in the MC–DRS Register. Lastly, the manner in which such control potentials are effective to produce potential changes in one read-out circuit per order, which read-out circuit is common to all four stages comprising the order and common also to the corresponding order of the MC–DRA Register, has been covered.

The manner of effecting reset of the DRS Register is as follows, the result of this operation being to return each order to "9" status, i.e., the nine's complement of "0." The collector load resistors of transistors T18 of stages S2 and S3 return to line 8C so that the triggers of these stages are reset to Off status in exactly the same manner as described above in connection with the MC–DRA Register triggers. However, the collector resistors of transistors T18 of stages S1 and S4 return to line 8B, which in turn returns to line 8 through cam contacts P8A, as shown in Fig. 45*a*. These cam contacts open just prior to divisor (DR) read-in, and the potential of line 8B rises to reduce the control grid bias of tubes V22 of stages S1 and S4, thereby switching the triggers of these stages to On status. It will be appreciated that with such initial status plus the response of stages S2, S3, and S4 to the turning On of its previous controlling stage, nines complement partial differential values of DR are directly formed, as will be apparent from Fig. 13.

*MP–Q Register*

The MP–Q Register is provided for the purpose of receiving the multiplier amount from a record card during each multiplying operation and also for the purpose of receiving the quotient amount as it is formed during each dividing operation.

The MP–Q Register comprises six denominational orders (shown in Figs. 23*a*–23*f*), only two of which are employed when multiplying. Referring for example to the upper portion of Figs. 23*c* and 23*d*, each order comprises four stages again designated S1 through S4. Each stage includes a trigger circuit, formed by transistor T8 and triode V4, which switches On and Off alternately in response to successive negative input pulses. The trigger circuits are connected in cascade fashion through intermediate circuits provided so that an order may operate either forwardly or reversely in response to input pulses applied at terminal 52. In addition, feedback circuits are provided so that each order automatically maintains itself in the tens notation.

One intermediate circuit, which includes transistor T10 and triodes V6 and V8, is provided between each pair of stages S1 and S2. Similar circuits are provided between each pair of stages S2 and S3, and S3 and S4.

The manner of operating the MP–Q Register in the forward direction is as follows. Assume that all stages are reset in Off status initially in a manner to be described hereinafter, and that wire 216 is at a raised potential while wire 218 is at a lowered potential. The first negative pulse applied to terminal 52 turns stage S1 On and the second negative pulse applied thereto turns stage S1 Off. When this latter action occurs, it is required that stage S2 switch On; this is accomplished as follows. When stage S1 switches Off, the negative pulse developed by the decreased current flow through resistor R12 is applied via condenser C2 to the base of transistor T10. Since the emitter of transistor T10 is returned to positive supply line 2, the effect of the aforementioned negative pulse is to increase the emitter voltage of transistor T10. Consequently, there is an increase in the collector current through transistor T10 and an increased potential is developed across resistor R14. Resistor R14 returns to wire 216, which is now at a raised potential as stated above. This raised potential on wire 216 plus the positive pulse appearing on resistor R14 is sufficient to render tube V8 conductive, and the resulting negative pulse on resistor R16 causes stage S2 to switch to its On status. The negative pulse developed across resistor R12 as above-mentioned is also applied to the grid of tube V6 via condenser C4 but has no effect on that tube because the latter is already biased at or beyond cut-off by the bias applied from wire 218 (now at a lowered potential) via resistor R18. The intermediate circuit transistors T10 and tubes V8 located between stages S2 and S3, and S3 and S4, respectively, cause forward operation between these stages in a similar manner.

When reverse operation of the MP–Q Register is required, the potential on wire 216 is lowered while that on wire 218 is raised. It was previously pointed out that for forward operation the switching Off of a trigger must cause the following trigger to switch, i.e., reverse its status from Off to On, or vice-versa. To achieve reverse operation it is required that the switching On of a trigger must cause the following trigger to be switched. This is accomplished in the following manner. At any time when stage S1 switches from Off to On, the positive pulse produced across resistor R12 is applied via condenser C4 to the grid of tube V6. This positive pulse added to the already raised potential of this grid, derived from wire 218 through resistor R18, causes tube V6 to conduct. Since tube V6 also connects to resistor R16, the resulting negative pulse is effective to switch stage S2. Note that the lowered potential on wire 216 reduces the collector current through transistor T10 and that the positive pulse produced across resistor R12 is also applied to the base of transistor T10 via condenser C2 and further reduces the flow of collector current through that transistor. The resultant decreased potential across resistor R14 has no effect on the current flowing through tube V8 since the latter is already biased at or beyond cut-off by the lowered potential on wire 216. The intermediate circuit condensers C4, resistors R18 and tubes V6 located between stages S2 and S3, and S3 and S4, respectively, cause reverse operation between these stages in a similar manner.

In order for the MP–Q Register to operate in the tens notation it is necessary to employ two adjusting or feedback circuits, one operating only in the forward direction and the other operating only in the reverse direction. The former will be described first. It is preferred for forward operation that the binary-to-decade adjustment be effected as an order passes from "7" to "8," i.e., in response to the eighth input pulse. When this takes place, stages S1, S2 and S3 switch Off and S4 switches On. The positive pulse produced on resistor R12 of stage S4 is applied via condenser C6 to the grid of tube V10, which is biased from wire 216 (now at a raised potential) through resistor R20. This pulse is therefore effective to render tube V10 conductive and the resultant negative pulse on its load resistor R22 is inverted by normally zero-biased tube V12 and appears as a positive pulse on load resistor R24.

The resistor R24-tube V12 anode junction connects to the anodes of diodes D2 and D4. The cathodes of diodes D2 and D4 are respectively connected to the grids of tubes V4 in stages S2 and S3. With tube V12 normally highly conductive, diodes D2 and D4 are non-conductive since the large voltage drop across resistor R24 maintains their anodes negatively biased. The negative pulse produced on resistor R22 momentarily renders tube V12 non-conductive and the resulting positive pulse on resistor R24 causes diodes D2 and D4 to conduct. Such action returns the stage S2 and S3 triggers concurrently to a common and On status. The manner in which an order of the MP–Q Register responds to successive input pulses applied at terminal 52 when operating in the forward direction is shown in Fig. 27.

It is preferred that when the MP–Q Register operates reversely the binary-to-decade adjustment be effected as an order passes from "2" to "1" and its stage S4 switches to Off status. During multiplication, the particular input pulse causing this adjustment is thus determined by the value stored in the order due to read-in prior to the switching from forward to reverse operation. During dividing, the adjustment will be effected only if the quotient value is "1." This is because, starting from "0" with all triggers S1–S4 of the MP–Q Register Off and going backwards (0, 9, 8, 7, etc.), the order passes from "2" to "1" only in response to a ninth input pulse.

Figure 23A:
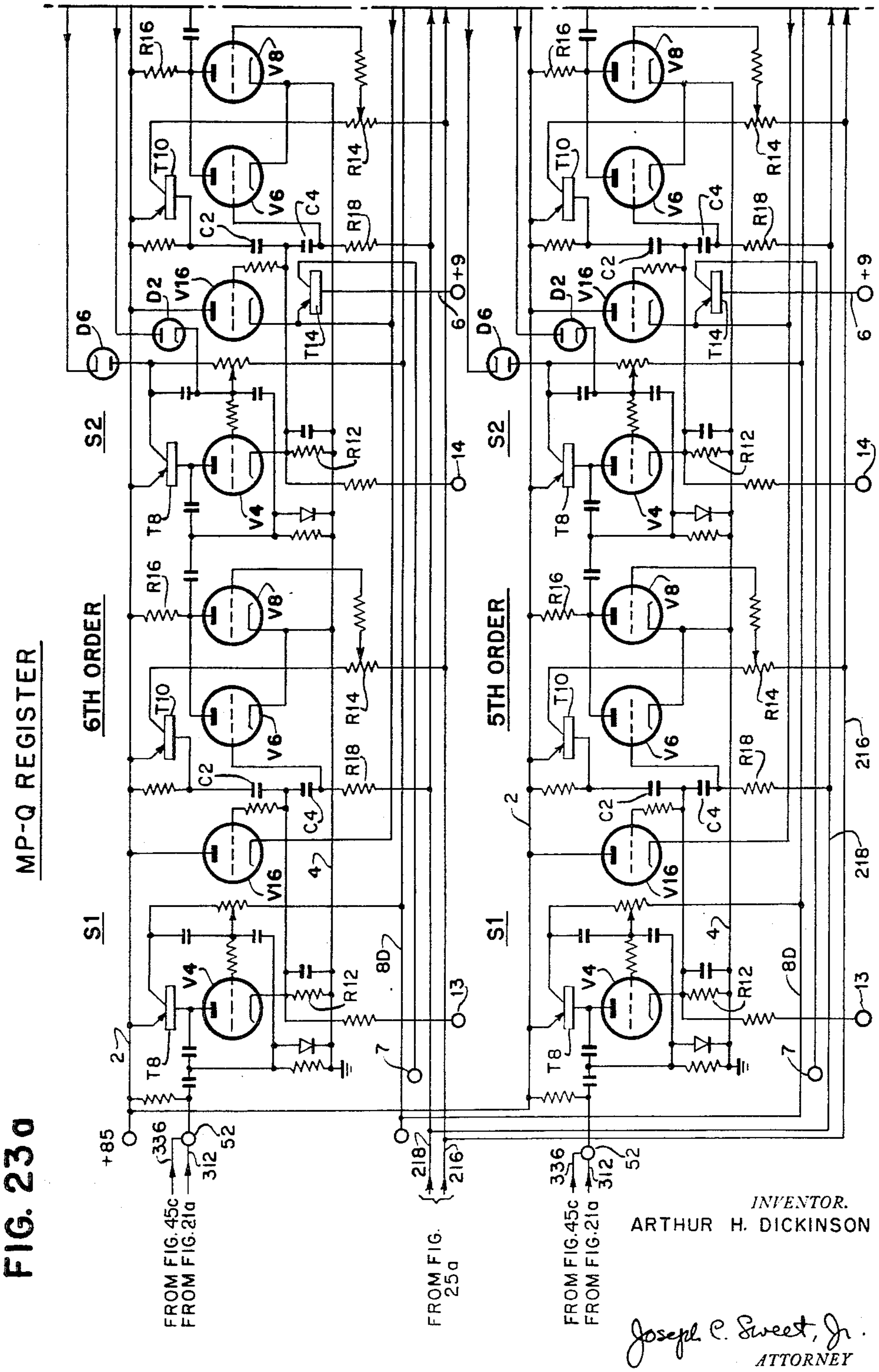
Figure 23B:
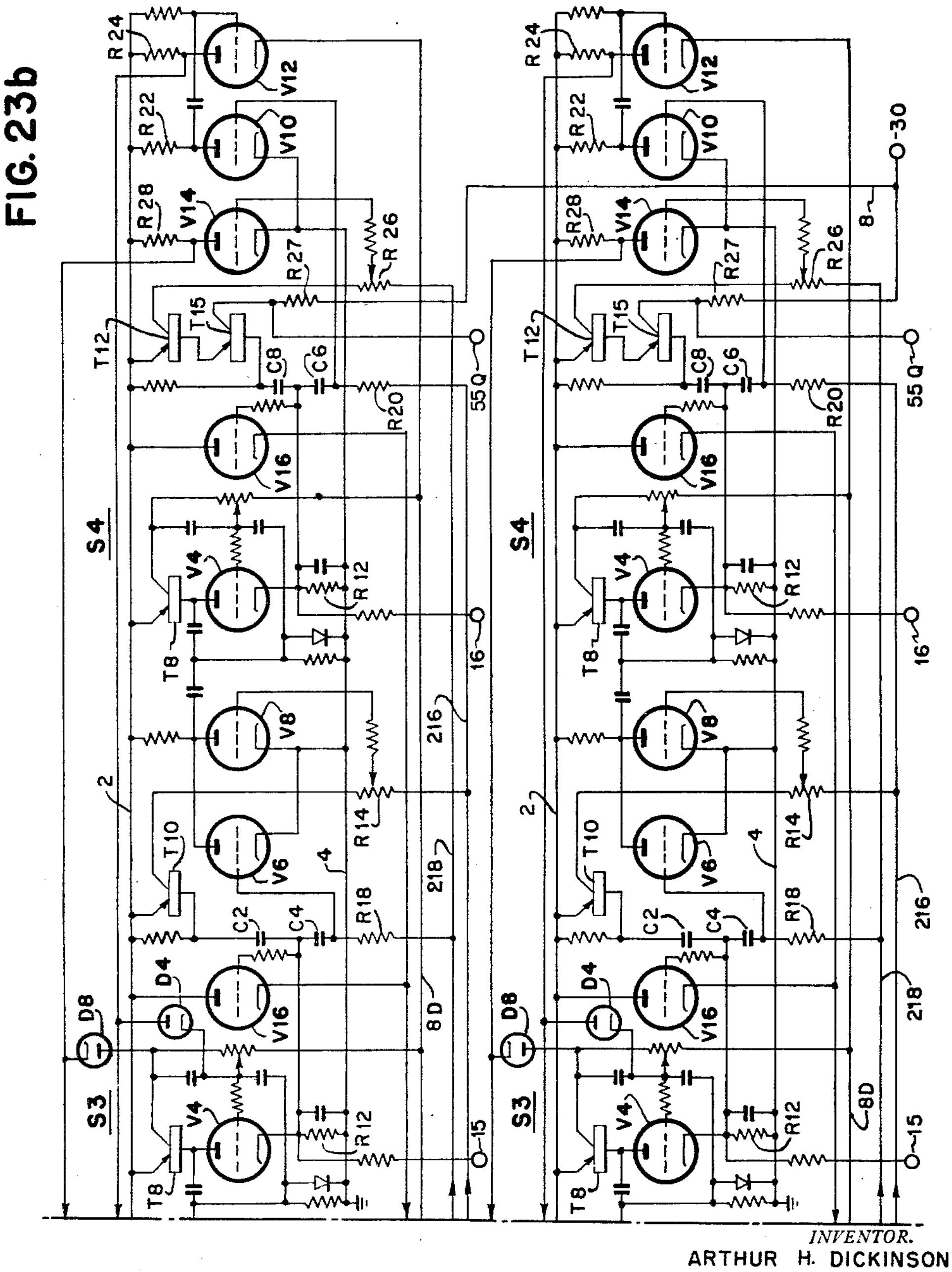
Figure 23C:
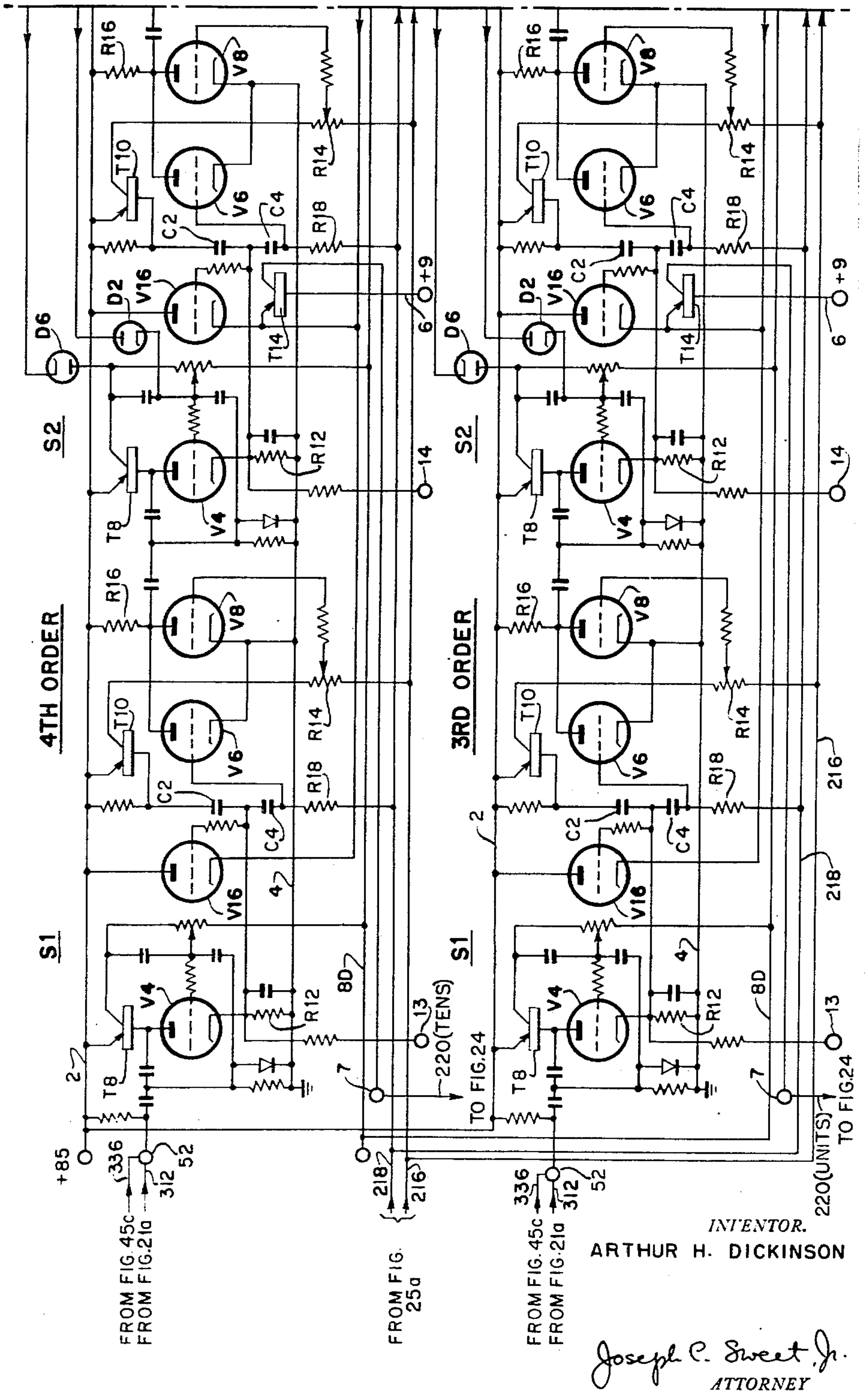
Figure 23D:
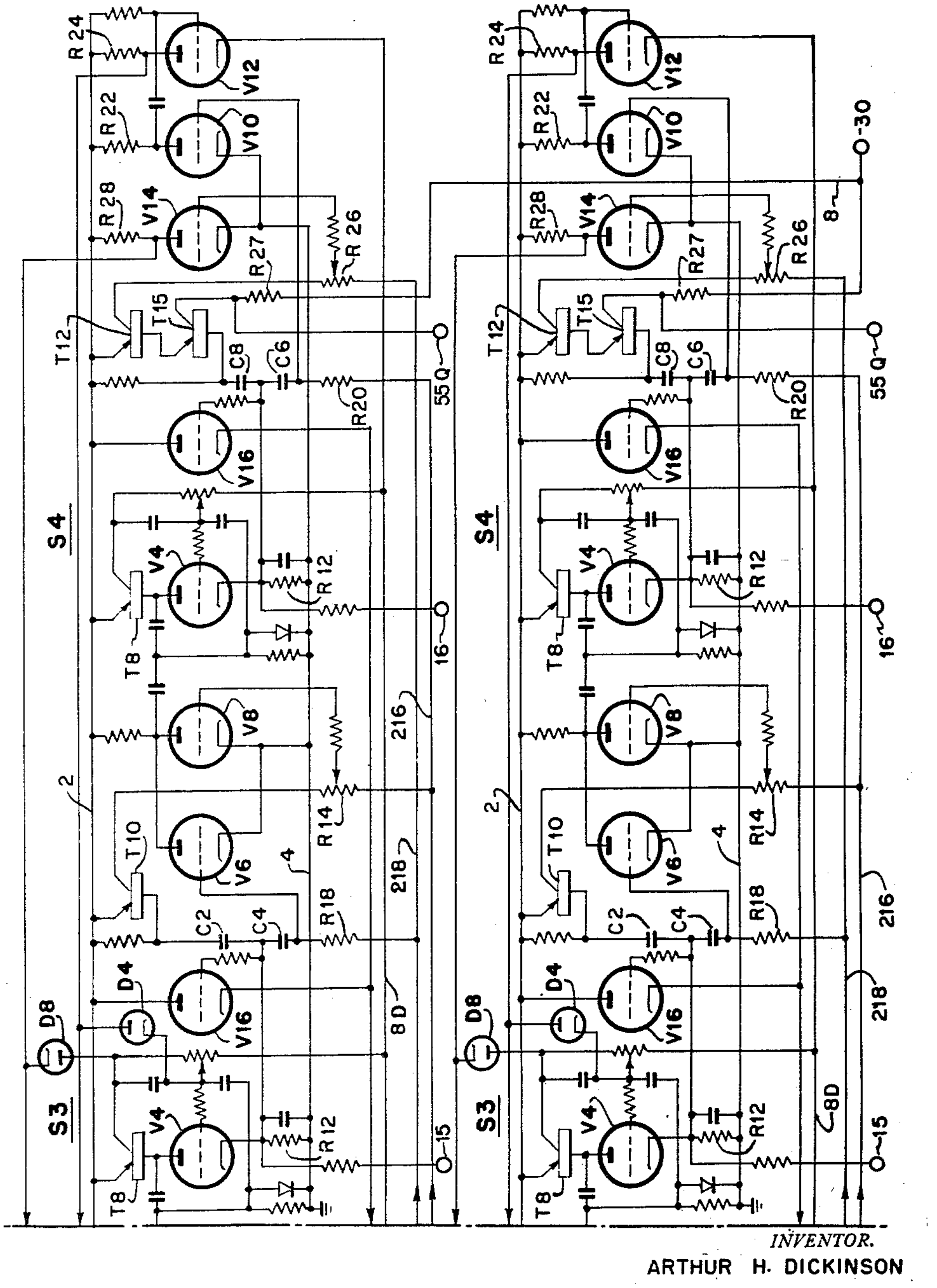
Figure 23E:
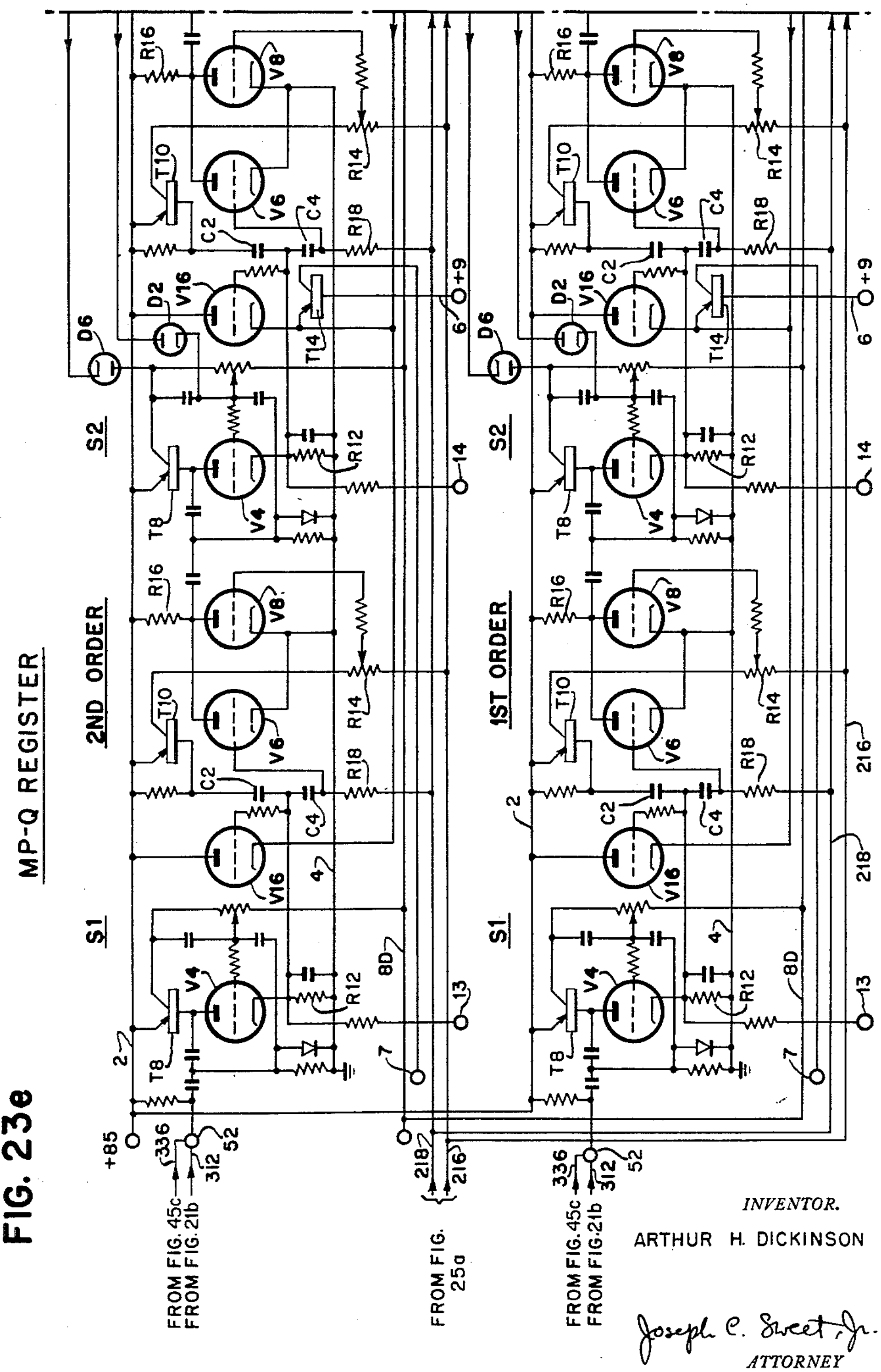
Figure 23F:
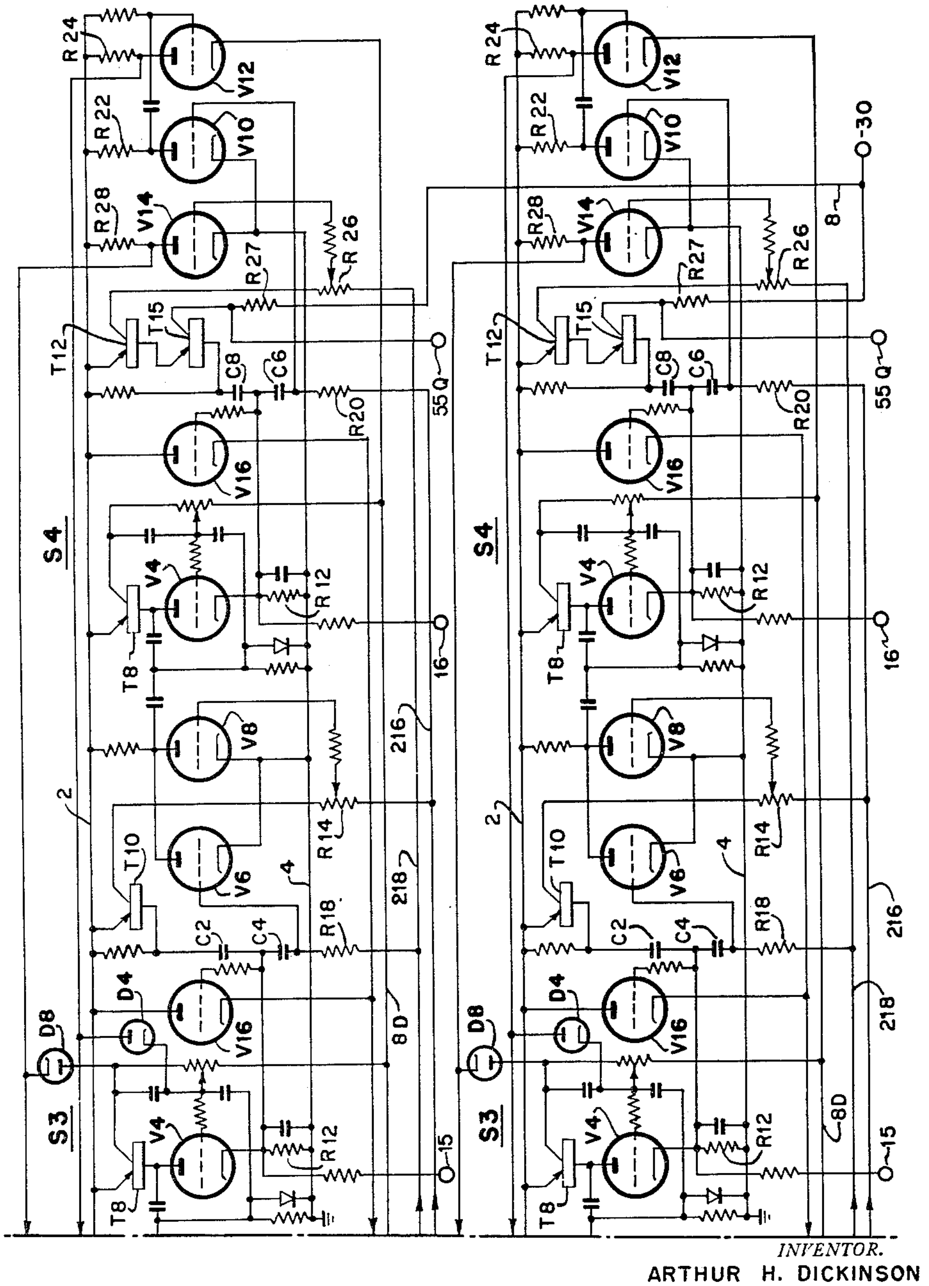

The negative pulse produced when the voltage drop across resistor R12 of a stage S4 falls is applied via condenser C8 to the base of its transistor T12 through the base-to-emitter path of its transistor T15 (Figs. 23*b*, 23*d*, and 23*f*). A transistor T15 is included in each order of the MP–Q Register for read-out purposes as will be explained more in detail hereinafter. This negative pulse applied to the base of transistor T12 increases its emitter-to-base potential. As a result, a positive pulse is produced in its collector circuit, which includes resistor R26 and connects to wire 218. Since the latter is at a raised potential during reverse operation, this pulse on resistor R26 is effective to cause current flow through tube V14 and its load resistor R28. The resistor R28-tube V14 anode junction connects to the cathodes of diodes D6 and D8. The anodes of diodes D6 and D8 respectively connect to the collectors of transistors T8 of stages S2 and S3.

When tube V14 conducts, as just described, the voltage drop across resistor R28 increases and both diodes D6 and D8 are caused to conduct. The result of this action is to switch stages S2 and S3 simultaneously from On to Off status. The operation of an order of the MP–Q Register in a reverse direction during multiplication is shown in Fig. 28.

When multiplying, the number of transfers of the multiplicand (MC) into the PR–DD Accumulator by a particular multiplier (MP) order is determined by the MP digit entered therein. Stated otherwise, the number of impulses required to operate an MP order reversely until it reaches zero corresponds to the MP digit. When an MP order reaches zero, further MC transfer operations are suspended and operations are shifted to another MP order. If the entry from the card is "0" (zero) in a particular MP order, then no MC transfer cycles take place. These requirements are met by controls based on a "0" condition detection in an MP order.

The following Zero Detector circuit is employed to determine the presence or absence of a significant MP digit in each order. The cathodes of the four tubes V16 of each order are commonly connected to the emitter circuit of a transistor T14 for that order. The grids of these tubes V16 of an order are individually connected to the respective tube V4 cathode-resistor R12 junction in each of the stages S1 through S4 of that order. The base of each transistor T14 connects to positive supply line 6 (+9 volts). Whenever a digit stands in an order of the MP–Q Register, one or more of its tubes V16 conduct, thus raising the emitter potential of the associated transistor T14. Accordingly, if the collector circuit is completed and includes a load resistor, as in the third and fourth MP–Q orders in this machine, an increased voltage drop will be produced across this resistor. Referring now to either the third or fourth MP–Q orders, shown in Figs. 23*c* and 23*d*, the above-mentioned rise in potential of the emitter of transistor T14 of either order causes the collector current of this transistor to increase and since it is coupled to an associated load resistor R29 (Fig. 24, subsequently described) via wire 220, an increased voltage drop is produced across this resistor R29. Obviously, when the digit standing in an order is "0," the voltage drop across this resistor is low. The manner in which an increased or decreased potential is utilized either to permit and then terminate a multiplying operation or to eliminate the multiplying operation for a particular MP–Q column is described hereinafter.

The reason that only the collector circuits of transistors 14 of the third and fourth orders of the MP–Q Register are completed is that only these two orders are utilized in the machine during multiplying. However, a Zero Detector circuit including such a transistor is included in each of the other MP–Q orders to demonstrate the manner in which the digit handling capacity of the machine may be expanded, and also to provide symmetry of the units and interchangeability of the units of the different orders. The collector of each transistor T14 is connected to terminal 7, and in those orders (1st, 2nd, 5th and 6th) where it is not connected to a line 220, the emitter-to-base path of the associated transistor T14 simply acts as a diode.

For multiplication, the MP–Q Register operates in a forward direction when receiving an entry from the card, whereas each MP order operates in a reverse direction during the actual multiplication operation. When dividing, however, the MP–Q Register receives no entry from the card. An order then does, however, receive entries from circuits to be discussed subsequently. The number of such entries in any order is based on the number of times the dividend (DD) amount contains the divisor (DR) amount. When the DR amount is being subtracted from the DD amount, an MP–Q order operates in the forward direction, as shown in Fig. 27. On the other hand, when the DR amount is being added to the DD amount, the related MP–Q order operates in the reverse direction, as shown in Fig. 29.

The foregoing has described one order of the MP–Q Register and has discussed how this order may operate either forwardly or backwardly, how adjustments are made to maintain this order in the tens notation, and the manner in which circuits determine the presence or absence of a significant digit.

When dividing, the result or quotient amount in the MP–Q Register is punched in the card during a read-out operation. This is effected by applying ten impulses to each MP–Q order's input 52 from a respective wire 336 (Fig. 45*c*) during a punching cycle. During this operation each order progresses forwardly through ten steps, thus returning to the status it had prior to the punch cycle initiation. As each order passes from "9" to "0," there is produced at terminal 55Q an impulse which is differentially timed to correspond to the digit contained by the order. This is true whether the order was previously operated forwardly or backwardly in response to result-producing impulses.

As an order of the MP–Q Register passes from "9" to "0" during read-out in response to input pulses applied to terminal 52, the potential across resistor R12 of its stage S4 falls. This fall in potential is coupled via condenser C8 to the base of transistor T15, whose emitter is directly connected to the base of transistor T12. This reduction in the base potential of transistor T15 effectively increases its emitter-to-base voltage, causing increased current to flow in its collector circuit and thus producing a positive pulse across its load resistor R27, whose other terminal is connected to negative line 8 (−30 volts). This differentially timed positive impulse across resistor R27 is available at terminal 55Q for operating punch magnets as described more in detail hereinafter in connection with read-out.

Typical patterns of the MP–Q Register read-out are shown in Figs. 30 and 31.

It will be noted that terminals 13–16 are provided for each order of the MP–Q Register, each being connected to the cathode of a respective tube V4 of Stages S1–S4, respectively, of that order through a resistor. These terminals 13–16 are provided for indicating purposes, and may conveniently be connected to neon indicating lamps through amplifiers designed to increase the voltage swing across the cathode resistors R12 sufficiently to operate the neon lamps.

The method of resetting the MP–Q Register is as follows. When multiplying, the MP–Q Register is reset to zero just prior to entry of an MP amount therein. When dividing, the MP–Q Register is reset to zero following a read-out therefrom and just prior to entry of the quotient (Q) digits. This reset to zero is effected for a multiplying operation by returning line 8D through switch 140 (Fig. 45*a*, in the full-line position shown) and cam contacts P8B to line 8. As described previously in connection with the MC–DRA and DRS Registers, the opening of cam contacts P8B returns the collector resistors for transistors T8 of the MP–Q Register to a lower than normal potential (−70 volts), thereby applying a high negative bias to tubes V4 and shutting all the MP–Q Register triggers Off. For a dividing operation, switch 140 is placed in its opposite position, shown in dotted lines in Fig. 45*a*, thus providing a return for line 8D via cam contacts P9A, which upon opening cause the triggers to switch to their Off status, in the manner previously described, just following read-out and prior to the next dividing problem.

*PR–DD Accumulator*

The PR–DD Accumulator receives transfers of the multiplicand (MC) from the MC–DRA Register during multiplying to form the product (PR) and, during dividing, receives the dividend (DD) amount of the card. It comprises eight orders, shown in Figs. 20*a*–20*h*, each including fundamentally four stages S1 through S4. Referring, for example, to the third PR–DD order, shown in the lower half of Figs. 20*c* and 20*d*, each stage basically is a trigger circuit employing a transistor T16 and a tube V18. The trigger circuits are connected in cascade fashion and are responsive to impulses applied at input 54. Carry circuits are provided for determining and applying a carry to the next higher order when a lower order passes from a "9" to a "0." Also, adjusting circuits, generally similar to those described previously, are provided for maintaining each PR–DD order in the tens notation.

However, it should be mentioned that it is required that the adjusting circuits operate so as to allow a related stage to switch either from On to Off, or from Off to On. This is in contradistinction to the form of adjusting circuits employed in the MP–Q Register, where the adjustment is invariably from On to Off or vice-versa. Another consideration governing the type of PR–DD adjusting circuits is that an order receives transfers from the MC–DRA and DRS Registers on a partial differential value basis. Such a method of effecting a transfer requires that in addition to the cascade connections between one trigger and another, previously mentioned, each stage S1 through S4 must be provided with an independent input. It is further required that this independent input must be capable of switching its related trigger from either status to the other. In the PR–DD Accumulator, a tube V20 is provided for each stage for the purpose either of causing switching of the trigger by the preceding trigger in the series (as regards stages S2–S4) or, in the case of stage S1, of causing switching of that stage in response to entry (during dividing only) and read-out or carry impulses (during multiplying only). Tubes V26 (one for each stage, the four associated with the third PR–DD order being shown in the lower right half of Fig. 19*a*) effect entries into the respective PR–DD Accumulator stages on a partial differential value basis. Tubes V28 (one for each of stages S2 and S3 of each order; those associated with the third PR–DD order being shown in Fig. 20*d*) respond to adjusting pulses from stage S4 of each order and apply such to stages S2 and S3 of that order.

Upon reference to the earlier section "DRS Register" it will be recalled that the stages comprising an order in that register are arranged to respond to keying pulses in a manner that causes reverse operation. That is, all orders save the first respond to a positive pulse produced by the trigger preceding it in the cascade arrangement.

In connection with the PR–DD Accumulator it is required that in order to respond to any entry in an ascending sense. At the same time, design considerations required that the standardized keying pulse be positive. To achieve both objectives, it is required that the accumulator order stages be reset in an On, rather than the usual Off status. Manifestation of the digit standing in an order is therefore by the Off status of triggers rather than the usual On sense.

Fig. 32 shows the manner in which an order of the PR–DD Accumulator responds to impulses applied only to its input 54.

Fig. 8 shows the manner in which an order responds to successive entries of partial differential values "9" through "1," commencing with an initial "0" setting. Timed pulses representative of the binary coded digits are applied to the grids of the four tubes V26 of that order. The first digit to be entered into the order of the PR–DD Accumulator is "9." This is represented by timed pulses representing the digits "8" and "1," their time of application to the PR–DD Accumulator being controlled by the A Commutator. These pulses are positive and act to reduce the grid bias of tubes V26 associated with stages S4 and S1 sequentially in that order. The resultant initial negative pulse produced on plate load resistor R34 of tube V20 associated with stage S4 is effective to switch stage S4 from On to Off status to effect entry of the "8" into the order.

Before effecting the following entry of "1," it is required that the order receive an adjustment so that it will be maintained in the tens notation. Referring again to the third PR–DD order shown in Figs. 20*c* and 20*d* as an example, as stage S4 switches Off, the junction between the base of its transistor T16 and the anode of its tube V18 rises in potential. Differentiating condenser C10 couples this junction to the grid of tube V30, which is normally biased in non-conducting status. The differentiated positive pulse produced causes tube V30 to conduct momentarily and provide a short negative pulse on its plate load resistor R36. This negative pulse is concurrently applied via condensers C12 and C14 to two self-restoring or monostable trigger circuits. The first trigger circuit includes tube V31 and transistor T22 and the second trigger circuit includes tube V32 and transistor T24. These function as Delay Circuits DL1 and DL2 of Figs. 3*a*, 3*b* and 10*b*–10*e*.

With regard to the first-mentioned monostable trigger, the grid of tube V31 returns to ground line 4 via resistor R38. The cathode of tube V31 connects to the emitter of transistor T22, whose base also returns to line 4 via resistor R40. Normally both tube V31 and transistor T22 are conductive. Thus, a relatively high current flows in the transistor T22 collector circuit, which includes resistor R42. This collector is coupled to the grid of tube V31 through condenser C16. Since the voltage drop across resistor R42 is high, condenser C16 is relatively discharged. The negative pulse derived from condenser C12 is effective to shut tube V31 Off. When this occurs, the emitter-to-base potential of transistor T22 falls substantially to zero and the collector current through resistor R42 drops.

The voltage at the condenser C16-resistor R38 junction goes negative with respect to the potential of line 4 (ground), and the voltage at the condenser C16-resistor R42 junction falls toward the potential of line 8 practically instantaneously upon tube V31 ceasing conducting. This action occurs with substantially no change in the charge on condenser C16. Were condenser C16 not present in the circuit, the potential of the resistor R42-transistor T22 collector junction would fall even further toward that of line 8. Accordingly, directly after the aforementioned rapid change, condenser C16 commences to charge exponentially toward the potential difference between line 4 and that established at the resistor R42-transistor T22 collector junction when the transistor T22 emitter voltage is low. During such action the condenser C16-resistor R42 junction potential falls exponentially while the condenser C16-resistor R38 junction potential rises exponentially toward line 4. Eventually the voltage at the condenser C16-resistor R38 junction rises to a value at which tube V31 again becomes conductive. The time constant established principally by condenser C16 and resistors R38 and R42 determines the time elapsed before tube V31 does conduct. Cumulative action causes tube V31 to reach full conducting status substantially instantaneously.

Condenser C18 couples the grid of tube V31 to the grid of tube V28 associated with stage S2. This tube V28 is normally biased at or beyond cut-off by means of a voltage divider comprising resistors R41 and R43 connected between ground line 4 and negative supply line 8. The rapid rise of the tube V31 grid voltage as it becomes conductive is applied as a positive pulse from condenser C18 to the grid of tube V28 associated with stage S2, which tube shares the plate load resistor R34 of that stage with its tube V20. The resultant negative pulse across this resistor R34 causes stage S2 to switch Off, as may be seen by reference to Fig. 8.

The time constant governing the operation of the similar tube V32-transistor T24 monostable trigger associated with stage S3 is somewhat larger. This is achieved by making condenser C15 (connecting the collector of transistor T24 to the grid of tube V32) approximately twice the size of condenser C16, and also by shunting grid resistor R39 of tube V32 by condenser C17. Accordingly tube V32 remains non-conductive longer than tube V31. Therefore tube V32 does not return to normal conducting status until some time after stage S2 switches Off. The return of tube V32 to normal status applies a positive pulse to the grid of tube V28 associated with stage S3 via condenser C19. Such action causes stage S3 to switch Off in the manner just described with reference to the tube V28 associated with stage S2, as may be seen by reference also to Fig. 8.

As shown in Figs. 20*b*, 20*d*, 20*f*, and 20*h*, the adjustment circuit associated with stage S3 of each order of the PR–DD Accumulator is similar to the one associated with stage S3 of the third order, just described, except that in the first, second, fifth and sixth orders the grid of tube V28 is coupled via condenser C19′ to the cathode of tube V32 instead of to the grid thereof. The operation is identical, however, since the grid and cathode voltages of tube V32 are in phase in this circuit. Also, the adjustment circuits associated with stage S2 of the fourth, seventh and eighth orders of the PR–DD Accumulator are similar to the one associated with stage S2 of the third order, just described.

However, the adjustment circuits associated with stage S2 of the first, second, fifth and sixth orders of the PR–DD Accumulator differ slightly in structure, although not in function. See Figs. 20*f* and 20*h*. Referring, for example, to the first order of the PR–DD Accumulator shown in Fig. 20*h*, it will be noted that condenser C12′ is connected directly to the grid of tube V28 associated with stage S2 and tube V31 and transistor T22 are omitted. Moreover, condenser C12′ (which now couples the grid of this tube V28 to the junction of the plate of the preceding tube V30 and its plate load resistor R36) is made small so that it functions as a differentiating condenser. When tube V30 conducts and produces a short negative pulse upon its plate load resistor R36 as described previously, this negative pulse is differentiated by condenser C12′. As before, tube V28 is biased at or slightly below cut-off by means of the voltage divider comprising resistors R41 and R43 connected between ground line 4 and negative line 8, and hence the negative differentiated pulse produced coincident with the leading edge of the negative pulse applied to differentiating condenser C12′ has no effect on the operation of this tube. However, the subsequent positive differentiated pulse coincident with the trailing edge of the negative pulse applied to differentiated condenser C12′ causes tube V28 to conduct momentarily. Since this tube shares plate load resistor R34 associated with tube V20 of stage S2, the resultant negative pulse on this load resistor R34 causes stage S2 to switch Off as desired. As before, the parameters of the circuit are arranged such that stage S2 is turned Off by this adjusting pulse prior to the time that stage S3 is turned Off by its adjusting pulse.

Referring again to the entry of the digit "9" into an order of the PR–DD Accumulator in partial differential binary-coded fashion, i.e., by the entry of the digits "8" and "1," there has thus far been described the manner in which the digit "8" is entered and the adjustments which thereafter take place to maintain the accumulator order in the decade system. Referring again to the third order of the PR–DD Accumulator, following such adjustment of this order the A Commutator effects the application of a timed impulse representing the digit "1" to cause tube V26 associated with stage S1 (Fig. 19*a*) to conduct. The resultant negative pulse across resistor R34 of stage S1 (Fig. 20*c*) causes the latter to switch Off. This operation completes the addition of a "9" into the PR–DD Accumulator on a partial differential value basis with timed pulses. Since this order initially stood at "0," no carry out of the order is required. It will be observed from a comparison of Fig. 8 with Fig. 2 that a "9" is manifested in the PR–DD Accumulator as a binary code "15." It may therefore be seen that the effect of the adjusting just described is to add a "6" automatically into an order when the stage S4 trigger switches from On to Off. Such action occurs invariably.

The second entry into the PR–DD Accumulator indicated in Fig. 8 is that of an "8." During this transfer cycle, tube V26 associated with stage S4 (Fig. 19*a*) becomes conductive in response to the "8" timed value impulse. The resultant negative impulse on resistor R34 of stage S4 (Fig. 20*c*) switches the latter from Off to On, but no operation of the adjusting circuits ensues. Since no further entry of timed impulses is made in this transfer cycle, stages S1, S2 and S3 remain Off, indicative of the resultant digit "7" in the order.

However, a switching of stage S4 On again is indicative that the order has passed from "9" to "0" and a carry of the "10" must be effected. When this occurs, it is required that the Carry Determining and Effecting Circuit be operated. This comprises fundamentally a trigger circuit CY which includes transistor T26 and tube V34. When stage S4 switches from Off to On, the current flow through its cathode resistor R44 increases. This rise in potential is applied as a positive pulse by condenser C20 to the grid of tube V36, which is normally biased Off. The positive pulse just mentioned renders tube V36 conductive. The anode of tube V36 is directly connected in parallel with the anode of tube V34 to the base of transistor T26 and the increased current flow through tube V36 increases the emitter-to-base potential of transistor T26. The collector current through transistor T26 therefore increases, thereby rendering tube V34 conductive and switching the carry trigger CY from Off to On status.

The switching of trigger CY to On status increases the potential drop across resistor R46 in the cathode circuit of tube V34. The tube V34-resistor R46 junction is coupled to the grid of normally Off gated tube V38 through diode D10, poled as shown. The aforementioned potential rise across resistor R46 is insufficient by itself to overcome the bias on gated tube V38 provided by positive line 6 (+9 volts) connected to the cathode thereof. However, during the carry portion of each transfer cycle into the PR–DD Accumulator, a positive gating pulse is applied to wire 234 by circuits (Figs. 22*a*–*c*) described below, and since the grid of tube V38 is also coupled to wire 234 via diode D12, poled as shown, at carry time a positive pulse on wire 234 added to the rise in voltage provided by resistor R46 is sufficient to cause tube V38 to conduct. The anode of the tube V38 in each of the first seven orders connects to resistor R34 related to stage S1 in the adjacent higher order. This conduction of tube V38 causes a negative pulse to appear on the resistor R34 to which it is connected, thereby switching stage S1 in the adjacent higher order and applying a carry of "1" thereto.

At the end of the carry portion of a transfer cycle, a negative pulse is applied to wire 235. This wire is coupled, via differentiating condenser C21 and coupling condenser C23, to the grid of tube V34 of each of the carry triggers CY and, accordingly, the aforementioned negative pulse switches to Off status any CY trigger which is On in anticipation of possible operation during a succeeding cycle.

No connection is made to the anode of the tube V38 associated with the eighth order since no carry is required from this order (which is used only for dividing) in the present machine, and there is no higher order. However, a complete carry trigger stage CY is provided for this order to demonstrate the manner in which the digit handling capacity of the machine may be expanded, and also to provide symmetry of the units and interchangeability of the units of the different orders. The transistor T26-tube V34 portion of the carry stage CY of the eighth order is required, however, for the "Carry-No-Carry" detection described below.

Similarly, no connections are provided from the distributor to the grids of tube V36 of the carry trigger circuits CY of the sixth, seventh and eighth PR–DD orders. In the first five PR–DD orders, however, (and also in the "below units" trigger circuits CY, Fig. 21*c*) respective lines 295 connect from the distributor to the grids of these tubes V36 to operate these carry stages during dividing to allow entry of "elusive 1's" in any of the first six PR–DD orders, as described more fully hereinafter.

Fig. 8 is illustrative of the patterns of operation which the triggers S1–S4 of a PR–DD order produce when digits such as "7" through "1" are added during subsequent transfer cycles. While these entries are typical of those which may be effected into a PR–DD order, they are not necessarily all-inclusive nor do they indicate only those occasions when automatic self-adjusting operations occur. Further these are not all-inclusive as to the occasions when a carry must be effective out of the order.

For example, in the present machine it is required that a "carry-on-a-carry" must be capable of being effected, i.e., when an order of the PR–DD Accumulator stands at the highest value digit and receives a carry from its next lower order, it must be able to effect a carry into the next higher order. This is achieved by making the gating pulse on line 234 (which enables the carry circuits CY of each of the PR–DD orders) of a longer time duration than the time required for each order to produce a carry indication when the order stands at "9" and its stage S1 is switched On by a carry signal received from the previous order. Referring again to the third PR–DD order (Figs. 20*c* and 20*d*), assume that this order stands at "9," i.e., with each of its stages S1, S2, S3, S4 and CY in Off status, as indicated in Fig. 8. Assume further that when, at carry time, the grid of tube V38 (Fig. 20*d*) of this stage is raised in potential by the positive voltage gate on line 234, a carry is produced from the next lower or second order. Since the carry stage CY of the third order is in Off status, as pointed out above, initially this tube V38 does not conduct and no carry signal is provided at this time to the next or fourth PR–DD order. However, the carry signal from the second PR–DD order causes stage S1 of the third PR–DD order (Fig. 20*c*) to be switched On. This switches On, in succession, stages S2, S3 and S4 and carry stage CY of the third PR–DD order. Since the grid of its tube V38 is still partly conditioned via diode D12 from the positive voltage gate on line 234, this tube conducts as soon as the associated carry stage CY is switched to On status, which thereupon causes stage S1 of the fourth PR–DD order (Fig. 20*c*) to switch in status and provides the required "carry-on-a-carry."

When multiplying with this multiplier-divider, the product result is formed in the PR–DD Accumulator. There must be a read-out, therefore, from the PR–DD Accumulator in order to record the result on the record card. It is required that read-out be effected from the four center orders (third, fourth, fifth and sixth) of the PR–DD Accumulator since only they receive the transfers of the multiplicand MC. During this operation, each of the four selected orders is impulsed through ten steps by pulses applied to its input terminal 54 as explained more fully hereinafter in connection with read-out. As each order passes from "9" to "0," a differentially timed impulse corresponding to the digit contained by the order is produced at its terminal 55PR connected to the cathode of tube V18 of stage S4. The adjusting circuits function upon read-out in the manner described previously when the PR–DD Accumulator receives MC or DR entries. Fig. 33 shows the pattern of operation effected by the four triggers comprising a PR–DD order in response to ten read-out impulses applied to its input 54 when an "8" is the digit initially standing in the order. Note that the resultant digit is an "8" and also that the read-out pulse is produced at "8" in the read-out cycle.

There has now been described the manner in which the PR–DD Accumulator receives entries of partial differential MC or DR values. It is seen that these values are represented by timed value impulses. While the detailed description has been limited to entries into a single PR–DD order, it is to be understood that entries are effected into a plurality of PR–DD orders concurrently. It is also to be understood that like digits comprising a partial differential value are entered concurrently in a plurality of PR–DD orders. Further, it has been pointed out that each timed value impulse directly effects operation of a particular trigger provided for storing such pulses whose position in time denotes a particular value or digit and also that entries are effected by use of binary coded pulses which are entered into accumulating circuits connected fundamentally in binary fashion.

Actually, the PR–DD Accumulator comprises groups of circuits connected for basic binary operation. Each group, however, possesses an automatically operated adjusting circuit which maintains the natural frequency based on the radix ten. Accordingly, the advantages of binary methods of adding are retained while at the same time manifestation and read-out in the tens notation are obtained. The description has pointed out the conditions which determine the instant at which the adjustments mentioned must take place, and the fact that two such adjustments per order are required, each occurring independently of the other. The method of effecting the adjustments is essential not only when MC or DR entries are made but also when a read-out is effected.

The manner of effecting reset of the PR–DD Accumulator is as follows. Initially, it should be reiterated that all stages S1–S4 are established in On status while each carry trigger CY is reset to Off status. This reset during multiplying is effected by returning line 8A through switch 138 (in the full-line position shown in Fig. 45*a*) and cam contacts P9 to line 8 (Fig. 45*a*). Opening of cam contacts P9 reduces the grid bias of tubes V18 of all the PR–DD Accumulator order stages and causes the latter to turn On following a read-out. During dividing operations switch 138 is set in its other (dotted-line) position shown in Fig. 45*a*, and the return for line 8A is then via switch 138 and cam contacts P8A, which upon opening cause the triggers to turn On just prior to read-in.

*Add Commutator*

As stated previously, the function of the Add or "A" Commutator is to produce and supply timed control potentials. The A commutator is employed during both multiplying and dividing operations and is associated with the MC–DRA Register. During multiplication, it controls the transfer of the multiplicand MC into the PR–DD Accumulator, while during division it controls the transfer of the divisor DR additively into the PR–DD Accumulator. The A Commutator also provides other controlling potenitals or impulses for purposes which will be described hereinafter. Basically it includes four stages, comprising trigger circuits, and has associated therewith two additional stages which operate not only in conjunction with this commutator but also in conjunction with the Subtract or S Commutator described hereinafter.

The basic A Commutator and the two additional stages normally operate as a closed ring. Under certain conditions, however, it may function as a start-stop device. One of the characteristics of the A Commutator is that the number of stages which may be operated is variable, i.e., the number of intervals (defined by the index points) comprising one complete cycle is variable. Accordingly, the length of a commutator cycle may be increased or shortened. This feature of the commutator's operation is dependent on the partial differential values formed by the MC–DRA Register.

If one or more orders of the MC–DRA Register contain only a single binary digit, i.e., either only "8's," only "4's," only "2's" or only "1's," the commutator cycle comprises three intervals defined by the index points. However, if an order contains more than one binary digit, the cycle will comprise a greater number of intervals. If, for example, the amount standing in the MC–DRA Register is "19" or "91," then the commutator cycle comprises four intervals. On the other hand, if the amount standing in the MC–DRA Register is "37" or "73" the commutator requires five intervals for a complete cycle. Further, if the MC amount is "87" or "78," then six intervals comprise a complete commutator cycle. It is evident from the foregoing that the patterns of partial differential values formed by the MC–DRA Register govern the number of intervals required by the A Commutator for one complete cycle of operation.

Figure 22A:
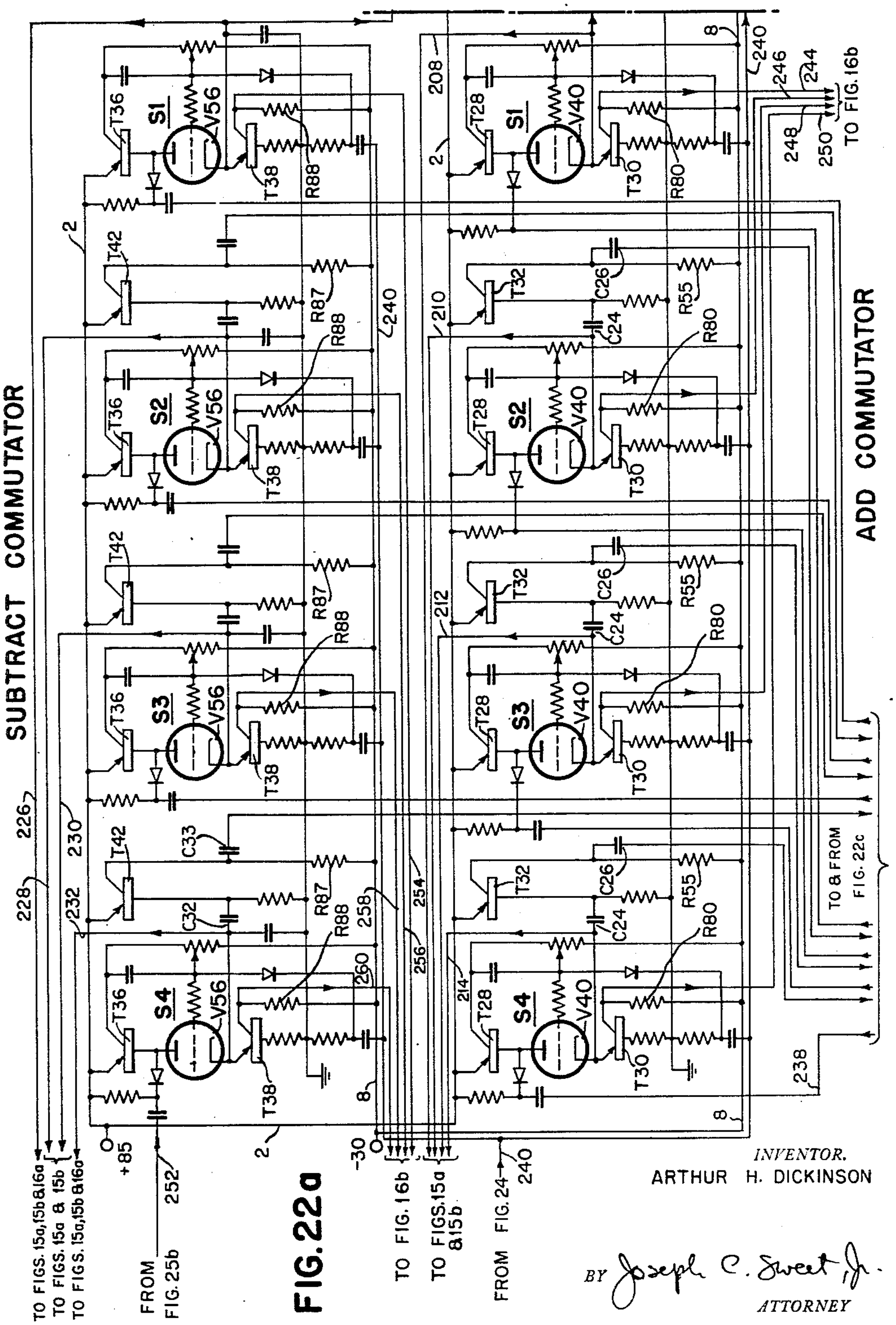
Figure 22B:
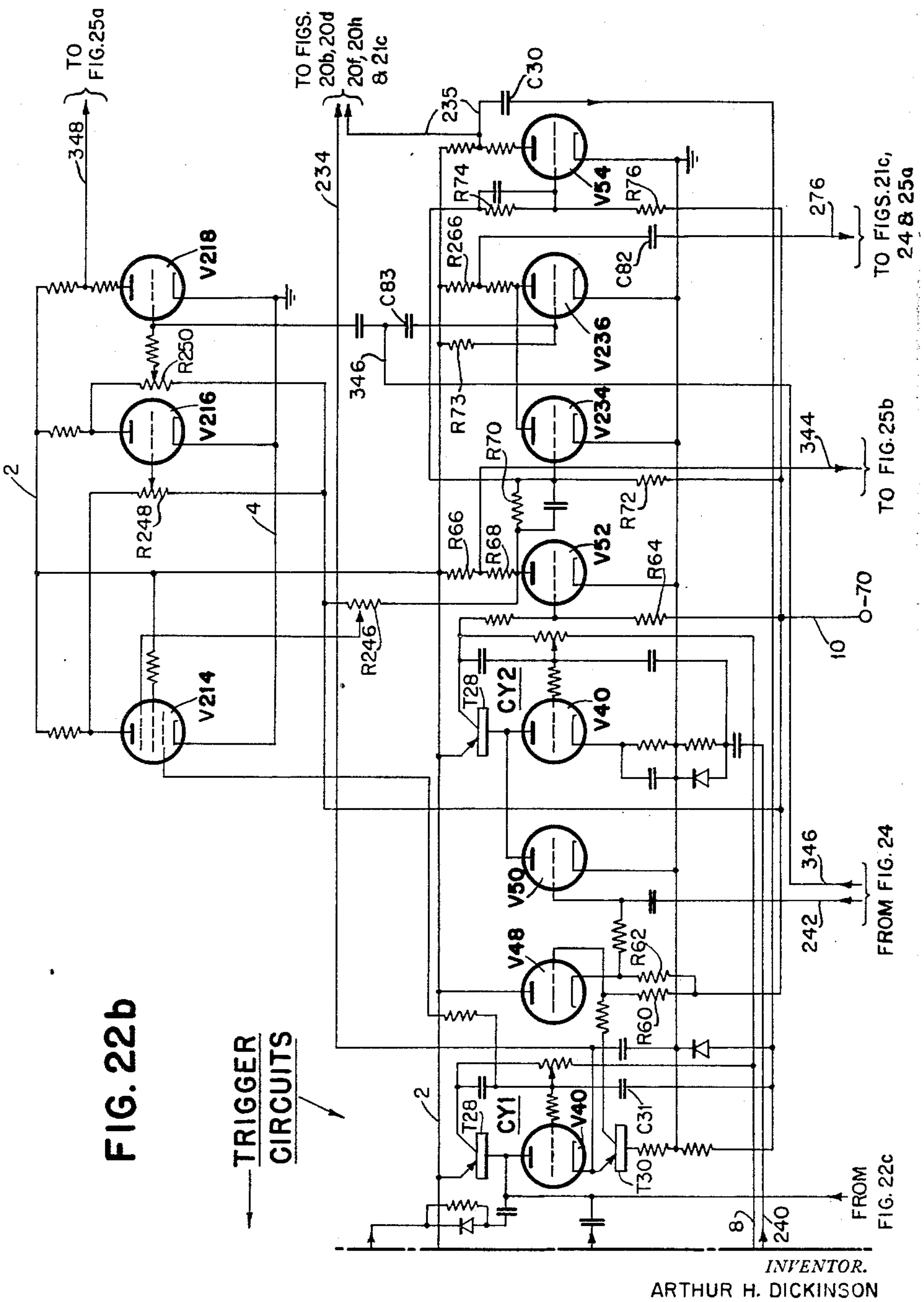
Figure 22C:
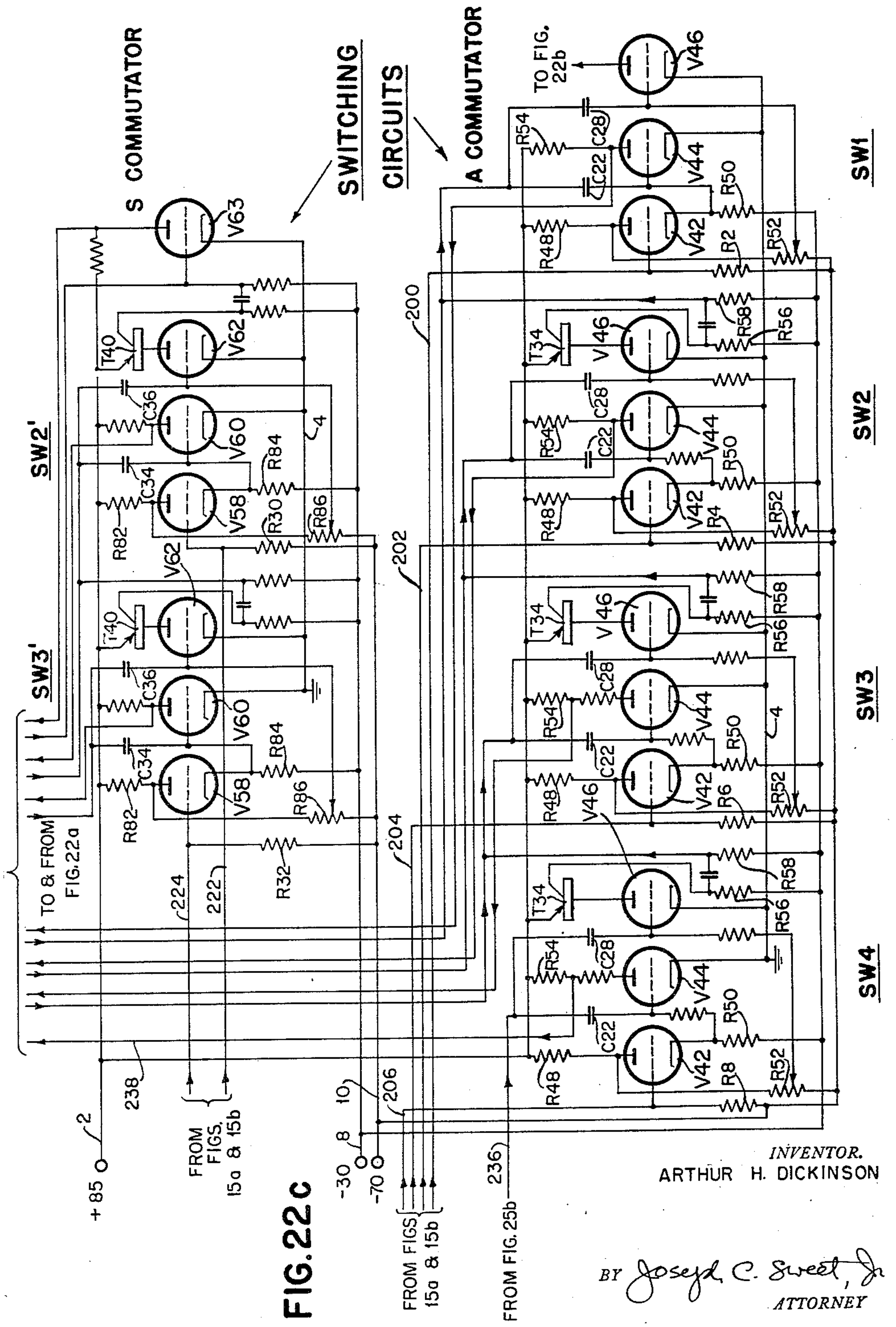

Referring now to the detailed circuit, shown in the lower half of Figs. 22*a* and 22*b*, the four basic stages are labelled S4, S3, S2 and S1 and the two additional stages are labelled CY1 and CY2. Each stage includes a transistor T28 and tube V40. In addition, in stages S4–S1 and stage CY1 the cathode of tube V40 returns to ground line 4 through the emitter-to-base circuit of supplementary transistor T30. In stage CY2 this transistor is omitted. In its operation the A Commutator operates in a manner such that stages S4, S3, S2, S1 and CY2 remain On for one interval defined by the index points. The trigger circuit of stage CY1 remains On for two such intervals, one of which overlaps that required by the operation of stage CY2.

Four control devices or switching circuits are provided, one ahead of stage S4 and the other three intermediate stages S4 and S3, S3 and S2, and S2 and S1, respectively, for the purpose of establishing the variable commutator operation referred to above. These switching circuits are labelled SW4–SW1 and each includes tubes V42, V44, V46, shown in Fig. 22*c*. In addition each of switching circuits SW3 and SW2 includes two transistors T32 and T34 (shown in Figs. 22*a* and 22*c*, respectively), and switching circuit SW4 includes a single transistor T34 (Fig. 22*c*) and switching circuit SW1 a single transistor T32 (Fig. 22*a*). The exact mode of operation of the A Commutator for different partial differential values standing in the MC–DRA Register will now be described.

Assume that only the digit(s) "8," i.e. either "88," "08," or "80" has been entered into the two-order MC–DRA Register described previously. In a manner previously described, the potential drop across resistor R8 (Fig. 22*c*) connected to line 206 is now high while the potential drops across resistors R6, R4 and R2 (Fig. 22*c*) connected to lines 204, 202 and 200, respectively, are low. The raised potential on resistor R8 renders tube V42 of switching stage SW4 more conductive. Accordingly, the potential drops across its associated plate resistor R48 and cathode resistor R50 are increased while that across shunting resistor R52 is decreased. The increased potential across cathode resistor R50 reduces the grid bias of associated tube V44 without, however, rendering it conductive. Initiation of the A Commutator cycle occurs when a positive pulse appears on start line or wire 236 in a manner to be described. This pulse is fed via condenser C22 to the grid of tube V44 of stage SW4, causing conduction of this tube. The resultant negative pulse produced on its plate load resistor R54 is applied via wire 238 to the base of transistor T28 of stage S4 in the A Commutator.

Accordingly, this stage S4 trigger is switched from Off to On status. Off line 240 continuously receives short negative pulses, one at each index point time, from tube V43 (Fig. 24), whose grid is connected to the wire 340 output of master pulse generator 114 (which goes positive at index point time) via a differentiating circuit comprising condenser C25 and resistor R53. Thus, one index point following the turning On of stage S4, the negative pulse on wire 240 causes stage S4 to switch Off.

It will be recalled that it was pointed out previously that the start pulse on wire 236 occurs simultaneously with one of the Off pulses on wire 240. Thus, this Off pulse on wire 240 tends to turn stage S4 Off at the same time that the start pulse on wire 236 tends to turn that stage On. However, trigger stage S4 is basically of the type disclosed in my copending application Serial No. 177,446, now Patent No. 2,872,592, and in its present modified form in my application Serial No. 312,318, now Patent No. 2,761,965, both referred to previously. In such a trigger circuit an On pulse takes precedence, so that even if an Off pulse is applied simultaneously therewith as in this case, the trigger circuit is nevertheless turned On.

The tube V40 cathode-transistor T30 emitter junction in stage S4 (Fig. 22*a*) is coupled via condenser C24 to the base of transistor T32 associated with switching stage SW3. When stage S4 switches Off, the fall in potential of the junction just mentioned causes a negative pulse to be applied via condenser C24 to the base of transistor T32, thereby increasing its emitter-to-base potential. As a result its collector current increases and the voltage across resistor R55 in its collector circuit rises.

The increase in potential across resistor R55 is applied as a positive pulse via condenser C26 concurrently to condensers C22 and C28 (Fig. 22*c*) in switching circuit SW3 intermediate stages S4 and S3 of the A Commutator. Since the potential of resistor R6 is low due to the absence of any stored digit(s) "4" in the MC–DRA Register as assumed above, the conduction of associated tube V42 is low and the potential drop across resistor R52 shunting the latter is high. Accordingly, the grid bias of associated tube V46 is reduced, although not sufficiently to cause the latter to conduct in the absence of the previously mentioned positive pulse produced across resistor R55 of stage SW3 (Fig. 22*a*) and applied to condenser C28 (Fig. 22*c*). The concurrent occurrence of this positive pulse, however, causes tube V46 of stage SW3 to conduct. This conduction increases the emitter-to-base potential of the related serially-connected transistor T34 and a positive pulse is produced on both resistors R56 and R58. The positive pulse on resistor R58 is concurrently applied to condensers C22 and C28 of switching circuit SW2 intermediate stages S1 and S2. Since the potential drop across resistor R4 is low, due to the absence of any stored digit(s) "2" in the MC–DRA Register as assumed above, this positive pulse last-mentioned is effective to cause conduction of tube V46 and related serially-connected transistor T34 in this circuit. The resultant positive pulse on the related resistor R58 similarly renders tube V46 in switching circuit SW1 intermediate stages S1 and CY1 conductive since the potential of resistor R2 is low due to the absence of any stored digit(s) "1" in the MC–DRA Register as assumed above. The conduction of this tube V46 effects the turning On of the first carry trigger CY1 (Fig. 22*b*).

It will be recalled that the MC–DRA Register was assumed to contain a partial differential value involving only "8's." Accordingly, in view of this pattern, the A Commutator need only supply control potentials required for the transfer of an "8" partial differential value out of the MC–DRA Register. Stated otherwise, the amount standing in the MC–DRA Register did not require operation of stages S3, S2 or S1, and the commutator cycles requiring their operation were eliminated.

Thus far the operation of the A Commutator up to and including the turning On of stage CY1 has been described. With stage CY1 On, transistor T30 thereof is in high conduction status and the voltage drop across its load resistor R60 is large, rendering normally-conducting tube V48 even more conductive. The increased potential drop across cathode resistor R62 of tube V48 decreases the grid bias of tube V50 without causing conduction thereof. Wire 242 receives a short positive pulse at each index point time from transistor T31 (Fig. 24), whose base is coupled via differentiating condenser C29 to line 342 of master pulse generator 114, described below. The first impulse received on wire 242 following the turning On of stage CY1 is effective to cause tube V50 to conduct, thereby turning On stage CY2, which includes a transistor T28 and tube V40. Stage CY2 remains On for one commutator interval defined by the index points, the next pulse on Off line 240 being coupled to the grid of tube V28 of stage CY2 to shut the latter Off. At this time stage CY1 is also switched Off through the following circuitry.

Resistor R64 is included in the collector circuit of transistor T28 of stage CY2. When stage CY2 is On, the voltage drop across resistor R64 is high and tube V52 is conductive. With tube V52 conductive, the voltage drops across its series plate load resistors R66 and R68 are high while those across its series shunting resistors R70 and R72 are low. Similarly, the potential drops across resistors R74 and R76 (in parallel with resistors R70 and R72) are low and tube V54 is non-conductive.

When stage CY2 switches Off, tube V52 becomes non-conductive and the resultant voltage drop across resistor R76 increases sufficiently to render tube V54 conductive. The negative pulse produced on plate load resistor R78 of tube V54 is fed via line 235 and condensers C30 and C31 to the grid of tube V40 of stage CY1, switching the latter to Off status concurrently with the turning Off of stage CY2.

One complete cycle of operation of the commutator has been described in detail for a specific partial differential value standing in the MC–DRA Register. The manner in which three potential commutator intervals were omitted or eliminated has also been described. Fig. 6 shows diagrammatically the operation of the A Commutator under the conditions just described.

Assume next that the amount entered and standing in the MC–DRA Register is composed solely of the digit(s) "6" or a combination of binary digits adding up to "6," i.e., that the amount is "66," "06," "60," "24" or "42." The manner in which the A Commutator then automatically eliminates operates for unused stages S4 and S1 is as follows. From the description given so far, it will be recalled that the result of any of the aforementioned entries in the MC–DRA Register is that the potential drops across resistors R6 and R4 (Fig. 22*c*) are large while those across resistors R8 and R2 (Fig. 22*c*) are small. In view of the fact that the potential drop across resistor R8 is small, tube V42 of switching stage SW4 is relatively non-conductive and the potential drop across its shunting resistor R52 is low. Accordingly, the pulse on start line 236 initiating operation of the commutator is non-effective as regards tube V44 of stage SW4 but does render the associated tube V46 conductive. The output of switching circuit SW4 preceding stage S4 of the A Commutator appears on collector resistor R58 of stage SW4 as a positive pulse, which is then fed to condensers C22 and C28 associated with switching circuit SW3 intermediate stages S4 and S3 of the A Commutator.

The increased potential across resistor R6 makes associated tube V42 more conductive and the current flow through cathode resistor R50 thereof larger. Accordingly, the above-mentioned positive pulse on resistor R58 of stage SW4 is effective through condenser C22 of stage SW3 to cause tube V44 thereof to conduct. The resultant negative pulse on its plate load resistor R54 switches On stage S3 of the A Commutator (Fig. 22*a*) and the next pulse on wire 240 switches this stage Off. When this occurs, transistor T32 following stage S3 of the A Commutator produces a positive pulse on its collector resistor R55. This pulse is applied to condensers C22 and C28 of switching circuit SW2 (Fig. 22*c*) intermediate stages S2 and S1 of the A Commutator. Tube V44 of stage SW2 conducts in response to this pulse in view of the fact that the voltage drop across resistor R4 is large. The negative pulse in the anode circuit of this tube V44 switches On stage S2 of the A Commutator (Fig. 22*a*).

At the end of the second commutator interval when stage S2 switches Off in response to a pulse on wire 240, transistor T32 following stage S2 produces a positive pulse on its collector resistor R55. This is applied to switching circuit SW1 intermediate stages S2 and S1 of the A Commutator. Since the potential drop across resistor R2 is low, only tube V46 of stage SW1 is made conductive, and stage CY1 of the A Commutator is switched rather than stage S1. The commutator cycle terminates after the two intervals required for the operation of stages CY1 and CY2 as described above.

The foregoing has described the manner in which the A Commutator operates for a complete cycle of four intervals. Two of these are allocated for the purpose of effecting carries while the other two are required for the purpose of reading out from the MC–DRA Register. The partial differential values standing in the MC–DRA Register determine not only the number of intervals required by the commutator but also which stages are operated; in this case, stages S3 and S2.

Fig. 34 shows the operation of the A Commutator for four intervals as just described, i.e., stages S1 and S4 not operated.

From the above it is also apparent that, had the MC–DRA Register contained a "99," "09" or "90," "18" or "81," a commutator cycle would also require no more than four intervals. In that event, however, stages S4 and S1 would operate sequentially prior to stages CY1 and CY2, rather than stages S3 and S2 as just described.

Figs. 4 and 5 show the A Commutator operating for a total of six intervals and five intervals, respectively, four or three intervals, respectively, being required for read-out from the MC–DRA Register plus the invariable two intervals allocated for carry purposes.

The above description has covered the manner in which the A Commutator cycle length is determined by the partial differential values formed by the MC–DRA Register. It has also been pointed out that the purpose of the A Commutator is to provide timed control potentials for effecting read-out of partial differential values from the MC–DRA Register on a timed value impulse basis.

Wires 208, 210, 212 and 214 link the A Commutator with the MC–DRA Register. The suppressor grids of tubes V2 of stages S4 of all orders of the MC–DRA Register (Figs. 15*a* and 15*b*) are connected via wire 214 to the A Commutator stage S4 tube V40-transistor T30 junction (Fig. 22*a*). Accordingly, whenever stage S4 in the A Commutator switches On, the bias of these suppressor grids is reduced substantially to zero. In a similar manner, wires 212, 210 and 208 link the stages S3, S2 and S1, respectively, of the MC–DRA Register and the A Commutator. The Carry On and Carry Off outputs derived from carry stages CY1 and CY2 are available at wires 234 and 235, respectively (Fig. 22*b*).

It is to be noted that no stage S4, S3, etc. of the A Commutator is operated unless a correspondingly valued digit comprises a partial differential value entered and stored in the MC–DRA Register. It is, of course, not necessary that such a digit be present in each MC–DRA order, but only in at least one order. The manner in which the proper timed control potential is produced in the required read-out circuit or circuits is under control of the status of the MC–DRA triggers, as previously described.

It is required that the A Commutator provide additional timed control potentials for use in that portion of the machine termed the Distributor, described in detail hereinafter. As mentioned previously, each stage S4, S3, etc. of the A Commutator includes a supplementary transistor T30. Whenever any stage of the A Commutator is On, its associated transistor T30 is highly conductive and the potential drop across collector resistor R80 thereof is high. The output of the transistors T30 operated by stages S1, S2, S3 and S4 of the A Commutator are applied to wires 244, 246, 248 and 250, respectively leading to the Distributor (Figs. 18*a* and 18*b*) via circuits shown in Fig. 16*b*.

No special reset circuit is required to adjust the initial status of the A Commutator stages. This is true also of the supplementary trigger stages CY1 and CY2. It is possible that the aforementioned triggers may establish momentarily a variegated On and Off pattern upon initial application of power to the various lines and to the heaters of the tubes. However, as soon as the pulses on wires 240 and 242 reach full amplitude, any stages which may thus be On are turned Off, and remain in this status until the machine is required to effect computations for the first record card.

*Subtract commutator*

As mentioned previously, the function of the Subtract or "S" Commutator also is to produce and supply timed control potentials. The S Commutator is employed during dividing operations only and is associated with the DRS Register. During dividing, it controls the transfer of the divisor DR into the PR–DD Accumulator subtractively. In addition, the S Commutator provides other controlling potentials or impulses for purposes to be described hereinafter. The S Commutator basically includes four stages, again labelled S1 through S4, and each comprising trigger circuits. Also, as pointed out previously in connection with the description of the A Commutator, the carry stages CY1 and CY2 previously described are shared by and operate in conjunction with the S Commutator. The S and A Commutators are not required to operate concurrently, but stages CY1 and CY2 are required to function whenever one or the other commutator operates.

The S Commutator together with stages CY1 and CY2 normally operate as a closed ring. Under certain conditions, however, it may function as a start-stop commutator. One of the characteristics of the S Commutator is that two stages operate invariably while the remaining two operate variably. In other words, the number of intervals comprising one complete cycle is variable but never less than four. Accordingly, the length of a commutator cycle may be increased or shortened. This feature of the commutator's operation is dependent on the partial differential value or values entered into and stored in the DRS Register.

If one or more orders of the DRS Register contains only "4's" or "2's," the commutator cycle comprises five intervals. However, if both "4's" and "2's" are entered in the DRS Register, i.e., if the amount standing in the DRS Register is "24" or "42," then the commutator cycle comprises six intervals. The presence of "8's" or "1's" has no effect on the number of commutator intervals inasmuch as a subtractive transfer of the divisor DR into the PR–DD Accumulator always requires a "9" and a "1" as previously stated. It is evident from the foregoing that the patterns of partial differential values standing in the DRS Register governs the number of intervals required by the S Commutator for one complete cycle of operation.

Referring now to the detailed circuit, shown in the upper half of Fig. 22*a*, each of the four stages (again labelled S4, S3, S2 and S1) includes a transistor T36 and tube V56. The cathode of each tube V56 returns to ground line 4 through the emitter-to-base circuit of a respective supplementary transistor T38. In its operation the S Commutator operates in a manner such that stages S4, S3, S2 and S1 thereof remain On for one commutator interval defined by the index points. Stages CY1 and CY2 (Fig. 22*b*), when operated by the S Commutator, are respectively On for two and one such commutator intervals.

Switching circuits SW3′ and SW2′ (shown mainly in the upper half of Fig. 22*c*) are provided intermediate stages S4 and S3 and stages S3 and S2 for the purpose of establishing the variable commutator operation referred to above. These switching circuits each comprise tubes V58, V60 and V62, and transistors T40 and T42, transistors T42 being shown in Fig. 22*a*. In addition, a transistor T42 (Fig. 22*a*) and tube V63 (Fig. 22*c*) is included between stages S2 and S1.

The exact mode of operation of the S Commutator for different partial differential values standing in the DRS Register is as follows. Assume now that either "44," "04," or "40" has been entered into the DRS Register, i.e., the entry includes only the digit(s) "4." As described previously, the potential drop across resistor R32 (Fig. 22*c*) will then be high while the potential drop across resistor R30 will be low. The raised potential across resistor R32 renders tube V58 of stage SW3′ more conductive, and accordingly, the potential drops across its plate load resistor R82 and cathode resistor R84 are increased while that across its shunting resistor R86 is decreased. The increased potential across this resistor R84 reduces the grid bias of tube V60 of stage SW3′ without, however, rendering it conductive.

It will be recalled that initiation of an S Commutator cycle occurs when a negative pulse derived from the AS–FR trigger circuit (Fig. 25*b*) appears on line or wire 252 in a manner described more fully hereinafter. This pulse causes stage S4 of the S Commutator (Fig. 22*a*) to switch On and it remains in this status until turned Off by the next negative pulse on Off line 240.

The S Commutator stage S4 tube V56-transistor T38 junction is coupled via condenser C32 to the base of transistor T42 following stage S4. When stage S4 switches Off, the fall in potential of this junction thus increases the emitter-to-base potential of transistor T42. As a result, the voltage across resistor R87 in its collector circuit rises. This change in potential across resistor R87 is applied as a positive pulse via condenser C33 concurrently to condensers C34 and C36 (Fig. 22*c*) in switching circuit SW3′ intermediate stages S4 and S3 of the S Commutator. Since, as described above, the raised potential across resistor R32 produces the previously mentioned positive pulse across resistor R86 biasing tube V60 of stage SW3′, the simultaneous application therewith of this additional positive pulse to the grid of this tube via condenser C34 causes this tube V60 to conduct. This action causes stage S3 of the S Commutator (Fig. 22*a*) to turn On and remain On for one commutator interval, at the end of which it is switched Off by the next pulse on Off line 240.

Since the potential of resistor R30 (Fig. 22*c*) is low, the action of this stage S3 in turning Off results in bypassing stage S2 of the S Commutator and the turning On of its stage S1 in the manner previously described. One commutator interval later the negative pulse on Off line 240 causes stage S1 to turn Off. The attendant drop in potential of the tube V56-transistor T38 junction of stage S1 is applied as a negative pulse to stage CY1 (Fig. 22*b*), causing the latter to turn On and thereby initiating the carry portion of an S Commutator cycle.

It will be recalled that the DRS Register was assumed to contain a partial differential value involving only "4's." Accordingly, in view of this pattern, the S Commutator need only supply control potentials required for the transfer of the partial differential value "4" out of the DRS Register. Stated otherwise, the amount standing in the DRS Register did not require operation of stage S2. The manner in which control circuits operate to eliminate idle commutator cycles is now apparent.

While the operation of the S Commutator has been described in detail only up to and including the turning On of stage CY1, the operation of both stages CY1 and CY2 for the two succeeding commutator intervals is similar to that previously discussed in connection with the A Commutator, and hence need not be repeated.

Fig. 35 shows diagrammatically the commutator's operation under the conditions just described.

From the foregoing it is apparent that were the DRS Register to contain only "2's," the S Commutator would likewise operate for five intervals. Also, it is apparent that were the digits "42" or "24" to be entered in the DRS Register, six commutator intervals would be required.

One complete cycle of operation of the S Commutator has been described in detail for a specific partial differential value standing in the DRS Register. The manner in which the S Commutator cycle length is determined by the partial differential values, formed by the DRS Register, has been described. It has also been pointed out that the purpose of the S Commutator is to provide timed control potentials for effecting read-out from the DRS Register of partial differential values on a timed value impulse basis.

Wires 226, 228, 230 and 232 link the S Commutator with the DRS Register. All suppressor grids of tubes V22 of stages S4 in the orders of this register (Figs. 15*a* and 15*b*) are connected via wire 232 to the S Commutator stage S4 tube V56-transistor T38 junction. Accordingly, whenever stage S4 in the S Commutator switches On, the bias of the aforementioned suppressor grids is reduced to zero. In a similar manner, wires 230, 228 and 226 link the stages S3, S2 and S1, respectively, of the DRS Register and the S Commutator.

It is to be noted that while stages S4 and S1 of the S Commutator always operate, neither stage S3 nor stage S2 thereof is operated unless a correspondingly valued digit comprises a partial differential value entered and stored in the DRS Register. It is, of course, unnecessary that such digit be present in each DRS order; its presence is required in only one order thereof. The manner in which the corresponding timed control potentials are produced in the required read-out circuit or circuits is under control of the status of the DRS Register triggers, as previously described.

It is required that the S Commutator provide additional timed control potentials for use in that portion of the machine termed the Distributor, described in detail hereinafter. Each stage S4, S3, etc., of the S Commutator includes a supplementary transistor T38 (Fig. 22*a*), as mentioned previously. Whenever a stage of the S Commutator is On, its associated transistor T38 is highly conductive and the potential drop across its collector resistor R88 is high. The output of the transistors T38 operated by stages S1, S2, S3 and S4 of the commutator are applied to wires 254, 256, 258 and 260, respectively, leading to Fig. 16*b*.

Like the A Commutator, no special reset circuit is required to adjust the initial status of the stages comprising the S Commutator. As pointed out previously, it is possible that the triggers of the commutator may establish momentarily a variegated On and Off pattern following application of power to the various lines and to the heaters of the tubes. However, as soon as the pulses on Off line 240 reach full amplitude, any stages which may be On are turned Off and remain in this status until the machine is required to effect computations for the first record card.

*Pulses to CS (column shift)*

In the preceding description, in connection with the MC–DRA and DRS Registers shown in Figs. 15*a* and 15*b*, the manner of producing potential changes on resistors R10 in the respective orders has been discussed. These potential changes are representative of digits to be read out and such changes have a duration of one or more commutator intervals defined by the index points. Further, these changes are produced by either the A Commutator or the S Commutator as explained above. It is required that any such change result in one or a plurality of timed value impulses occurring at mid-index point times.

Referring to resistor R10 in the units order (Fig. 15*b*), this is part of a voltage divider which also includes resistors R90 and R92, these three resistors being connected in the order named between positive supply line 2 and negative supply line 8C. The junction of resistors R90 and R92 connects to the grid of tube V64, shown in the upper right-hand corner of Fig. 15*b*. This tube and associated tubes V66 and V68 form a sequencer circuit SEQ. When the anode circuits of all of the gated pentodes V2 and V22 of the units orders of the MC–DRA and DRS Registers, respectively, are non-conductive, the voltage drop across resistor R92 is such as to maintain tube V64 zero-biased, i.e., conducting heavily. Accordingly, there is high current flow through tube V64 and resistor R94, which is the common plate load resistor for tubes V64 and V66. Under this condition the junction of resistor R94 and tubes V64 and V66 remains relatively unchanged in potential, even though tube V66 periodically shifts from conducting to non-conducting status as negative pulses are applied to the grid thereof from line 262.

Depending upon the partial differential values standing in the units order of the MC–DRA Register during a transfer cycle, the potential drop across resistor R10 increases. As a result the potential drop across resistor R92 decreases and tube V64 becomes non-conducting. The normal status of tube V66 is highly conductive in view of the fact that its grid returns to positive supply line 2 through resistor R95. The junction of the tube V66 grid and resistor R95 is coupled to wire 262, just referred to, by condenser C38. Negative pulses starting at mid-index point times and each lasting half a commutator interval are continuously applied to wire 262 from master pulse generator 114 (Fig. 24). Accordingly, at each mid-index point time the bias on tube V66 is increased, thereby shutting it Off. Whenever tubes V64 and V66 are concurrently shut Off, the potential drop across resistor R94 decreases. This is in the form of a sharp positive pulse, which is directly applied to the grid of cathode follower tube V68, rendering that tube more conductive. The output of tube V68 is derived from the junction of a voltage divider comprising resistor R93 and cathode resistor R96, and this output is further sharpened and applied to the units order wire 264 through a differentiating circuit comprising condenser C40 and resistor R97.

In a similar manner, timed value impulses are originated in the sequencer circuit SEQ of the tens order, sharpened and applied to its wire 264 (Fig. 15*a*).

Figure 36:
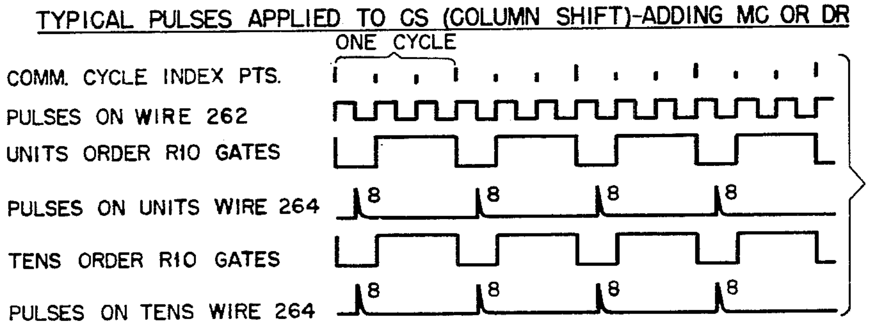
Figure 37:
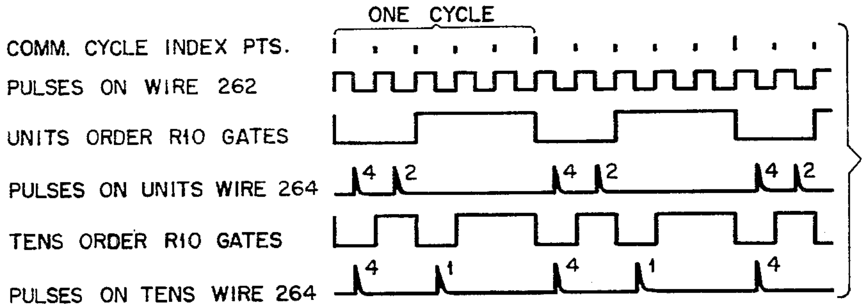
Figure 38:
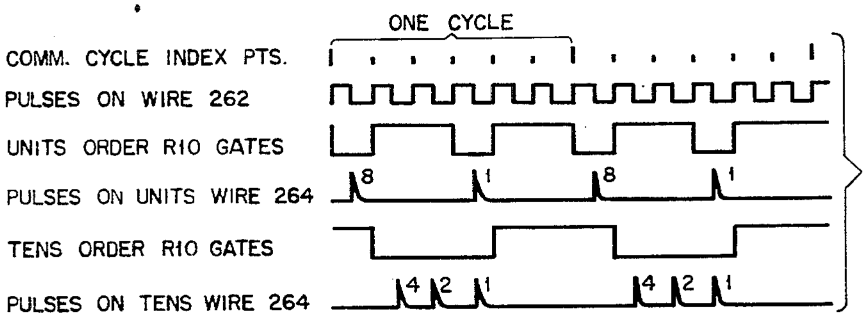

Figs. 36–38 show typical timed value impulses appearing on the wires 264 during a transfer cycle. Fig. 36 shows the pulses appearing on these wires when the numeral "88" entered and stored in the MC–DRA Register. Fig. 37 shows such pulses appearing on the same wires when the numeral "56" is entered and stored in MC–DRA Register. Fig. 38 shows such pulses appearing on these wires when the MC–DRA Register has stored therein the numeral "79." When transferring the multiplicand MC into the PR–DD Accumulator during a multiplying operation, only the MC–DRA Register is utilized, and the same is also true when the divisor DR is additively transferred during a dividing operation.

It has been previously explained that timed control potentials are produced on the same resistors R10 when a read-out of the divisor DR is effected subtractively from the DRS Register during a dividing operation. Accordingly, sharpened timed value impulses representative of the nine's complement of the divisor DR are applied to the wires 264 in a manner similar to that just described.

It has also been mentioned previously that when transferring the nines complemental divisor DR amount to the PR–DD Accumulator, it is necessary during each transfer cycle to introduce a "9" into the next higher accumulator order. In addition, it is also necessary to introduce an "elusive one" so that the true complement of the divisor DR is always applied to the PR–DD Accumulator. These entries are made as follows, in a circuit termed Compl. Ckt. in Fig. 10*a*.

Wire 232, which receives a control potential from stage S4 in the S Commutator, connects to the cathode of tube V70 (Fig. 16*a*) as well as to the suppressor grids of the stage S4 pentodes V22 in the DRS Register. The grid of tube V70 connects to ground line 4 through resistor R98 and to positive supply line 2 through resistor R99. Also, the anode of tube V70 returns to positive supply line 2 via resistor R100. With stage S4 of the S Commutator Off, tube V70 is in its more conductive state, and with stage S4 On, tube V70 is in its less conductive state. It will be recalled that stage S4 of the S Commutator is On for the first commutator interval during each cyclical operation of this commutator. With tube V70 then in its less conductive state, the voltage drop across resistor R100 is less and there is an accompanying increased potential drop across resistor R102. The grid of tube V72 is connected to negative supply line 10 via resistor R102, and the increased potential drop across this resistor therefore partially reduces the grid bias of tube V72. Wire 266 derives short positive pulses at mid-index point times from master pulse generator 114 via line 340 and tube 217 (Fig. 24) and is coupled to the grid of tube V72 via condenser C42. The next such pulse on wire 266 following the potential rise across resistor R102 is effective to render tube V72 conductive. The resultant negative pulse produced on plate load resistor R104 thereof is capacity coupled to the grid of normally On tube V74, rendering the latter non-conductive. The resultant positive pulse produced on plate load resistor R106 of tube V74 has a timed value of "8" and is applied to wire 268 leading to the Column Shift Gate Circuits (Figs. 17*a* and 17*b*).

A timed value of "1" is also required to complete the "9" entry previously referred to. This is obtained as follows. Wire 226 couples the S Commutator stage S1 trigger to the cathode of tube V76 (Fig. 16*a*) as well as to the suppressor grids of the stage S1 pentodes V22 in the DRS Register. The grid of this tube V76 returns to ground line 4 through the same resistor R98 referred to in connection with tube V70. Thus, when stage S1 of the S Commutator switches On during a cycle of its operation, tube V76 becomes less conductive and the voltage drop across its plate load resistor R108 decreases while that across resistor R110 increases. The grid of tube V78 connects to resistor R110, and with the potential across this resistor increased, the grid bias on tube V78 is somewhat reduced so that the next positive pulse appearing on wire 266 (which is also connected to the grid of tube V78 via condenser C44) causes tube V78 to conduct. The resulting negative pulse on plate load resistor R104, which tube V78 shares with tube V72, shuts off tube V74 in the manner previously described, and a "1" timed value pulse is applied to wire 268. It is therefore seen that tubes V72 and V78 act as a mixer circuit for causing timed value pulses representative of the extra "9" to be produced on wire 268. It will be noted that only when the S Commutator operates during a dividing operation are the two pulses representative of the "9" produced as just described and applied to wire 268.

The grid of tube V80 also connects to resistor R110 so that upon operation of stage S1 in the S Commutator its bias also is partially reduced. Since the grid of tube V80 is also coupled to wire 266 via the above-mentioned condenser C44, a positive pulse on wire 266 (referred to previously) causes full conduction of tube V80 and a negative pulse appears on its plate load resistor R112. This is capacity coupled to the grid of normally On tube V82, shutting it Off. The resultant positive pulse on plate load resistor R114 of the latter is applied to wire 270 leading to the CS Gates (Figs. 17*a* and 17*b*). Thus, once each cyclical operation of the S Commutator a "1" timed value impulse is applied to wire 270. As will be described in more detail hereinafter, this is the "elusive one" pulse commonly employed when subtraction is effected by entries of nines complemental amounts.

Figure 39:
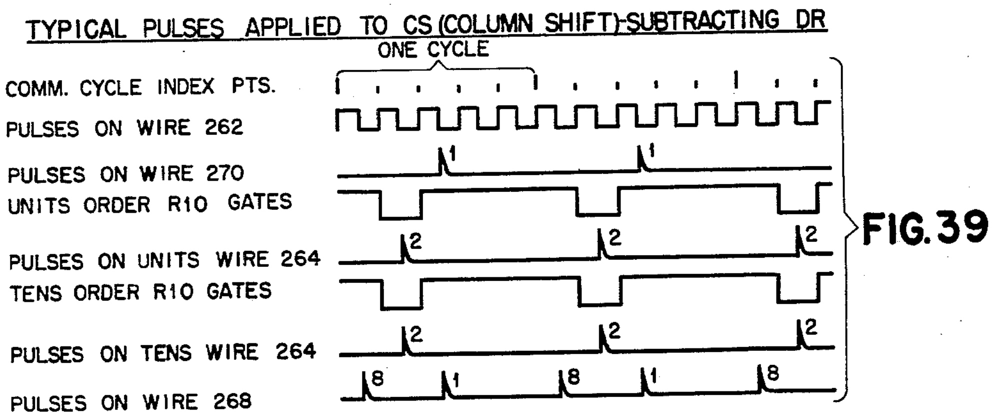
Figure 40:
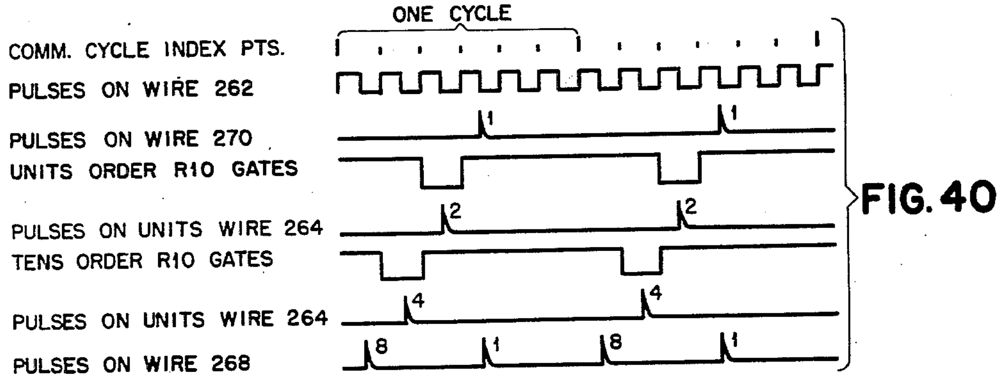
Figure 41:
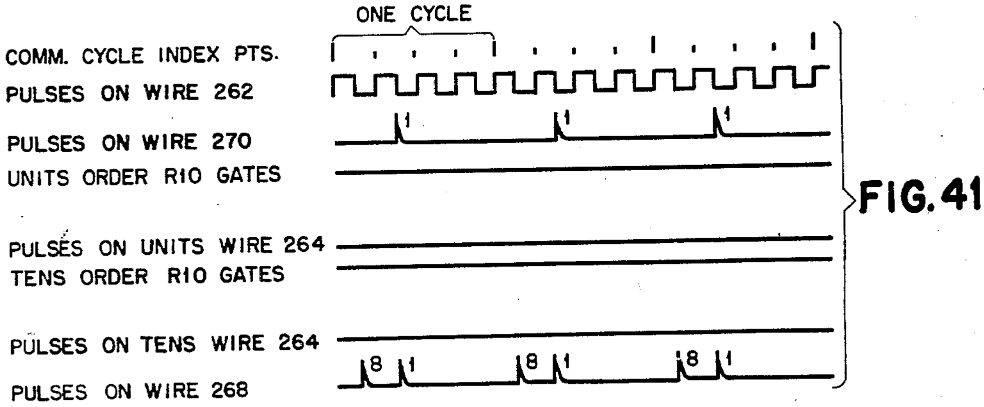

Fig. 39 shows the pulses appearing on wires 268, 264 and 270 when the numeral "22" stands in the DRS Register. Fig. 40 shows the timed value impulses appearing on the same wires when the amount standing in the DRS Register is "42." Fig. 41 illustrates the fact that no pulses appear on either units or tens wires 264 when the amount standing in the DRS Register is "00." However, note that wires 268 and 270 always receive "9" and "1" timed value impulses whenever the S Commutator operates.

The foregoing has described the manner in which timed control potentials are converted to timed value impulses. Consideration of this and the two previous sections reveals that the same patterns of timed pulses appear on wires 264 once each transfer cycle for different multiplicand (MC) and divisor (DR) partial differential values. This is apparent when it is realized that no more A Commutator cycles are required for transferring the numeral "91" than are required for the numeral "84." The pattern of pulses on the respective tens and units order wires 264 is the same in both cases. It is seen that the number of commutator cycle intervals defined by the index points is not necessarily indicative of the multiplicand (MC) or divisor (DR) value to be transferred. The subsequent discussion of the Distributor shows how this device evaluates the impulses for application to the PR–DD Accumulator.

It should be recalled that a further function of the S Commutator has also described, i.e., that of effecting production of an extra "9" and an extra "1" when transferring the divisor DR into the PR–DD Accumulator. The "9" is required to aid determination of the fact that the dividend DD no longer contains the divisor DR. The extra "1" is required to modify a divisor DR from a nine's complemental entry to a true complemental entry into the PR–DD Accumulator.

*Column shift*

The allocation of either MC or DR amounts to the proper columns of the PR–DD Accumulator is accomplished under the control of a column shift or CS Commutator and associated gate circuits. In both multiplying and dividing, the arrangement is such that the column shift operates in a higher to lower order sense. When multiplying, it is desired that no idle operations be performed for those orders of the MP Register which stand at "0." To effect this type of operation it is required that those stages of the CS Commutator which are called into action be under control of the presence of significant digits in the MP–Q Register orders. It is thus seen that the various stages comprising the CS Commutator must operate variably and sequentially. The CS Commutator has a further function when multiplying, namely to direct entries into the MP–Q Register and to cause its orders to retrogress to "0." When dividing, on the other hand, no column skipping is required and for this type of operation the CS stages operate invariably and sequentially. However, during a dividing operation, the CS Commutator has an additional function, namely to provide control potentials for two purposes. The first is to direct quotient entries into the proper columns of the MP–Q Register. The second is to operate, selectively, detecting devices which determine when the dividend amount must no longer receive subtractions or additions of the divisor DR.

Figure 16A:
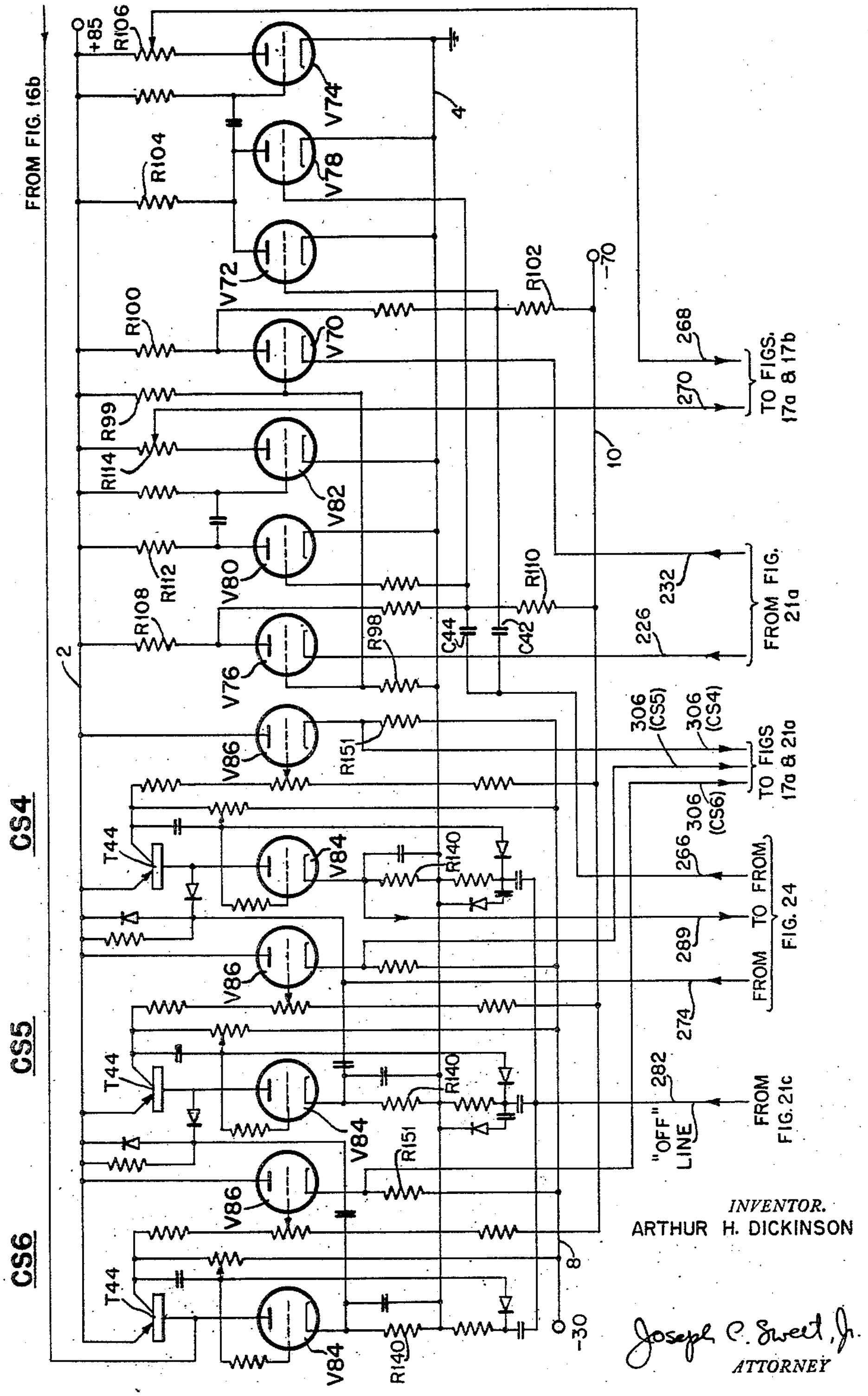
Figure 16B:
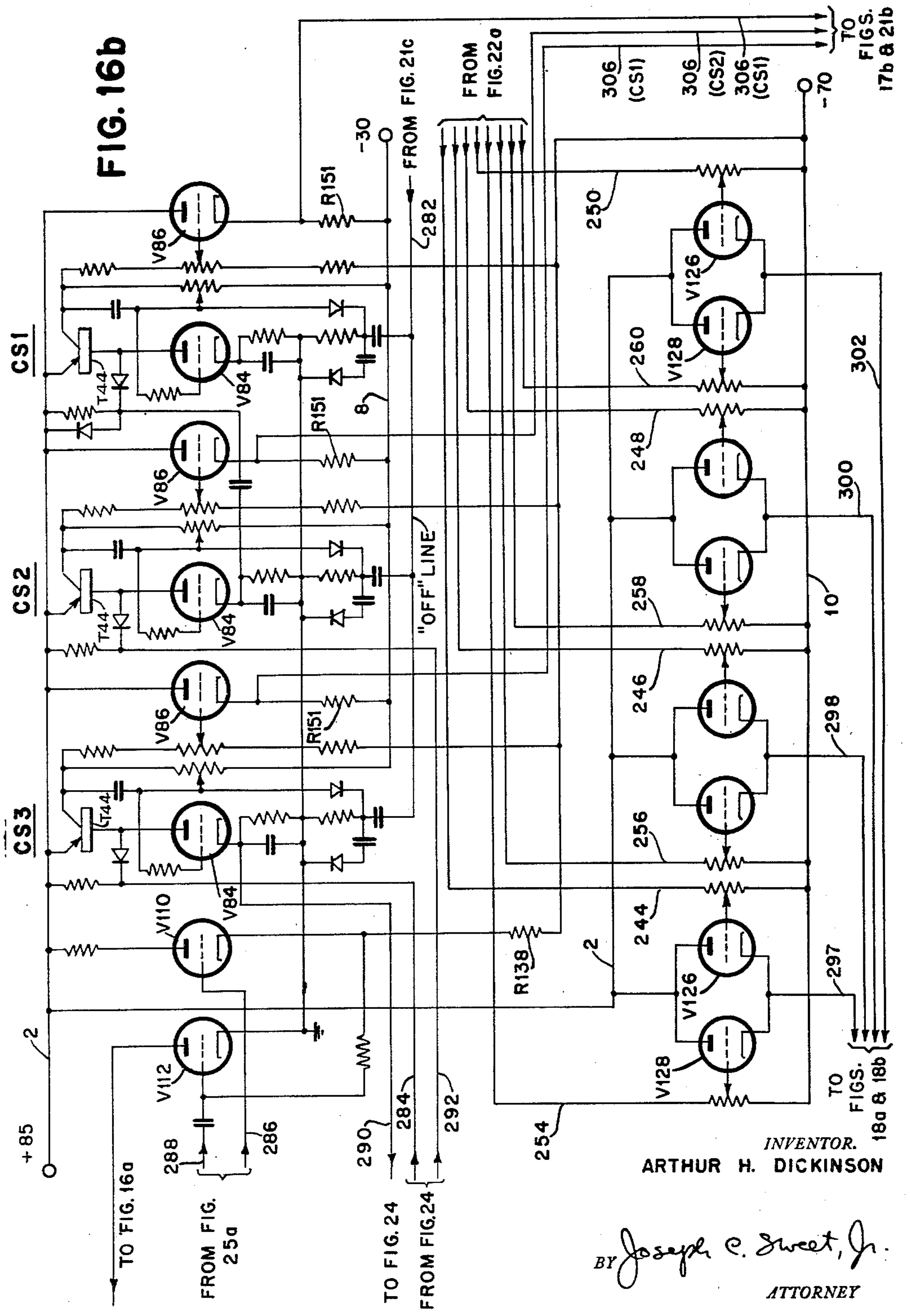
Figure 17A:
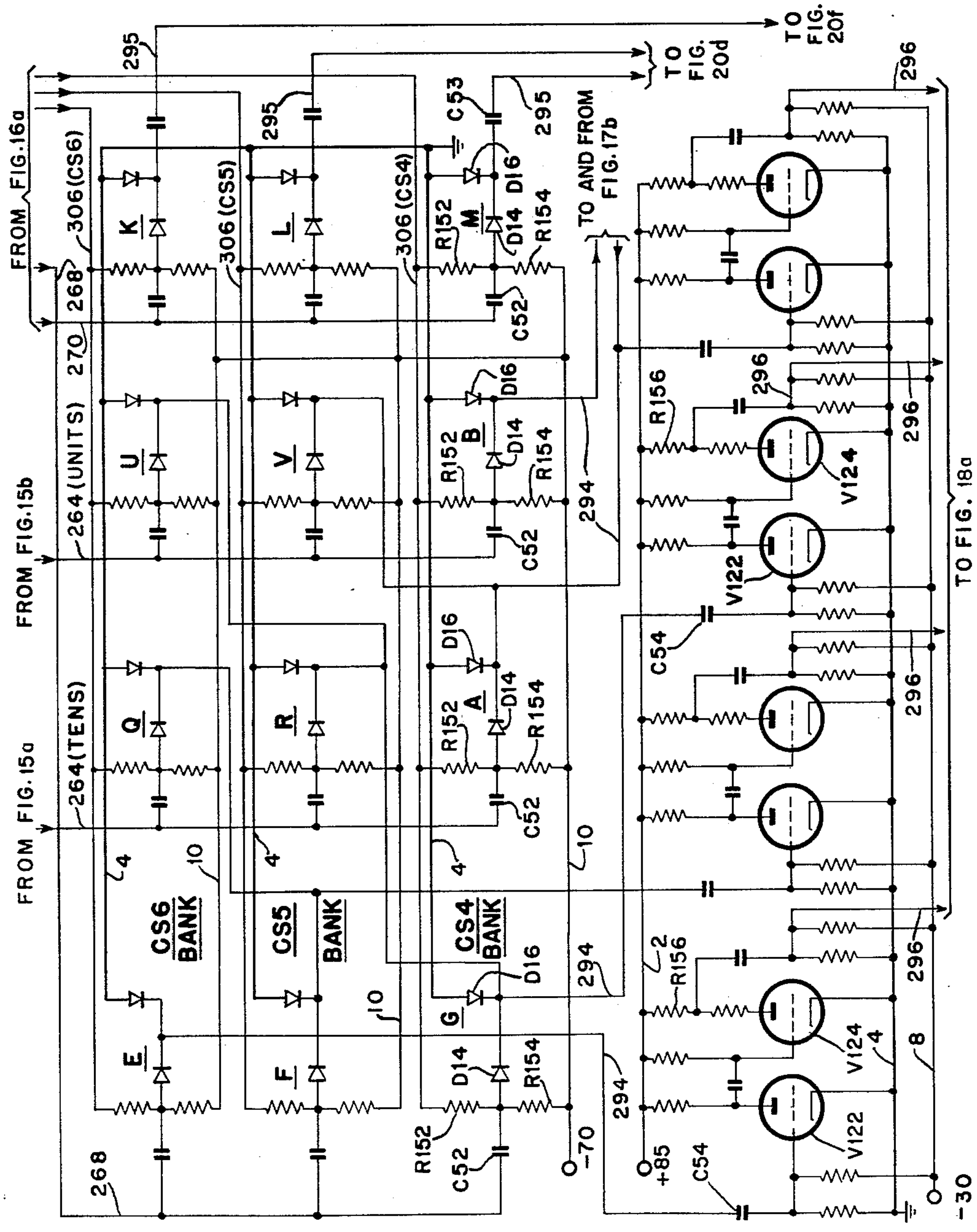
Figure 17B:
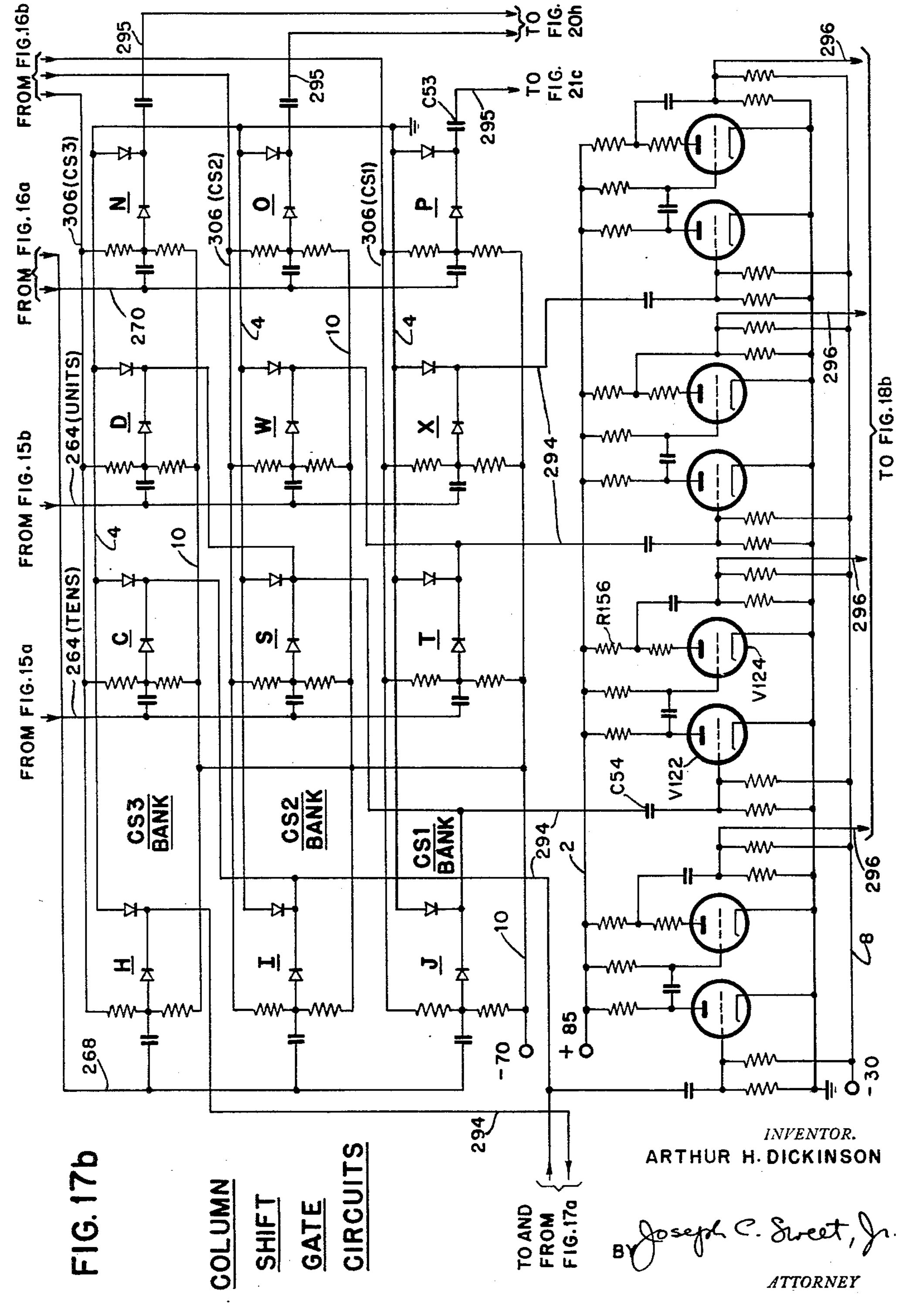

The CS Commutator, shown in the left-hand portion of Fig. 16*a* and the upper half of Fig. 16*b*, comprises six stages labelled CS6, CS5, CS4, CS3, CS2, and CS1. Each stage includes a trigger circuit, comprising a transistor T44 and a tube V84, and an associated tube V86. When the trigger circuit of any of these stages is On, the associated tube V86 is rendered more conductive. It will be recalled that, during multiplication, only stages CS4 and CS3 are utilized in the present machine. During multiplication by the tens multiplier digit, stage CS4 is switched On and remains On for a number of complete cycles of the A Commutator. Stage CS4 is switched Off when the MP–Q Register tens order reaches "0." The turning Off of stage CS4 is effective to turn stage CS3 On provided the MP–Q Register units order contains a significant digit. If stage CS3 is not turned On, the pulse produced by the switching Off of stage CS4 causes suspension of multiplying operations. On the other hand, if stage CS3 is turned On, it remains in that status until the multiplying operation for the units MP digit is completed, and then switches Off to suspend computing operations. While the above has assumed a significant tens multiplier digit, if there were none, stage CS4 would not turn On initially during multiplying, and instead stage CS3 would be turned On, as explained hereinafter.

Assume now that the MP amount is "50," i.e., that entries of "5" and "0" are made from the card into the fourth (tens) and third (units) orders, respectively, of the MP–Q Register. Following this entry, conduction of transistor T14 in the fourth order of the MP–Q Register (Fig. 23*c*) is high while that of transistor T14 in the third order is low. These transistors comprise respective Zero Detector Circuits. The two respective output wires 220 associated with the fourth and third orders connect to the grids of cathode follower tubes V88 and V90, respectively (Fig. 24). In view of the status of transistors T14 in the fourth and third MP–Q orders, the conduction of tube V88 is relatively high while that of tube V90 is low. With tube V88 highly conductive, the potential drop across its cathode resistors R116 and R118 is increased, thereby reducing the grid bias of tube V92 (Fig. 24) since the grid of that tube is connected to the junction of these resistors.

Initiation of a multiplying operation occurs when a positive pulse from transistor T66 (Fig. 25*a*), described hereinafter, is applied to multiply-start line 272. This pulse is coupled via condenser C46 (Fig. 24) to the grid of tube V92 to cause the latter to conduct. The resultant negative pulse at the plate of tube V92 is applied via wire 274 to the base of transistor T44 of stage CS4 (Fig. 16*a*). As a result of this pulse, stage CS4 is switched On and remains in this status for five complete cycles of the A Commutator.

Near the end of the fifth such cycle (more specifically during the first carry interval thereof, defined by the index points), the fourth MP–Q order returns to "0," and its transistor T14 (Fig. 23*c*) becomes less conductive, thereby reducing the current flow through tube V88 (Fig. 24) and its cathode resistors R116 and R118. As a result of this action, successive tube V94 (which had been conducting) shuts Off inasmuch as its grid is connected to the cathode of tube V88. When tube V94 goes Off, the potential drop across its plate resistor R120 decreases and that across resistor R122 (which is connected as a voltage divider with resistor R120 between positive supply line 2 and negative supply line 10) increases. A tap on resistor R122 is coupled to the grid of tube V96, as is wire 276.

Midway in each second carry interval defined by the index points, a positive pulse is produced on wire 276 by tube V236 (Fig. 22*b*), described hereinafter. The pulse thus occurring thereon during the carry interval of the commutator cycle when the fourth MP–Q order returned to "0," is added to the increased potential across resistor R122 and causes tube V96 to conduct. The cathode of tube V96 is in series with the emitter circuit of transistor T46, and the increased conduction of tube V96 thus causes a like condition in transistor T46 and its collector resistance R124.

The cathode of pentode V98 is connected to ground line 4 and its suppressor grid is connected to line 278. During multiplying operations, the potential of wire 278 is maintained at substantially that of line 4 (ground) by a trigger circuit including transistor T52 and tube V178 (Fig. 25*a*), described hereinafter, and coupled to line 278 via tube V180 and cathode follower V206. The rise in potential across resistor R124 (Fig. 24) is applied as a positive pulse to the control grid of tube V98, and the resulting negative pulse at its plate load resistor R126 is applied via wire 280 to the grid of normally zero-biased tube V100, shown in the upper portion of Fig. 21*b*. The positive pulse across plate load resistor R128 of the latter causes condition of the succeeding tube V102 and increased current flow through common plate load resistor R130 (Fig. 21*c*) of the latter and tube V154, thus producing a negative pulse which is applied to wire 282.

Wire 282 is coupled to the grids of the tubes V84 in each of stages CS1–CS6 (Figs. 16*a* and 16*b*), and this negative pulse thereon is effective to switch stage CS4 from On to Off.

It has been explained previously that, for the assumed multiplier value "50," the conduction of cathode follower tube V90 (Fig. 24) associated with stage CS3 (Fig. 16*b*) is relatively low inasmuch as a "0" stands in the third order of the MP–Q Register. Thus, current flow through its cathode resistor R132 is low and successive tube V104 biased therefrom is in Off status. The potential drop across plate load resistor R134 of tube V104 is low while that across resistor R136 (which is connected as a voltage divider with resistor R134 between positive supply line 2 and negative supply line 10 through multiply-divide switch 124) is high. The grid of tube 106 is biased from a tap on resistor R136. The positive pulse derived from resistor R124 when the potential thereacross increases and utilized to switch stage CS4 from On to Off, as previously described, is also coupled via condenser C45 to the grid of tube V106 and causes that tube to conduct. The resultant negative pulse produced at the common plate load resistor R137 of this tube and tubes V194 and V248 (Fig. 25*a*) is effective to terminate a multiplying operation, as will be described hereinafter in detail.

The foregoing has described the manner in which an order of the MP–Q Register containing a significant digit controls the turning On of its associated stage CS trigger. There has also been described the manner in which an MP order containing a "0" eliminates switching On of its associated column shift trigger. In this case, it was the higher order only in the MP–Q Register which contained a significant digit and, accordingly, when multiplication for the tens order was completed, hte multiplying operation terminated.

Had there been a significant digit in the third MP–Q order, the conduction of associated tube V90 (Fig. 24) would be relatively high and the potential drop across its cathode resistor R132 would be increased. Such increased potential drop would render successive tube V104 conductive and the potential drop across its shunting resistor R136 would be low. Thus the pulse produced on resistor R124 under the conditions previously stated would be ineffective to cause tube V106 to conduct, and the multiplying operation would not terminate at this time.

Instead, the increased potential drop across cathode resistor R132 of cathode follower V90 would partially reduce the bias of tube V108, shown to the left thereof and also biased thereby. The positive pulse on resistor R124 is also coupled, via condenser C47, to the grid of tube V108 and would thus cause this tube to conduct and produce a negative pulse upon its plate load resistor R135. This negative pulse is coupled to wire 284, which is connected to the base of transistor T44 of stage CS3 (Fig. 16*b*) to switch this stage to On status. It will then remain in this status as long as the third MP–Q order contains a significant digit. Eventually, however, this order reaches "0," and midway in the second carry interval in the cycle when this occurs, a positive pulse appears on wire 276 as mentioned previously. Since tube V90 (Fig. 24) becomes relatively non-conductive when the third order reaches "0" and its associated transistor T14 (Fig. 23*c*) becomes less conductive, the pulse on wire 276 is now effective to cause tube V106 to conduct and the multiplying operation to suspend, as will be described hereinafter in detail.

It should be noted that a negative pulse is produced upon wire 282 at mid-index point time during the second carry interval of each commutator cycle after Column Shift Stage CS4 is switched from On to Off. This pulse tends to turn Column Shift Stage CS3 Off if it is in On status. However, as pointed out previously in connection with the block diagram of the multiplication circuits, the trigger circuit utilized in each of the Column Shift Stages is of the type disclosed in my copending application Serial No. 177,446, now Patent No. 2,872,592, and in such a trigger circuit an On pulse takes precedence over an Off pulse applied simultaneously therewith. Therefore, as long as a significant multiplier digit remains in the third MP–Q Register order, Column Shift Stage CS3 will remain in On status due to simultaneous On pulses applied thereto from line 284 as follows.

As mentioned previously, the positive pulse derived from resistor R124 (Fig. 24) which produces the negative pulses on line 282 (via tube V98 and wire 280 leading to Fig. 21*b*) is also coupled via condenser C47 to the grid of tube V108 (Fig. 24). As long as the third MP–Q Register order contains a significant digit, tube V108 has its bias partially reduced due to the increased potential drop across cathode resistor R132 of tube V90 associated with the third MP–Q Register order. The above-mentioned positive pulse applied to the grid of tube V108 through condenser C47 causes this tube to conduct, thereby applying a negative pulse from its plate load resistor R135 to line 284. When the third MP–Q Register order does reach "0," however, in the course of the multiplication operation, cathode follower V90 becomes relatively non-conductive and reduces the bias of tube V108. The positive pulses now applied via condenser C47 to the grid of this tube are ineffective to cause it to conduct and no further pulses therefore appear on line 284. Accordingly, the first pulse appearing on line 282 and applied to Stage CS3 without the appearance of a concurrent pulse on line 284 is effective to switch this stage from On to Off. This occurs during the second carry interval of that A Commutator cycle in which the third MP–Q Register order returns to "0."

It will be recalled that it was assumed above that there was a significant digit in the tens order of the sample multiplier value ("50") but no significant digit in the units value. If this situation were reversed, the machine of the present invention would operate to switch Column Shift Stage CS3 to On status immediately at the beginning of the multiplying operation, skipping operation of Column Shift Stage CS4. This is accomplished as follows.

It will be recalled that the initial start pulse was applied from Start Line 272 and condenser C46 to tube V92 (Fig. 24) and that this caused a pulse to appear on line 274 leading to Column Shift Stage CS4 (Fig. 16*a*) inasmuch as tube V92 was partially biased by the conduction of previous tube V88. In the event that no significant digit was present in the fourth MP–Q Register order, tube V88 would be relatively nonconducting and no such pulse would be produced on line 274.

However, Start Line 272 is also coupled via condenser C49 to the grid of tube V109. The grid of this tube is biased from shunting resistor R123, connected in parallel with shunting resistor R122, and its plate and cathode are connected to the plate and cathode, respectively, of tube V96. When tube V88 is relatively nonconducting, succeeding tube V94 is in Off status and the potential drop across its shunting resistors R122 and R123 is increased. This increased potential across resistor R123 partially conditions tube V109, and the positive pulse applied to the grid thereof from line 272 via condenser C49 causes tube V109 to conduct. The cathode of tube V109, like the cathode of tube V96, above mentioned, is in series with the emitter circuit of transistor T46 and the increased conduction of tube V109 thus causes a like conduction in transistor T46 and its collector resistance R124. In a manner similar to that described above in connection with input pulses from line 276, this increased conduction of resistor R124 produces a positive pulse upon line 284, leading to Column Shift Stage CS3 (Fig. 16*b*), through condenser C47 and tube V108, if there is a significant digit stored in the third order of the MP–Q Register. The ensuing operation of the machine would then be as described above.

The detailed circuit elements comprising the blocks labeled C.F., SW. I, SW. II, C.F. & SW., and Stop Ckt., respectively, of Fig. 3*a* are believed clear from the above description and hence will not be delineated in detail.

When dividing, the Column Shift Stages or Triggers CS6 through CS1 operate sequentially and invariably. The number of commutator cycles during which a particular CS stage trigger remains On is determined by the number of times that the dividend contains the divisor DR. The manner of controlling the CS triggers during dividing is as follows.

When the machine is employed for dividing, the potential on wire 286 is at the higher of two values. This is controlled in a manner described hereinafter by a Multiply-Divide Trigger, including transistor T52 and tube V178 (Fig. 25*a*). The raised potential of wire 286 causes increased conduction through tube V110 (Fig. 16*b*) and an increased potential drop across its cathode resistor R138. This reduces the grid bias of tube V112, shown to the left thereof in Fig. 16*b*, without causing the latter to conduct. When a dividing computation is initiated, a positive pulse appears on wire 288 leading from the collector of transistor T70 (Fig. 25*a*). Tube V112 conducts in response to this positive pulse applied to its grid, and the resulting negative pulse at its plate is applied to the base of transistor T44 in stage CS6 (Fig. 16*a*), turning the latter On. When the dividend DD no longer contains the divisor DR subtractively, as described hereinafter a negative pulse is applied to wire 282 (which it will be recalled is connected to all the CS stage triggers), switching stage CS6 Off. The resulting fall in potential across its cathode resistor R140 is coupled to the base of transistor T44 of stage CS5, switching the latter On.

Stage CS5 remains On until the dividend DD no longer contains the divisor DR additively. At this time a negative pulse again appears on wire 282 and stage CS5 is switched Off. The negative pulse produced across cathode resistor R140 of stage CS5 switches stage CS4 On, and it remains in that status until the dividend DD again no longer contains the divisor DR subtractively. At this time the pulse on wire 282 switches stage CS4 Off.

It will be recalled that, during multiplying, stage CS3 was not necessarily switched On when stage CS4 switched Off. This is because it was desired to eliminate unnecessary commutator cycles when the units order multiplier digit stored in the third MP–Q Register order was "0." In dividing, however, there is no cycle elimination and stage CS3 must switch On whenever stage CS4 turns Off. Accordingly, the selective circuit employed in multiplying is not used in dividing.

The junction of tube V84 and resistor R140 of stage CS4 connects via wire 289 and condenser C48 to the base of transistor T48, shown in the lower right-hand portion of Fig. 24. The negative pulse produced at the cathode-resistor R140 junction of stage CS4 when the latter switches to Off status causes transistor T48 to increase its conduction and produce a positive pulse on its collector load resistor R142. Wire 286, at increased potential all during division, causes increased conduction through associated tube V114 and an increased potential drop across cathode resistor R144 of the latter. The positive pulse on resistor R142 plus the increased potential across resistor R144 is effective to cause tube V116 to conduct. The resulting negative pulse at the anode of tube V116 is applied to wire 284, which is coupled to the base of transistor T44 of stage CS3 (Fig. 16*b*). This negative pulse switches stage CS3 On and it remains in this status until the dividend DD no longer contains the divisor DR additively. At this time the resultant pulse on wire 282 switches stage CS3 Off.

Switching stage CS3 to Off status causes stage CS2 to turn On through a circuit substantially similar to the one intermediate stages CS4 and CS3 and utilized only during dividing. This similar circuit is also shown in the lower right-hand portion of Fig. 24 and includes wire 290, condenser C50, transistor T50 and its collector load resistor R146, tube V118 (controlled by the increased potential on wire 286 to produce an increased potential drop across its cathode resistor R148 during dividing), successive tube V120 which conducts when stage CS3 turns Off, and wire 292 upon which a resultant negative pulse appears and which connects to the base of transistor T44 of stage CS2 (Fig. 16*b*).

The manner in which stage CS2 thereafter switches stage CS1 to On status and the coupling between these stages is similar to that described in connection with stages CS6 and CS5. Note that either of stages CS2 and CS1, when On, is turned Off upon application of a negative pulse to wire 282.

It was mentioned previously that each stage CS trigger controlled an associated tube V86 When a stage CS trigger is On, its associated tube V86 is conductive. The cathode of each tube V86, such as the one associated with stage CS4 (shown in the central portion of Fig. 16*a*), connects to negative supply line 10 (—70 v.) via a respective line 306 and a respective resistor R164 (Fig. 21*a*), to negative supply line 8 (—30 v.) through a respective cathode resistor R151 (Fig. 16*a*), and also is returned to negative supply line 10 (—70 v.) through various resistors shown in Fig. 17*a*. These various resistors associated with each CS stage and the associated resistor R151 comprise the Column Shift Gate Circuits mentioned previously in connection with the block diagrams. It will be recalled that the Column Shift Gate Circuits controlled by line 306 from stage CS4 comprise Gate Circuits A, B, G, and M. Respective resistors R164 (Fig. 21*a* and 21*b*) connected to each line 306 are part of the "Carry/No-Carry" and Stepping Pulse Circuits described hereinafter in detail.

Each group of these various resistors (exclusive of resistors R151 and R164) controlled by line 306 of each CS stage includes four pairs of serially-connected resistors R152 and R154, as shown in Figs. 17*a* and 17*b*. One of the pairs of resistors R152, R154 is coupled at their junction to wire 268 via condenser C52. The pair associated with stage CS4 (see Fig. 17*a*) comprises part of gate G. Two of the other pairs of resistors R152, R154 are similarly coupled individually to units and tens wires 264, respectively, and the fourth pair of resistors R152, R154 is similarly coupled to wire 270. These pairs associated with stage CS4 comprise parts of gates B, A, and M, respectively. The junction of each pair of resistors R152, R154 is also returned to ground line 4 via serially-connected diodes D14 and D16, whose cathodes or bases are connected together as shown.

With stage CS4 in Off status, the conduction of its tube V86 (Fig. 16*a*) is low. The total potential across each pair of the associated four pairs of resistors R152 and R154 (Fig. 17*a*) is less than the potential difference between lines 4 and 10. Accordingly, each associated diode D16 operates in a forward direction while each associated diode D14 operates in a reverse direction, and the potential of each of these diodes D16, D14 junctions is substantially that of line 4.

With stage CS4 in On status, its tube V86 becomes more conductive, thus increasing the potential drop across each of these four pairs of resistors R152 and R154, but not so much so that the potential of the junction of each of the pairs of resistors R152, R154 rises above the potential of line 4. Accordingly, no output pulse is produced on output wires 294 inasmuch as the potential of the junction of the diodes D16, D14 remains substantially unchanged. On the other hand, with stage CS4 Off, appearance of a pulse on a wire such as wire 268 may raise the potential of the junction of any of the pairs of resistors R152, R154 to substantially that of line 4 without at the same time causing a pulse to appear on the respective output wire 294.

When stage CS4 is On concurrently with the appearance of a positive pulse on any of wires 264, 268, or 270, the potential across resistor R154 starts to rise above that of line 4. Now the situation with regard to diodes D14 and D16 reverses. That is, diode D14 operates in a forward direction and diode D16 operates in a reverse or high impedance direction. Thus the potential of the junction of the diodes D16, D14 is substantially that of the junction of the resistors R152, R154 and rises with respect to line 4. Accordingly, when a pulse appears on wire 268 concurrently with stage CS4 being On, an output pulse is produced by the gate and is applied to the respective output line 294.

Figure 7A:
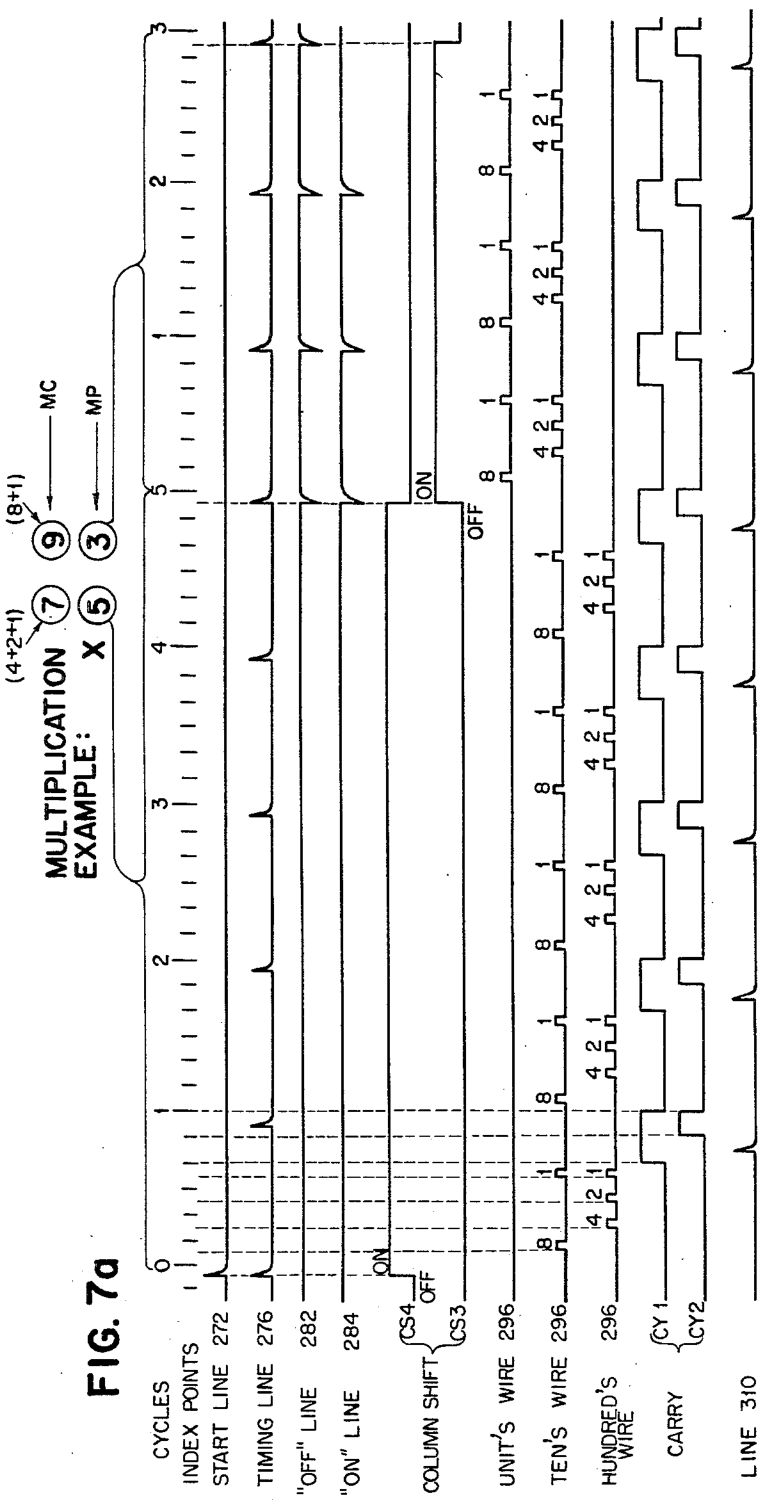

Whenever multiplying or dividing operations are effected, read-outs in the form of timed value impulses are effected either from the MC–DRA or DRS Registers. These timed value impulses appear cycle after cycle on wires 268, 264 and 270. Such impulses do not appear on output lines 294 unless a CS stage trigger is On. The manner in which impulses do appear on certain wires 294 has just been discussed for the condition when stage CS4 is On. It will be appreciated that the particular CS stage trigger which is On not only governs application of timed value impulses to lines 294 but also determines which selected ones of wires 294 receive the output pulses; i.e., each CS stage trigger controls a group of gate circuits similar to that controlled by stage CS4. These gate circuits are so interwired as to distribute output pulses to wires 294 (and associated wires 296—see Figs. 17*a* and 17*b*) in shifted relation as the CS stage triggers function sequentially. Fig. 7*a* shows operation of the column shift circuits for multiplying while Fig. 7*b* illustrates column shift operation during a dividing computation.

Figure 7B:
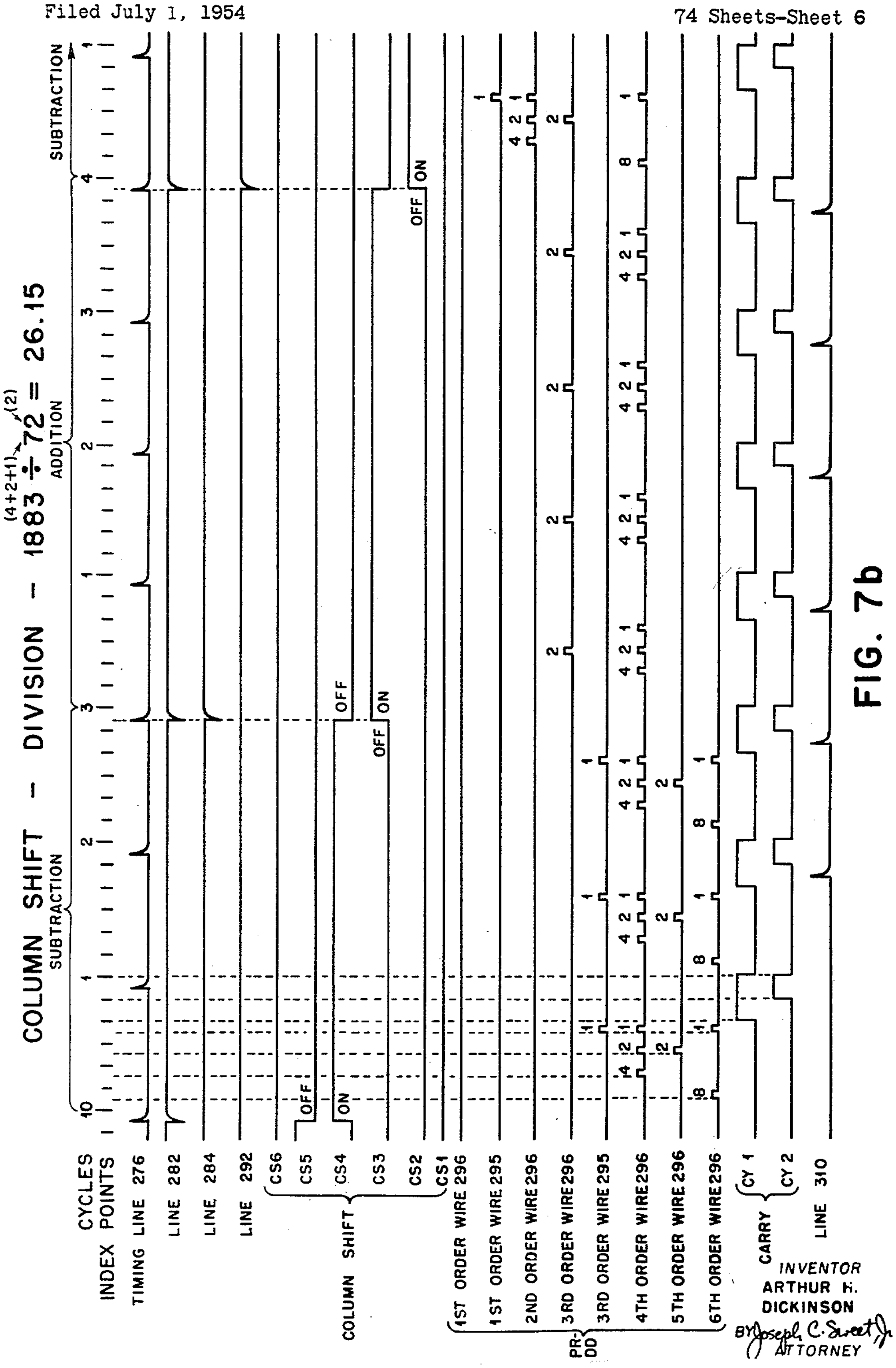

Consideration of Figs. 7*a* and 7*b* indicates that when any commutator cycle is less than the maximum of six intervals defined by the index points, those intervals which are required contain many possible combinations of value impulses. For example, if three intervals must be allocated for timed value impulses, the following are possible combinations: an "8," a "4" and a "1"; or, a "4," a "2" and a "1"; or, an "8," a "2" and a "1," etc. If only two intervals are required for timed value impulses, possible combinations are either an "8" and a "1," or an "8" and a "4," or a "4" and a "1," etc. From the foregoing it is seen that the pattern of timed value impulses appearing on output wires 294 (and 296) is not necessarily a measure of the magnitude of the data being transferred.

When dividing, the entry of an "elusive 1" is applied to the carry trigger CY located in that order of the PR–DD Accumulator which is of an order just lower than that receiving the lowest ordered DRS Register digit. In the eight order PR–DD Accumulator shown, the lowest orders DRS Register digit is entered in the sixth PR–DD order during the first subtraction cycle of a division operation. Therefore, during that cycle the "elusive 1" is entered into the carry trigger CY of the fifth PR–DD order. During the five successive column shift steps, the "elusive 1" need only be entered in the carry stages CY of the third and first PR–DD orders, in addition to the fifth PR–DD order as described above. However, to demonstrate the manner in which the machine of the present invention would operate if the lowest ordered DRS Register digit were entered first in an odd PR–DD order rather than an even one, a "below units" carry stage CY is also included and shown in Fig. 21*c*, and will be described shortly.

It should also be noted that the "elusive 1" is applied to the respective carry trigger CY during that interval of the S Commutator cycle when "1's" are being entered into the respective stages S1 of the two higher PR–DD orders if any "1's" are stored in the DRS Register. Thereafter, during the carry interval of the same S Commutator cycle, the "elusive 1" is transferred to the next higher PR–DD order stage S1, e.g., to the sixth PR–DD order stage S1 during the first subtraction cycle.

Figure 20C:
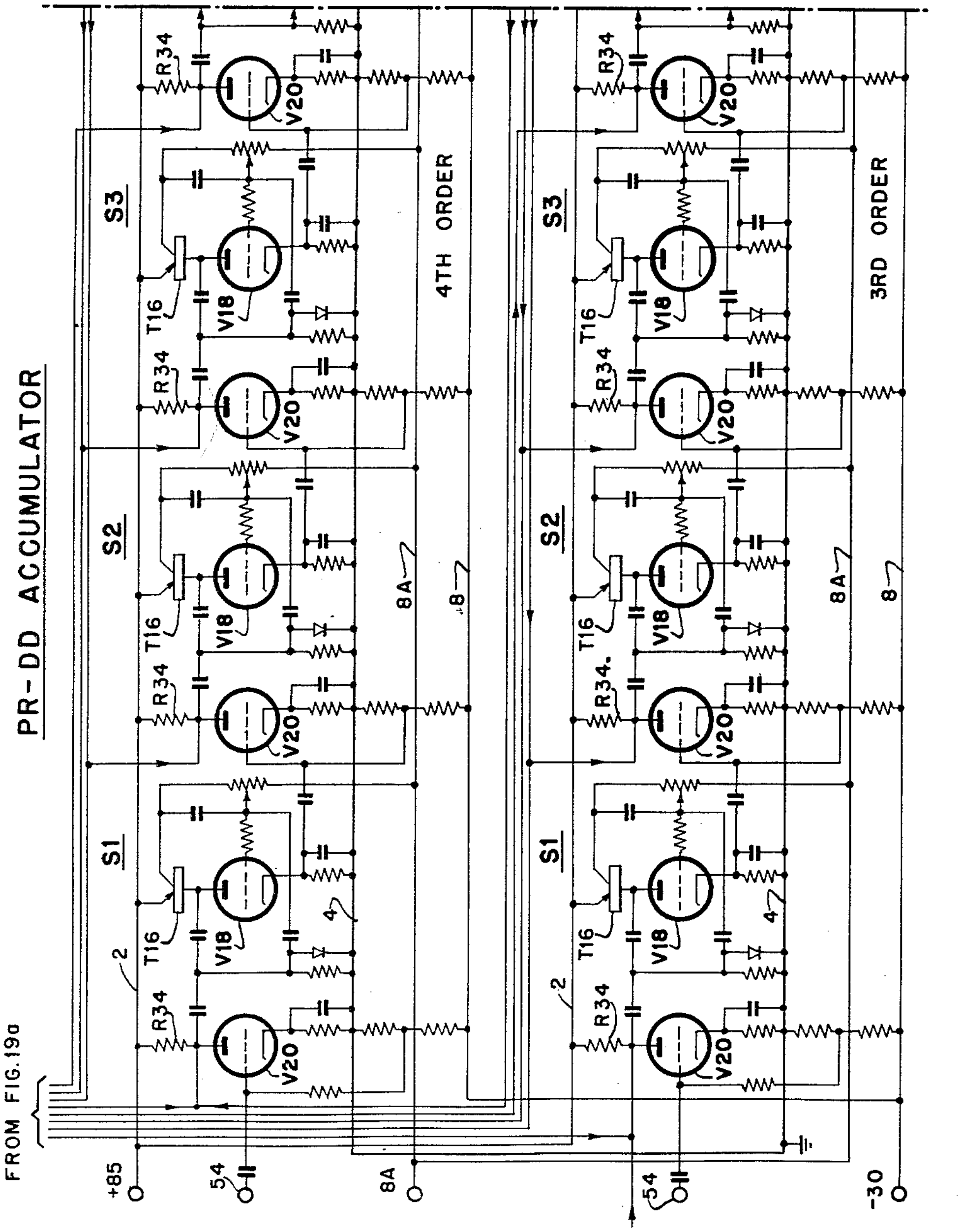
Figure 20D:
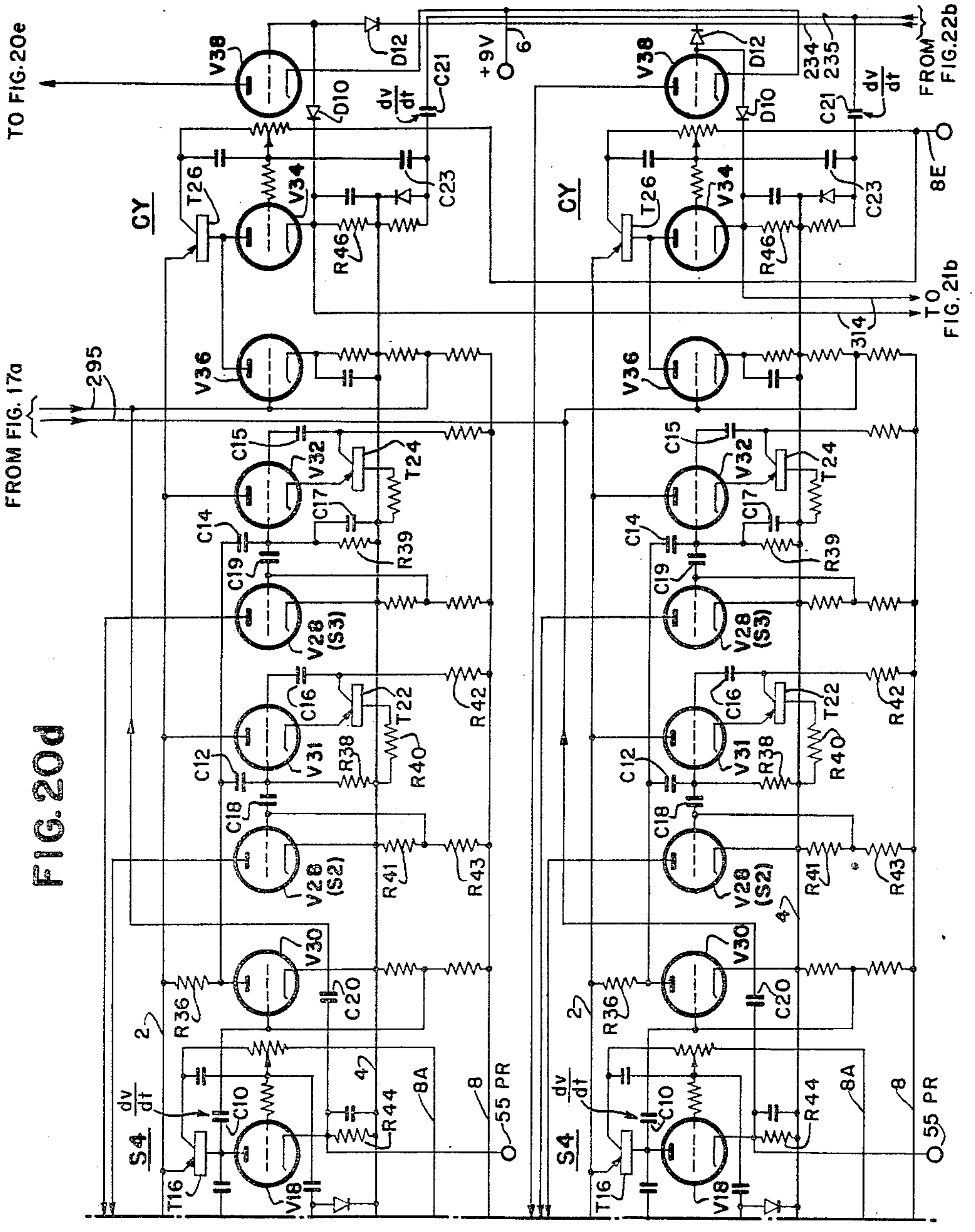

The selection of the particular column in the PR–DD Accumulator to which entry of the "elusive 1" is applied is also under control of the Column Shift Circuits. The input of any right-hand CS stage gate (i.e., gates K–P, Figs. 17*a* and 17*b*) is derived from wire 270 via a respective condenser C52 and is always a timed pulse representative of the digit "1." The output of such a gate, e.g., gate M (Fig. 17*a*) controlled by stage CS4, is applied via condenser C53 and wire 295 to the grid of tube V36 located in the third PR–DD order (Fig. 20*d*). The "1" timed value pulse is positive and causes this tube V36 to conduct, turning On its related carry stage CY. As mentioned previously, during the successive carry interval of the same S commutator cycle in which the "1" is entered into the carry stage CY, an output pulse is applied therefrom to the stage S1 of the next higher, or, in this case, the fourth PR–DD order (Fig. 20*c*).

As pointed out above, during the first subtraction cycle of a division operation, the pulse representative of the "elusive 1" is entered into carry stage CY of the 5th PR–DD order via Gate Circuit K, inasmuch as the lowest order digit from the DRS Register is entered into the sixth PR–DD order. During the successive subtraction operation cycles, the "elusive 1" pulses are entered into the 3rd and 1st orders of the PR–DD Accumulator via Gate Circuits M and O, respectively. Accordingly, it should be noted that Gate Circuits L, N and P (Figs. 17*a* and 17*b*), like "below units" stage CY, are not necessary or utilized in the same division example described. However, these circuits are included for symmetry and to permit the machine of the present invention to be operated by entering the lowest-ordered divisor digit initially in an odd PR–DD order, if preferred, rather than an even one.

Figure 20G:
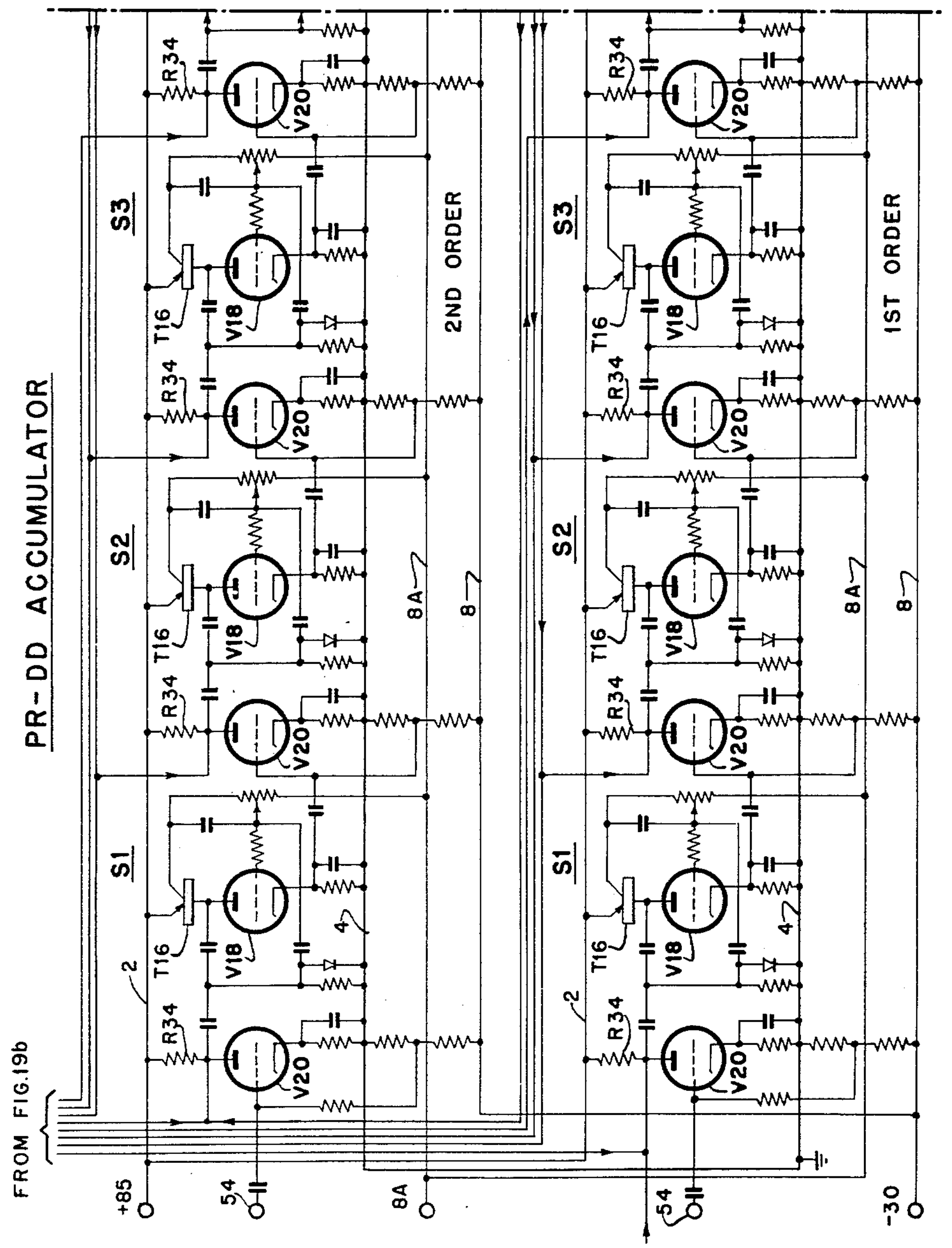
Figure 20H:
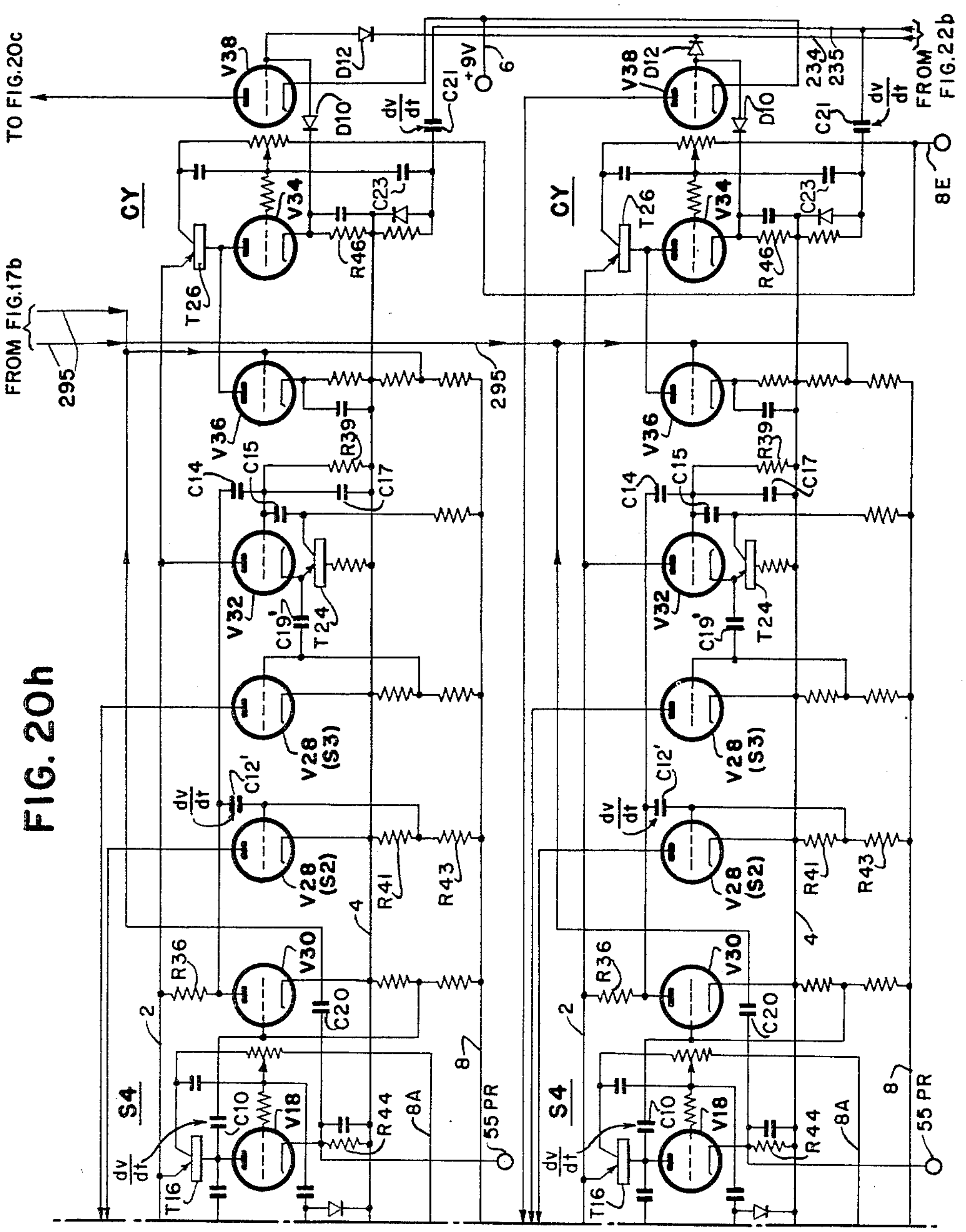
Figure 21A:
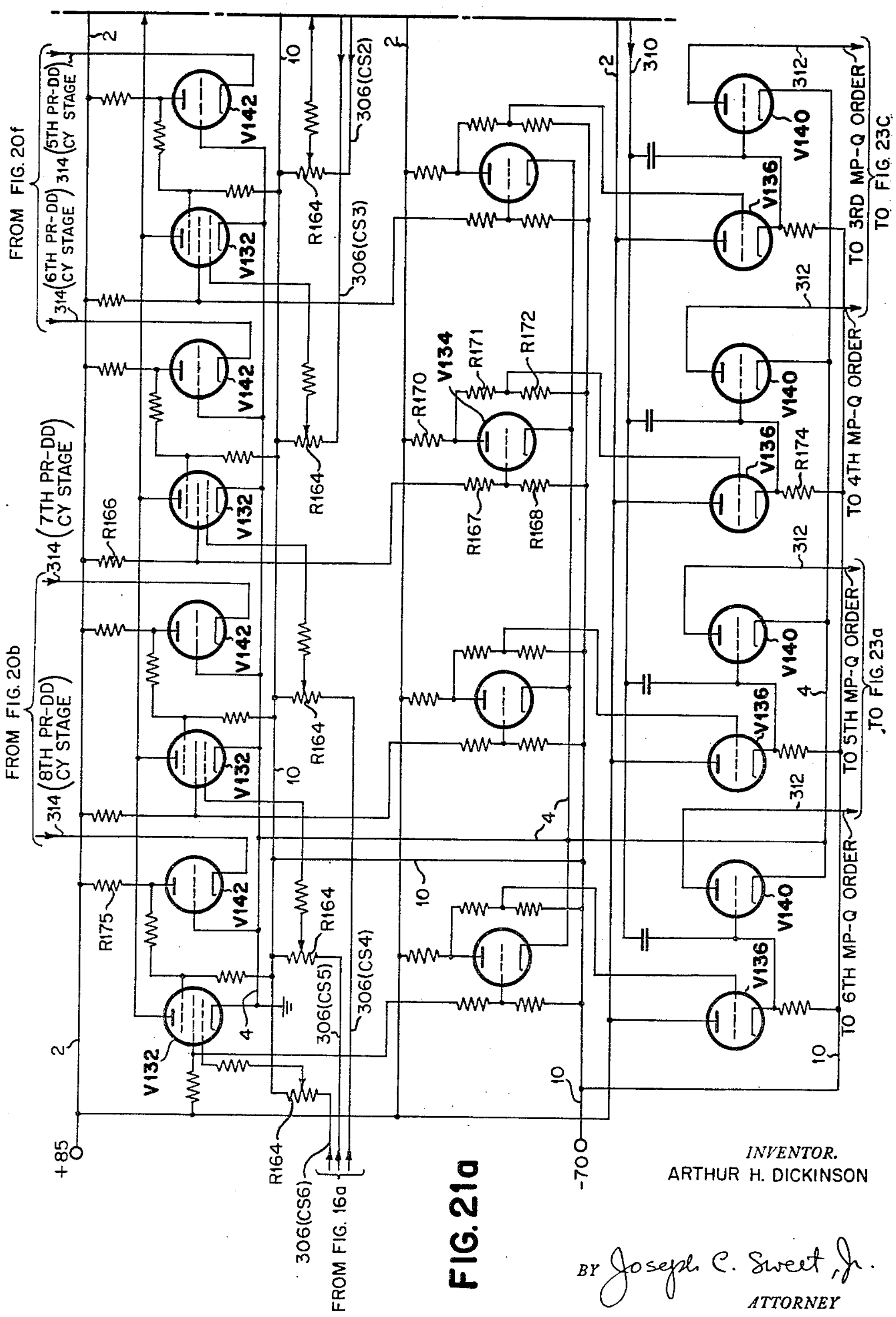

The "below units" carry stage CY is similar to the carry stages CY in each of the PR–DD Accumulator orders and is shown in the right-hand portion of Fig. 21*c*. It is controlled by the output of gate P (Fig. 17*b*), which is controlled in turn by stage CS1 (Fig. 16*b*), and the output of gate P is applied via the respective condenser C53 and wire 295 to the grid of tube V36 of the "below units" stage CY. The "1" timed value positive pulse causes this tube to conduct, turning on its related "below units" carry stage CY trigger comprising transistor T26 and tube V34. When a carry gate pulse is thereafter applied from line 234 to the grid of the associated gating tube V38, a pulse is applied from the latter to stage S1 of the first PR–DD order (Fig. 20*g*).

It is interesting to note that in the transfer of partial differential values from one MC–DRA or DRS Register order, only a single channel is required in the CS Commutator. Basically, each order of the MC–DRA and DRS Registers contains four stages, and the same is true also of the PR–DD Accumulator, which receives transfers. Were an order in the MC–DRA or DRS Registers linked stage for stage with a PR–DD Accumulator order, the wiring of the column shift and the number of gates would be materially increased. The use of timed value impulses reduces the number of linking channels to a minimum, i.e., one.

Figure 18A:
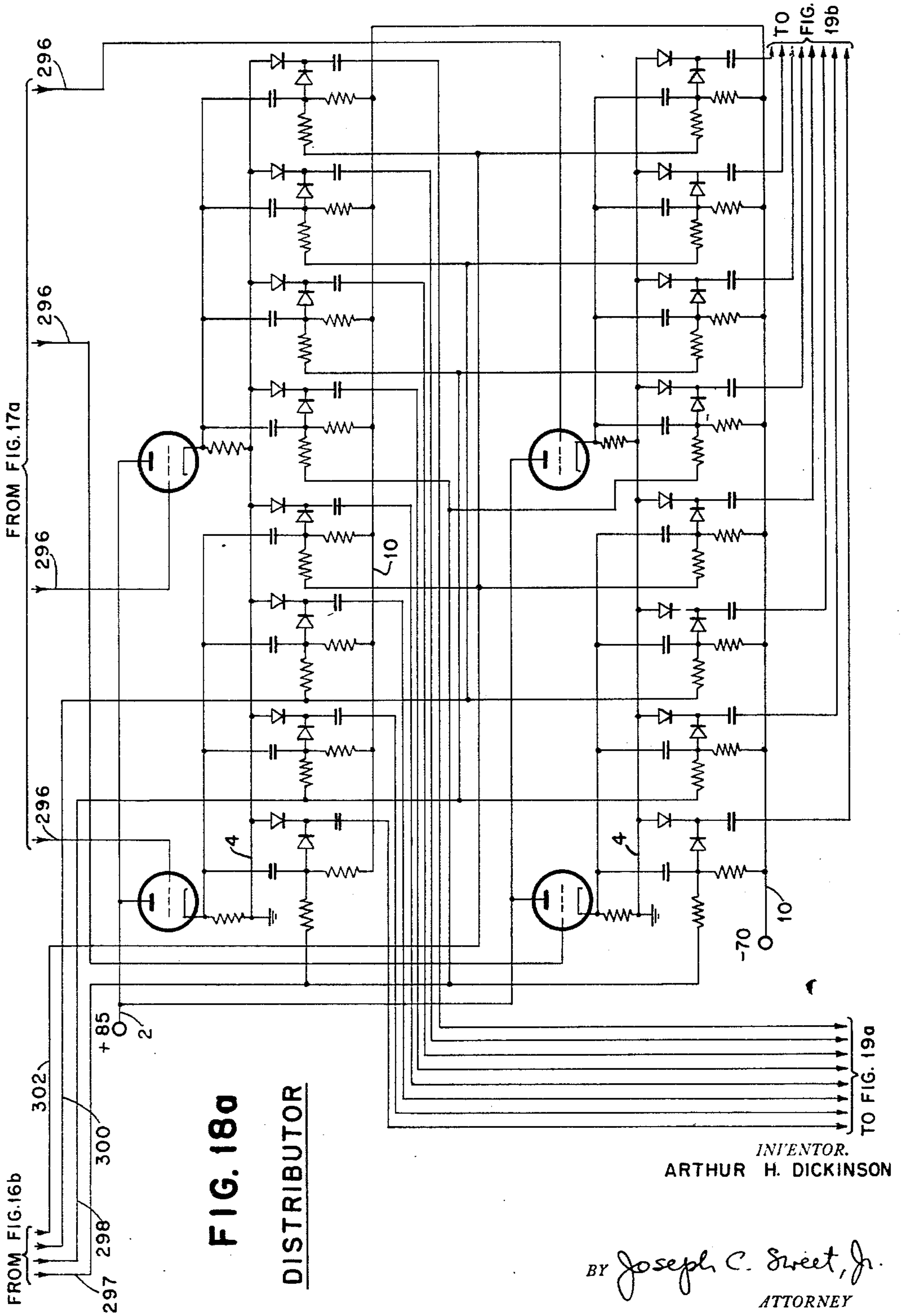
Figure 18B:
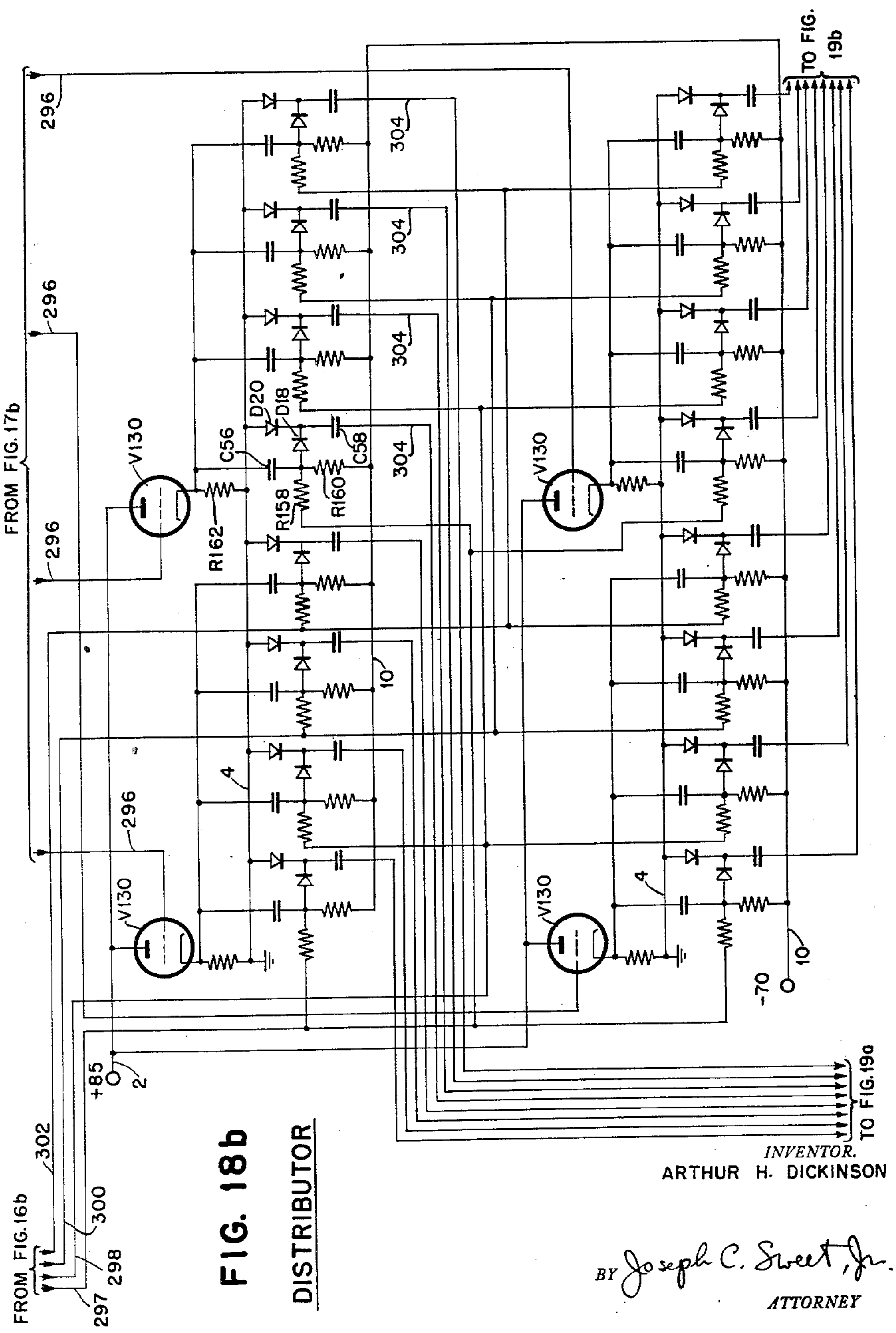
Figure 19A:
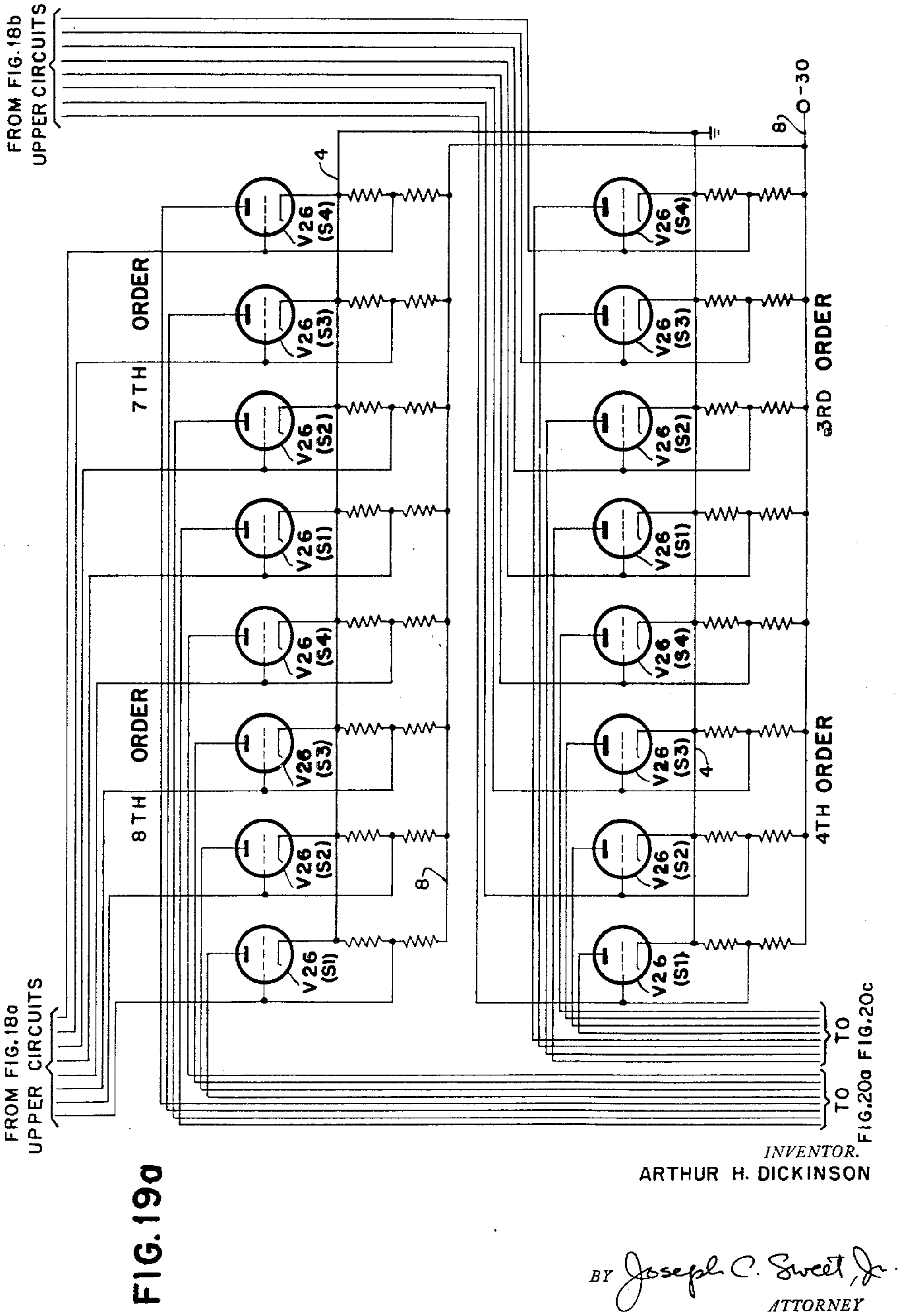
Figure 19B:
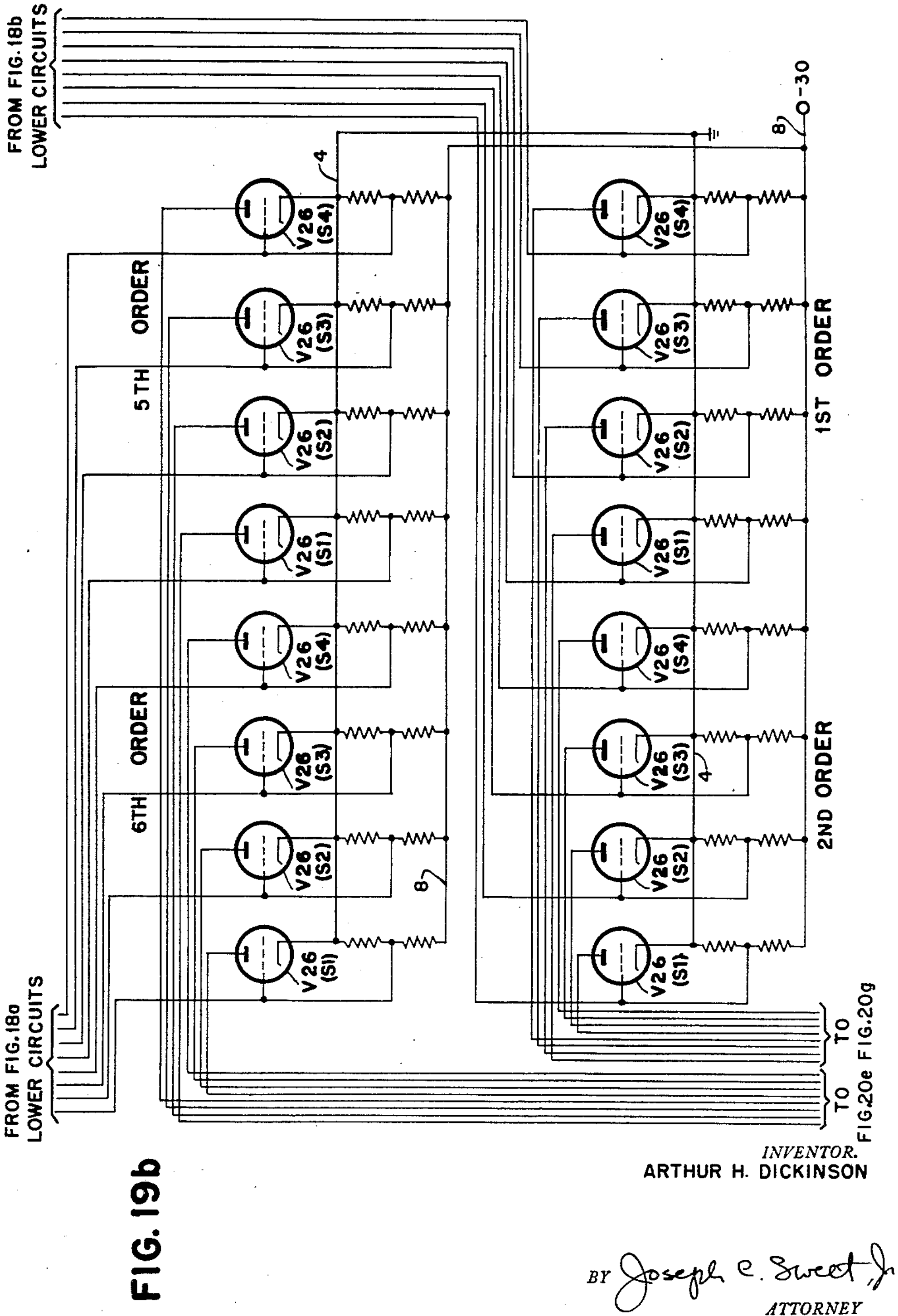

The pulses produced on wires 294 are amplified prior to subsequent use. As shown in Fig. 17*a* and 17*b*, a pulse appearing on any wire 294 is applied via a respective condenser C54 to the grid of a respective tube V122, which is normally Off. The aforementioned positive pulse causes this tube V122 to conduct and a negative pulse is thus supplied to the grid of the successive tube V124, which is normally conducting or On. The negative pulse shuts tube V124 Off and produces an amplified positive pulse on its plate resistor R156, which pulse in turn is applied to a respective wire 296 leading to the associated Distributor (Fig. 18*a* or 18*b*).

During multiplying and dividing operations, entries are effected into the MP–Q Register by means of Stepping Pulse Circuits under control of the CS Commutator. It will be appreciated that each CS stage is associated with a certain MP–Q Register order, e.g., stage CS4 (Fig. 16*a*) is related to the fourth MP–Q Register order. With stage CS4 On, its associated tube V86 (Fig. 16*a*) is more conductive. The cathode of tube V86 also connects via a respective wire 306 and resistor R164 (Fig. 21*a*) to negative supply line 10 as mentioned previously. The rise in potential of this wire 306 causes an increased potential drop across the respective resistor R164. Since the control grid of a respective pentode V132 is connected to a tap on this resistor R164, conduction in the screen-cathode circuit of this pentode is produced. A resistor R166 connects this screen grid to positive supply line 2 and resistors R167 and R168 connect it to negative supply line 10. Consequently, the potential drop across resistor R166 increases while that across resistors R167 and R168 decreases. The drop in potential across the latter resistors causes the associated tube V134 to shut Off since its grid also returns to negative supply line 10 via resistor R168. The potential drop across plate load resistor R170 of this tube V134 decreases while that across associated shunting resistors R171 and R172 increases, the latter resistors being connected in series between the plate of tube V134 and negative supply line 10. The decrease in potential across this resistor R172 brings about an increased conduction of associated tube V136, since its grid is connected to the junction of resistors R171 and R172, and an increased potential drop across cathode resistor R174 of this tube V136.

Once each commutator cycle a negative pulse is applied to wire 308 by circuits described below in connection with Fig. 25*a*, this pulse occurring midway in the first commutator cycle interval allocated for carry. Since wire 308 is coupled to the grid of tube V138 (Fig. 21*b*), this negative pulse shuts off tube V138 and produces a positive pulse on wire 310 connected to its plate load resistor. This pulse plus the increased potential across the above-mentioned resistor R174 (Fig. 21*a*) causes the associated tube V140 to conduct since both wire 310 and resistor R174 are connected to the grid of the latter. The resultant negative pulse at the anode of this tube V140 is applied via the respective wire 312 to the fourth MP–Q Register order (Fig. 23*c*). Similar respective wires 312 are connected to the other MP–Q Register orders. During multiplying, an MP–Q Register order in this fashion receives impulses which in number are sufficient to return the order step-by-step to "0." During dividing, the impulses thus applied to an MP–Q Register order are sufficient in number to form the required quotient or Q digit in step-by-step fashion.

A further function of the CS Commutator is utilized only during a dividing operation. During such operations, it is necessary to determine when the dividend or DD amount becomes negative on subtractive transfers from the DRS Register into the PR–DD Accumulator. It is also necessary to determine when the dividend or DD amount becomes positive on additive transfers from the MC–DRA Register into the PR–DD Accumulator. When such conditions are detected, it is required that column shift, among other things, be effected. The previously mentioned determination of negative or positive status of the dividend DD amount alternates as dividing computations progress. Both types of determinations are made by detecting the status of the carry circuit CY in the next higher order of the PR–DD Accumulator than that receiving the highest order of the divisor. When subtractive entries are made into the PR–DD Accumulator, the condition which must be ascertained is that of a "no carry," and when additive transfers are effected in the PR–DD Accumulator, the condition that must be determined is one of "carry."

When dividing operations are initiated, the stage CS6 trigger (Fig. 16*a*) is in On status. Its associated tube V86 is more conductive and the potential drop across the related resistor R164 (Fig. 21*a*, to which it is connected via a respective line 306) increases, thereby decreasing the control grid bias of the associated tube V132 (in the upper left-hand corner of Fig. 21*a*) to zero. In this manner the anode-cathode path in this tube V132 is made potentially conductive. A respective wire 314 links the junction of the cathode of tube V34 and its cathode resistor R46 of the stage CY trigger in the highest (8th) order of the PR–DD Accumulator (Fig. 20*b*) with the cathode of tube V142 just to the right of this tube V132 (Fig. 21*a*). As long as subtractive entries into the 8th order of the PR–DD Accumulator cause its stage CY to turn On each transfer cycle, the "carry/no-carry" detecting circuit does not function. When the dividend or DD amount no longer contains the divisor DR, there is "no carry" and this 8th order stage CY trigger is therefore Off at the end of a transfer cycle. This results in the above-mentioned tube V142 becoming conductive, thereby increasing the potential drop across its plate load resistor R175 and switching the above-mentioned tube V132 to the left thereof to Off status. As a result of this, the potential drop across common plate load resistor R176 (Fig. 21*b*) decreases while that across common shunting resistors R177 and R178 increases. This rise across resistor R178 causes tube V144 to the right thereof to conduct, decreasing the potential drop across resistor R180. The decreased potential drop across resistor R180 shuts Off the screen-cathode path through tube V146 and the voltage drop across resistor R182 rises.

When subtracting operations are performed during a dividing operation, the potential of wire 316 is raised while that of wire 318 is lowered (Fig. 25*b*). These raised and lowered potentials are provided by a source described below in connection with trigger circuit AS–FR (Fig. 25*b*). The combination of the raised potential on wire 316 and the increased potential drop across the abovementioned resistor R182 (Fig. 21*b*) causes tube V148 (Fig. 21*c*) to conduct. This conduction reduces the potential drop on resistor R184, thereby switching tube V150 to Off status so that the voltage drop on resistor R186 increases. This causes tube V152 to become more conductive to reduce partially the grid bias of tubes V154 and V244.

Once each cycle (at mid-index point time during the second or CY2 carry interval) a positive pulse is applied to wire 276 (Figs. 21*c* and 22*b*) from a source discussed below in connection with Fig. 22*b*. This pulse plus the increased conduction of tube V152 (Fig. 21*c*) causes tube V154 to conduct and apply a negative pulse to "off" line 282 leading to Figs. 16*a* and 16*b*. As a result of this action, a column shift is effected (in the manner above-described) and also the source (Fig. 25*b*) applying the potentials to wires 316 and 318 shifts in status so that the potential on wire 318 becomes greater while that on wire 316 becomes lower. The operation of this source supplying wires 316 and 318 is described below in connection with Figs. 25*a* and 25*b*.

With stage CS5 (Fig. 16*a*) On, additive transfers of the divisor DR are applied to the PR–DD Accumulator. As previously stated, when the amount in the dividend DD eventually becomes positive, the next column shift must be effected. When this condition is reached, the carry trigger CY in the next to the highest (7th) order of the PR–DD Accumulator (Fig. 20*b*) switches On. As a result of this, the related tube V142 (Fig. 21*a*) connected thereto via a respective wire 314 is switched Off, and the associated tube V132 (already partially conditioned by the raised potential on the respective wire 306 from stage CS5) becomes conductive. This again results in an increased potential drop across the common plate load resistor R176 (Fig. 21*b*) and a decreased potential drop across the common shunting resistors R177 and R178, again switching tube V144 to Off status. In consequence, the potential drop across resistor R180 again rises. This, in combination with the already raised potential on wire 318, makes tube V146 conductive in the same manner that the previously raised potential on wire 316 made tube V148 conductive. As a result, the voltage drop on shunting resistor R184 (Fig. 21*c*) common to tubes V146 and V148 decreases and tube V150 again switches Off. As described previously, this causes the potential across resistor R186 to rise, thereby partially reducing the grid bias of tube V154. Thus, in this cycle, when a condition of carry is detected, the ensuing positive pulse on wire 276 (Figs. 21*c* and 22*b*) during the second carry portion of the cycle causes tube V154 to conduct and a negative pulse again to appear on "off" wire 282, causing a second column shift and again shifting the status of the source applying the potentials to wires 316 and 318. This operation then continues in the manner described.

*Distributor*

It will be recalled that the stages S4, S3, S2 and S1 of the PR–DD Accumulator directly receive entries of timed impulses representing the digits "8," "4," "2" and "1," respectively, in a sequential fashion in that order. Accordingly, it is required that distributing circuits be provided to direct the timed impulses appearing on a wire 296 (Figs. 17*a* and 17*b*) to the stages of the PR–DD Accumulator order related thereto in magnitude. A distributor circuit is provided for each PR–DD Accumulator order, and all distributor circuits are partially controlled by either the A Commutator or S Commutator, whichever is operated, and partially by timed value impulses on the associated wire 296.

In addition to all distributor circuits being partially controlled by either the A Commutator or the S Commutator, whichever is operated, it is further required that any stage of either commutator which is turned On provide an associated section of each distributor circuit with a control potential. Wires 244, 246, 248 and 250 link the respective stages of the A Commutator with four tubes V126 shown in the lower half of Fig. 16*b*. Whenever a stage of the A Commutator is in On status, its related tube V126 is made more conductive. The wires 254, 256, 258 and 260 link the respective stages of the S Commutator with a group of four tubes V128, also shown in the lower half of Fig. 16*b*. Whenever a stage in the S Commutator is operated, it is effective to cause increased conduction through its related tube V128.

Since the A and S Commutators never operate simultaneously, it is seen that tubes V126 and V128 are never conductive simultaneously. Therefore, the cathodes of each pair of tubes V126 and V128 of corresponding stages are made common. Accordingly, a control potential supplied by stage S1 of either commutator is commonly applied to wire 297 (Fig. 16*b*). Similarly, a control potential provided by stage S2 of either commutator is applied to wire 298, that of either stage S3 to wire 300, and that of either stage S4 to wire 302. It is apparent that the group of wires 297, 298, 300, 302 receive timed control potentials, and further, each for the duration of one commutator interval. The particular wires which receive such timed control potentials are determined by those stages in either the A Commutator or the S Commutator which are called upon to operate. It is, of course, understood that this operation of the stages is in turn determined by the partial differential values standing in either the MC–DRA or DRS Registers, and wires 297, 298, 300 and 302 receive only control potentials which correspond to the partial differential values to be transferred.

As mentioned above, there is one distributor for each PR–DD Accumulator order, those for the first through fourth orders being shown in Fig. 18*b* and those for the fifth through eighth orders being shown in Fig. 18*a*. The distributor for each order comprises four gate circuits of the type employed for column shift purposes. A wire such as 297 returns to negative supply line 10 through resistors R158 and R160 (Fig. 18*b*) connected in series. The junction of resistors R158 and R160 returns to ground line 4 through opposed diodes D18 and D20 poled as shown and this junction is also coupled to the junction of the cathode of tube V130 and its cathode resistor R162 through condenser C56. From the foregoing it is apparent that the gate circuits of a distributor are selectively partially unblocked depending upon the timed control potentials appearing on wires 297, 298, 300 and 302. The particular gate circuit or circuits which become completely unblocked depend upon the timed value impulse or impulses (corresponding to a digit or digits stored in the MC Register) applied from a wire 296 to the grid of tube V130, making it conductive.

The output of each distributor gate circuit is applied to a respective output wire 304 via condenser C58. Each of the four wires 304 of a particular distributor group of four gate circuits is coupled by a respective amplifier V26 (Figs. 19*a* and 19*b*) to that stage of its associated PR–DD Accumulator order which corresponds in magnitude to the timed control potential applied to the gate circuit. In this manner timed value impulses provided by an order of either the MC–DRA or DRS Registers are received by a single channel of a distributor circuit and are applied to the proper stages comprising a related PR–DD Accumulator order. Also, from the foregoing it is seen that the CS Commutator acts to apply the timed value impulses to the gates in a shifting relation so that entries are effected into the proper PR–DD Accumulator orders.

*Record handling machine*

The record cards for which multiplying or dividing computations are to be effected may be handled by a record controlled machine of the general type described in U.S. Patent No. 2,372,909, issued April 3, 1945, to Ralph E. Page and Horace S. Beattie, and assigned to the assignee of the present application. Fig. 42 is a diagrammatic view of such a structure and is based on Fig. 2*b* of that patent. The group of cards punched with the multiplicand MC and multiplier MP data or the dividend DD and divisor DR data are placed in hopper 56 with the "9" index point position leading. As long as there is a card in the hopper, the hopper card lever contacts HC remain closed. Cards are fed one after another from the bottom of the stack by picker means 58 operated by rocker means 60. As each card emerges from the hopper, it is seized by feed rolls 62 and 64 and fed into the reading station, where it causes card lever contacts CL1 to close. At the reading station is also located a row of sensing brushes 70, one for each card column, and a coacting contact roll 72.

The card is next grasped by feed rolls 66 and 68, and as the card passes between these, it causes card lever contacts CL2 to close. Feed rolls 66 and 68 advance the card from the reading station to a punching station and into the grasp of feed rolls 74 and 76. At the punching station is located a row of punches 78, one for each card column, and a coacting punch die 80.

Each of the punches pivotally carries an interposer 82 which is normally out of the path of the continuously oscillating punch depressor plate 84. Plate 84 is operated through connecting rods 86 by eccentrics 88 on a rotating shaft 90. For each punch there is provided a call magnet PM which, upon energization acts through its armature lever and a link 92 to hook the interposer 82 to the plate 84 during its down stroke. Accordingly, as plate 84 effects its down stroke, it acts through the interposers hooked thereon to drive the selected punches through the card. Feed rolls 74 and 76 feed the card from the punching station past card lever contacts CL3, which thereupon close, to a final pair of feed rolls 94 and 96, which eject the card to a stacker 98.

The card picker means, feed rolls and contact roll are driven by a motor operated mechanism through a clutch 100 shown diagrammatically in Fig. 42. In a manner fully discussed in the previously mentioned patent, the feed and contact rolls operate to feed the card intermittently when the clutch is engaged. In this manner the index point positions of a card successively traverse the brushes 70 during one machine cycle. In a similar manner, the card traverses punches 78 during the following machine cycle. There is an interval between each index point of feed during which the selected punches are depressed to perforate the card.

Figs. 43*a* and 43*b* show the timing of various circuit breaker contacts labeled CB and other cam contacts labeled P. These contacts are mechanically operated by the machine and control circuits in a manner discussed hereinafter. These figures also indicate the times when the card lever contacts CL1, CL2, and CL3 referred to above are effective to control machine operations. Figs. 44*a* and 44*b* show in a similar fashion a sequence of the machine cycles which ensue when this machine is placed in operation upon a group of cards.

*Complete operation*

To place the machine in operation it is necessary to close switch 102 (Fig. 45*a*), thus supplying energy to a power supply generally indicated at 104 in this figure. Preferably the various output voltages of this supply are well-regulated. The line labeled 4 is the ground bus or reference line for all other potentials. With reference to line 4, the potential of line 2 is +85 volts; that of line 6, +10 volts; that of line 8, −30 volts; and that of line 10, −70 volts. These potentials are utilized in the computing circuits of this machine. In addition, the reading and punching section of the machine requires that +150 volts be applied to line 12, +140 volts to line 14, +65 volts to line 16, +40 volts to line 18, and −100 volts to line BI. For purposes of clarity in the circuit diagrams, the connections from lines 4 and 20 to the heaters of the various tubes are not shown, nor are the heaters themselves.

With cards in hopper 56 (Fig. 42) and switch 102 (Fig. 45*a*) closed, the machine is ready to commence operation on a series of cards. The presence of cards in hopper 56 causes closure of card lever contacts HC (Figs. 42 and 45*a*), bringing about energization of relay coil RL3 (Fig. 45*a*). Energization of coil RL3 causes closure of contacts RL3A. To initiate operations, the start key 106 is depressed to complete a circuit from line 18 through stop key 105, start key 106, and relay coil RL10 to line 4. Energization of coil RL10 closes its contacts RL10BL, whereupon relay coil HD is energized. Relay contacts HD1 close to complete a circuit from one side of the 110 volt A.C. line through motor M to the other side of the line. Motor M is the driving motor for the reading and recording section of the machine.

The energization of coil RL10 also effects closure of its contacts RL10BU and a circuit is completed from line 18 through the cam contacts P1 (now closed, see Fig. 43*a*), and clutch magnet PCM to line 4. The energization of magnet PCM effects operation of the clutch mechanism generally designated 100 in Fig. 42. With the clutch mechanism operated and motor M turning, the initial machine cycle takes place. During this cycle the first card is fed from hopper 56 (Fig. 42) to a position in which the leading edge of the card is about to traverse brushes 70. Reference to Figs. 43*a* or 44*a* indicates that near the end of this first cycle the card effects closure of card lever contacts CL1. Such operation causes energization of relay coil RL8 (Fig. 45*a*). Assuming that the operator has released the start key contacts prior to the end of the first card feed cycle, the relay coil RL10 becomes deenergized when cam contacts P5 (Fig. 45*a*) open (see Figs. 43*a* or 44*a*), interrupting the previously established stick circuit for relay RL10, which circuit also includes contacts RL10AL (Fig. 45*a*). Such deenergization of coil RL10 also results in the deenergization of relay HD and the opening of the circuits to motor M and clutch magnet PCM. Accordingly, the machine stops at the end of the first cycle.

A second cycle is initiated when the operator again depresses the start key 106. Further, had the operator maintained the start key 106 depressed, a second card in the cycle would automatically have followed the first such cycle, because relay RL10 would be continuously energized, even when cam contacts P5 opened.

During this second cycle the first card is moved past the sensing brushes 70 (Fig. 42) to a point where its leading edge is just under the punches 78. During this card feed cycle the data for either multiplying or dividing operations is sensed by brushes 70 and entered into the proper registers. The circuit details for this are described below. Late in this cycle the required computing operations are effected.

Near the end of this second card feed cycle, the card lever contacts CL2 (Fig. 45*a*) close, as indicated in Figs. 43*a* or 44*a*. The closure of contacts CL2 causes energization of relay coil RL1 (Fig. 45*a*). The energization of coil RL1 closes contacts RL1AU and RL1BL for purposes subsequently discussed.

It should be also mentioned that during this second card feed cycle a second card is fed from hopper 56 to the brushes 70 of Fig. 42.

A third machine cycle is automatically initiated if the operator maintains start key 106 depressed or is initiated upon a third depression of this start key. Near the end of this third machine cycle, card lever contacts CL3 (Fig. 45*a*) close (see Figs. 43*b* or 44*b*) and relay coil RL7 (Fig. 45*a*) is energized, which in turn effects closure of its contacts RL7A. Assuming that the operator maintains start key 106 depressed throughout the entire third machine cycle, relay RL10 now remains energized through a stick circuit which includes its contacts RL10AU, contacts RL7A, RL1AU, and RL3A of the other respective relays, and stop key 105, all now closed. Machine cycles continue thereafter automatically as long as cards are present in hopper 56 of Fig. 42.

It will be recalled that at the end of the second card cycle the first card was about to traverse punches 78 of Fig. 42. During the third card feed cycle the first card has punched thereon the result of the computing effected near the end of the second card feed cycle. Figs. 44*a* and 44*b* show, in detail, the sequence of operation of various elements essential for placing the machine in operation.

*Read-in*

Referring now to Figs. 43*a*, 43*b*, 44*a*, 44*b* and 45*a*–45*f*, when multiplying, as a card passes brushes 70 (Fig. 42), it is required that the multiplicand MC amount on the card be entered into the MC–DRA Register and that the multiplier MP amount on the card be entered into the MP–Q Register. Prior to read-in, the related registers are reset to "0" condition in the manner described previously.

On the other hand, when dividing, the dividend DD and divisor DR amounts appear on the card. In this instance, as each card feeds past brushes 70, the dividend DD amount is read into the PR–DD Accumulator and the divisor DR amount is read into both the MC–DRA and DRS Registers. Prior to this entry, the PR–DD Accumulator and MC–DRA Register are reset to a "0" condition while the DRS Register is reset to a "9" condition. The manner of achieving these resets has been explained previously in the sections wherein these particular circuits were described.

In the now well-known 80 column IBM card, each digit is represented by a hole selectively punched at one index point position in a respective one of the 80 columns. Accordingly, as a hole in the card encounters a respective one of the eighty brushes 70, a circuit which includes that brush and contact roll 72 (Figs. 42 and 45*b*) is completed, thereby producing a differentially timed impulse. This differentially timed impulse is then converted into a series of impulses equal in number to the magnitude of the digit to be entered. Thus, an entry into a required register is effected by a series of impulses, produced as follows.

It will be recalled that the IBM card is read (and punched) in the present machine row-by-row, i.e., all 9's positions are first read (or punched), then all 8's, then all 7's, and so forth. It will also be recalled that the exemplified embodiment of the present machine has a two-order MC capacity, a two-order MP capacity, a two-order DR capacity and a four-order DD capacity. Since multiplication and division never occur simultaneously and the MC and DR amounts are selectively entered in a single register, only eight columns of the IBM card could be utilized for input data instead of ten. However, in the present embodiment the MC and DR amounts are assumed to be contained in separate columns of the IBM card. Accordingly, brushes 70 corresponding to the first through tenth columns of the IBM card are shown in Fig. 45*b* and connected to the reading circuitry, and brush 70 corresponding to the eightieth column is also indicated (no connection being made to this brush). In the following description, it has been assumed that the four-order dividend amount is entered in the first four columns of the IBM card, the two-order DR amount is entered in the fifth and sixth columns, the two-order MC amount is entered in the seventh and eighth columns, and the two-order MP amount is entered in the ninth and tenth columns. Ten entry or reading circuits are thus required, each including a respective trigger E1–E10 and an associated tube V164. Entry triggers E1 and E7 are shown in detail in Figs. 45*b* and 45*e*, respectively, together with the respective associated tubes V164. The remaining eight entry triggers and associated tubes V164 are indicated as being included within the respective blocks in Figs. 45*d*, 45*e* and 45*f*. However, to simplify the description, only one of these read-in circuits will be described in detail.

It is required that nine pulses be produced during each and every card feed cycle following energization of relay coil RL1, from 0–9 of these pulses then being gated through each tube V164 as required to enter a desired number indication into the proper register. A control trigger labeled T1 in Fig. 45*a* is utilized to produce these nine pulses. This trigger includes tubes V154 and V156, which may comprise the two halves of a twin triode, as shown. Normally, beginning shortly after the start of a cycle, this trigger is On (opening of contacts P8 effects reset to On—see Figs. 43*a* and 43*b* for the timing) with tube V156 conductive and tube V154 in Off status. Shortly after the beginning of a machine cycle, as shown in Figs. 43*a* and 43*b*, cam contacts P2 (Fig. 45*a*) close, and shortly thereafter cam contacts CB4 and CB3 (Fig. 45*a*) close. This action applies a positive potential from line 18 to wire 322 leading to the grid of tube V154, switching trigger T1 to Off status. The junction of resistors R188 and R190 is connected to the plate of tube V154 and also, through condenser C60, to the grid of tube V158. The negative pulse thus produced at this junction is therefore applied to the grid of tube V158, which is normally conducting. The resulting positive pulse produced at plate load resistor R192 of tube V158 is applied via condenser C62 to wire 324, connected to the suppressor grid of each of the ten tubes V164 (Figs. 45*b*, 45*d*, 45*e* and 45*f*) referred to above. This positive pulse is effective to raise the potential on the suppressor grid of each of these tubes V164 to zero. Shortly after the turning Off of trigger T1, cam contacts P6, CB1 and CB2 (Fig. 45*a*) close, as shown in Figs. 43*a* and 43*b*, and a positive potential is thus applied from line 18 to wire 326 leading to the grid of tube V156 of trigger T1, returning the latter to On condition. Reference to Figs. 43*a* and 43*b* indicates that this action occurs at each of the index point positions "8" through "1," and trigger T1 thus pulses the suppressor grid of each tube V164 nine times, in succession, during each machine cycle.

Assume now that a division operation is to be performed and that the first row of the first IBM card contains a "6," i.e., that the lowest order of the dividend DD amount to be entered is a "6." At the "6" index point time, a circuit providing a positive potential from line 18 is completed, as shown in Fig. 45*a*, through cam contacts CB6 and CB5 (now closed, see Figs. 43*a* and 43*b*), relay contacts RL8B (also closed) and line 327 to contact roll 72 (Figs. 42 and 45*b*) and thence through the respective brush 70 and a plug connection 108 between the respective plug sockets 110 and 112 to the respective entry trigger labeled E1 (Fig. 45*b*). This trigger E1 includes tubes V160 and V162, which again may comprise the two halves of a twin triode, as shown. The effect of this positive pulse is to switch trigger E1 to Off status at the "6" index point time. The grid of related tube V164 connects to the junction of shunting resistors R194 and R196 of trigger E1, and the resultant potential at this junction with trigger E1 Off reduces the control grid bias for this tube V164. At each of the next six index point positions (for the index points 5 through 0) in the entry cycle, tube V164 associated with trigger E1 produces negative pulses upon its series plate load resistors R198 and R199. Accordingly, six impulses representative of the digit "6" punched in the first column of the card are applied from the junction of resistors R198 and R199 to wire 328. This wire is connected to input terminal 54 of the third order of the PR–DD Accumulator (Fig. 20*g*), the first two orders being provided to produce answers to the hundredths digit.

Figure 20E:
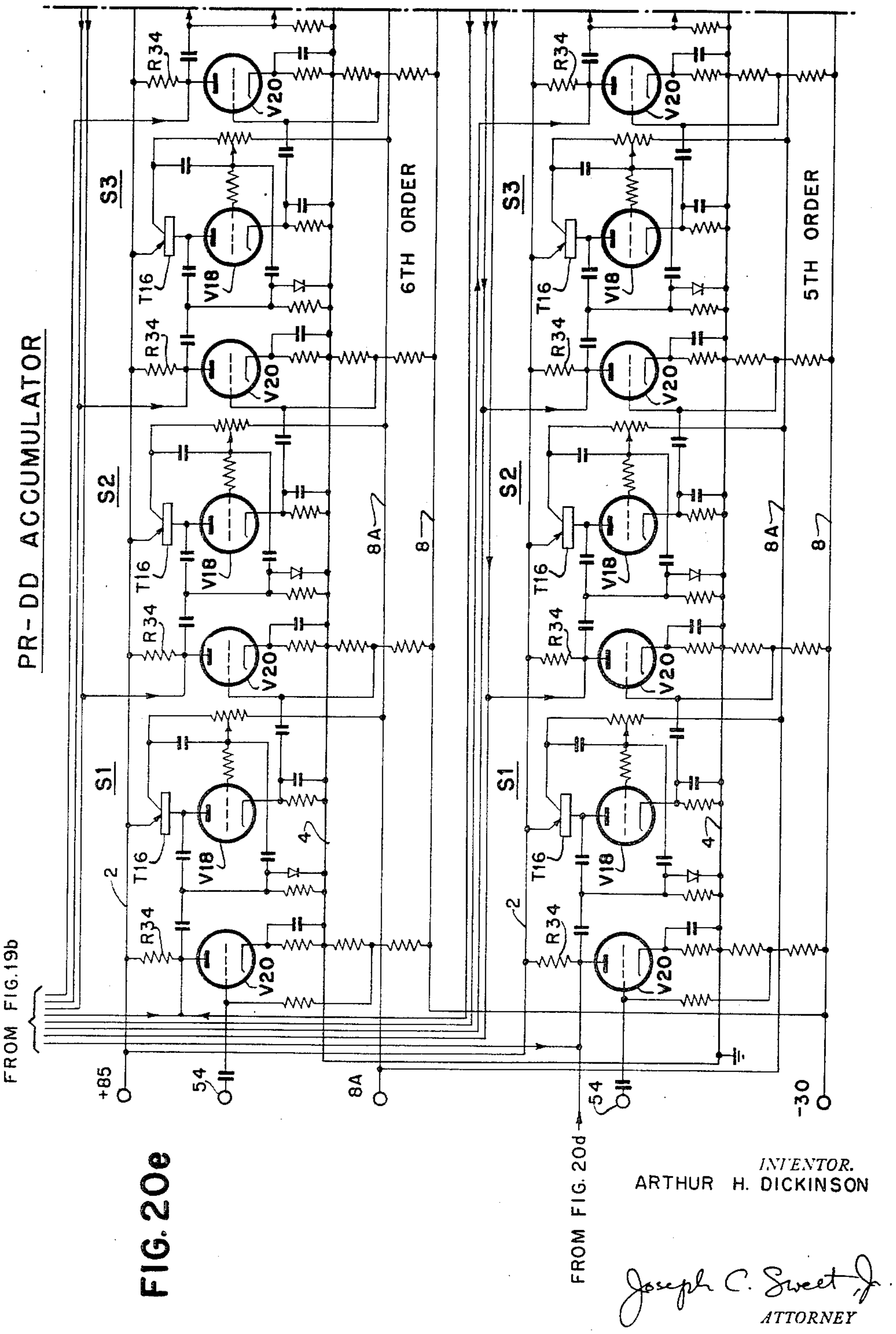
Figure 20F:
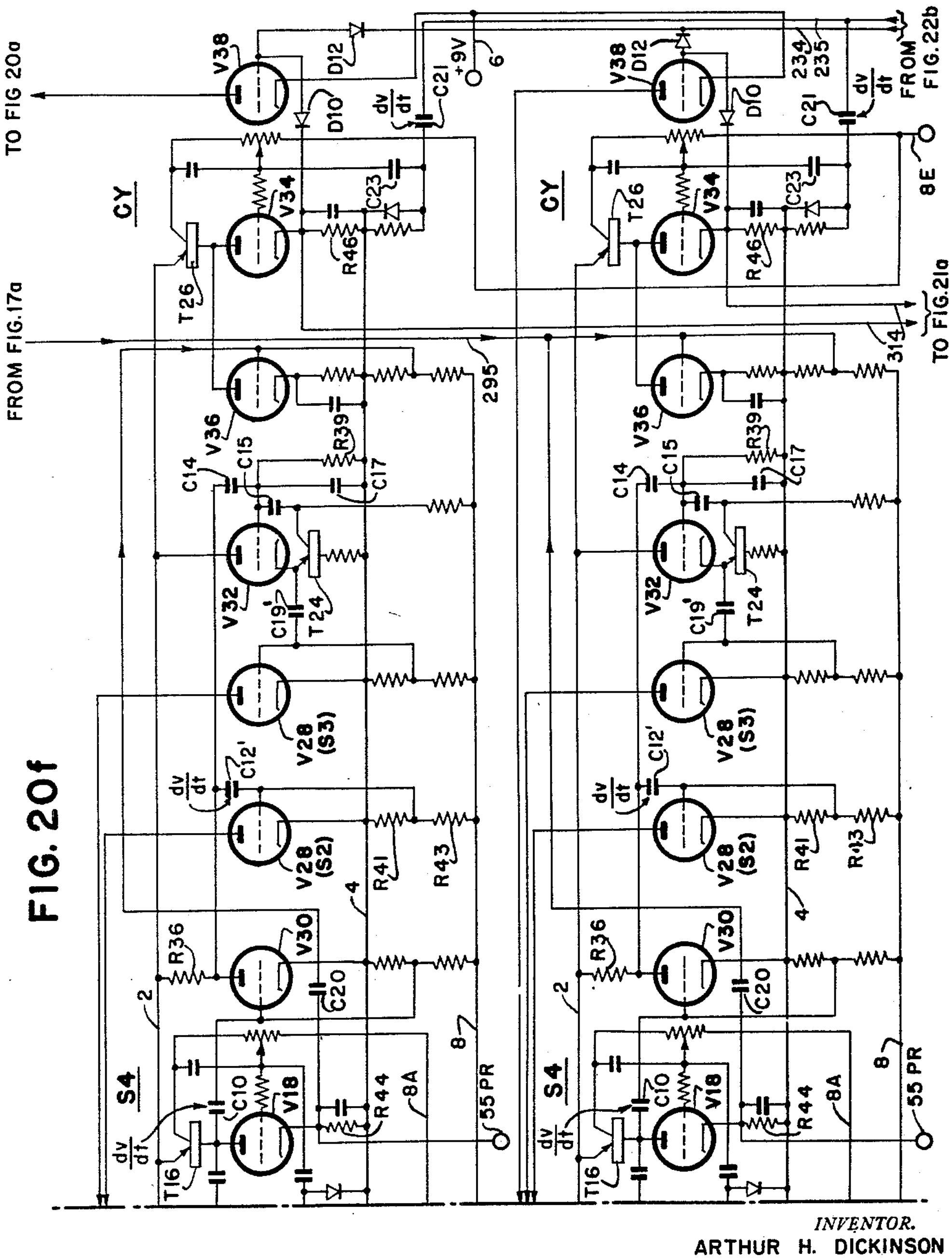

During this same machine cycle, the other three orders of the dividend amount are read from the second, third, and fourth columns of the IBM card and the required number of impulses then delivered to the respective input terminals 54 of the fourth, fifth and sixth orders of the PR–DD Accumulator (Figs. 20*c* and 20*e*). The two orders of the divisor amount are also read during this same cycle from the fifth and sixth columns of the IBM card and the required number of impulses then delivered to the respective input terminals 50 of the two orders of the MC–DRA and DRS Registers (Figs. 15*a* and 15*b*).

In a similar manner, during a multiplication operation, the two orders of the multiplicand amount are read from the seventh and eighth columns of the IBM card and the required number of impulses then delivered to the respective input terminals 50 of the MC Register during a single machine cycle, and, during the same cycle, the two orders of the multiplier amount are read from the ninth and tenth columns of the IBM card and the required number of impulses then delivered to the respective input terminals 52 of the third and fourth orders of the MP Register (Fig. 23*c*).

The opening of cam contacts P8 (Fig. 45*a*) at the beginning of each machine cycle turns On any trigger E1–E10 which was turned Off during the previous cycle and, in addition, establishes trigger T1 in On condition at the beginning of each machine cycle, as above-mentioned.

*Read-out*

Before describing multiplying and dividing operations in detail, a description is believed desirable of the method of reading out results whereby either a product PR or quotient Q amount is recorded by punching the record card bearing the factors determining the result amount. It will be recalled that this action occurs in that machine cycle just following the one in which the factors were read in and a computation was performed therewith. It will also be recalled that the present machine has a four digit product PR capacity and a six digit quotient Q capacity.

When multiplying, a product PR amount is produced in the PR–DD Accumulator whereas in dividing, the quotient Q amount is formed in the MP–Q Register. As the card traverses the punches 78, it is required that each punch 78 be operated at a differential time corresponding to the digit to be recorded. This operation is achieved by impulsing each of the required orders of the PR–DD Accumulator or MP–Q Register through ten steps. As any order passes from "9" to "0," there is produced a pulse at a differential time corresponding to the digit contained by the order. It will be recalled that all six orders of the MP–Q Register can be so impulsed, but that, in the present machine, only four orders of the PR–DD Accumulator are so arranged (i.e., the middle four—the third through sixth orders) in view of the four digit product capacity. The manner in which an order is provided with ten pulses is as follows:

The read-out pulses are produced under control of a read-out trigger labeled RD in Fig. 45*b*. This trigger RD includes tubes V166 and V168, which again may comprise the two halves of a twin triode, as shown, and at the beginning of each recording cycle the trigger is in On status with tube V168 conductive and tube V166 in Off status, due to their connection to line BI via the P8 contacts (Fig. 45*a*). Commencing at the "9" index point time of the third and each successive machine cycle, and for each one of the succeeding ten (9–0) index point times, cam contacts CB1 and CB2 (Fig. 45*a*) close and then reopen (see Figs. 43*a* and 43*b* for the timing) to provide ten successive positive impulses on wire 330 from positive line 18 through the RL1BL contacts, now closed (see Figs. 43*a* and 43*b*). The leading edge of each pulse occurs exactly at the corresponding index point time, and the effect of each positive pulse on wire 330, which is connected to the grid of tube V166 of trigger RD, is to turn the latter Off. At a subsequent time between each of the ten index point positions, cam contacts CB3 and CB4 (Fig. 45*a*) close and then reopen (see Figs. 43*a* and 43*b* for the timing) to apply ten successive positive pulses to wire 332, which is connected to the grid of tube V168 of trigger RD, turning the latter On each time. The junction of plate load resistor R200 and the plate of tube V166 of trigger RD is coupled via condenser C64 to the grid of tube V170, which is normally conducting. The turning Off of trigger RD thus applies a negative pulse to the grid of tube V170, in turn switching the latter Off. The resulting positive pulse on its plate load resistor R204 is applied via condenser C66 to wire 334 connected to the grid of each of six tubes V172, one for each of the six quotient digits. One of these tubes V172 is shown in detail in Fig. 45*b* and the other five are included within the respective blocks of Fig. 45*d*. Each tube V172 is normally nonconducting and the positive pulse applied to its grid is effective to produce a negative pulse on its series plate load resistors R206 and R207 and a respective wire 336 which connects to a respective MP–Q Register input terminal 52 (Figs. 45*c*, 23*a*, 23*c* and 23*e*). The ten negative impulses appearing on each wire 336 are effective to advance the associated register order through ten steps for recording purposes for effecting read-out from the MP–Q Register during a dividing operation.

The plate of tube V166 of trigger RD is also coupled via respective lines 335 and condensers C65 to the grid of each of four tubes V171 one for each of the four product digits. One of these tubes V171 is shown in detail in Fig. 45*e* and the other three are included within the respective blocks of Figs. 45*e* and 45*f*. The negative pulse produced on each line 335 when trigger RD switches Off causes each tube V171 to become non-conductive. A positive pulse therefore appears on series plate load resistors R207 and R208 of each tube V171 and on each of the four related wires 337, which connect to the respective PR–DD Accumulator input terminals 54 (Figs. 45*c*, 20*c* and 20*e*). In this manner each of the third, fourth, fifth and sixth PR–DD Accumulator orders advances through ten steps to effect read-out from this accumulator during a multiplying operation.

When dividing, no read-out pulses should be provided by these tubes V171. Accordingly, the plate supply for such tubes V171 from line 12 is opened by placing Multiply-Divide switch 114 in the reverse position of that shown in Fig. 45*c*. Such switch 114, when in reverse position during a dividing operation, does, however, provide a circuit to supply line 12 from the plate of each tube V172, associated with the MP–Q Register. Further, switch 114 in the position shown renders the tubes V171 associated with the PR–DD Accumulator effective and the tubes V172 associated with the MP–Q Register ineffective.

The junction of tube V18 and resistor R44 of stage S4 in each of the third, fourth, fifth and sixth PR–DD Accumulator orders (Figs. 20*d* and 20*f*) applies a positive pulse from its terminal 55PR (see Fig. 45*c*) to a respective wire 338 (Fig. 45*c*) as the order passes from "9" to "0" during a readout operation. This pulse is applied via condenser C55 to the grid of each of a related pair of tubes V174 and V176, there being one tube V174 and one tube V176 associated with each of the four PR–DD Accumulator orders just mentioned. One pair of these tubes V174 and V176 is shown in detail in Fig. 45*e*. The other three pair are included within the blocks in Figs. 45*e* and 45*f*. The tubes V174 and V176 of each pair are connected for parallel operation and are normally nonconductive. The effect of this positive pulse at their grids is to render these tubes conductive and cause current to flow in their common cathode circuit, which extends via a respective plug connection 116 made between respective sockets 118 and 120 to a respective punch magnet PM. In the manner explained previously, each punch magnet PM operates its related link 92 and interposer 82 which causes the related punch 78 to be effective and punch the required digit in the desired column of the IBM card.

In connection with the MP–Q Register the emitter voltage of the transistor T1 of each order (Figs. 23*b*, 23*d* and 23*f*) is increased when the potential across resistor R12 of its stage S4 falls as an order passes from "9" to "0." This action results in a positive pulse on its collector load resistor R27, which is coupled via the respective terminal 55Q (see Fig. 45*c* also), a respective wire 338 and respective condenser C55 to the grid of each of a related pair of tubes V174 and V176. There are six pair of tubes V174 and V176 associated with the six MP–Q Register orders, one pair being shown in detail in Fig. 45*c* and the other five pair being included within the blocks in Fig. 45*d*. The positive pulse appearing at the collector load resistor R27 of any order of the MP–Q Register thus causes conduction of the related tubes V174 and V176 and energization of the associated punch magnet PM. Each order of either the MP–Q Register or the PR–DD Accumulator from which read-out must be effected is, of course, connected from its terminal 55Q or 55PR, respectively, via wires 338 and plug connections 116 to the desired punch magnets PM.

The plate supply for each of the tubes V174 and V176 is derived from positive supply line 14 via cam contacts P10 (Fig. 45*c*) and wire PO. As shown in Figs. 43*a* and and 43*b*, these tubes are thus energized during each machine cycle only during the time that any of the digits 0–9 are to be punched and not at the other index point times.

As the last card of a group emerges from hopper 56 (Fig. 42), the card lever contacts HC open, causing deenergization of relay coil RL3 (Fig. 45*a*) and opening of contacts RL3A in the stick circuit for relay coils RL10 and HD. Accordingly the machine stops in a condition such that the last card is about to traverse reading brushes 70 (Fig. 42). If further cards are to be utilized for computations, they may be added to hopper 56 and the start key depressed once to initiate further card handling operations. On the other hand, if no further cards are to be handled, those which remain in the machine may be computed upon and fed to stacker 98 by maintaining start key 106 (Fig. 45*a*) depressed.

Referring again to the power supply circuits shown in Fig. 45*a*, it will be noted that —30 volt supply line 8 is connected through various cam contacts P8A, P8B, P9 and P9A, and Multiply-Divide Switches 138, 140 and 142 to branch lines 8A, 8B, 8C, 8D and 8E. More specifically, line 8 connects to line 8B through cam contacts P8A; line 8A connects to line 8 through the same cam contacts P8A when switch 138 is in the divide position, and to line 8 through cam contacts P9 when switch 138 is in the multiply position; line 8D connects to line 8 through cam contacts P9A and to —70 volt supply line 10 through resistor R209 when switch 140 is in the divide position, and to line 8 through cam contacts P8B and to line 10 through resistor R211 when switch 140 is in the multiply position; line 8C is connected to line 8 through cam contacts P8B and to line 10 through resistor R211; and line 8E connects to line 8 through cam contacts P8B and to line 10 through resistor R211 when switch 142 is in the divide position, and to line 8 through cam contacts P9A and to line 10 through resistor R209 when switch 142 is in the multiply position. As indicated on Fig. 45*a* and shown in the timing chart of Figs. 43*a* and 43*b*, cam contacts P8, P8A, and P8B break before the "9" index point time of each cycle, whereas cam contacts P9 and P9A break after the "0" index point time of each machine cycle. Note also in Fig. 45*a* that the movable contact associated with cam P8 is also connected to the grid of tube V194 of Fig. 24.

It will be recalled that line 8A is connected to the stages S1–S4 triggers of the PR–DD Accumulator (Figs. 20*a*–20*h*), line 8B is connected to the AS–FR trigger (Fig. 25*b*) and to the stages S1 and S4 triggers of the DRS Register (Figs. 15*a* and 15*b*), line 8C is connected to the stages S2 and S3 triggers of the DRS Register and the stages S1–S4 triggers of the MC–DRA Register (Figs. 15*a* and 15*b*), line 8D is connected to the QS trigger (Fig. 25*a*) and to all the triggers of the MP–Q Register (Figs. 23*a*—23*f*), and line 8E is connected to the carry triggers of the PR–DD Accumulator (Figs. 20*b*, 20*d*, 20*f* and 20*h*).

*Multiplying and control circuits therefor*

The type of computation performed by the machine is determined by the position of switch 122 (Fig. 25*a*) associated with the Multiply-Divide trigger. When in the "M" position– shown, the machine performs multiplying operations. In addition, switches 114 (Fig. 45*c*), 124 (Fig. 24), 138, 140 and 142 (Fig. 45*a*) and 143 (Fig. 25*a*) are then adjusted to the "M" position, as shown in the respective figures. If desired, these switches may be ganged for simultaneous manual operation, or they may be relay operated. With switch 122 in the position shown in Fig. 25*a*, the potential of the junction of resistors R208 and R210 is applied to the grid of tube V178 to maintain the Multiply-Divide trigger in On status. This trigger includes transistor T52 and tube V178. With the Multiply-Divide trigger in On status, successive tube V180 is non-conductive and the potential drop across its shunting resistor R212 is high. The resultant grid bias reduction of tube V182 (Fig. 25*b*) causes the latter to conduct during each machine cycle upon closure of cam contacts P4 (see Figs. 43*a* and 43*b* for the timing), thereby switching trigger AS–FR (Add/Subtract-Forward/Reverse) to Off status after having been turned On early in a cycle, by means of line 8B (see Fig. 45*a* also), to allow proper forward operation of the MP–Q Register during entry of the multiplier MP. This trigger AS–FR includes tube V184 and transistor T54. Likewise, during multiplying operations tube V183 (Fig. 25*a*) is highly conductive to maintain trigger QS (Quotient Suppress), which includes transistor T56 and tube V186, in On status.

It may be mentioned that trigger AS–FR has the function of causing the MP–Q Register orders to operate in a reverse direction and further of causing operation of the A commutator only during the computing portion of one card feed cycle. The prime use for trigger QS is suppressing the quotient indication at certain times, as will be pointed out below in the description relating to dividing and control circuits therefor.

In a previous section it was stated that in starting up the machine, the first card reaches the reading brushes 70 (Fig. 42) at the end of the first card feed cycle. It was further pointed out that during the second card feed cycle the multiplicand MC and multiplier MP amounts are read from the card and entered into their related registers and that just after the card is read, multiplying operations occur and are completed prior to the full advance of the card to the punching station.

As an example, assume that the quantity "37" is to be multiplied by the quantity "56." Then the first card for which multiplying operations are to be performed will contain the amounts "37" and "56" in the multiplicand MC and multiplier MP fields, respectively. As the card traverses the reading brushes 70 during the third card feed cycle, the value "56" is entered into the third and fourth orders of the MP–Q Register (Figs. 23*c* and 23*d*) and the value "37" is entered into the units and tens orders of the MC–DRA and DRS Registers (Figs. 15*a* and 15*b*). The manner of translating differentially timed impulses into a number of impulses corresponding to related digits has been described above. It should be recalled, however, that prior to such read-in, the MP–Q, MC–DRA and DRS Registers are reset as discussed in the previous respective sections relating to these devices. Having effected a read-in of the multiplicand MC and multiplier MP amounts, a multiplying operation is now ready to be performed. However, prior to initiation of this operation it is necessary to reset the PR–DD Accumulator. This is carried out in the manner described previously in the section relating to this device. As mentioned previously, the closure of cam contacts P4 (Fig. 25*b*—see Figs. 43*a* and 43*b* for the timing) permits the conducting tube V182 to switch trigger AS–FR to Off status and maintain it in this status during the computation portion of each machine cycle, after the MC and MP amounts have been entered into the machine.

Shortly after the "11" index point time in the second card feed cycle, cam contacts P11 shift to a reverse position from that shown in Fig. 24, the timing being indicated in Fig. 43*a*. Prior to this, when cam contacts P11 are in the position shown in Fig. 24, condenser C68 is charged to the potential across resistor R214, which is connected in series with resistor R216 between supply lines 2 and 8. Upon the shift of cam contacts P11, condenser C68 discharges through the emitter-base circuit of transistor T58 through contacts RL8C, now closed (see Fig. 43*a*). Transistor T58 forms part of a trigger circuit which also includes transistor T60 and tube V188. The transistor T58-tube V188 trigger is the first of two which comprise a Compute-Start Circuit. The discharge of condenser C68 in the transistor T58 emitter-base circuit shifts the transistor T58-tube V188 trigger to On status. This action renders transistor T60 more conductive and the increased current flow through its collector resistance R218 causes successive tube V190 to become more conductive. This results in increased current flow through cathode resistor R220 of tube V190, partially reducing the grid bias of tube V192.

The basic impulses for operating the multiplying and dividing circuits of this machine are provided by a pulse generator 114 of the type fully described in U.S. Patent 2,514,023, issued July 4, 1950, to Carl A. Bergfors and assigned to the assignee of the present application. It is sufficient to state here that the output of this generator is in the form of two continuous sets of square wave impulses, each approximately 180 electrical degrees apart. One set of pulses is applied to wires 262 and 340 and goes positive and negative at index and mid-index point times, respectively, of the A and S Commutator cycles, and the second set is applied to wire 342 and goes negative and positive at index and mid-index point times, respectively.

The first positive pulse (at mid-index point time) appearing on wire 342 following the turning On of the transistor T58-tube V188 trigger is effective to cause tube V192 to conduct due to the connection to the grid of the latter via resistor R217 and condenser C69. This action switches the second Compute-Start Trigger from Off to On status. This second trigger includes cross-coupled tubes V194 and V196 and it remains in On status with tube V196 conducting until the end of the multiplying computation because of the connection of the grid of tube V194 to cam contact P8 in Fig. 45*a*. As shown in Figs. 43*a* and 43*b*, cam contact P8 opens just after the beginning of the third card feed cycle, thus then switching the second Compute-Start Trigger to Off status.

With the second Compute-Start Trigger On, the control grid bias of tube V198 is reduced to zero. The positive pulses (at index point time) on wire 340 appear continually on resistor R222 by virtue of the coupling condenser C70 between resistor R222 and wire 340. The next positive pulse on resistor R222 following the turning On of the second Compute-Start Trigger reduces the suppressor grid bias of tube V198 to zero and the resultant conduction of this tube produces a negative pulse on resistor R224. This pulse is applied to the first Compute-Start Trigger, returning it to Off status.

When the first Compute-Start Trigger switches Off, a negative pulse is produced at the junction of the emitter of transistor T60 and the cathode of tube V188. This negative pulse is applied via wire 345, a group of paralleled diodes D19 (Fig. 25*a*) and condenser C72 to resistor R226, which is serially connected in the emitter-base circuits of transistors T61 and T62 connected in a tandem arrangement. The diodes D19 serve to suppress the positive pulse produced when the first Compute-Start Trigger switches On, a plurality of these diodes being utilized because of the magnitude of the current to be conducted.

The cathode of tube V200 (Fig. 25*a*) connects to the cathode of tube V184 in trigger AS–FR (Fig. 25*b*), and the grid of tube V200 is biased from a voltage divider connected between positive line 2 and ground line 4. Accordingly, when trigger AS–FR is Off, tube V200 is conductive and there is a decreased potential drop across its shunting resistor R228 (Fig. 25*b*). This results in a low conductive status for cathode follower tube V202, biased therefrom, and a low potential drop across its series cathode resistors R230, R232 and R234. The bias thereby applied to the grid of successive tube V204 is highly negative, thus shutting this tube Off. The resulting increased potential drop across shunting resistor R236 partially reduces the negative grid bias of tube V206.

The previously mentioned negative pulse from the first Compute-Start Trigger (Fig. 24) applied via wire 345 to the base of transistor T62 (Fig. 25*a*) results in the production of a positive pulse in the collector circuit of tandem-connected transistor T61. This pulse is applied via condensers C74 and C75 to the grid of tube V206 (Fig. 25*b*), rendering conductive this tube and transistor T64 connected in series therewith. The positive pulse produced in the collector circuit of transistor T64 is applied to line 236 to initiate an operation of the A Commutator (Figs. 22*a–c*).

The foregoing has described the manner in which a multiplying operation is initiated by a contact controlled by the record handling mechanism. In view of the fact that the multiplier MP amount is "56," no machine cycles are eliminated. As previously mentioned, the On status of the transistor T52-tube V178 Multiply-Divide trigger (Fig. 25*a*) causes tube V180 to be shut Off. The resultant increased potential drop across resistor R238 causes tube V207 to be more conductive, producing an increased potential drop across its cathode resistor R240. Accordingly, the grid bias of tube V208 is partially reduced.

The previously mentioned negative pulse on wire 345 causes increased conduction through transistor T62 and produces a positive pulse in its collector circuit. This pulse is applied via condenser C76 to the grid of tube V208, whose negative bias is already partially reduced as just mentioned above. The resultant current flow through tube V208 causes increased conduction of series-connected transistor T66, in turn producing a positive pulse in its collector circuit which is applied to start line 272. This positive pulse switches trigger CS4 (Fig. 16*a*) to On status by means of tube V92 (Fig. 24) and wire 274 in the manner previously described. With trigger CS4 in On status and with operation of the A Commutator initiated, the first transfer of the multiplicand MC from the MC–DRA Register into the PR–DD Accumulator follows. The pattern which the triggers in the pertinent (third through sixth) orders of the PR–DD Accumulator and in the pertinent (second and third) orders of the MP–Q Register establish during the first commutator cycle is shown in Fig. 47*a*. Once a multiplying operation has been initiated, it is required that transfers of the multiplicand MC amount into the PR–DD Accumulator occur automatically without interruption as long as the MP–Q Register contains significant digits. Stated otherwise, the initiation of the A Commutator cycles must occur automatically after the initial one just described. This is accomplished as follows.

Wire 354 connects the cathode of grounded-grid tube V210 (Fig. 25*b*) with the junction of tube V198 (Fig. 24) and its cathode resistor R242. With the second Compute-Start trigger On, there is current flow in the screen-cathode path of tube V198, and the resultant potential drop across cathode resistor R242 is effective to switch tube V210 (Fig. 25*b*) to Off status. This results in an increased potential drop across shunting resistor R244, which partially reduces the grid bias of successive tube V212.

In connection with the operation of the A Commutator, it has been pointed out above that carry trigger CY2 switches Off at the termination of each complete commutator cycle. When this occurs, its transistor T28 (Fig. 22*b*) becomes relatively non-conductive and current flow through collector resistor R64 thereof is reduced. This shuts tube V52 Off, which decreases the current flow through series plate load resistor R66 of the latter and produces a positive pulse which is applied to wire 344. Wire 344 is coupled to the grid of tube V212 (Fig. 25*b*) via condenser C78, and tube V212 now conducts and thereby increases the emitter-base voltage of transistor T68. The resultant positive pulse in the collector circuit of transistor T68 is applied to the grid of tube V206 via condensers C80 and C75. The increased conduction of transistor T64 results in a positive pulse on wire 236 (leading to Fig. 22*c*) so as to initiate operation of the A Commutator for another cycle. It is thus apparent that the A Commutator cycles will continue as long as the second Compute-Start trigger is in On status, and the effect of these successive cycles of the A commutator operation in the present multiplication example is shown in Figs. 47*a* and 47*b*.

On the other hand, had only one multiplying cycle been called for, i.e., had the multiplier value been "01," thus requiring only one cycle of operation of the A Commutator, then the second Compute-Start trigger (Fig. 24) would be in Off status prior to the appearance of the above-mentioned pulse on wire 344 in Fig. 22*b*. When the second Compute-Start trigger switches to Off status, tube V198 (Fig. 24) becomes non-conductive and wire 354 connected to the cathode thereof assumes ground potential. Since wire 354 extends to the cathode of tube V210 (Fig. 25*b*), the latter tube is thus made conductive, thereby reducing the bias on successive tube V212 such that the latter does not conduct in response to the positive pulse from Fig. 22*b* thereafter appearing on wire 344. Therefore, no pulse would be produced on wire 236 for initiating another cycle of operation of the A Commutator.

For each cycle of operation of the A Commutator, it is required that an entry of "1" be made into the proper order of the MP–Q Register. The effect of this entry is to reduce that order step-by-step to "0" from whatever significant digit is standing therein. Each of these step-by-step actions occur midway of the first half of the two index point intervals allocated for carry purposes during the respective commutator cycle, as follows.

The control grid of tube V214 (Fig. 22*b*) connects to the output circuit of trigger CY1 and, when the latter is On, the grid bias of tube V214 is zero. With trigger CY2 in Off status, as is the case during the first half of the first carry interval, successive tube V52 is non-conductive and there is an increased potential drop across its shunting resistor R246. This increased potential drop reduces the suppressor grid bias of tube V214 to zero. Accordingly, tube V214 conducts throughout the first half of the first carry interval and causes reduction of the voltage drop across its shunting resistor R248, this reduced voltage drop being effective to shut successive tube V216 Off. The resulting increased potential drop across shunting resistor R250 partially reduces the grid bias of gate tube V218.

The negative-going portions of the square wave voltage continually appearing on wire 340 (Fig. 24) are effective via condenser C81 (Fig. 24) to shut tube V217 Off beginning at the mid-index point of each commutator interval. This results in the production of positive pulses, which appear on wires 266, leading to Fig. 16*a*, and 346, leading to the grid of the above-mentioned tube V218 (Fig. 22*b*).

A positive pulse on wire 346 beginning midway in the first half of the first carry interval causes tube V218 to conduct, thus producing a negative pulse on wire 348. This negative pulse on wire 348 shuts Off the normally conducting tube V220 (Fig. 25*a*), and a positive pulse is thereby produced on its shunting resistor R252. The cathode of grounded grid tube V222 connects to the cathode of tube V186 of trigger QS, which is On due to the grid of tube V186 being connected to negative supply line 8 through switch 143 in the "M" position shown in Fig. 25*a*. With trigger QS On, tube V186 in conducting and tube V222 is shut Off, and the potential drop across shunting resistor R254 is high. This results in a reduction of the control grid bias of tube V224 to zero. The previously mentioned positive pulse on resistor R252 occurring midway in the first half of the first carry interval thus causes tube V224 to conduct and produce a negative pulse on wire 308 coupled to its plate. The manner in which this "step down" pulse is routed to a selected one of wires 312 and the proper MP–Q Register order through tube V138, wire 310 and a respective tube V140 has been previously described in connection with Figs. 21*a* and 21*b*. This action occurs once each cycle of the A Commutator.

In connection with the previous description of an MP–Q Register order, it was pointed out that with wire 218 at a higher potential and wire 216 at a lower potential, the order operates reversely in response to input pulses, i.e., each input pulse steps the stored count down by "1." This required potential condition on wires 216 and 218 is obtained as follows. During a multiplying computation trigger AS–FR (Fig. 25*b*) is in Off status, i.e., with its tube V184 nonconducting. The cathode of tube V226 (Fig. 25*a*) connects to the cathode of tube V184, and with trigger AS–FR in Off status, tube V226 is more conductive and there is a decreased potential drop across its shunting resistor R256. Accordingly, tube V228 is less conductive and the potential drop across its cathode resistor R258, to which wire 216 connects, is decreased. On the other hand, the decreased potential drop across shunting resistor R260 of tube V226 shuts successive tube V230 Off, thereby producing an increased potential drop across resistor R262 shunting the latter and causing increased conduction of tube V232 (Fig. 25*b*). With tube V232 more conductive, there is an increased potential drop across its cathode resistor R264, thus raising the potential of wire 218 to a higher value.

In connection with discussion of the operation of the A Commutator, it has been pointed out that carry trigger CY2 (Fig. 22*b*) is On for one commutator interval only, and more particularly the last one of a complete commutator cycle. With trigger CY2 On, successive tube V52 is conductive and the voltage drop across shunting resistor R72 is low. This causes tube V234 to be shut Off so as to unblock one-half of a double triode gate, which also includes tube V236. Wire 346 is connected to the grid of tube V236 through a differentiating circuit comprising condenser C83 and resistor R73. The positive pulse on wire 346, beginning at mid-index point time and mentioned above as applied to the grid of tube V218, is itself derived by differentiating the square-wave voltage on line 340 (Fig. 24). The trailing edge of this relatively short positive pulse on wire 346 occurs very shortly after mid-index point time, and the differentiated negative pulse produced therefrom by passage through condenser C83 is then effective, when applied to the grid of tube V236 (Fig. 22*b*), to shut the latter Off. The resultant positive pulse produced on plate load resistor R266 is applied via condenser C82 to wire 276 leading to Figs. 21*c*, 24 and 25*a*.

It will be recalled that, during multiplying, wire 278 (Fig. 25*a*) is at substantially ground potential and, in conjunction with the pulses on line 276, controls tube V98 (Fig. 24) to produce, via line 280 and tubes V100 and V102, a negative pulse on line 282 at mid-index point time during each second carry interval defined by the index points when Column Shift Stage CS3 is in On status and during that A Commutator cycle when the ten's order of the MP Register returns to "0" when Column Shift Stage CS4 is in On status (see Fig. 7*a*). Note that wire 278 is also connected to the grid of tube V237 (Fig. 25*b*) and maintains this tube conducting during multiplying in order to keep the potential on wire 318 low and thus prevent tube V146 from producing pulses on line 282 at this time. If it were not for tube V237, the potential on wire 318 would be high when trigger AS–FR (Fig. 25*b*) switched to Off status at the end of the entry portion of a multiplying operation and rendered tube V203 non-conducting. If the potential on wire 318 were high during multiplying, this would permit tube V146 (Fig. 21*b*) to conduct and condition tube V154 (Fig. 21*c*) to produce a pulse on line 282 in response to each pulse on line 276 in the event that a carry occurs out of the 6th order of the PR–DD Accumulator during the time that Column Shift Stage CS4 is effective or out of the 5th order of the PR–DD Accumulator during the time that Column Shift Stage CS3 is effective. However, tube V237 is not really required in the present two order MC machine, since no carry can occur out of the 6th order of the PR–DD Accumulator during the time that Column Shift Stage CS4 is effective, and the pulses are already being produced continuously on line 282 during the time that Column Shift Stage CS3 is effective. It is included merely to demonstrate its action when required, as for example, if a three order MC Register were utilized and the highest order MC digit then initially entered in the seventh PR–DD Accumulator order.

As has been described previously in connection with the control of column shift for a multiplying operation, the pulse occurring on wire 276 when the ten's order of the MP Register returns to "0" during the time that trigger CS4 (Fig. 16*a*) is in On status is effective to produce a negative pulse on wire 282 (Figs. 16*a*, 16*b* and 21*c*) and also on wire 284 (Figs. 16*b* and 24). The negative pulse on wire 282 causes trigger CS4 to switch to Off status. The manner in which a negative pulse is also produced on wire 284, in view of the fact that there is a significant digit "6" stored in the third MP–Q Register order (Figs. 23*c* and 23*d*), has also been described above. This negative pulse turns On trigger CS3 concurrently with the switching of trigger CS4 to Off status.

Reference to Fig. 47*a* shows that at the end of five A Commutator cycles the amount in the fourth order of the MP–Q Register is "0." The result standing in the sixth, fifth, fourth and third orders of the PR–DD Accumulator is "1850," which is the product of "37" and "50."

By virtue of the fact that the fourth MP–Q Register order now stands at "0," there is a column shift and operations automatically continue for the third MP–Q Register order. The shutting Off of trigger CS4 and the turning On of trigger CS3 cause transfers from the MC–DRA Register into the PR–DD Accumulator orders in a lower denominational relationship. Transfer cycles of the multiplicand MC from the MC–DRA Register under the control of the A Commutator continue automatically in the manner above-described, and once each cycle the amount in the third MP–Q Register order is stepped down by "1." After six transfer cycles this third MP–Q Register order reaches "0" and hence multiplying operations should cease. This cessation is effected shortly after the third MP–Q Register order returns to "0," when the pulse on line 276 is applied via tube V96, transistor T46, condenser C45, tube V106 and the Multiply Stop line of Fig. 24 to the second Compute-Start trigger, comprising tubes V194 and V196, to return this trigger to Off status.

Reference to Fig. 47*b* indicates that the sixth, fifth, fourth and third orders of the PR–DD Accumulator now stand at "2072," which is the product of "37" and "56." During the third card feed cycle this result is read out from PR–DD Accumulator and recorded in the product field of the card as it traverses punches 78. The manner of impulsing the required orders of the PR–DD Accumulator through ten steps to effect this read-out has been previously described.

Recapitulating briefly, a record-controlled transistor computer has been described in which the multiplicand MC and multiplier MP amounts are read from a record card and entered into appropriate registers. The value of the digit standing in an MP order determines the number of cycles taken by a commutator to effect transfer of the multiplicand MC into the PR–DD Accumulator. Cycles are skipped when a column contains a "0," and the value of partial differential values standing in the MC Register are determined and effect control of the number of intervals (defined by the index points) comprised in each transfer cycle. Accordingly, the time required for computing is determined by the magnitudes of both the multiplicand MC and multiplier MP.

The transfer of the multiplicand MC into the PR–DD Accumulator is effected on a partial differential value basis and timed value pulses are utilized. The PR–DD Accumulator receives entries on a binary radix basis and manifests an output to the base ten. Impulses applied at the lowest valued input effect read-out by production of differential timed impulses corresponding to the product PR amount.

These impulses control punch magnets in the card feed cycle following that in which computing is effected, thereby perforating a representation of the product in the card bearing the representations of the amounts forming the product. The use of transistors and other semiconductor devices in this machine reduces the number of vacuum tubes required to effect multiplication in a similar manner by at least 33%.

*Dividing and control circuits therefor*

In order to place the machine in operation for dividing computations, switches 114 (Fig. 45*c*), 122 (Fig. 25*a*), 124 (Fig. 24), 138, 140 and 142 (Fig. 45*a*) and 143 (Fig. 25*a*) must be placed in the reverse position from that shown in the respective figures. With switch 122 in this reverse position, the Multiply-Divide trigger comprising transistor T52 and tube V178 (Fig. 25*a*) is maintained Off throughout the dividing operations. In addition, the opening of switch 124 (Fig. 24) renders tubes V90, V92 and V104 in that figure ineffective during dividing. Further, prior to each dividing computation trigger AS–FR, comprising transistor T54 and tube V184 (Fig. 25*b*), is switched On when the potential of line 8B changes (see Fig. 45*b*).

When trigger AS–FR is switched On, tube V226 (Fig. 25*a*), whose cathode is directly connected to the cathode of tube V184, becomes non-conductive and the decrease in current flow through its plate load resistor R268 is applied as a positive pulse via condenser C84 to the grid of tube V238. The negative pulse momentarily produced by tube V238 switches trigger QS to Off status.

Upon placing the record handling mechanism in operation, the first card for which dividing computations are to be performed reaches the sensing brushes 70 (Fig. 42) at the end of the first card feed cycle. Each of the cards to be handled is punched with the dividend DD and divisor DR amounts.

Assume again that the dividend is "2072" and the divisor is "37." This is the same sample problem described in connection with Fig. 9. During the first portion of the second card feed cycle, the dividend DD amount of "2072" is entered into the middle four orders of the PR–DD Accumulator (i.e., the 6th, 5th, 4th and 3rd orders), by circuits previously discussed. The divisor DR amount of "37" is read into the MC–DRA and DRS Registers. It will be recalled that because of the reset status of these registers, the true DR amount is formed in the MC–DRA Register and the nine's complement amount in the DRS Register.

Shortly after the "11" index point time in this second card feed cycle, closure of cam contacts P11 (see Figs. 43*a* or 44*a*) cause the first Compute-Start trigger, comprising transistor T58 and tube V188 (Fig. 24), to switch to On status. In a manner similar to that described previously in connection with the multiplying operations, shortly thereafter the second Compute-Start trigger, comprising tubes V194 and V196 (Fig. 24), is turned On, and shortly afterward the first Compute-Start trigger is switched Off.

As has been pointed out previously, this machine effects dividing by alternately subtracting from, and adding the divisor DR amount into, the PR–DD Accumulator. During each alternate subtracting and adding series of cycles, quotient digits are formed in the proper orders of the MP–Q Register. As the first Compute-Start trigger switches Off, it is effective to initiate operation of the S Commutator and to shift trigger CS6 to On status. These are accomplished as follows.

With trigger AS–FR (Fig. 25*b*) switched On, i.e., with tube V184 conducting, tube V200 (Fig. 25*a*) is Off since its cathode is directly connected to the cathode of tube V184. Accordingly, the voltage drop across shunting resistor R228 (Fig. 25*b*) is increased, as is the conduction of tube V202 biased therefrom. This results in an increased potential drop across series cathode resistors R230, R232 and R234, partially reducing the grid bias of tube V240 biased by these resistors. When the first Compute-Start trigger (Fig. 24) thereafter switches Off in the manner described previously, the decreased potential on wire 345 is coupled via diodes D19 and condenser C72 to the base of transistor T62 (Fig. 25*a*). This causes serially connected transistor T61 to produce a positive pulse in its collector circuit, which pulse is applied via condensers C74 (Fig. 25*a*) and C86 (Fig. 25*b*) to the above-mentioned partially conditioned tube V240. The latter is now switched to On status and applies a negative pulse to wire 252. This negative pulse switches trigger S4 in the S Commutator (Fig. 22*a*) to On status to initiate operation of the S Commutator in a manner previously described. The number of intervals in the resultant commutator cycle is determined in part by the partial differential value standing in the DRS Register.

The manner in which trigger stage CS6 is turned On when a series of dividing operations is initiated is as follows. With the Multiply-Divide trigger comprising transistor T52 and V178 (Fig. 25*a*) in Off status, successive tube V180 biased thereby is more conductive, which renders tube V207 less conductive due to the decreased potential drop across resistor R238. Accordingly, tube V246 is switched Off and an increased potential drop is produced across its shunting resistor R272. This increased potential drop on resistor R272 is applied to wire 286 and causes an increased conduction of tube V110 (Fig. 16*b*), in turn resulting in an increased potential across cathode resistor R138 of the latter. This potential rise partially conditions tube V112, biased thereby, for conduction by decreasing its negative bias.

The pulse applied to wire 345 when the first Compute-Start trigger (Fig. 24) switches Off brings about an increased conduction of transistor T62 (Fig. 25*a*), as described above. The pulse produced in the collector circuit of transistor T62 is applied via condenser C92 to the grid of tube V250, and increased current flow therethrough increases the emitter bias of series-connected transistor T70. The positive pulse thereby produced on wire 288 is effective to render partially-conditioned tube V112 (Fig. 16*b*) conductive, and the resultant negative pulse at its anode causes trigger stage CS6 (Fig. 16*a*) to switch to On status.

Figure 48A:
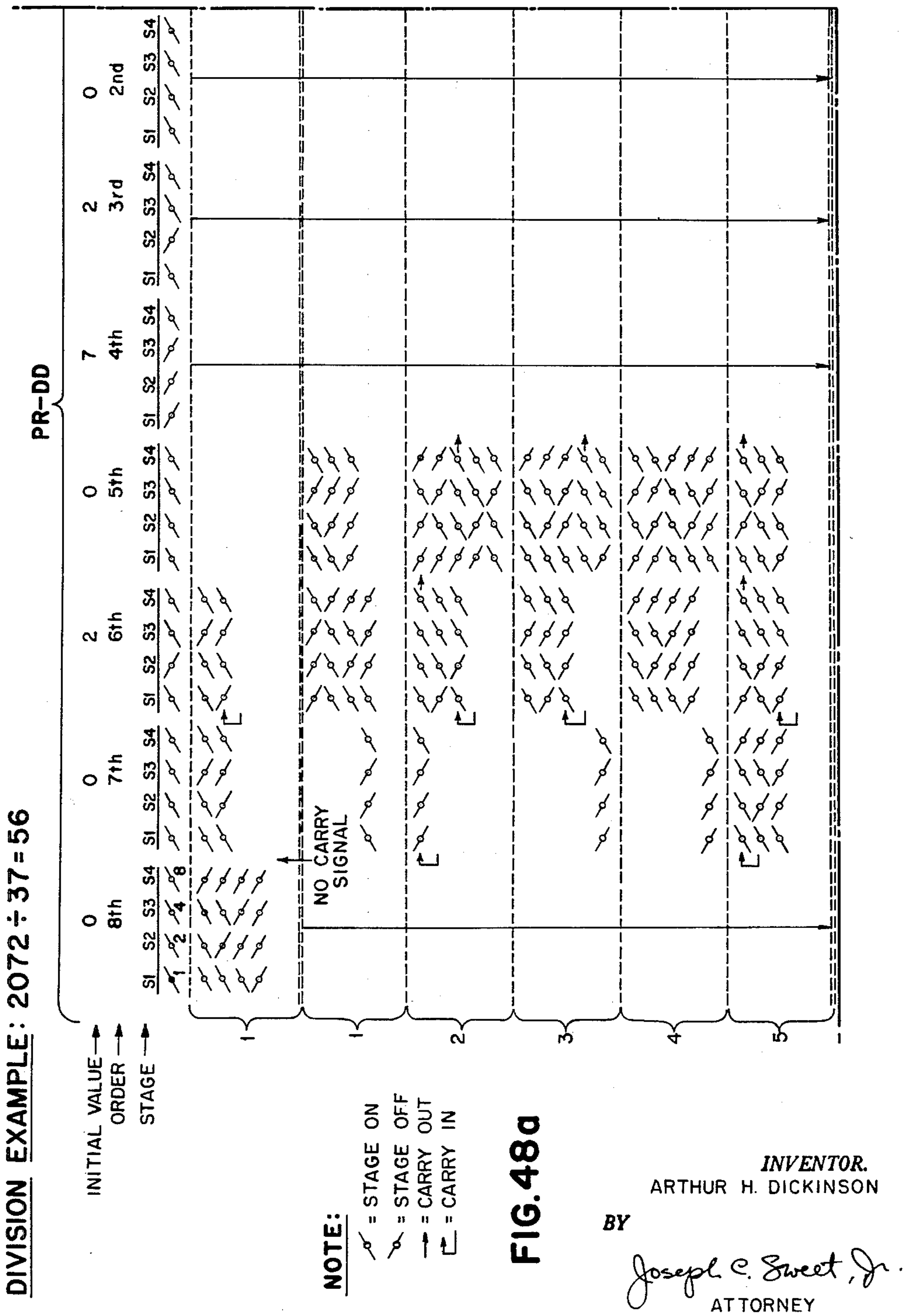
Figure 48B:
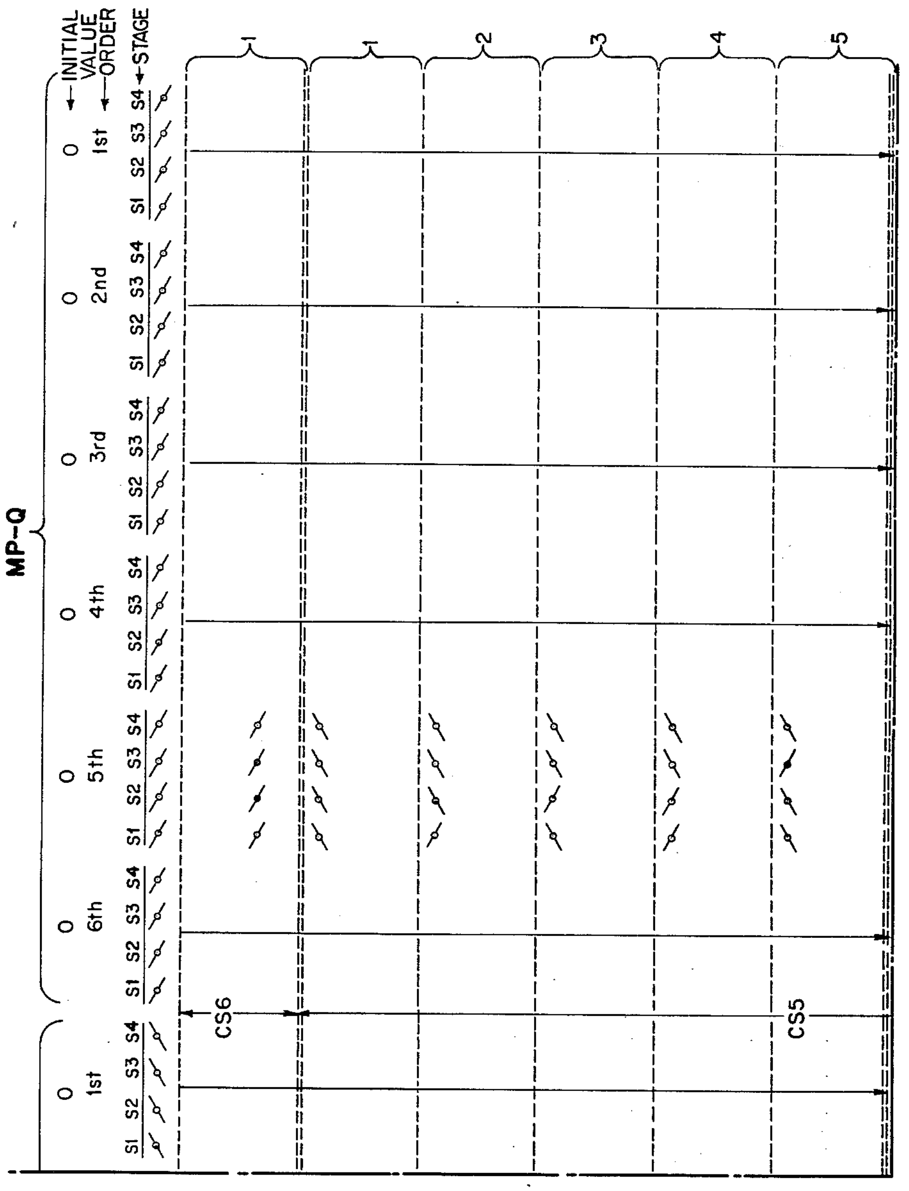
Figure 48C:
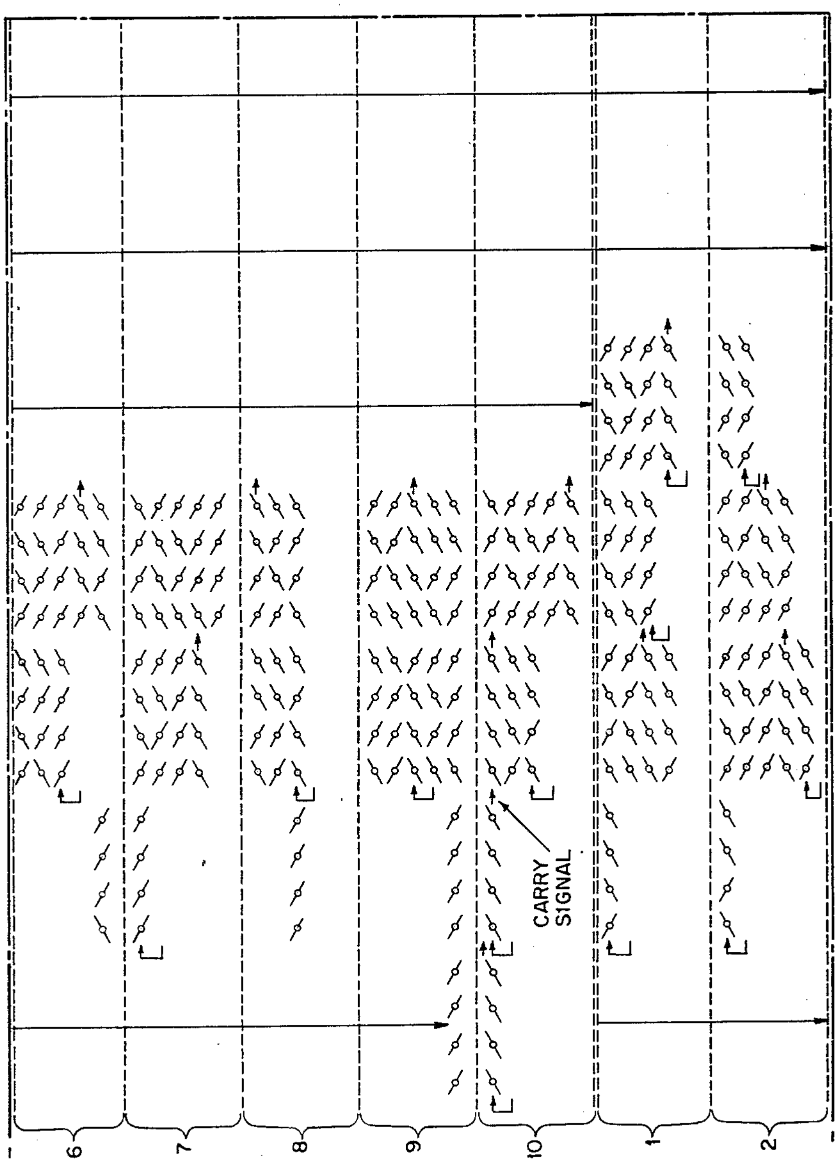

The first S Commutator cycle effects subtraction of the divisor by means of addition of the true complement of the divisor DR amount into the three highest orders of the PR–DD Accumulator. Figs. 48*a* and 48*b* indicate the pattern which the PR–DD Accumulator triggers produce for this first transfer cycle where, as assumed above, the problem is "2072" divided by "37." It will be recalled that the successive digits of the DD value "2072" were initially entered in the form of partial differential values into the 6th, 5th, 4th, and 3rd orders, respectively, of the PR–DD Accumulator. As shown in Figs. 9 and 48*a*, and 48*b*, during the first operation cycle, in order to effect the required subtraction, a "9" is thereafter entered into the 8th order of the PR–DD Accumulator, a "6" is entered into the 7th order, and a "2" and a "1" are entered in succession into the 6th order thereof. The digits "6" and "2" entered are, of course, the nine's complements of the DR value "37," and the "9" and the "elusive 1" are required in the method of dividing utilized.

In this machine no quotient digit is entered into an MP–Q Register order during the first cycle in which the divisor DR is subtracted from the dividend DD. This suppression is mathematically correct in view of the fact that an extra subtractive entry of the divisor DR is necessary to render the dividend DD negative. This is commonly termed an "overdraft" condition. The single extra entry into the PR–DD Accumulator to cause "overdraft" should obviously not be the cause of an extra entry into the MP–Q Register, and suppression of entry into this register in the first S Commutator cycle is the equivalent of preventing such entry during that S Commutator cycle resulting in the "overdraft" situation.

The suppression is accomplished as follows. With trigger QS (Fig. 25*a*) initially in Off status, grounded grid tube V222 is highly conductive. The resulting potential drop across its shunting resistor R254 is low and prevents pentode V224 from conducting when the pulse on wire 348 (from the circuit of Fig. 22*b*) is received by adjacent tube V220 at mid-index time during the first carry interval of the first S Commutator cycle. Thus no pulse is applied via wire 308, tube V138 (Fig. 21*b*), wire 310, and the respective tube V140 and wire 312 (Fig. 21*a*) leading to the sixth order of the MP–Q Register (Figs. 23*a* and 23*b*).

Reference to Fig. 48*a* indicates that at the end of this first DR transfer cycle, the carry trigger CY in the highest or 8th PR–DD Accumulator order (Fig. 20*b*) is in Off status. Accordingly, the related tube V142 (Fig. 21*a*) is highly conductive, which renders tube V152 (Fig. 21*c*) conductive, and a negative pulse is therefore applied to line 282 (Fig. 21*c*) midway in the second carry interval of this first DR transfer cycle due to the appearance then of a positive pulse on wire 276. The manner in which the "no carry" condition causes this pulse to appear on line 282 has been described previously, the fact that a "no carry" condition is effective to produce such a pulse being determined by the fact that wire 316 is at the higher of its two potential states while wire 318 is at the lower of its two potential states. This is because trigger AS–FR (Fig. 25*b*) is in On status and tube V200 (Fig. 25*a*) is therefore in its less conductive state, so that the potential across its shunting resistor R228 (Fig. 25*b*) rises. This causes tube V202 to conduct, raising the potential on wire 316 and on the grid of tube V203, which causes the latter to conduct, thereby reducing the potential drop across its shunting resistor R229 and the potential of wire 318 connected thereto.

The negative pulse on "Off" line 282 is applied to each of stages CS1–CS6 (Figs. 16*a* and 16*b*). Since only stage CS6 is On, however, the pulse is effective only as to this stage, which is thus turned Off. This causes a negative pulse to be applied to the base of transistor T44 of stage CS5, turning the latter On and thus effecting a one step column shift.

Since the dividend DD amount did not contain the divisor DR upon transfer of the latter by the S Commutator cycle as just described, not only is a column shift effected but also certain control circuits are operated whereby, after such column shift, the Add or A Commutator thereupon functions to transfer the divisor DR additively into the PR–DD Accumulator. The manner in which these control circuits are operated is as follows.

At the end of the initial (and in this example, the single) S Commutator cycle and midway during the second carry interval thereof, the above-mentioned positive pulse on wire 276 renders tube V242 (Fig. 25*a*) conductive, which switches trigger QS from Off to On status. As has been previously mentioned, the conduction status of tube V152 is at its higher value during this carry interval of the first S Commutator cycle. The increased conduction status of tube V152 also partially reduces the grid bias of successive tube V244 such that midway during the second carry interval of this cycle the positive differentiated pulse from wire 276 also causes current flow through tube V244. The resulting short negative pulse is applied via condenser C88 to trigger AS–FR (Fig. 25*b*), switching the latter from On to Off status.

With trigger AS–FR in Off status, the pulse on wire 344 (Fig. 22*b*) at the termination of the S Commutator cycle is now effective (via condenser C78, tube V212, transistor T68, condensers C80 and C75, tube V206 and transistor T64 of Fig. 25*b*) to bring about the appearance of a positive pulse on start line 236 leading to the A Commutator (Figs. 22*a*–*c*). The manner in which tube V206 is partially conditioned by the Off status of trigger AS–FR via tubes V200 (Fig. 25*a*) and V202 and V204 (Fig. 25*b*) has been described above in connection with the multiplication control circuits.

The machine now begins a series of additive transfers from the MC–DRA Register into the PR–DD Accumulator, as indicated in Figs. 48*a*–48*d*, which show the pattern which the various triggers comprising the PR–DD Accumulator produce as the transfers are carried out cycle after cycle by the A Commutator. In the particular problem chosen, ten such transfers are required to cause restoration of the characteristic of the PR–DD Accumulator amount from negative to positive. It will be appreciated that these additive transfers are effected in a shifted columnar relationship since Column Shift trigger stage CS5, rather than stage CS6, is now On, as described above. Note in Figs. 48*a* and 48*c* that the digits "3" and "7" are now added in partial differential form into the sixth and fifth orders, respectively, of the PR–DD Accumulator.

The repeated operation of the A Commutator, just referred to, is caused by the pulse which appears on wire 344 (Fig. 22*b*) at the end of each commutator cycle. Trigger AS–FR is in Off status throughout each addition portion of the division operation, and as above-mentioned, this partially conditions tube V206 via tubes V200 (Fig. 25*a*) and V202 and V204 (Fig. 25*b*). Accordingly, each pulse on line 344 is effective (via condenser C78, tube V212, transistor T68, condensers C80 and C75, tube V206 and transistor T64 of Fig. 25*b*) to produce a positive pulse on start line 236 leading to the A Commutator (Figs. 22*a*–22*c*), thereby initiating another cycle of operation of the latter.

Since trigger AS–FR is in Off status, the potential on wire 218 (Fig. 25*a*) is high while that on wire 216 is low, as above-described. Further, the potential on wire 318 (Fig. 25*b*) is high while that on wire 316 is low, since with trigger AS–FR in Off status, tube V200 (Fig. 25*a*) is in its more conductive state so that the potential drop across its shunting resistor R228 (Fig. 25*b*) falls. This causes tube V202 to conduct less and thus lowers the potential on wire 316 and on the grid of tube V203, which causes the latter to be shut off also, thereby increasing the potential drop across its shunting resistor R229 and the potential of wire 318 connected thereto. This partially conditions tube V146 (Fig. 21*b*) in the manner described previously to prepare this tube for conduction when a carry condition is detected in the seventh PR–DD Accumulator order, as described below.

Figure 48D:
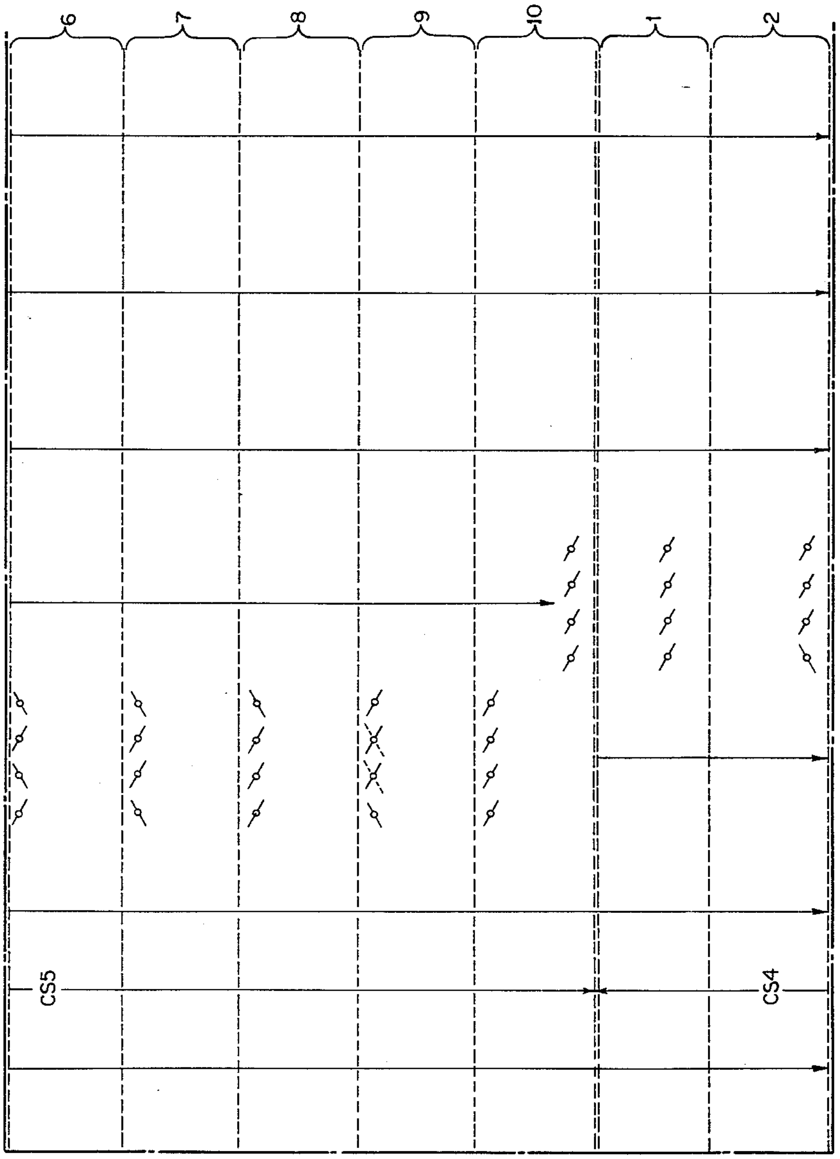
Figure 48E:
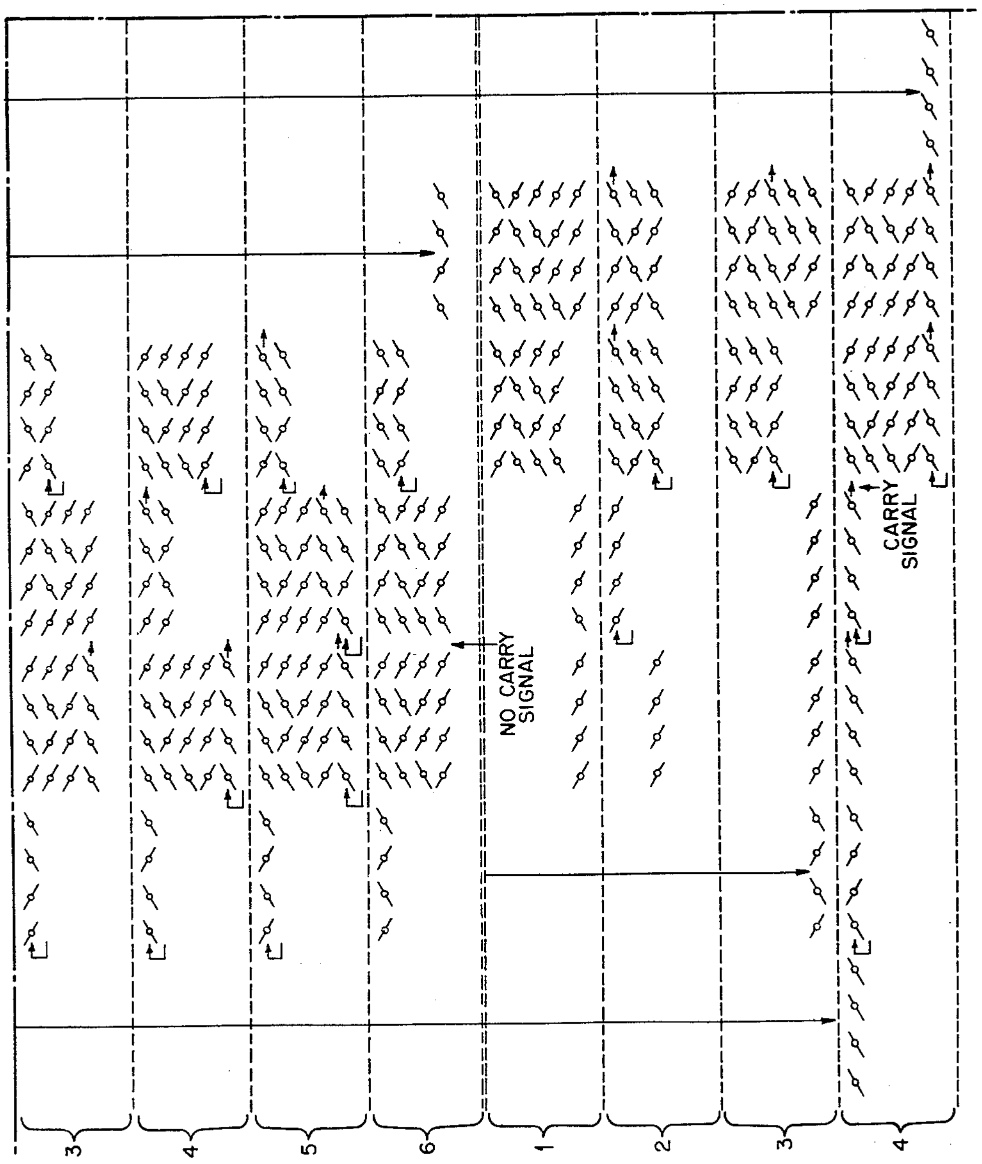

With the potential on wire 218 high, the entries made once each cycle into the fifth order of the MP–Q Register (Figs. 23*a* and 23*b*) cause reverse operation of its triggers. Since trigger QS (Fig. 25*a*) is in On status, once each cycle of the A Commutator there is an entry of a single pulse from wire 310 (Figs. 21*a* and 21*b*) and the proper wire 312 (Fig. 21*a*) into the fifth order of the MP–Q Register (Figs. 23*a* and 23*b*) under control of a related tube V140 (Fig. 21*a*) in the manner described in connection with multiplying operations. The pattern which these triggers produce is shown in Figs. 48*b*, 48*d* and 48*e*. It will be noted from Figs. 48*b* and 48*d* that during the ten addition cycles under discussion, ten such entries of "1" are made and the fifth MP–Q Register order traverses through ten steps, from "0" to "0". There is no effect on an adjacent order or orders because no carry circuits are provided in the MP–Q Register.

Since wire 318 is at its higher potential, as just described above, and connected to the suppressor grid of tube V146 (Fig. 21*b*), this tube is partially conditioned, and will conduct when a carry condition is detected in the order of the PR–DD Accumulator next higher than that receiving the highest order of the DR value, i.e. the seventh order, since the DR digits "3" and "7" are being entered into the sixth and fifth orders, respectively. During the tenth A Commutator cycle, the seventh PR–DD Accumulator order carry circuit CY (Fig. 20*b*) is turned On (see Fig. 48*c*), and this, via the respective line 314 and tubes V142 and V132 (Fig. 21*a*) the latter being already partially conditioned from line 306 (CS5), causes tube V144 (Fig. 21*b*) to shut tube V144 Off. This causes the above-mentioned partially conditioned tube V146 to conduct and, via tubes V150 and V152 (Fig. 21*c*), to partially condition tube V154. Midway in the second carry interval of this tenth A Commutator cycle, a positive pulse appears on wire 276 (Fig. 22*b*), and this, when applied to tube V154 (Fig. 21*c*), produces a negative pulse on "Off" line 282. As previously described, this pulse switches Column Shift trigger stage CS5 (Fig. 16*a*) to Off status, which causes stage CS4 to turn On. In addition, the same pulse on line 276 is applied via tube V244 (Fig. 21c), also partially conditioned from tube V152, and condenser C88 to trigger AS–FR (Fig. 25b) and causes the latter to switch to On status. As described above, this concurrently switches trigger QS to Off status via tube V226, condenser C84 and tube V238 of Fig. 25a.

With the control circuits in this status and with trigger stage CS4 On, the divisor DR is transferred subtractively into the PR–DD Accumulator in a shifted columnar relationship as indicated in Figs. 9 and 48c–48f. A "9" is entered into the 6th order of the PR–DD Accumulator, a "6" is entered into the 5th order, and a "2" and a "1" are entered into the 4th order thereof. As mentioned previously in connection with the first subtraction cycle of the division operation, the digits "2" and "6" are the nine's complements of the DR value "37" and the "9" and the "elusive 1" are required in the method of dividing utilized.

The first cycle of operation of the S Commutator is initiated by the pulse on line 344 (Fig. 22b) occurring during the tenth and last cycle of the previous A Commutator operation, this pulse being applied via condenser C78, tube V212, transistor T68, condensers C80 and C86, and tube V240 (partially conditioned by the On status of trigger AS–FR) of Fig. 26b and thence via line 252 leading to the S Commutator (Figs. 22a–c). Successive cycles are initiated from successive pulses on line 344 via the same circuitry.

No entry of "1" is made into the fourth MP–Q Register order (Figs. 23c and 23d) during the initial S Commutator cycle because trigger QS (Fig. 25a) is Off, as above stated. At the end of this single cycle, however, the pulse on wire 276 is effective through tube V242 to switch trigger QS On again. During the required succeeding subtraction cycles, successive entries of "1" are applied, one each cycle, to the fourth MP–Q Register order (Figs. 23c and 23d) from wire 310 (Figs. 21a and 21b) and the respective tube V140 and wire 312 (Fig. 21), as indicated in Figs. 48c–48f.

These figures (and also Fig. 9) demonstrate that six such transfers of the divisor DR must be made before the characteristic of the amount in the PR–DD Accumulator becomes negative. Note, however, that only five of these transfers are registered in the MP–Q Register. It will be observed by reference to Figs. 9, and 48c and 48e, that at the end of each S Commutator cycle except the last, the second from the highest or 7th PR–DD Accumulator order carry circuit is On. Only during the sixth or last transfer cycle in this carry trigger Off, in which status it controls production of a negative pulse on wire 282 (Fig. 21c) in the manner described above. Thereupon the status of the control circuits shifts and Column Shift trigger stage CS4 turns Off and stage CS3 is switched On, as well as operation of the A Commutator now being again initiated.

Figure 48F:
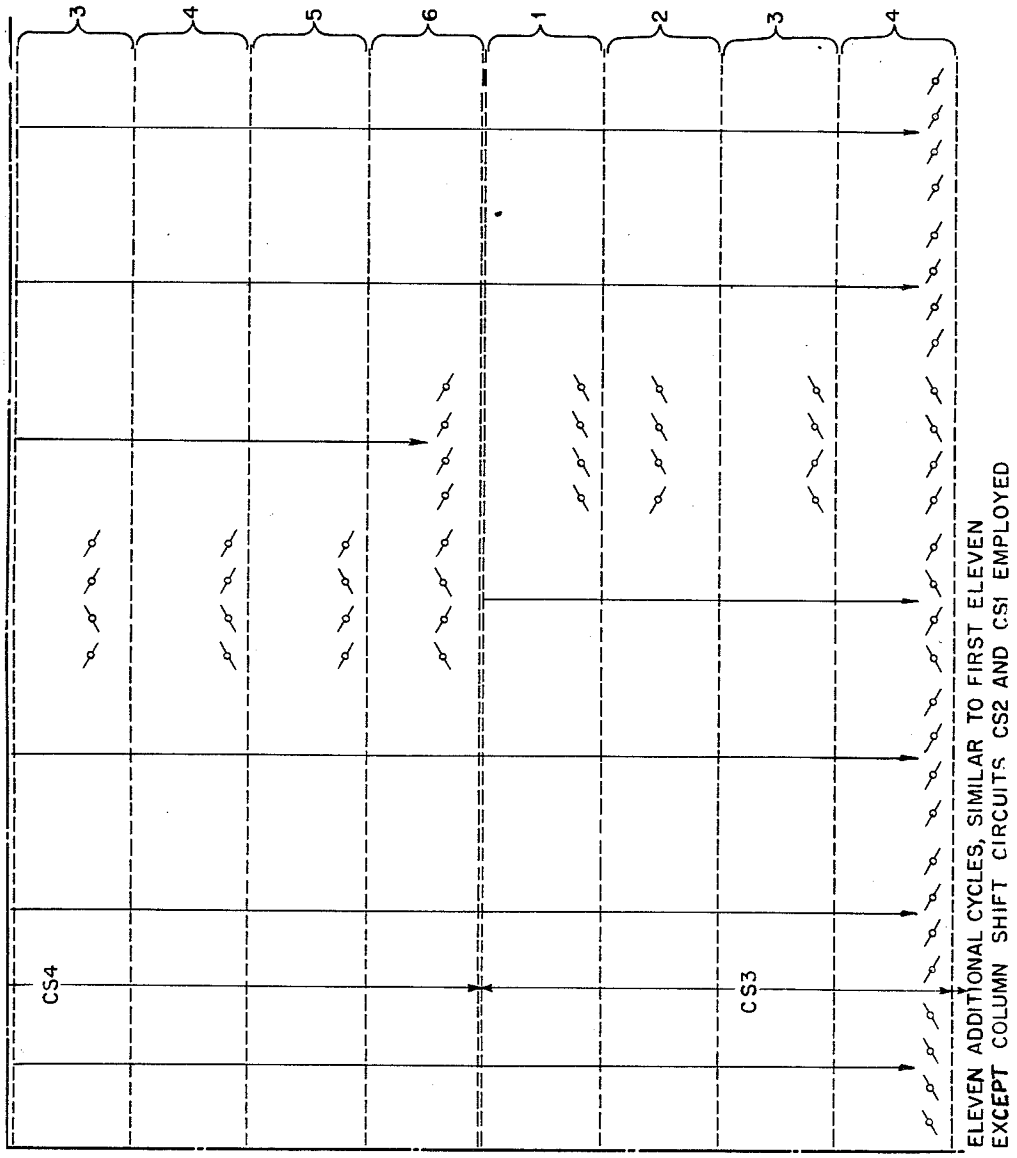

The machine of the present invention is then effective to apply the divisor DR to the PR–DD Accumulator additively again for a series of cycles. In the example chosen, the number required to convert the PR–DD Accumulator amount from a negative to a positive quantity is four. By virtue of the fact that the third MP–Q Register order operates reversely during addition, the result of these four cycles is an entry of a "6" in this third MP–Q Register order. The pattern produced by the switching action of the triggers in the PR–DD Accumulator and the MP–Q Register during these additive cycles is also shown in Figs. 48e and 48f.

While not shown in Figs. 48a–48f, a further single cycle is carried out by the S Commutator, followed by ten cycles of the A Commutator. The result of these eleven additional cycles is to leave "00" in the two lower MP–Q Register orders. Since the manner in which the transfers are effected and in which the control circuits operate is substantially similar to that described in connection with the operation of the S Commutator and A Commutator for the portion of the dividing problem thus far described, no further description is deemed necessary.

Having completed the division of "2072" by "37" to secure the quotient amount "0056.00," dividing operations are suspended when, in this case, the A Commutator effects the tenth transfer of the divisor DR into the PR–DD Accumulator with Column Shift trigger stage CS1 On. As mentioned above, during dividing the Multiply-Divide trigger including transistor T52 and tube V178 (Fig. 25a) is in Off status. Successive tube V180 is therefore highly conductive, which renders tube V207 less conductive. Accordingly, the potential drop across cathode resistors R240 and R270 of the latter is low, which shuts tube V246 Off and results in an increased potential drop across its shunting resistor R271. Tube V248 is biased from this resistor via line 286 and resistor R273, and thus the grid bias of this tube is partially reduced.

Figure 21B:
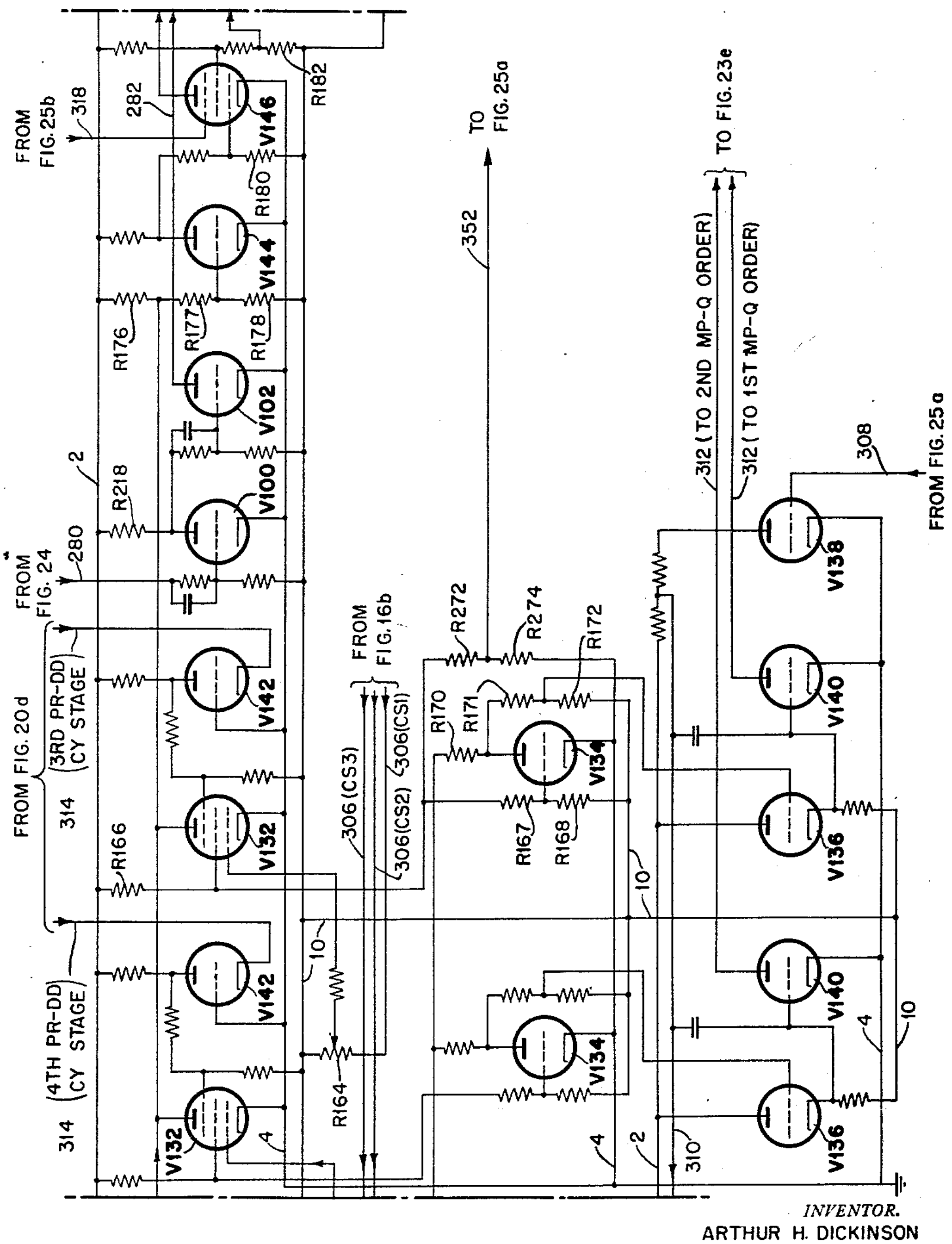
Figure 21C:
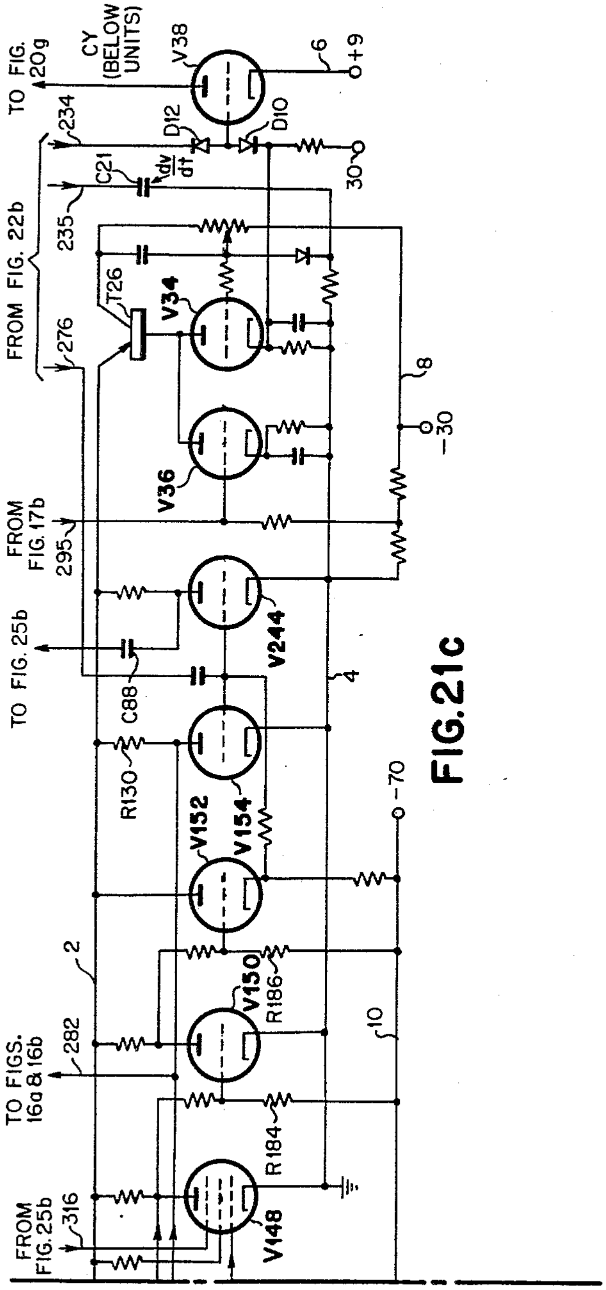

When Column Shift trigger stage CS1 (Fig. 16b) is switched Off during the last A Commutator cycle, the potential on associated wire 306 falls, and the effect of this potential drop is to shut off the screen grid-cathode current flow in the related tube V132 (Fig. 21b). Resistors R272 and R274 couple the screen grid of this tube to line 4. The junction of resistors R272 and R274 is coupled to the grid of the above-mentioned tube V248 (Fig. 25a) via wire 352 and condenser C90. Upon the shutting Off of the screen grid-cathode path of this tube V132 (Fig. 21b), the potential at the junction of its resistors R272 and R274 rises, and the resultant positive pulse applied via condenser C90 (Fig. 25a) to the grid of tube V248 causes increased current flow therethrough. Tube V248 shares plate load resistor R137 (Fig. 24) with tube V194 of the second Compute-Start trigger and with tube V106 of the Multiply Stop circuit. Increased current flow through this resistor R137 switches tube V196 to Off status and at the same time makes the potential applied to the control grid of successive pentode V198 more negative. The latter tube is thus switched Off also, reducing the potential of its cathode and that of grounded grid tube V210 (Fig. 25b), connected thereto by line 354. Tube V210 thus is switched On, and the resultant more negative potential (derived from shunting resistor R244) at the grid of successive tube V212 thereafter prevents the latter tube from conducting when a positive pulse is applied from line 344 at the end of this last A Commutator cycle. Accordingly, operation of the A Commutator ceases and dividing operations are terminated. Note that tubes V210 and V212 and transistor T68 comprise the Divide Stop circuit shown in the block diagram, Fig. 10d.

At the conclusion of the card feed cycle in the record handling mechanism in which the aforementioned dividing problem is carried out, the card reaches the punching station 78 (Fig. 42). In the following card feed cycle the result "0056.00" standing in the MP–Q Register is punched into the card. As pointed out previously, this is effected by impulsing each of the MP–Q Register orders through ten steps under the control of read-out circuits previously described. It will be appreciated that during this punching operation the dividend DD and divisor DR amounts are also being read from the following record card, if any, which is passing the reading brushes 70, to prepare the machine for the next computation.

The second portion of a record-controlled transistor computer has thus been described, including the manner in which the dividend DD and divisor DR amounts are read from a record card and entered into registers. One such register contains the true divisor DR amount, while another contains the nine's complemental amount formed automatically during entry. The values of partial differential values standing in the MC–DRA and DRS Registers control the number of index points comprised in each transfer cycle of an associated commutator. Accordingly, the time required for computing is in part determined by the magnitude of the divisor DR and its nine's complement.

Transfers from the DRS and MC–DRA Registers are carried out in alternate groups of S or A Commutator cycles. Such transfers are made into the PR–DD Accumulator on a partial differential value basis employing timed value impulses. The quotient Q digits are formed in the MP–Q Register by operating successive individual orders forwardly, reversely, forwardly, reversely, etc., starting with the higest order. Other pulses applied to the MP–Q Register orders permit readout by production of differentially timed impulses corresponding to the quotient amount, and these impulses control the punch magnets in the cycle following the computing operation, thereby punching the card with the quotient found for the given dividend DD and divisor DR amounts. The use of transistors and other semiconductor devices in this machine reduces by at least 33% the number of vacuum tubes required to produce dividing operations in a similar manner.

It will be recalled that terminals 13, 14, 15 and 16 of the MP–Q Register (Figs. 23*a*–23*f*) are provided for connection to suitable indicating lamps (not shown), the connection being made through amplifiers if desired or required, to inform operating or maintenance personnel of the On-Off status of the respective trigger circuits. While not mentioned previously in the detailed description, terminals 20 and 21 (Fig. 25*a*), 22 (Fig. 25*b*), 25 and 26 (Fig. 24), and 30 (Fig. 21*c*), connected to other respective trigger circuits, are provided for the same purpose and may be similarly utilized for indication purposes.

While there have been shown, described and pointed out the fundamental novel features of this invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, a commutator comprising at least two cascaded stages, each adapted to provide a voltage gate output, and a switching circuit associated with each stage and selectively operable to bypass or not bypass that stage under control of an input switching impulse to vary the number of successive voltage gate outputs and the length of the commutator cycle, a register comprising at least two cascaded stages, one for and connected to control each of said switching circuits and each including a second output, and gate means controlled by the voltage gate output of the commutator stage associated with the respective switching circuit controlled by the register stage and connected to said second output for gating same.

2. In a machine of the class described, a commutator comprising a plurality of cascaded stages, each adapted to provide a voltage gate output, and including at least one switching circuit having an input and two alternatively effective outputs with its input connected to one stage and its two ouputs respectively coupled to two successive stages and also having a separate control input for determining which output is to be effective, said switching circuit being selectively operable to bypass or not bypass the first of said two successive stages under control of an input switching impulse applied to said separate control input to vary the number of successive voltage gate outputs and the length of the commutator cycle.

3. A commutator in accordance with claim 2 and a register comprising a plurality of cascaded stages, at least one of which is connected to control said switching circuit.

4. Apparatus in accordance with claim 3 including gate means and wherein said one stage of said register includes a second output connected to said gate means and the voltage gate output of the stage of the commutator which said switching circuit is operable to bypass is utilized to control said gate means and thereby gate this second output.

5. A commutator in accordance with claim 2 comprising four stages and a first switching circuit connecting the second stage selectively to the third and fourth stages, and a second switching circuit connecting the first stage selectively to the second stage and the first switching circuit.

6. A commutator in accordance with claim 2 comprising four stages and a first switching circuit connecting the third stage selectively to the input and output of the fourth stage, a second switching circuit connecting the second stage selectively to the third stage and the first switching circuit, a third switching circuit connecting the first stage selectively to the second stage and the second switching circuit, and a fourth switching circuit for connecting an input selectively to the first stage and to the third switching circuit.

7. A commutator in accordance with claim 5 comprising six cascaded stages with the input of the fifth stage connected to the output of said fourth stage.

8. A commutator in accordance with claim 6 comprising six cascaded stages with the input of the fifth stage connected to the output of said fourth stage.

9. A commutator in accordance with claim 6 comprising four additional cascaded stages with the output of the fourth additional stage commoned with the output of said fourth stage, and including a fifth switching circuit connecting the second additional stage selectively to the third and fourth additional stages, and a sixth switching circuit connecting the first additional stage selectively to the second additional stage and the fifth switching circuit.

10. A commutator in accordance with claim 9 wherein each of the stages comprises a trigger circuit and including a common line connected to each trigger circuit for resetting it from On to Off status.

11. A commutator in accordance with claim 10 wherein each of the trigger circuits comprises a serially connected tube and transistor with the transistor output connected in a positive feedback arrangement to the tube input.

12. A commutator in accordance with claim 9 and a register comprising four cascaded stages, one for and connected to control each of the first through fourth switching circuits.

13. Apparatus in accordance with claim 12 wherein each stage of said register includes a second output and the voltage gate output of the stage of the commutator to which the respective switching circuit is connected is utilized to gate this second output.

14. Apparatus in accordance with claim 13 and a second register comprising four cascaded stages with its second stage connected to control said fifth switching circuit and its third stage connected to control said sixth switching circuit and these second and third stages each including a second output, wherein the voltage gate outputs from said four additional cascaded commutator stages are utilized to gate, in succession, these second outputs and the outputs of the other two stages of this second register, wherein a common input is provided to the first stage of each register, wherein each stage of both registers comprises a trigger circuit capable of assuming alternate Off and On states, wherein the first and fourth stages of said second register are reset in On status and the second and third stages of the second register and all four stages of the other register are reset in Off status, wherein, after reset, each successive stage of said second register is switched in status when the previous stage is switched On whereas each successive stage in the other register switches in status when the previous stage is switched Off, and wherein the gated outputs of both registers are all commoned, and a sequencer circuit connected to these commoned outputs to provide sequential outputs in response to successive input pulses from a separate source supplying one pulse during each successive voltage gate output from the commutator.

15. Apparatus in accordance with claim 12 and including a plurality of said four-cascaded-stage registers, each connected as specified in claim 12 and with corresponding stages of the different registers connected to control the same switching circuit.

16. Apparatus in accordance with claim 15 wherein the gated second outputs of each register are commoned, and a sequencer circuit for each register and connected to its commoned outputs to provide sequential outputs in response to successive input pulses from a separate source supplying one pulse during each successive voltage gate output from the commutator.

17. Apparatus in accordance with claim 16 wherein each stage of each register comprises a serially connected transistor and pentode with the transistor output connected to the control grid of the pentode in a positive feedback arrangement and the respective voltage gate connected to the suppressor grid, and wherein the plate of the pentode provides said second output connected to said sequencer circuit.

18. Apparatus in accordance with claim 17 wherein each stage of each register includes at least one additional transistor connected in series with the respective serially-connected transistor and pentode and whose output provides the control potential for the associated switching circuit.

19. Apparatus in accordance with claim 17 wherein each stage of each register includes at least one additional transistor connected in series with the respective serially-connected transistor and pentode and with the outputs of such additional transistors of each register commonly connected to provide a detection circuit to determine when all stages of that register are in Off status.

20. Apparatus in accordance with claim 12 and a second register comprising four cascaded stages with one stage connected to control said fifth switching circuit and another stage connected to control said sixth switching circuit.

21. Apparatus in accordance with claim 20 including a plurality of said four-cascaded-stage second registers, each connected as specified in claim 20 and with corresponding stages of said second registers connected to control the same switching circuit.

22. Apparatus in accordance with claim 21 wherein said one and another stages of each second register each include a second output, and the voltage gate outputs from said four additional cascaded commutator stages are utilized to gate, in succession, these second outputs and the outputs of the other two stages of each said second register.

23. Apparatus in accordance with claim 22 wherein the gated outputs of each second register are commoned, and a sequencer circuit for each second register and connected to its commoned outputs to provide sequential outputs in response to successive input pulses from a separate source supplying one pulse during each successive voltage gate output from the commutator.

24. A register comprising four stages connected in cascade and each comprising a trigger circuit capable of assuming alternate Off and On states, means for resetting the first and fourth stages in one state and the second and third stages in the opposite state, said stages each switching the next stage in status when changing from said one state to said opposite state during forward operation of the counter with entry signals applied serially to the first stage, and said stages each switching the next stage in status when changing from said opposite state to said one state during reverse operation of the counter with entry signals applied serially to the first stage, and means for operating the register reversely during entry to form directly the nine's complement of the entered amount manifested by the entry signals.

25. A reversible register comprising three intermediate coupling circuits and four stages connected in cascade with a respective coupling circuit connecting each preceding stage to the successive stage, each stage comprising a trigger circuit capable of assuming alternate On and Off states, each trigger circuit comprising a serially connected tube and transistor with the transistor output connected in a positive feedback arrangement to the tube input, and each coupling circuit being adapted to switch the successive stage in status in response to the previous stage switching Off or On respectively, under control of an externally applied control potential to achieve alternative forward and reverse operation, respectively, of the register, a first adjustment circuit connected between the fourth stage and the second and third stages and adapted to switch the second and third stages from Off to On status when the fourth stage switches On, a second adjustment circuit similarly connected between the fourth stage and the second and third stages and adapted to switch the second and third stages from On to Off status when the fourth stage switches Off, each intermediate coupling circuit and the two adjustment circuits comprise a vacuum tube and a cascaded transistor and vacuum tube selectively providing the alternate paths for reverse and forward operation, means for selectively enabling said first and second adjustment circuits for forward and reverse operation, respectively, of the register and a zero detection circuit connected to each stage to determine when all stages are in On status and comprising a cathode follower for each stage having its input connected to the output of the stage and a transistor having its emitter-base path connected as the common cathode impedance for all the cathode followers.

26. A reversible register as in claim 25 including an additional transistor serially connected with the cascaded transistor of said adjustment circuits to provide at its output a properly timed read-out pulse when the register is operated forwardly and ten successive impulses are applied to the input of its first stage.

27. A register comprising four cascaded stages, each comprising a scaler circuit capable of assuming alternate On and Off states in response to successive input pulses, and each including a second input, and an adjustment circuit, including first and second delay elements providing different time delays, connected between the fourth stage and the second and third stages through said first and second delay elements, respectively, for switching said second and third stages in status in succession when said fourth stage switches in status.

28. A register as in claim 27 wherein said scaler circuits each comprise a serially connected tube and transistor with the transistor output connected in a positive feedback arrangement to the tube input, and said delay elements each comprise a condenser and a serially connected tube and transistor with the transistor output connected through said condenser in a positive feedback arrangement to the tube input.

29. A plurality of registers as in claim 27 connected in cascade to form an accumulator and including a carry circuit between the input of each successive register and the output of the preceding one.

30. An accumulator as in claim 29 wherein each carry circuit is adapted to store a carry indication and deliver the same to the next stage under control of an applied control potential.

31. An accumulator as in claim 30 wherein the applied control potential is of longer duration than the time required for each order to store a carry indication when the order stands at its highest indication and a carry is received from the next lower order.

32. An accumulator as in claim 30 wherein each carry circuit includes a trigger circuit comprising a serially connected tube and transistor with the transistor output connected in a positive feedback arrangement to the tube input and a further tube biased both by the output of said trigger circuit and by said control potential and producing an output only in response to the simultaneous application of both.

33. An electronic multiplier for producing multiplication by over and over addition of a multiplicand amount a number of times equal to the value of a multiplier, comprising: a multi-order electronic product accumulator responsive to impulses in binary form and including feedback means for accumulating the result in binary coded decimal form and also including carry means between adjacent orders thereof; a multi-order electronic multiplier register with each order responsive to successive impulses and including feedback means for registering the result in binary coded decimal form; means for entering the multiplier value impulses into the respective orders of the multiplier register; means for stepping down the content of the effective order of said register by a "one" manifestation during each addition; column shift means for controlling the relative columnar position of read-in of the multiplicand value, in binary form impulses, into the product accumulator; means controlling said column shift means to produce successive column shifts in response to detection of a "zero" manifestation in successive orders of said multiplier register as the multiplication operation progresses; and wherein each addition is under control of a commutator providing addition of different binary digit manifestations of each multiplicand order sequentially and the same binary digit manifestations in different multiplicand orders simultaneously.

34. An electronic multiplier as in claim 33 including a multi-order multiplicand register and switching means connecting said commutator and said multiplicand register for controlling the length of the commutator cycle in accordance with the presence or absence of the different binary digit manifestations stored in said multiplicand register.

35. An electronic divider for producing division by over and over addition of the divisor and the complement thereof in alternation to the dividend, comprising: a multi-order electronic register for receiving and storing, in binary form, manifestations of the true value of the divisor; a multi-order register for receiving and storing, in binary form, manifestations of the nine's complement of the divisor; a multi-order electronic accumulator including adjustment circuits for receiving in binary form and storing, in binary coded decimal form, manifestations of the value of the dividend and including carry means between adjacent orders thereof and carry manifesting means for each order and each order having independent inputs for receiving, in binary form, manifestations of the divisor values during said additions; a multi-order electronic register including adjustment circuits for receiving in binary form and storing, in binary coded decimal form, manifestations of the quotient value; stepping means for increasing the content of the effective order of the quotient register by a "one" manifestation during each addition cycle except the first one of each group in which the manifestations of the nine's complement of the divisor is added; means for adding a "one" manifestation in the order of the dividend accumulator receiving the manifestations of the lowest divisor order value and a "nine" manifestation in the order of the dividend accumulator next higher than that receiving the manifestations of the highest divisor order value during each addition of the manifestations of the nine's complement of the divisor; column shift means for controlling the relative columnar position of read-in of the manifestations of the divisor value, in binary form, into said dividend accumulator; means controlling said column shift means to produce successive column shifts in response to detection, by the carry manifestation means of the order of the dividend accumulator next higher than that receiving the manifestations of the highest order divisor value, of a no-carry condition during addition of the manifestations of the nine's complement of the divisor value and of a carry condition during addition of the manifestations of the true divisor value; and, means connecting said dividend accumulator and the registers for storing manifestations of the nine's complement of and the true value of the divisor, respectively, for causing addition of these alternately during alternate column shifts steps.

36. An electronic divider as in claim 35 including means for reading out the contents of the orders of said quotient register at the conclusion of the division operation.

37. An electronic divider as in claim 35 wherein each addition is under control of a commutator providing addition of manifestations of different binary digits of each divisor order sequentially and addition of manifestations of the same binary digits in different divisor orders simultaneously.

38. An electronic divider as in claim 37 including means connecting said register for storing manifestations of the true value of the divisor and said commutator for controlling the length of the commutator cycle during addition of the manifestations of the true value of the divisor in accordance with the presence or absence of the manifestations of the different binary digits stored in said last-mentioned register.

39. An electronic divider as in claim 37 including additional means connecting said register for storing manifestations of the nine's complement and said commutator for controlling the length of the commutator cycle during addition of the manifestations of the nine's complement of the divisor in accordance with the presence or absence of the manifestations of certain binary digits stored in said last-mentioned register.

References Cited in the file of this patent

UNITED STATES PATENTS

| | | |
|---|---|---|
| 2,295,448 | Bryce et al. | Sept. 8, 1942 |
| 2,328,610 | Bryce et al. | Sept. 7, 1943 |
| 2,386,481 | Lang | Oct. 9, 1945 |
| 2,394,925 | Luhn | Feb. 12, 1946 |
| 2,500,294 | Phelps | Mar. 14, 1950 |
| 2,514,036 | Dickinson | July 4, 1950 |
| 2,534,287 | Marsh | Dec. 19, 1950 |
| 2,536,916 | Dickinson | Jan. 2, 1951 |
| 2,536,955 | Palmer et al. | Jan. 2, 1951 |
| 2,557,085 | Fisk et al. | June 19, 1951 |
| 2,591,008 | Rench | Apr. 1, 1952 |
| 2,597,796 | Hindall | May 20, 1952 |
| 2,603,746 | Burkhart et al. | July 15, 1952 |
| 2,604,262 | Phelps | July 22, 1952 |
| 2,618,753 | Van Mierlo | Nov. 18, 1952 |
| 2,620,448 | Wallace | Dec. 2, 1952 |
| 2,623,170 | Dickinson | Dec. 23, 1952 |
| 2,623,171 | Woods-Hill | Dec. 23, 1952 |
| 2,624,508 | Dickinson | Jan. 6, 1953 |
| 2,632,845 | Goldberg | Mar. 24, 1953 |
| 2,634,052 | Bloch | Apr. 7, 1953 |
| 2,636,133 | Hussey | Apr. 21, 1953 |
| 2,644,887 | Wolfe | July 7, 1953 |
| 2,658,681 | Palmer | Nov. 10, 1953 |
| 2,670,445 | Felker | Feb. 23, 1954 |
| 2,672,283 | Havens | Mar. 16, 1954 |
| 2,679,975 | Grosvalet | June 1, 1954 |
| 2,682,615 | Sziklai et al. | June 29, 1954 |
| 2,685,039 | Scarbrough | July 27, 1954 |
| 2,700,503 | Crosman | Jan. 25, 1955 |
| 2,700,504 | Thomas | Jan. 25, 1955 |
| 2,701,095 | Stibitz | Feb. 1, 1955 |
| 2,703,201 | Woods-Hill et al. | Mar. 1, 1955 |
| 2,706,811 | Steele | Apr. 19, 1955 |
| 2,711,526 | Gloess | June 21, 1955 |
| 2,719,670 | Jacobs et al. | Oct. 4, 1955 |

(Other references on following page)

UNITED STATES PATENTS

| | | |
|---|---|---|
| 2,722,375 | Chenus | Nov. 1, 1955 |
| 2,745,599 | Wood-Hill et al. | May 15, 1956 |
| 2,749,037 | Stibitz | June 5, 1956 |
| 2,758,787 | Felker | Aug. 14, 1956 |
| 2,760,087 | Felker | Aug. 21, 1956 |
| 2,767,908 | Thomas | Oct. 23, 1956 |
| 2,772,050 | Robinson et al. | Nov. 27, 1956 |
| 2,775,402 | Weiss | Dec. 25, 1956 |
| 2,784,907 | Williams et al. | Mar. 12, 1957 |
| 2,789,766 | Wood | Apr. 23, 1957 |
| 2,798,156 | Selmer | July 2, 1957 |
| 2,819,839 | Jacobs et al. | Jan. 14, 1958 |
| 2,834,543 | Burkhart | May 13, 1958 |

FOREIGN PATENTS

| | | |
|---|---|---|
| 1,043,321 | France | June 10, 1953 |
| 749,836 | Great Britain | June 6, 1956 |

OTHER REFERENCES

Progress Report No. 2 on the EDVAC, Moore School of Engineering, declassified Feb. 13, 1947 (Fig. PY-0-230) (pages 1.4.9–1.4.15; 7 pp.).

Proc. of the IRE, "Diode Coincidence and Mixing Circuits in Digital Computers," May 1950, Tung Chang Chen, pages 511–514.

"High Speed Computing Devices," by ERA, McGraw-Hill, 1950 (pages 297–299).

Rev. Scien. Inst., vol. 22, No. 6, June 1951, A New Type of High Speed Coincidence Circuit, Z. Bay, pages 397–400.

Proc. of the IRE, "Miniature Rectifier Computing and Controlling Circuits," An Wang, August 1952, pages 931–935.

Electrical Engineering, "Typical Block Diagrams for a Transistor Computer," by Felker, pages 1103–1108, December 1952.

UNITED STATES PATENT OFFICE
CERTIFICATE OF CORRECTION

Patent No. 2,942,780 June 28, 1960

Arthur H. Dickinson

It is hereby certified that error appears in the printed specification of the above numbered patent requiring correction and that the said Letters Patent should read as corrected below.

Column 10, line 69, for "206" read -- 296 --; column 30, line 2, for "[Fig. 15b])" read -- [Fig. 15a]) --; line 11, for "$S_1$, $S_2$" read -- S1, S2 --; column 33, line 12, for "to" read -- at --; column 37, line 29, for "in order to" read -- any order --; column 53, line 59, for "condition" read -- conduction --; column 74, line 40, for "in", second occurrence, read -- is --; column 81, line 24, for "Fig. 26b" read -- Fig. 25b --; line 48, for "in", first occurrence, read -- is --.

Signed and sealed this 11th day of April 1961.

(SEAL)

Attest:

ERNEST W. SWIDER

Attesting Officer

ARTHUR W. CROCKER

Acting Commissioner of Patents